United States Patent
Sederlund et al.

(10) Patent No.: US 6,647,301 B1
(45) Date of Patent: Nov. 11, 2003

(54) PROCESS CONTROL SYSTEM WITH INTEGRATED SAFETY CONTROL SYSTEM

(75) Inventors: Edward R. Sederlund, Saginaw, MI (US); Ernst W. Quelle, Stade (DE); Helmut A. Bezecny, Duedenbuettel (DE); Johannes C. Kanse, Biervliet (NL); Robert J. Lindesmith, Midland, MI (US); John L. Clement, Midland, MI (US); Donald Grinwis, Midland, MI (US); Eloy Baca, Jr., Attleboro, MA (US); Dennis J. Dunlap, Attleboro, MA (US); Brent M. Frank, Franklin, MA (US); Augustine K. Tibazarwa, Quincy, MA (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/482,386

(22) Filed: Jan. 12, 2000

Related U.S. Application Data

(60) Provisional application No. 60/130,627, filed on Apr. 22, 1999.

(51) Int. Cl.[7] .................................................. G05B 9/02
(52) U.S. Cl. ........................... 700/79; 700/20; 700/21; 700/174; 700/108; 700/110; 714/6; 714/7; 714/8; 714/15; 714/24; 714/31; 714/47
(58) Field of Search ........................... 700/20, 21, 174, 700/108, 110, 79; 714/47, 15, 24, 6, 7–8, 31

(56) References Cited

U.S. PATENT DOCUMENTS

| 4,598,355 A | * | 7/1986 | Shepler et al. ................. 700/79 |
| 4,649,515 A | * | 3/1987 | Thompson et al. ............ 706/52 |
| 5,151,866 A | | 9/1992 | Glaser et al. ................. 364/483 |
| 5,408,603 A | | 4/1995 | Van de Lavoir et al. ... 395/161 |
| 5,428,745 A | | 6/1995 | de Bruijn et al. ............ 395/200 |

(List continued on next page.)

FOREIGN PATENT DOCUMENTS

| EP | 0457308 A2 | 11/1991 |
| WO | WO 93/13477 | 7/1993 |
| WO | WO 98/36355 | 8/1998 |

OTHER PUBLICATIONS

Distributed Computing Environment Using Real–Time Scheduling Logic and Time Deterministic Architecture, filed in the United States of America on May 26, 1998, Application Ser. No. 60/086,737, Woods et al.

Specification for Limits and methods of measurement of radio disturbance characteristics of industrial, scientific and medical (ISM) radio–frequency equipment, British Standard, BS EN 55011:1991.

Electromagnetic compatibility—Generic emission standard, Part 2. Industrial environment, British Standard, BS EN 50081–2:1994.

British Standard Specification for Limits and methods of measurement of radio interference characteristics of information technology equipment, British Standard, BS 6527:1988 EN 55022:1987.

(List continued on next page.)

*Primary Examiner*—Paul P. Gordon
*Assistant Examiner*—Thomas Pham

(57) ABSTRACT

A process control system receiving input signals from a controlled apparatus and using the input signals in determining at least one output signal modifying the characteristics of at least one respective control device in the controlled apparatus where the source code for the general control of the apparatus and the source code for the safety shutdown system of the apparatus are compiled to control code in a unified compilation.

8 Claims, 95 Drawing Sheets

U.S. PATENT DOCUMENTS

| | | | |
|---|---|---|---|
| 5,428,769 A | | 6/1995 | Glaser et al. ............... 395/575 |
| 5,491,625 A | | 2/1996 | Pressnall et al. ............ 364/133 |
| 5,506,792 A | | 4/1996 | Adelson et al. ............. 364/570 |
| 5,519,603 A | | 5/1996 | Allbery, Jr. et al. ........ 364/133 |
| 5,553,237 A | | 9/1996 | Eisenberg et al. ..... 395/184.01 |
| 5,555,424 A | | 9/1996 | Sederlund et al. .......... 395/800 |
| 5,561,770 A | | 10/1996 | de Bruijn et al. ....... 395/200.06 |
| 5,568,615 A | | 10/1996 | Sederlund et al. ..... 395/200.08 |
| 5,572,671 A | | 11/1996 | Eisenberg et al. ..... 395/184.01 |
| 5,583,757 A | | 12/1996 | Baca, Jr. et al. ............ 364/184 |
| 5,631,825 A | | 5/1997 | van Weele et al. ......... 364/188 |
| 5,655,133 A | | 8/1997 | Dupree et al. ......... 395/800.23 |
| 5,726,668 A | | 3/1998 | Clement ........................ 345/1 |
| 5,864,657 A | * | 1/1999 | Stiffler .......................... 714/15 |
| 5,984,504 A | * | 11/1999 | Doyle et al. ................ 700/108 |

OTHER PUBLICATIONS

Limits and methods of measurements of radio disturbance characteristics of information technology equipment, British Standard, BS EN 55022:1995 CISPR 22:1993.

Safety requirements for electrical equipment for measurement, control, and laboratory use, Part 1. General requirements, British Standard, BS EN 61010–1:1993.

Automatic gas burner control systems for gas burner and gas burnings appliances with or without fans, British Standard, BS EN 298:1994.

Technical Help to Exporters (translation), Electrical equipment for furnaces, British Standards Institution, DIN VDE 0116, Oct. 1989.

Principles for computers in safety–related systems (translation), DIN V VDE 0801 Amendment A1, Revision: 0.7 Nov. 25, 1994.

Commission Electrotechnique Internationale, International Electrotechnical Commission, Functional safety of electrical/electronic/programmable electronic safety–related systems, Part 1: General requirements, CEI IEC 61508–1, Version 4.0 May 12, 1997.

Commission Electrotechnique Internationale, International Electrotechnical Commission, Functional safety of electrical/electronic/programmable electronic safety–related systems, Part 2: Requirements for electrical/electronic/programmable electronic safety–related systems, CEI IEC 61508–2, Version 4.0 May 12, 1997.

Commission Electrotechnique Internationale, International Electrotechnical Commission, Functional safety of electrical/electronic/programmable electronic safety–related systems, Part 3: Software requirements, CEI IEC 61508–3, Version 12.0 May 12, 1997.

Commission Electrotechnique Internationale, International Electrotechnical Commission, Functional safety of electrical/electronic/programmable electronic safety–related systems, Part 4: Definitions and abbreviations, CEI IEC 61508–4, Version 4.0 May 12, 1997.

Commission Electrotechnique Internationale, International Electrotechnical Commission, Functional safety of electrical/electronic/programmable electronic safety–related systems, Part 5: Examples of methods for the determination of safety Integrity levels, CEI IEC 61508–5, Version 4.0 May 12, 1997.

Commission Electrotechnique Internationale, International Electrotechnical Commission, Functional safety of electrical/electronic/programmable electronic safety–related systems, Part 6: Guidelines on the application of parts 2 and 3, CEI IEC 61508–6, Version 4.0 May 12, 1997.

Commission Electrotechnique Internationale, International Electrotechnical Commission, Functional safety of electrical/electronic/programmable electronic safety–related systems, Part 7: Overview of techniques and measures, CEI IEC 61508–7, Version 4.0 May 12, 1997.

Measurement–Control–Regulation, Fundamental Safety Considerations for MSR Protection Equipment, English title: Measurement and control: Fundamental safety aspects to be considered for measurement and control equipment, DIN V 19 250 (translation included).

Code of Federal Regulations, Labor, 29, Part 1900 to § 1910.999, Revised as of Jul. 1, 1998.

Code of Federal Regulations, Labor, 29, Part 1900 to § 1910.999, Revised as of Jul. 1, 1999.

Lexis Law Publishings Code of Federal Regulations, 29 CFR 1910.119, Feb. 8, 2000.

Leonard Sterle, Applying PLCs in Safety Systems, 74 Control and Instrumentation, 23(1991)Jan., No. 1, pp. 39–40, London, GB.

Patent Abstracts of Japan, JP 09185556, Jul. 15, 1997, Toshiba Corp., Method for Managing Duplex Memory and Duplex Memory Management Device.

* cited by examiner

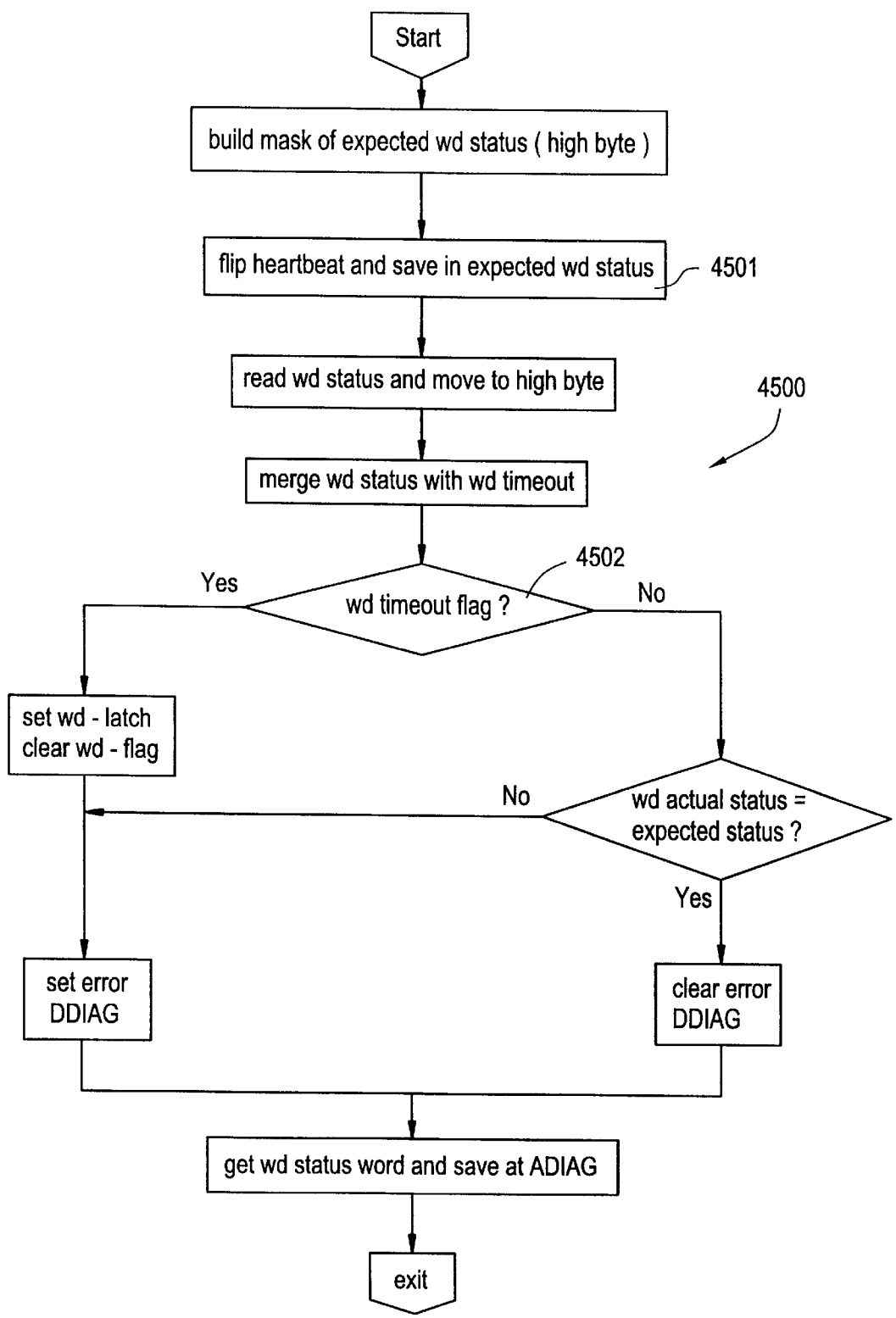

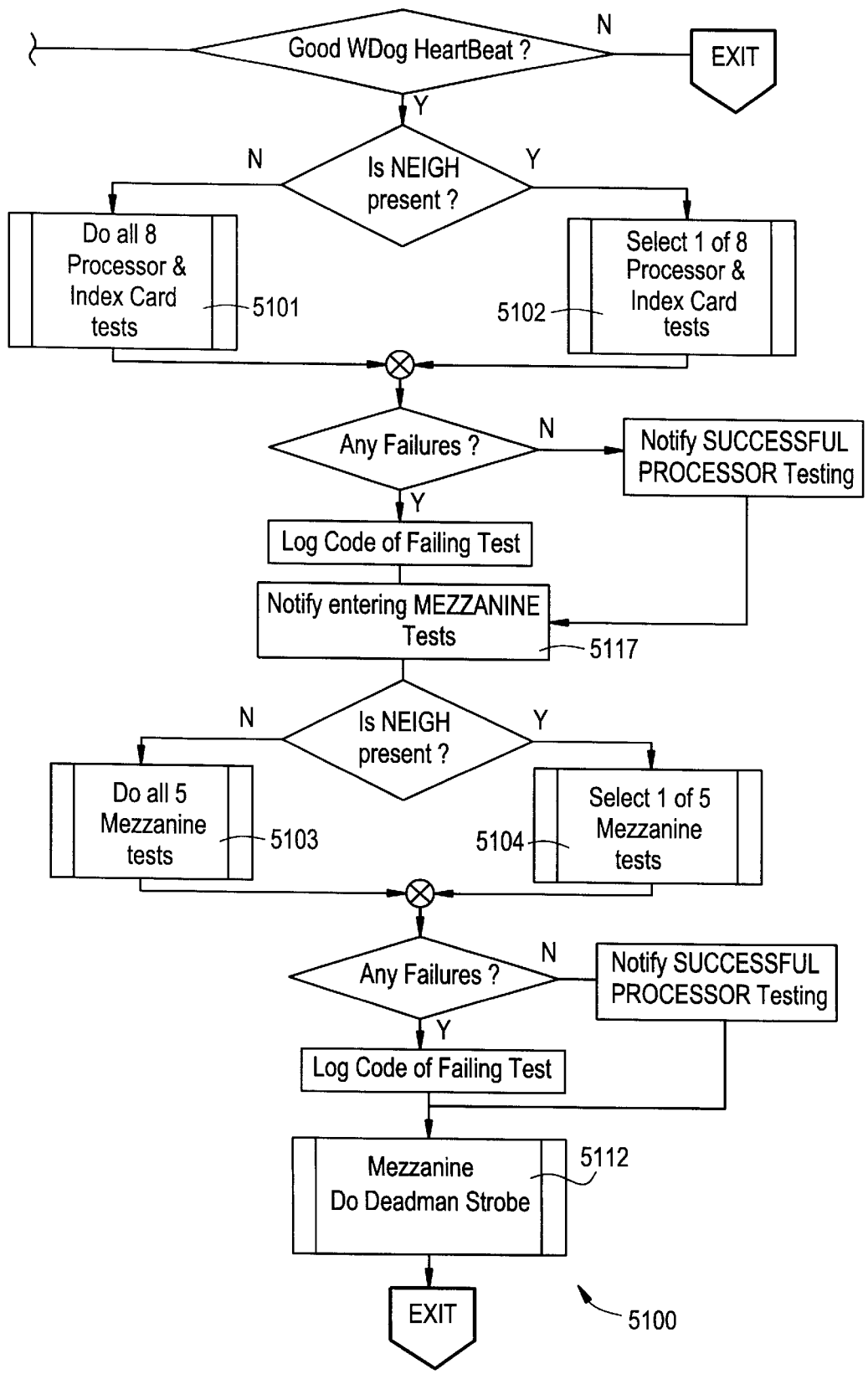

PROCESS CONTROL SYSTEM WITH INTEGRATED SAFETY CONTROL SYSTEM

CROSS-REFERENCE TO PRIOR APPLICATION

This application claims the benefit of U.S. Provisional Application No. 60/130,627 filed Apr. 22, 1999.

FIELD OF THE INVENTION

This invention relates to control systems where safety features are of special interest.

BACKGROUND

A number of process control systems use both a general process control system and a second attached safety shutdown computer system to comply with safety requirements in an apparatus controlled by the process control system. Such safety requirements are formalized in documented standards such as IEC 61508 (International Electrotechnical Commission Standard 61508) Parts 1 through 7; VDE 0801 (German Technical Standard 0801) AK 1 through 6; DIN (German Normalizing Institute Standard) 0116, Chapter 8.7; DIN V 19250, AK 1 through 6; EN (European Standard) 298, Chapters 9 and 10; EN 61010-1; EN 50081-2; EN 55011; and EN 55022. Process control safety requirements are also formalized in regulations such as 29 C.F.R. §1910.119 in the United States of America.

Respective to formalized requirements, a process known as "certification" is used in determining formalized acceptability of a system. The certification process examines conformance between (a) design of the system, (b) practices by organizations in construction, modification, and use of the system, and (c) the formalized requirements. Respective to "certification" and IEC 61508, four levels of acceptability are defined which are known as SILs (Safety Integrity Levels), with SIL 1 appropriate for processes having some minor risk and SIL 4 appropriate for processes having high potential risk (for example, public transportation systems under automatic control or nuclear power plants under automatic control). "Certification" is usually done by a trained "certifying agency" with credibility for such review in the society in which the "certified" system is used; an example of such a "certifying agency" is TÜV Bäyern having main offices in Munich, Germany.

In providing an acceptable control solution, there is frequently a need in higher-risk processes for the safety shutdown system to have robustness and real-time diagnostic sophistication superior to comparable attributes in the general process control system. The safety shutdown system is also usually more secure than the general process control system in the ability of an operating technician to modify critical parameters; in this regard, access to the data space of a safety shutdown computer uses a physical lock and key kept in secure custody. Safety shutdown computer system design has taken a somewhat different course from general process control system design; this has resulted in divergence in operational and programming attributes of the systems. While the concurrent use of such systems with their divergent operational and programming attributes has been generally effective, there are drawbacks. Engineers, supervisors, and operating technicians must be versant in the accompanying divergent operational and programming attributes; and, in certain situations, a comprehensive understanding of the manner in which the two systems as a whole effect control is confounded as features respective to the divergent operational and programming attributes interact.

Process control systems incorporating the use of a safety shutdown computer system also enable compilation of affiliated potentially variant control-computer-executed logic sets used in the two different systems at different times: a situation which does not characterize the control system logically unified at one point in time under a unified authority. "Potentially variant" references that portion of the logic which could reasonably be expected to undergo change at the level of security access permitted to the programming engineer; a Read Only Memory chip (ROM), while frequently providing logic derived from a compile process, is not "potentially variant" in this regard unless routine incremental modifications to the control computer logic includes the process of new ROM creation and ROM component change. A control system logically unified at one point in time (that is, where all potentially variant source code for the general control of the apparatus and all potentially variant source code for the safety shutdown system of the apparatus are compiled to Machine Operation Code in the same compile instance) under a unified authority is ideally desirable in managing complex facilities. Finally, provision of a support base for two different systems is usually more expensive than for one system; such extra expense confounds efficient use of resources.

What is needed in resolving the above concerns is to provide a single unified system for executing both the safety related aspects of process control and the general aspects of process control. A rapid solution to this is to use a safety-capable system for all control needs; however, the use of a safety-capable system (frequently triply-redundant physically) in generally controlling a facility as well as in providing for its safety shutdown is expensive because of the higher capital needed per I/O point. So, while providing a technical solution to the problem of a single unified system, use of a safety shutdown system for all control is not usually an efficient resolution to the problem. What is truly needed and desired, therefore, in resolving the above concerns is to provide an economically viable single unified system capable of executing both (a) safety-related process control and (b) general process control. The present invention provides a solution to this need by providing a unified system which can execute general process control of an apparatus while also providing features used (a) in implementing burner and fired equipment safety shutdown and (b) in implementing safety management and safety integrity system solutions for achieving at least Safety Integrity Level 3 (SIL1, SIL2, and SIL3) conformance (when further coupled with organizational and engineering processes respective to construction, modification, and use of the control system which are acceptable to the certifying agency).

The following incorporated documents describe embodiments in a general process control system prior to modification into the unified control system described in this specification:

One embodiment of a control computer used in a general process control system is described in U.S. Pat. No. 5,555, 424 (24Sederlund et al.) issued on Sep. 10, 1996 and entitled "Extended Harvard architecture computer memory system with programmable variable address increment" to Sederlund, Edward R.; Lindesmith, Robert J.; Root, Larry A.; Dupree, Wayne P.; and Thomas, Lowell V. This patent is expressly incorporated herein by reference in the present application for showing the status of the prior art and a manner of use respective to the present invention.

An embodiment of a redundant control computer system in a general process control system using two control computers such as the control computer described in 24Sederlund et al. is described in U.S. Pat. No. 5,583,757 (Baca, Jr. et al.) issued on Dec. 10, 1996 and entitled "Method of input signal resolution for actively redundant control computers" to Baca, Jr., Eloy; Dupree, Wayne P.; Grinwis, Donald J.; Kanse, Johannes C.; Pelletier, Douglas P.; and Schulze, Oscar E. This patent is expressly incorporated herein by reference in the present application.

An embodiment of a system for achieving data access for the control computer described in 24Sederlund et al. is described in U.S. Pat. No. 5,568,615 (15Sederlund et al.) issued on Oct. 22, 1996 and entitled "Stealth interface for control computers" to Sederlund, Edward R.; Thomas, Nadene T.; Lindesmith, Robert J.; and Cowles, Russell W. This patent is expressly incorporated herein by reference in the present application for showing the status of the prior art and a manner of use respective to the present invention.

An embodiment of a system providing a Remote Field Unit (also referenced in abbreviated form as a "Remote", an "RFU", or a "Remote unit") for use with the control computer described in 24Sederlund et al. is described in U.S. Pat. No. 5,428,769 (69Glaser et al.) issued on Jun. 27, 1995 and entitled "Process control interface system having triply redundant Remote Field Unit field units" to Glaser, Robert S.; Hoy, Robert S.; Fernandez, G. Paul; and Grai, Timothy J. This patent is expressly incorporated herein by reference in the present application for showing the status of the prior art and a manner of use respective to the present invention.

An embodiment of a system providing an interface for reading electrical current in power distribution systems for use with the field unit described in 69Glaser et al. is described in U.S. Pat. No. 5,151,866 (66Glaser et al.) issued on Sep. 29, 1992 and entitled "High speed power analyzer" to Glaser, R. Steven and Bade, Jeffrey M. This patent is expressly incorporated herein by reference in the present application for showing the status of the prior art and a manner of use respective to the present invention.

An embodiment of a system providing a high speed gateway for use with the redundant control computer system described in Baca, Jr. et al. and the system for achieving data access for the control computer described in 24Sederlund et al. is described in (a) U.S. Pat. No. 5,519,603 (Allbery, Jr. et al.) issued on May 21, 1996 and entitled "Intelligent process control communication system and method having capability to time align corresponding data sets" to Allbery, Jr., James D.; Troisi, Peter A.; Johnson, Susan J.; Cullen, James H.; Butler, Richard L.; Ferreira, James P.; Ellison, Joseph; Patel, Chiman L.; Uban, James E.; and Schultz, Dale H.;
(b) U.S. Pat. No. 5,428,745 (45de Bruijn et al.) issued on Jun. 27, 1995 and entitled "Secure communication system for re-establishing time limited communication between first and second computers before communication time period expiration using new random number" to de Bruijn, Ronny P.; Verboven, Marc L. K.; van Weele, Leonardus A.; Vermeire, Roger R.; Schulze, Oscar E.; Schultz, Dale H.; and Bell, Brian G.; and
(c) U.S. Pat. No. 5,561,770 (70de Bruijn et al.) issued on Oct. 1, 1996 and entitled "System and method for determining whether to transmit command to control computer by checking status of enable indicator associated with variable identified in the command" to de Bruijn, Ronny P.; van Weele, Leonardus A.; Verboven, Marc L. K.; Vermeire, Roger R.; Schulze, Oscar E.; Bell, Brian G.; and Schultz, Dale H.

These patents are expressly incorporated herein by reference in the present application for showing the status of the prior art and a manner of use respective to the present invention; the system that they describe is also denoted as the high speed interface (or HSI) in this specification.

An embodiment of a system providing human interfacing for use with the redundant control computer system and interfaces described in the above patents is described in U.S. Pat. No. 5,631,825 (van Weele et al.) issued on May 20, 1997 and entitled "Operator station for manufacturing process control system" to van Weele, Leonardus A.; de Bruijn, Ronny P.; Vermeire, Roger R.; Zemering, Christo; and Lenting, Ben. This patent is expressly incorporated herein by reference in the present application for showing the status of the prior art and a manner of use respective to the present invention.

Embodiments of systems providing real-time interpretation of Application Program code executing in the above systems are described in U.S. Pat. No. 5,491,625 (Pressnall et al.) issued on Feb. 13, 1996 and entitled "Information display system for actively redundant computerized process control" to Pressnall, Dana W.; Polishak, Jeffery T.; Felix, Bradley K.; Durisin, Michael J.; and Ellison, Joseph.; and in U.S. Pat. No. 5,408,603 (Van de Lavoir et al.) issued on Apr. 18, 1995 and entitled "Global process control information system and method" to Van de Lavoir, Ronny; Follon, Marinus (Neerpelt, BE); and Ravenscroft, Ian. These patents are expressly incorporated herein by reference in the present application for showing the status of the prior art and a manner of use respective to the present invention.

A large graphical overview system providing interface to humans is deployed in the preferred embodiment along with the Operator Station. This graphical overview system is described in U.S. Pat. No. 5,726,668 (Clement) issued on Mar. 10, 1998 and entitled "Programmable graphics panel" to John L. Clement. This patent is expressly incorporated herein by reference in the present application for showing the status of the prior art and a manner of use respective to the present invention.

An embodiment of a system providing a new control computer for alternative future use as the processor in the redundant control computer system described in Baca, Jr. et al. and a manner of use in a coordinated distributed system is described in (a) U.S. Pat. No. 5,655,133 (Dupree et al.) issued on Aug. 5, 1997 and entitled "Massively multiplexed superscalar Harvard architecture computer" to Dupree, Wayne P.; Churchill, Stephen G.; Gallant, Jeffry R.; Root, Larry A.; Bressette, William J.; Orr, III, Robert A.; Ramaswamy, Srikala; Lucas, Jeffrey A.; and Bleck, James; (b) United States Patent Application having Ser. No. 08/797, 967 filed on Feb. 12, 1997 and entitled "A Dedicated Context-Cycling Computer" naming as inventors Dupree, Wayne P.; Verniers, Gerrit; Lucas, Jeffrey A.; Root, Larry A.; and Churchill, Stephen G.; and (c) U.S. Provisional Patent Application having serial No. 60/086,737 filed on May 26, 1998 and entitled "Distributed Computer Environment Using Real-Time Scheduling Logic and Time Deterministic Architecture" naming as inventors Woods, Randy D.; Jachim, David M.; Dupree, Wayne P.; Verniers, Gerrit H.; Churchill, Stephen G.; and Fernandez, George P. These patents are expressly incorporated herein by reference in the present application for showing the status of prior art and a manner of use in one contemplated embodiment respective to the present invention.

Additional features which were implemented in modifying a general process control system such as that described above to incorporate features necessary for economically providing a combined and unified (a) general process control system and (b) safety shutdown computer system is appreciated through study of the summary and details respective to the present invention as further provided herein.

SUMMARY OF THE INVENTION

The present invention provides a process control system receiving input signals from a controlled apparatus and using the input signals in determining at least one output signal modifying the characteristics of at least one respective control device in the controlled apparatus where source code for the general control of the apparatus and source code for the safety shutdown system of the apparatus are compiled to control code in a unified compilation.

Details of the invention are fully appreciated from an examination of the detailed description and figures.

BRIEF DESCRIPTION OF THE FIGURES

FIGS. 34A1–34A3 and 34B–34E present a flowchart of the executable Machine Operation Code for diagnostics respective to the Serial Graphics system used in the preferred embodiment.

FIG. 35 presents a flowchart of the executable Machine Operation Code for monitoring the Watchdog.

FIGS. 41A and 41B present a flowchart of the executable Machine Operation Code for the diagnostic set executed in real-time during a normal Hz1 cycle.

DETAILED DESCRIPTION OF THE PREFERRED EMBODIMENTS

Figure 1:
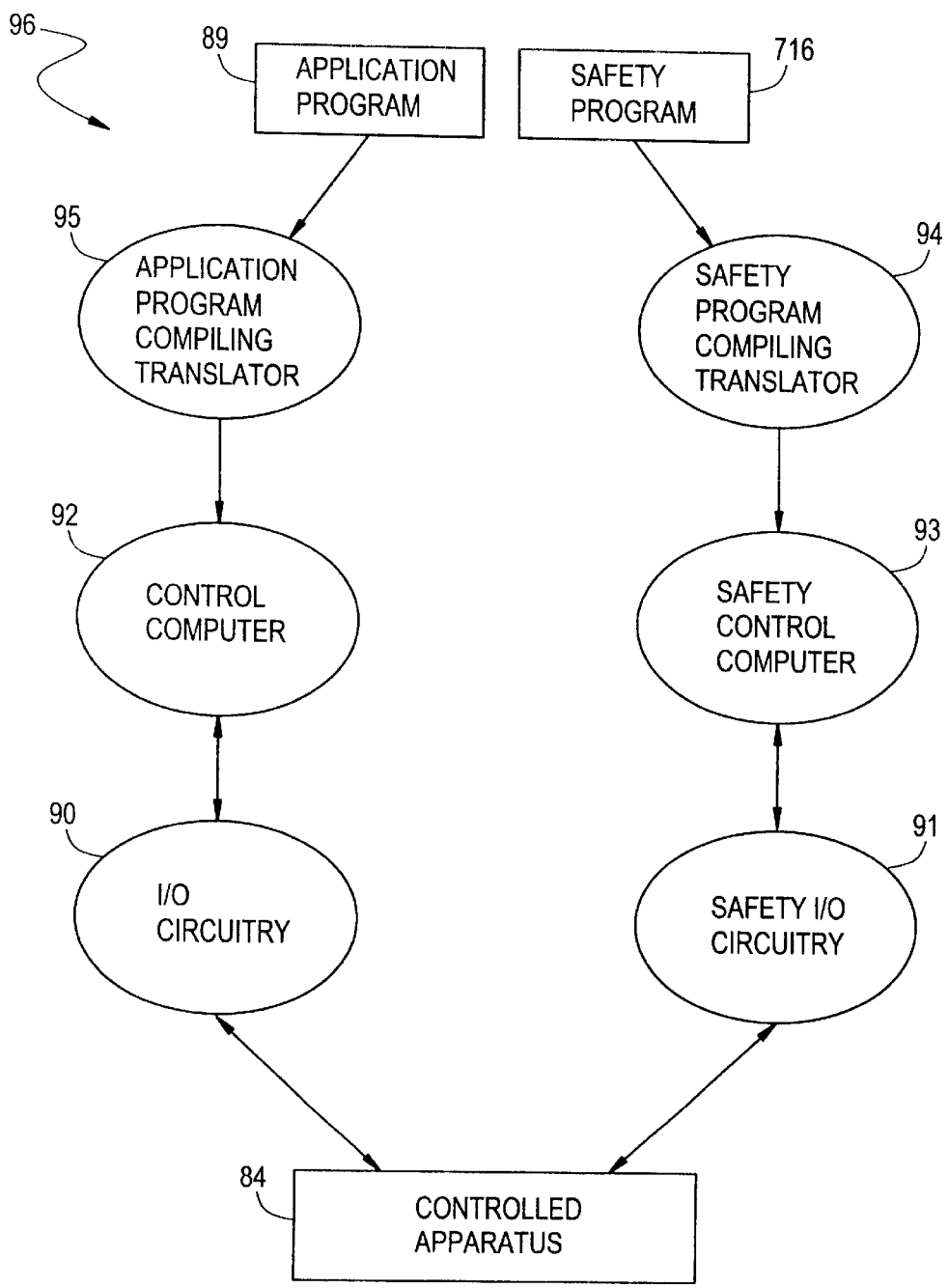
FIG. 1 presents an prior art overview of prior art key domains needed in a process control system having safety shutdown capability.

The following eleven paragraphs present a discussion of the System Overview respective to the preferred embodiment.

The preferred embodiment provides a process control system receiving input signals from an apparatus (manufacturing equipment) and executing Machine Operation Code to use the input signals in determining at least one output signal modifying the characteristics of at least one respective control device in the apparatus where source code for the general control of the apparatus and source code for the safety shutdown system of the apparatus are compiled in the same compile instance (a further discussion of modification of control device characteristics is presented in the fifth paragraph of the System Overview). This helps in achieving the ideal outcome that all incremental modifications to control and operation are implemented at one point in time as a unified whole, preferably by use of the same language for expressing source code for the general control of the apparatus and source code for the safety shutdown system of the apparatus; one of the benefits of this is that all issues respective to interactions between different functions and features in the system can usually best be reviewed and tested under one accountable authority in the organization responsible for the apparatus.

A general collection of control concepts (a control schema) is expressed by a programming engineer in the context of a high level programming language into a source code file known as an Application Program having at least one Safety Integrity Programming (SIP) subsection. An affiliated Compiling Translator is used to convert the Application Program instance into a control computer Machine Operation Code instance with a Safety Integrity Programming rule set in the Compiling Translator assuring conformant and cooperative adjoinder between the control computer, procedures and structures in the Machine Operation Code, and SIL requirements for the source code of the Safety Integrity Programming subsection. The use of a common language for both (a) the Safety Integrity Programming section and (b) that code compiled outside of the Safety Integrity Programming section for general process control purposes (that is, code not needing SIL requirement adjoinder) enables further efficiency in one embodiment as safety shutdown logic and general process logic are articulated with highly similar operational and programming attributes. The compilation of the entire Application Program having at least one SIP section and at least one non-SIP section into control computer Machine Operation Code in the same compile instance enables a control system as a logically unified entity at one point in time under a unified authority. Machine Operation Code has a non-variant portion and a variant (data) portion, where the variant (data) portion begins with the instance generated by the Compiling Translator and is then modified with each cycle of the control computer to reflect the nature of the controlled apparatus at any particular moment of time.

The process control system uses a first and second control computer where each control computer has a Primary Memory and a Shadow Memory. A bi-directional communications channel connects the first control computer to the second control computer and is used for enabling bilateral transmission of the input signals.

First arbitrated input values are determined in the first control computer from the input signals transmitted from the second control computer and the input signals read by the first control computer; and second arbitrated input values are determined in the second control computer from the input signals transmitted from the first control computer and the input signals read by the second control computer.

After each control computer executes the Machine Operation Code of the Application Program on the arbitrated input values to derive a process control signal, the first process control signal and the. second process control signal (from the first and second control computers, respectively) are coupled together into one output signal impressed simultaneously from both control computers to the appropriate control device. A control device has its characteristics modified by an output signal as the output signal changes the position of a gate element or the dynamic nature of the control device. Examples in this regard include a block valve which has alternative characteristics of either being open (fluidly conducting) or closed (fluidly non-conducting); an analog valve whose gate characteristic is defined as a particular position respective to a plurality of relative positions within a range as, for example, 10 percent open, 25 percent, open, or 73 percent open; and a pump which is alternatively characterized as either energized (pumping fluid) or not-energized (not pumping fluid). The characteristics of the control devices inherently define some of the operational attributes of the apparatus in real-time . . . , for example, the attribute of open cross sectional area respective to fluid flow inside of a pipe channel is inherently locked to the characterized position of a valve as either opened, closed, or (in the case of the analog valve) in a relative percentage of opened; the characteristic of a pump as energized to run and pump material or the characteristic of a pump as de-energized to not pump material affects the attributes of pressure and kinetic energy within the apparatus at the location of the pump.

In generating an output signal, (1) each control computer defines a digital address and a digital value set of at least one digital value respective to each output signal; (2) a first digital-to-analog circuit connected to the computer processor converts the set of digital values into a single analog signal if the set of digital values is directed to an analog output signal or, in the case of a digital output signal, the digital value is converted to a digital signal; (3) a multiplexing circuit interfaces the first digital-to-analog circuit to affiliated output circuits; (4) a second digital-to-analog circuit connected to the control computer processor converts the digital address for the multiplexing circuit into an address-value analog signal; (5) an analog-to-digital circuit interfaces the second digital-to-analog circuit and the control computer processor to convert the address-value analog signal into a set of address-value digital signals; and (6) the set of address-value digital signals and the digital address are compared. If the set of address-value digital signals and the digital address are not determined to be identical, outputs from the control system are set to position in fail-safe until the Machine Operation Code in the control computer processor halts real-time operation of the apparatus (except for holding control devices in fail-safe mode) and successfully executes a full set of startup diagnostics. The fail-safe context of a field control device is defined as the position of the field device when the signal input from the control system into the device (used in positioning the element within the field device which modifies real-time attributes of the apparatus being controlled—for example, the effective open cross section of a pipe) has a value of zero voltage, zero analog value, and/or FALSE Boolean value.

A set of Motherboards is also used in interfacing each control computer processor to output circuits (usually positioned in cabinets denoted as "Cans", as further described herein), and a Mezzanine Board is also provided on each Motherboard. The Motherboard and Mezzanine Board both provide "deadman" circuits, where a "deadman" is a highly reliable configuration, design attribute, and effective subpart of a circuit enabling the circuit (a) to provide energized outputs (as a normal operation output) but, alternatively, (b) to force a clear, direct, and unconfounded latched cessation in provision of the energized outputs upon the occurrence of a particular operational situation (event) in real-time where the cessation is latched to persist until specifically released. In providing features respective to achieving a certified system, a "Can Deadman" circuit is disposed on each Motherboard, and a SIL Mezzanine Board DO (Digital Output Signal) Deadman (abbreviated herein as the DO Deadman Circuit) is disposed on each Mezzanine Board. A Watchdog circuit (the "Watchdog") is also provided in the control computer which provides a reset connection to the control computer processor for halting real-time execution of Machine Operation Code in the control computer if (a) the occurrence of a predetermined event output from the control computer does not occur in a timely manner or (b) if a signal is input from certain diagnostic circuitry. The Can Deadman circuit has an RC circuit connected to an activity pulse receiver such that the Can Deadman implements an output (that is, the Can Deadman "fires") to halt the provision of its output signals to the controlled apparatus if a set of ongoing first pulses from the control computer do not sustain the capacitor in the RC circuit in offset from a threshold value. The DO Deadman Circuit implements a latched deadman (a separate deadman from the Can Deadman") to de-energize all digital outputs from the Can if an output from the control computer indicates non-standard operation of the control computer; in this regard, the DO Deadman Circuit circuit has an RC circuit connected to an activity pulse receiver such that the Can Deadman implements an output (that is, the Can Deadman "fires") to halt the provision of digital output signals to the controlled apparatus from its Can if a set of ongoing second pulses from the control computer do not sustain the capacitor in the RC circuit in offset from a threshold value. The second pulses result from the execution by the control computer of a Machine Operation Code subset designed to be sufficiently complex to execute to conclusion only if the control computer is executing according to full conformance to designed capability above a very high threshold of probability. The computer responds to deadman output from the DO Deadman Circuit to require a complete run of its real-time initialization tests to enable a return to provision of energized digital outputs from the Can. It should be noted that, in standard and general practice, digital output signals are used for rapidly and effectively configuring a controlled apparatus into a fail-safe context; in the instance that an analog output signal is to be specifically de-energized for operational transition of the controlled apparatus to position in fail-safe configuration, a digital output signal is frequently implemented as a switch for opening the connection between the control computer and the field control device receiving the analog output signal.

The system provides for a SEQUENCE data object type for use in (1) Application Program source code programming in a computer by a programming engineer where the source code is compiled into Machine Operation Code for use in the control computer, (2) the computer implemented process of source code compilation into Machine Operation Code for loading into the control computer, and (3) oriented interaction on the part of operating technicians with the control computer during operation. In this regard, a SEQUENCE is virtually designed to be an infological construct for association in the data schema of the Application Program with a set of physical components operated as a Process Unit which are a part of the apparatus (for example, a boiler and a set of valves associated with the boiler) controlled by the control system. The SEQUENCE is also expressed as a type of datalogical object within the Compiling Translator and also as a data type within the control computer.

The SIP (Safety Integrity Programming) rule set subset of the computer-executed logic within the Compiling Translator (where the SIP rule set is a subset, portion, and/or "section" of the Compiling Translator which is a collection of contiguous and/or non-contiguous computer-executed Compiling Translator logic directed to assuring conformant and cooperative adjoinder between each control computer, procedures and structures in the Machine Operation Code executed in each control computer, and SIL requirements) provides computer-implemented logic which executes to provide for alignment of (a) the Application Program logic in the form of (1) the data variables defined for compilation in the SIP section and (2) the Application Program statements defined for compilation in the SIP section with (b) SIL specific constraints defined for (1) the SIL level appropriate to the apparatus operated and (2) the control computer used for control of the apparatus. In this regard, the SIP rule set interprets a function type statement in the particular instance of the Application Program being compiled into a SIP variable list of SIP variables for use respective to Application Program statements in the SIP section. A second portion of the logic in the SIP rule set of the Compiling Translator then compares each SIP variable used in a SIP section with the coding in that section to assure that (a) no SIP variable in the SIP variable list has its value determined outside of one single SIP section; (b) every SIP variable in the SIP list is used in at least one SIP section; and (c) that any conclusions from the use of non-SIP variables used in a SIP section are dominated within the statement wherein they are used by a statement portion based upon SIP variables. In implementing the third consideration, a SIP Boolean operator type (SIPAND and SIPOR are examples of the type) is provided for signaling to the Compiling Translator that use of non-SIP variables in a computer statement has concluded so that the SIP rule set will fully apply to the remainder of the statement. A third portion of the logic in the Compiling Translator suppresses generation of the Machine Operation Code upon non-conformance of code in a SIP section to alignment considerations in SIP variables, the SIP variable list, and SIP section. Another portion of the logic in the Compiling Translator defines a Compiling Translator signature data value characterizing the Machine Operation Code in the Program Memory (a portion of the general memory in the control computer where the Machine Operation Code does not change from moment-to-moment in real-time); and this signature data value is used in real-time to validate the integrity of the Machine Operation Code respective to the Machine Operation Code which was generated by the Compiling Translator.

The SEQUENCE data object type has a set of affiliated attributes such as (a) a set of Process Unit Steps respective to the apparatus being controlled (for example, a "maintenance off-line" Process Unit Step, an "equipment testing" Process Unit Step, a "purge_with_air" Process Unit Step, an "initial firing and warm-up" Process Unit Step, a "full pressure" Process Unit Step, an "operate at steady output pressure" Process Unit Step, a "gentle decrease of pressure" Process Unit Step, and a "discharge of product" Process Unit Step), (b) a set of alarms (for example, "high level in the water tank" alarm, "loss of burner flame" alarm, "emergency situation" alarm, "high pressure" alarm, "low pressure" alarm), (c) "time in current active" Process Unit Step (STIME in SSTEP), (d) "shutdown" status in SEQUENCE, (e) "emergency" status in SEQUENCE, and (f) "material recipe being used" in SEQUENCE. Additionally, a first Process Unit Step data object type having a safety-domain attribute parameter is provided for use in the SIP section; and a second Process Unit Step data object type having a normal-operations attribute parameter set is provided for use outside of the SIP section. A prioritized stinted-shutdown status process control object type is also provided for use. In this regard, a stinted shutdown status process control object type is an object which functions to identify a situation in a SEQUENCE where "shutdown" of that Process Unit in the affiliated apparatus is desired but in a stinted and restrained manner which achieves a secure and safe operational status in the system even as the economic penalty to the system is minimized. In managing the many levels of the shutdown imperative, a stinted-shutdown status process control object type is provided where the priority attribute parameter supports five priority levels. A more detailed discussion of the nature of the SEQUENCE is further provided in the detailed discussion of software used in the system.

In the real-time execution environment, executable logic is provided in the control computer which defines a real-time signature data value characterizing the Machine Operation Code in the Program Memory (one part of the general memory in the control computer where the Machine Operation Code does not change from moment to moment in real-time) and compares that real-time signature data value to the Compiling Translator signature data value which has already been summarily described. The control computer halts real-time execution of the Machine Operation Code when the Compiling Translator signature data value and the real-time signature data value are different in value. The control computer compares data in the Primary Memory (that part of the general memory in the control computer where the Machine Operation Code can change from moment to moment in real-time) and data in the Shadow Memory upon read access to examine for differences in those values; the control computer is halted when data values in the Primary Memory and respective data values in the Shadow Memory are determined to be different.

The following paragraph presents a discussion of Real-time, Hz1, Hz10, and Hz100.

Real-time computer processing is generically defined as a method of computer processing in which an event causes a given reaction within an actual time limit and wherein computer actions are specifically controlled within the context of and by external conditions and actual times. As an associated clarification in the realm of process control, real-time computer-controlled processing relates to the performance of associated process control logical, decision, and quantitative operations intrinsic to a process control decision program functioning to monitor and modify a controlled apparatus implementing a real-time process (such as a "Process Unit" as described herein) wherein the process control decision program is periodically executed with fairly high frequency usually having a period of between 10 ms and 2 seconds, although other time periods are also utilized. In the case of "advanced" control routines where a single solution instance requires substantial computational time, a larger period is essentially necessary (frequency in determination of changes in control element settings should be executed at a frequency equal-to-or-less-than the frequency of relevant variable measurement). In the preferred embodiment, the control-computer-executed real-time logic which executes one time per second (a Hz1 real-time cycle) is referenced as Hz1 logic, the control-computer-executed real-time logic which executes ten times per second (a Hz10 real-time cycle) is referenced as Hz10 logic, and the control-computer-executed real-time logic which executes one hundred times per second (a Hz100 real-time cycle) is referenced as Hz100 logic herein—where Hz stands for "hertz", a generally recognized designation of frequency in reference of one cycle per second.

The following paragraph presents a discussion of Left control-computer and Right control computer respective to the preferred embodiment.

The following topic describes redundancy concepts, and the preferred embodiment is deployed on a redundant control computer set. A first fundamental logical identifier in the data base of each control computer in the redundant set is defined to its database by a physical switch on the control computers—one position of the switch defines the control computer as the "Left" control computer and the other position defines the control computer as the "Right" control computer of the pair. If three control computers are used (as in a Remote Field Unit), a switch to define a control computer as the "Middle" control computer is also provided.

The following paragraph presents a discussion of Redundancy, Arbitrated Redundancy, and Active Redundancy.

"Redundant operation" in a process control system, "arbitrated redundant" operation in a process control system, and "active redundant" operation in a process control system are three related operational methodologies. In this regard, real-time control computer machines are deployed in a number of robust design approaches. Redundancy relates to the provision of at least two control computer machines being actively available at essentially the same time for executing process control logic (in the form of control-computer-executed logic) and for implementing activities needed for control; however, in a strict sense, redundant operation does not carry either a requirement for explicit coordination between the actions of the two control computer machines or even actively direct control of field devices by both control computer machines. A set of redundant control computer machines might exert control decisions on the same apparatus without coordination of data values in real-time or without any mutual diagnostics; indeed, some approaches to safety shutdown system design have preferred that at least two totally independent systems effect control with one system being oriented only to "safety" (optionally with three independent safety subsystems all having further independent authority within the safety shutdown system) without any consideration of status in the "general control" system not specifically directed to safety concerns. Alternatively, redundancy refers to the provision of a backup computer and process control system which quickly "takes over" if something indicates that the primary process control system is "in trouble". Coordination between machines operating redundantly (when coordination is desired) requires that "arbitration" is provided to enable definition of which primary machine(s) actually effect(s) control to apparatus control elements, which machine(s) function(s) in a standby and/or "second opinion" voting context in helping to assure that proper action is taken by the primary machine(s), and what values are used in effecting the position of control elements. In one form of arbitration, standby machines give overwrite preference to the values defined in a companion primary machine actively operating the apparatus (a) so that, if and when control is transferred to a standby machine, transfer of control is "bumpless" to the field control devices and (b) so that undesirable transients are not effected by transfer of control authority respective to field control elements. In another form of arbitration, voting is executed by a set of machines on the value to be sent to the field, with one machine then implementing the voted value to the field device under the watchful monitoring of the other machines—with the set of machines optionally having the further ability to "vote" the machine implementing output voltages to the field control element into standby status. Arbitration can also be conditional to different field devices, where (a) some outputs signals are effected without arbitration of input values (respective to the determination of those output signals) or of the output signals by more than one machine to the field device; (b) some output values are determined after acceptance of one machine's input values (respective to the determination of those output signals) as long as the difference between the input values to the Left and Right machines is within a tolerance, with the machines ignoring a mutual value if the tolerance is exceeded; and (c) some output values are determined after acceptance of one machine's input values (respective to the determination of those output signals) as long as the difference between the input values to the Left and Right machines is within a tolerance, with either machine having the power to drive the field device to position in fail-safe mode if the tolerance is exceeded. Active redundancy is preferably implemented to the field device; in this regard, "active redundancy" means that at least two separate control computers simultaneously impress their output control voltages to a particular field control device on the same output wire. This active redundancy approach implies that the highest voltage being impressed defines the status of the field device, although the influence of lower voltages can impact the stability of the voltage driven to the field device because of the effect of all voltages on the "resistance" (at DC circuit stability) or "impedance" (during DC circuit transience) in the field device driving circuitry. In the preferred embodiment, (a) some actively redundant output signals result from outputs determined from input values which have not been arbitrated between the two machines; (b) some actively redundant output signals result from outputs determined from input values after acceptance of the Left machine's input values as long as the difference between the Left and Right machines is within a tolerance, with the machines ignoring a mutual value if the tolerance is exceeded; and (c) some actively redundant output signals result from outputs determined from input values after acceptance of the Left machine's input values as long as the difference between the Left and Right machines is within a tolerance, with either machine having the power to drive the field device to fail mode if the tolerance is exceeded; (d) some actively redundant output signals result from outputs determined from input values after acceptance of the Right machine's input values as long as the difference between the Left and Right machines is within a tolerance, with the machines ignoring a mutual value if the tolerance is exceeded; and (e) some actively redundant output signals result from outputs determined from input values after acceptance of the Right machine's input values as long as the difference between the Left and Right machines is within a tolerance, with either machine having the power to drive the field device to fail mode if the tolerance is exceeded. In the preferred embodiment, Hz10 and Hz100 operations are characterized by the first "(a)" case in both the general or safety oriented logic sections of the executing real-time code; Hz1 "general operations" are generally characterized by the second "(b)" and fourth "(d)" cases; and Hz1 "safety oriented" operations are generally characterized by the third "(c)" or fifth "(d)" cases. With respect to input signal arbitration, some modifications to the analog input signal arbitration methodology described in U.S. Pat. No. 5,583,757 to Baca, Jr. et al. were implemented in the development of the preferred embodiment; these modifications to the information disclosed in that patent are outlined in FIGS. 15, 16, 17, and 18 and are further discussed in another part of this specification. Other changes in Process Unit Step management is appreciated by comparing the information in that patent to the discussion with respect to FIGS. 55 through 58.

The following paragraph presents a discussion of the Application Program.

A general collection of control concepts (a control schema) is expressed by a programming engineer in the context of a high level programming language into a source code file known as an Application Program. A Compiling Translator effects a compiling instance to convert an Application Program instance into a Machine Operation Code instance for load into the control computer.

The following paragraph presents a discussion of the Compiling Translator.

A Compiling Translator is computer executed software which converts and translates high-level source code language software (such as the Application Program) into Machine Operation Code by using techniques of software compiling, lexical analysis, comment removal, macro substitution, statement analysis with rules, intermediate object code generation, assembly code generation, linkage to standard subroutines in Machine Operation Code form, and/or binary machine code generation.

The following paragraph presents a discussion of the Machine Operation Code.

Machine Operation Code is machine code and data which, in usually binary form, is loaded into a computer to enable the computer to perform a specific function during the time when the machine code is used to define the conducting pathways in the computer circuitry and the data is referenced, used, modified, and otherwise electrically processed by the computer circuitry. Machine Operation Code has a non-variant portion and a variant (data) portion, where the variant (data) portion begins with the instance generated by the Compiling Translator and is then modified with each cycle of the control computer to reflect the nature of the controlled apparatus at any particular moment of time.

The following paragraph presents a discussion of the Fail-Safe concept.

The fail-safe context of a field control device is defined as the position of the field device when the signal input from the control system into the device (used in positioning the element within the field device which modifies real-time attributes of the apparatus being controlled—for example, the effective open cross section of a pipe) has a value of zero voltage, zero analog value, and/or FALSE Boolean value.

The following paragraph presents a discussion of the term "Deadman".

A "deadman" is a highly reliable configuration, design attribute, and subpart of a circuit enabling the circuit (a) to provide an energized output (as a normal operation output) but, alternatively, (b) to force a clear, direct, and unconfounded latched cessation in provision of the energized output upon the occurrence of a particular operational situation (event) in real-time where the cessation is latched to persist until specifically released.

The following paragraphs present a discussion of Unit Operations, Unit Processes, Process Units, and the SEQUENCE Concept respective to the preferred embodiment.

In introduction of the control-computer-executed logic and the use of the aforementioned SEQUENCE object in a control computer program in the preferred embodiment, a brief review of two terms related to the art and technology of chemical engineering is in order. Traditional concepts of the "unit operation" (a particular kind of physical change procedure used and effected in chemical processing—for example, filtration, evaporation, distillation, or heat transfer) and the "unit process" (a particular kind of transformation in materials via chemical reaction—for example, oxidation, hydrolysis, esterification, polymerization, or nitration) define functional activities which must execute in order to effect a particular desired incremental transformation of a "starting" material to a "product" material. These physical changes and chemical transformations usually occur through use of an apparatus which, in operation, converts starting material into product material (in both a micro and macro context); and it is useful for that portion of the apparatus involved in the execution of at least one "unit operation" or "unit process" to be referenced and organized for control purposes in the described embodiment in a least one "Process Unit" (for example, a reactor, a fractionating tower, a crystallizer, a dryer, a tank farm, a distillation unit, an extraction unit, or an evaporator). In an overall chemical manufacturing plant a number of sequential and parallel "unit operations" and "unit processes" are therefore effectively executed collectively in a respective set of "Process Units" to convert many instances of "starting materials" into "product materials" (where the "product material" from one "Process Unit" is very often the "starting material" for the next "Process Unit" when the situation is examined in a micro context). Engineering and operations personnel have traditionally referenced and managed the operation of such a plant apparatus in the context of a set of such "Process Units" in effecting operation of these sequential and parallel "unit operations" and "unit processes" where "raw" ("starting") material(s) are converted into "finished" ("product") material(s) in a macro context. In example, a team of operating technicians might be "starting up" "reactor" "Process Units" in a plant even as the team is also "doing maintenance" on a first "distillation tower" "Process Unit" and "running" a second "distillation tower" "Process Unit" disposed to operate in parallel with the first distillation tower. But it needs to also be appreciated that the "Process Units" do not stand free in a physically separated and defined manner in an apparatus such as a chemical manufacturing plant (the target use of the preferred embodiment) because the chemical manufacturing plant usually enables internal fluid movement by providing essentially one large apparatus built of conjoined vessels, pipes, pumps, valves, instruments, and wires. The "Process Unit" definitions are therefore, in verity, logical (in both cerebral and electrical-circuit-implemented contexts) and cultural rather than specifically and clearly physically defined. In example of this point, when a pipe with a valve connects a reactor to a surge tank, the reactor, pipe, valve, and surge tank are constructed as one unified and conjoined physical apparatus; one can conveniently consider the reactor as a first "Process Unit" and the surge tank as a second "Process Unit", but the issue of which Process Unit includes the valve (and the pipe) for management and control purposes requires acceptance of the fact that a technologically artistic and cultural decision must be made since (a) there is no clear and specific physical separation between the two "Process Units" within the valve and (b) bifurcated control of the valve at a particular moment of real-time is definitely not desirable.

A "Process Unit", then, is a useful abstraction which relates to a domain of physical equipment (a subset apparatus section in a larger apparatus) interconnected and operated as a unified whole even though it is a subpart of a larger collection of physical equipment. However, this useful abstraction recognizes (1) that a set of material processing domains exist in a usefully adjoined and coordinated relationship when the complex apparatus is executing real-time material handling and processing and (2) that each of these domains have properties in their own domain context which reflect and characterize the status of their affiliated "Process Unit" respective to its dynamic status in real-time. In effecting control by a control computer on an apparatus, the SEQUENCE is a datalogical object which maps to the "Process Unit" abstracted domain within the apparatus under control; and a SEQUENCE datalogical object has a set of attributes datalogically characterizing the operational status of the "Process Unit" affiliated with the SEQUENCE in real-time. In this regard, some attributes of a SEQUENCE are a series of Process Unit Steps (where only one Process Unit Step is "active" at a particular moment of real-time); a set of alarms; a recipe; time in current active Process Unit Step; a horn status (or set of horn statuses—in large systems it is useful for different types of concerns to have different horn tones and, optionally, affiliated preprogrammed audio announcements); an emergency status; a shutdown status; a set of control elements which can modify the physical dimensions, attributes, and characteristics of the apparatus (for example, modifying the attribute of open cross sectional area respective to fluid flow inside of a pipe channel through opening or closing of a valve, energizing a pump, or deenergizing a pump); and a set of measurements from sensors located in the apparatus which can convert attributes of the apparatus such as temperature, pressure, level, valve position, and/or shaft rotational rate into a voltage or into a digital message for assimilation into the database of the control computer. It should be noted that, in the preferred embodiment, a measurement from a sensor located in the apparatus can "belong-to" many SEQUENCEs, but a control element preferably "belongs-to" and has its real-time positioning value calculated in only one SEQUENCE as a (usually analog or digital) output value and signal (even though the computed output value for the control element is referenced in the logic of other SEQUENCES). While some of the attributes of the SEQUENCE object have a physical manifestation (for example, transmitters, valves, and solenoids) which are a physical part of the apparatus under control, other attributes (such as the Process Unit Steps, the alarms, an emergency status, a shutdown status, or a recipe) are essentially data indicators related to aspects of the SEQUENCE data object and its affiliated "Process Unit" portion of the physical apparatus—these other attributes have no direct physical manifestation within the apparatus. It should also be noted that the "Process Unit" of some SEQUENCEs (defined by, for example, SEQUENCE objects related to utility systems such as "cooling water", "pneumatic air", "service water", or "electrical power") is effectively dispersed physically over the entire apparatus and interfaces to many of the other "Process Units". In implementing the use of process control, some SEQUENCES are also usefully defined for other aspects related to operation of the apparatus under control (for example, communications management on a periodic basis to an accounting system), so some SEQUENCES are defined for organizing auxiliary reporting considerations related to real-time overall management of the operation of the apparatus, without having a direct impact on real-time control of the apparatus. In this regard, the Compiling Translator which converts a particular instance of an Application Program (a user language file containing documented source code for the control program related to the controlled apparatus) into Machine Operation Code for the real-time control computer in the system provides a full set of attribute variables via inheritance for each defined SEQUENCE, dramatically minimizing the time needed by the programming engineer to characterize the data set needed for a programming situation when a SEQUENCE is defined as a general datalogical object for managing a real-time need.

SEQUENCEs therefore enable definition of a logical backbone for a particular instance of a process control program as a group of logical objects which define Process Unit domains for unit operations, unit processes, and unified utilities whose cycles of operation are performed either simultaneously or independently with respect to each other. The boundaries between SEQUENCEs frequently occur where surge capacity or simultaneous cycling in the dynamic operation of the apparatus being controlled by the process control system is required. Although it seems slightly counterintuitive to use the term SEQUENCE in referencing a single data object (as opposed to a series of objects), the term evolved in the manufacturing culture of the inventors as relating originally to the sequence of Process Unit Steps respective to a particular "unit process" (for example, a reactor has a "sequence" of Process Unit Steps which, in example, are termed 'maintenance', 'automatic testing of critical instruments', 'load first component', 'adjust temperature', 'add second component', 'cool', 'discharge', and 'clean', with the 'clean' Process Unit Step terminating to the 'automatic testing of critical instruments' Process Unit Step unless a termination to the 'maintenance' Process Unit Step is in order; the reactor "Process Unit" in this case is mapped to one SEQUENCE datalogical object in the control program, and the SEQUENCE has the set of sequential Process Unit Steps as one of its attributes).

In implementing the fundamental first step in articulating a particular process control program for effecting computer control of an apparatus, the programming engineer characterizes a Set of SEQUENCEs to reflect the set of Process Units (respective to "unit processes" and "unit operations") in an apparatus to be controlled; and, as should be apparent from the foregoing, this is a somewhat judgmental and technologically artistic characterization. Although the SEQUENCEs defined have their logic executed in a serial manner, it is not necessary for the order of logic execution in the control computer respective to the SEQUENCEs to progress in specifically aligned cadence to the relative positioning of the "Process Units" in the apparatus; however, in this regard, the programming engineer must always consider the impact of data defined at one moment of real-time and then referenced shortly thereafter.

The control-computer-executed logic in a control computer program in the system operates to complete all control-computer-executed logic at least once per second of real-time. In this second, the control-computer-executed logic reads all analog inputs and digital inputs as measurements from the controlled apparatus, effects the execution of the logic in each SEQUENCE in a serial manner (that is, SEQUENCE 1, SEQUENCE 2, . . . , SEQUENCE N), defines all analog outputs and digital outputs to the controlled apparatus, effects communications, and prepares to read all analog inputs and digital inputs at the start of the next second of real-time.

The following paragraphs present a discussion of the Control Computer Tasks respective to the preferred embodiment.

As described in U.S. Pat. No. 5,583,757 (Baca, Jr., et al.), the use of two redundant processors is facilitated by use of logical designations for alternative operational modes of the control computers themselves. In this regard, a second fundamental logical identifier in the data base of each of the control computers respective to the status of the control computer in the redundant set is defined to its database as a mode of operation designated by a "Task". In the preferred embodiment:

Task A (Task Alpha) defines an operational mode when either the entire logic or a logical subset of the executing control program in the partner control computer is being transferred into the Task A control computer.

Task B (Task Baker) defines an operational mode when digital and analog outputs of the executing control program are not operational but, in essentially all other respects, the control computer is participating as a full partner in the control process.

Task C (Task Charlie) defines an operational mode when the dynamic data (the data subject to value change in real-time) in the partner control computer is being transferred into the Task C control computer.

Task D (Task Dog or "The Dog") defines an operational mode when the control computer is participating as a full partner in the control process with a control computer in Task F and is synchronizing to the logical cycle of the control computer in Task F.

Task E (Task Echo or Task Eagle) defines an operational mode when the control computer is executing the control process without an active partner control computer if the control computer either initiated as a standalone system or had a prior status of Task D but has never achieved Task F status.

Task F (Task Fox or "The Fox") defines an operational mode either when the control computer is participating as a full partner in the control process with a control computer in Task D or when the control computer has existed with the status of Task F and is presently executing in standalone.

Task 6 defines an operational mode when the control computer is acquiring a new Machine Operation Code version respective to a new instance of Application Program source code from a low speed interface.

Task 8 defines an operational mode when the control computer is acquiring a new Machine Operation Code version respective to a new instance of Application Program source code from the high speed interface (HSI).

Task 4 (DEBUG Task) defines an operational mode when the control computer has halted Hz1, Hz10, and Hz100 control of its apparatus but continues to execute a fundamental operating system enabling examination of database and program values within the memory of the control computer.

A "partner" or "neighbor" computer to a Task F computer is most usually either a Task D or Task B computer. Conversely, a "partner" or "neighbor" computer to a Task D or Task B computer is most usually a Task F computer. In the very rare, generally undesirable, and highly unusual situation where a Task F and Task D partnership suffers the loss of their bidirectional communication "major" link, the prior Task F computer continues in Task F and the prior Task D computer modifies to Task E.

Either of the Left or Right control computers is in any Task as a result of a decision implemented in the logic of the executing control program, or it can also be forced to a Task by human interaction. The Left and Right data definitions are usually not modified in operation and can only be changed by human interaction; it should be noted, however, that the logic of the executing control program essentially immediately changes the Task status of the machines and executes logic directed to position control devices into fail-safe if two Left control computers or two Right control computers are attempting to execute actively redundant operation (a process executed in order to preserve safe operation of the controlled apparatus). There are also diagnostic alarms in the logic of the executing control program (with affiliated logic defining emergency and shutdown status flags) which activate upon other unacceptable combinations of the Left, Right, and Task statuses in the two control computers. In summary, in an actively redundant system, the logic of the executing control program preferably performs a diagnostic set of checks on the status of each control computer and on the status of the control computers as a set (a) to insure that necessary alignments respective to safe operation exist at essentially all times and (b) to take immediate action respective to risk minimization in the apparatus if the necessary alignments respective to safe operation do not exist.

The following paragraphs present a discussion of the Cans, Can Motherboards, and I/O Cable Driver Board respective to the preferred embodiment.

In the preferred embodiment, subsets of the total set of input signals and output signals respective to the apparatus (under control) interface to each control computer via a respective Motherboard; and the input signals, output signals, and Motherboards in any particular subset are frequently physically disposed in a cabinet referenced in the lexicon of the inventors as a "Can". In this regard, a "Can" frequently holds the input boards, output boards, Motherboards, respective power supplies, and override switches for both the "Left" control computer and the "Right" control computer respective to the signals in the subset. The value respective to a "Can" instance is the same in the databases of both the "Left" control computer and the "Right" control computer and is used to coordinate values from the "Left" control computer and the "Right" control computer in diagnostic and arbitration status determination. Usually, in the preferred embodiment, a "Can" holds the field interface electronics described above for 100 analog input signals, 100 digital input signals, 100 analog output signals, and 100 digital output signals for a total of 400 signals in electrical communication with measurement and control devices in the apparatus under control. As should be appreciated from a careful study of the preferred embodiment described in this specification, a "Can" therefore holds field interface electronics for processing 800 total signals since both the "Left" control computer and the "Right" control computer have their own unique, separate, and distinct sets of boards for processing the 100 analog input signals, 100 digital input signals, 100 analog output signals, and 100 digital output signals which interface to the control computers and the apparatus under control through the "Can". When signals are received from the triply-redundant Remote Field Unit, a virtual "Can" (representing the Remote Field Unit) is still considered to exist and a "Can" database value is aligned in the databases of the "Left" control computer and the "Right" control computer for all signals managed in this manner. Irrespective of whether signals are interfaced to the apparatus (under control) in a dual-redundant or triply-redundant manner, arbitration processes between the "Left" control computer and the "Right" control computer execute in a manner which does not consider this difference in interface methodology; however, certain diagnostics respective to the signals are necessarily interpreted by different executable logic to properly characterize a comprehensive status for the system as a whole in the databases of the "Left" control computer and the "Right" control computer. In this regard, the Motherboards of the individual "Cans" have much of the Deadman circuitry disposed on boards which are known as the "Mezzanine Boards".

In addition to the "Can" Motherboards which interface the field IO boards to the control computers, each control computer has a I/O Cable Driver Board which provides an interface between all "Can" Motherboards addressed by the control computer and the control computer. This I/O Cable Driver Board holds the analog-to-digital and digital-to-analog conversion circuitry and is interfaced to a control bus in providing data and signal exchange between the "Can" Motherboards and the control computer.

Please note that references to memory capacity herein use "K" to reference 1024 sixteen bit words of capacity.

FIG. 1 presents a prior art overview 96 of prior art key domains needed in a process control system having safety shutdown capability. The overall process control system incorporates the use of both a general process control system and a second attached safety shutdown computer system to enable compliance with safety requirements respective to hazards affiliated with a useful apparatus controlled by the process control system. The general process control system uses a general program Compiling Translator 95 to generate Machine Operation Code from Application Program 89; the Machine Operation Code is loaded into control computer 92; and control computer 92 interfaces via I/O circuitry 90 to effect control in and monitor apparatus 84. A second attached safety shutdown computer system uses a safety program Compiling Translator 94 to generate Machine Operation Code from Safety Program 716 devoted to safety concerns; the Machine Operation Code is loaded into safety control computer 93; and safety control computer 93 interfaces via I/O circuitry 91 to effect control in and monitor apparatus 84 to enable compliance with safety requirements respective to hazards affiliated with a useful apparatus controlled by the process control system.

Figure 2:
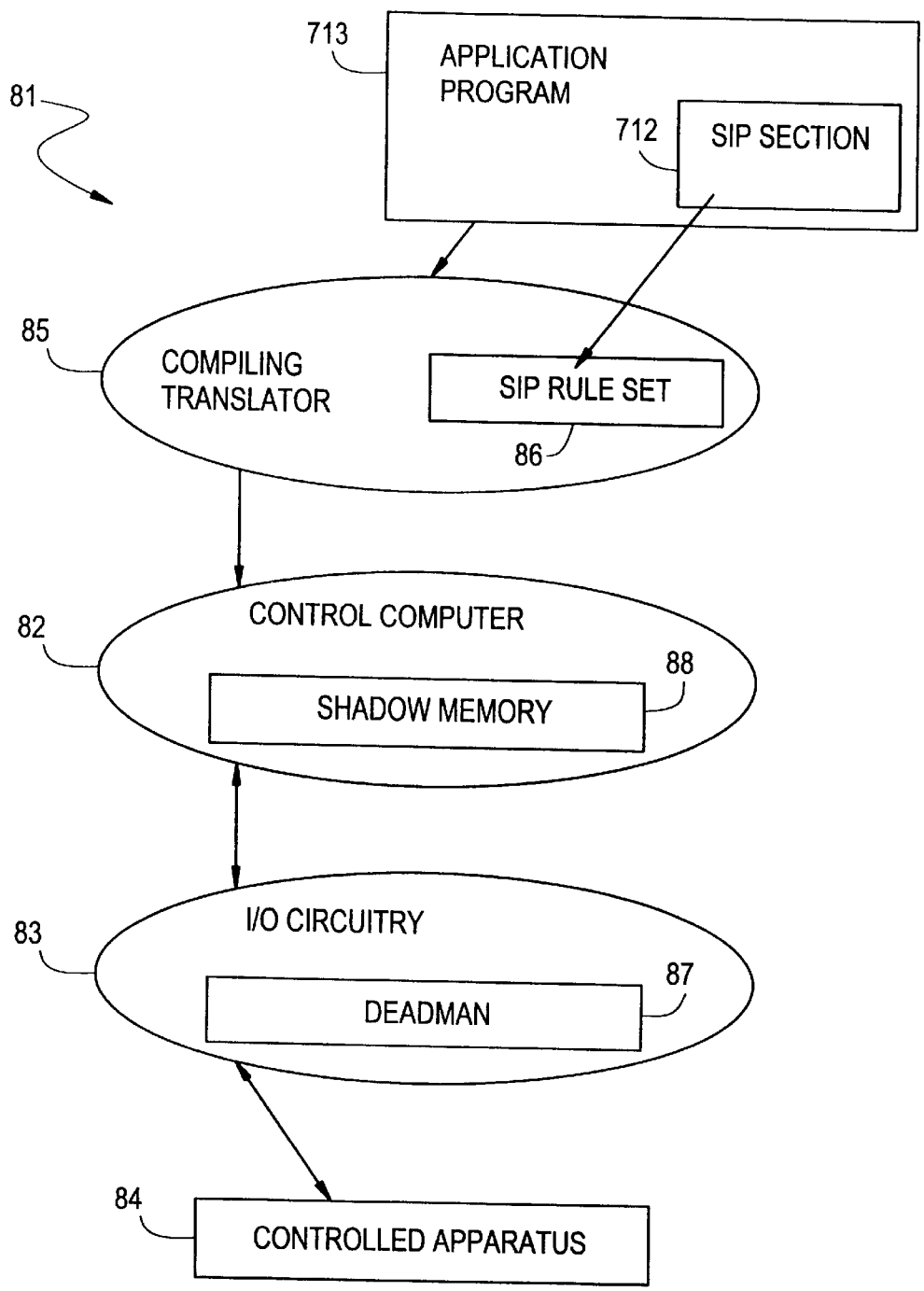
FIG. 2 presents an unified system overview of the key domains needed in a process control system having safety shutdown capability according to the present invention.

FIG. 2 presents a unified system 81 overview of the key domains needed in a process control system having safety shutdown capability according to the system of the preferred embodiment. The Application Program 713 has at least one SIP segment 712 and at least one non-SIP segment (not shown—a "non-SIP segment" is also denoted as a "general process control segment" and is, in one interpretation, that part of Application Program 713 which is not contained in SIP segment 712). A single Compiling Translator 85 compiles an Application Program into Machine Operation Code for control computer 82. The Compiling Translator 85 has an SIP (Safety Integrity Programming) rule set 86 as a subset of the computer-executed logic within the Compiling Translator (where the SIP rule set is a subset, portion, and/or "section" of the Compiling Translator which is a collection of contiguous and/or non-contiguous computer-executed Compiling Translator logic directed to assuring conformant and cooperative adjoinder between each control computer, procedures and structures in the Machine Operation Code executed in each control computer, and SIL requirements). The particular statements which execute to provide the SIP rule set are, in one embodiment, contiguous within the Compiling Translator; in an alternative embodiment, the statements which execute to provide the SIP rule set are not-contiguous as coded, although the statements in the non-contiguous embodiment are designed, managed, and reviewed with the certifying authority as a holistic virtual section so that the requirements of the particular SIL are reviewed to the satisfaction of the certifying authority. In either alternative of either contiguous or non-contiguous coding, the SIP rule set provides computer-implemented logic which executes to provide for alignment of (a) the Application Program logic in the form of (1) the data variables defined for compilation in each SIP section and (2) the Application Program statements defined for compilation in each SIP section with (b) SIL specific constraints defined for (1) the SIL level appropriate to the apparatus operated and (2) the control computer which is used for control of the apparatus. In one embodiment, SIP sections 712 are managed as separate Application Program files where each file has a special SIP security access code different from the security access code used for the general process control segment of the Application Program. In a further embodiment, SIP sections 712 have a checksum generated at the time of compile of each SIP section where the checksums are both logged to a checksum file and are further loaded into the control computer memory so that auditing is facilitated. In a further embodiment, The checksum is generated in a first compile pass and then in a second compile pass with the first pass checksum and the second pass checksum being compared to the checksum retained from the prior compile instance in the checksum file so that consistency in the code of the SIP section is verified from a first compile instance to any subsequent compile instance until such time as a willful change in the content of a SIP section is implemented by an accountable programming engineer with a concurrent modification via a specific protected utility of the stored checksum in the checksum file. If the comparison of the first pass checksum, the second pass checksum, and the checksum retained from the prior compile instance indicates that all three checksums are not identical, then the compile process does not proceed to generate the unified Machine Operation Code for loading into the control computer.

As previously noted, the SIP (Safety Integrity Programming) rule set provides computer-implemented logic which executes to provide for alignment of (a) the Application Program logic in the form of (1) the data variables defined for compilation in the SIP section and (2) the Application Program statements defined for compilation in the SIP section with (b) SIL specific constraints defined for (1) the SIL level appropriate to the apparatus operated and (2) the control computer which is used for control of the apparatus. In this regard, the SIP rule set interprets a function type statement in the particular instance of the Application Program being compiled into a SIP variable list of SIP variables for use respective to Application Program statements in the SIP section. A second portion of the logic in the SIP rule set of the Compiling Translator then compares each SIP variable used in a SIP section with the coding in that section to assure that (a) no SIP variable in the SIP variable list has its value determined outside of one single SIP section; (b) every SIP variable in the SIP list is used in at least one SIP section; and (c) that any conclusions from the use of non-SIP variables used in a SIP section are dominated within the statement wherein they are used by a statement portion based upon SIP variables. In implementing the third consideration, a SIP Boolean operator type is provided for signaling to Compiling Translator 85 that use of non-SIP variables in a computer statement has concluded so that SIP rule set 86 will fully apply to the remainder of the statement. Two operators of the SIP Boolean operator type are SIPAND and SIPOR. In this regard, an example statement is:

Conclusion(SIP) IF <clause without SIP variables> SIPAND <clause with SIP variables>

In the above statement, the "clause with SIP variables" functions to override any conclusion in the "clause without SIP variables" to insure that safe operations are not violated since the SIP conclusion variable has its value defined by a consideration conjoined with a clause which is fully SIP rigorous; the transition to SIP rigor is triggered by the SIP prefix in the AND Boolean operator.

A third portion of the logic in the Compiling Translator suppresses generation of the Machine Operation Code upon non-conformance of code in SIP section 712 to alignment considerations in SIP variables, the SIP variable list, and the SIP section. Another portion of the logic in Compiling Translator 85 defines a Compiling Translator signature data value characterizing the Machine Operation Code in the Program Memory (a portion of the general memory in the control computer where the Machine Operation Code does not change from moment-to-moment in real-time); and this signature data value is used in real-time to validate the integrity of the Machine Operation Code respective to the Machine Operation Code which was generated by the Compiling Translator.

A first Process Unit Step data object type having a safety-domain attribute parameter is provided for use in the SIP section; and a second Process Unit Step data object type having a normal-operations attribute parameter is provided for use outside of the SIP section. A prioritized stinted-shutdown status process control object type is also provided for use. In this regard, a stinted shutdown status process-control object type is an object which functions to identify a situation in a SEQUENCE where "shutdown" of that Process Unit in the affiliated apparatus is desired but in a stinted and restrained manner which achieves a secure and safe operational status in the system even as the economic penalty to the system is minimized. In managing the many levels of the shutdown imperative, a stinted-shutdown status process control object type is provided where the priority attribute parameter supports five priority levels.

In managing SIP variables, SIP sections, and SIP Process Unit Steps, three key techniques are followed:

1. A CRC32 at the source code level is confirmed on each compilation of a SIP segment, with a change management system under control of a specific accountable person for modification of the source code in that section.
2. All Process Unit Steps designated and defined to the Compiling Translator as SIP Process Unit Steps must be explicitly calculated in a SIP section (a SIP Process Unit Step may not be first defined to the Compiling Translator and then not further defined as a Boolean calculation result in a SIP section).
3. In the Machine Operation Code data set, all SIP variables are protected against manual change by an operating technician.

In a preferred embodiment, Shadow Memory circuitry 88 is added to control computer 92 to effect a "new" control computer 82. In this regard, the preferred embodiment uses two control computers with Shadow Memory circuitry 88 to more economically provide functionality achieved in an alternative embodiment having three control computers; it should be noted, however, that the benefits of the use of Machine Operation Code according to Compiling Translator 85 are achieved without the use of Shadow Memory section 88 if three control computers are used to effect control to apparatus 84 and each control computer has a diagnostic system and method for identifying the occurrence of a memory failure in any of the three computers (that is, without limitation to the foregoing, error correction code memory). The preferred embodiment uses Deadman 87 in I/O Circuitry 83 to effect fail-safe output when control computer 82 does not provide a set of ongoing pulses to sustain a capacitor in an RC circuit in Deadman 87 in offset from a threshold value; the pulses result from the execution by the control computer of a Machine Operation Code subset designed to be sufficiently complex to execute to conclusion only if the control computer is executing, above a very high threshold of probability, according to full conformance to designed capability. In other words, the Machine Operation Code subset is sufficiently complex to establish, at a high level of statistical confidence or above a high statistical probability threshold, that the various internal components, registers, and subcircuits of the control computer are operating correctly and according to their design as depicted to the certifying authority.

Figure 3A:
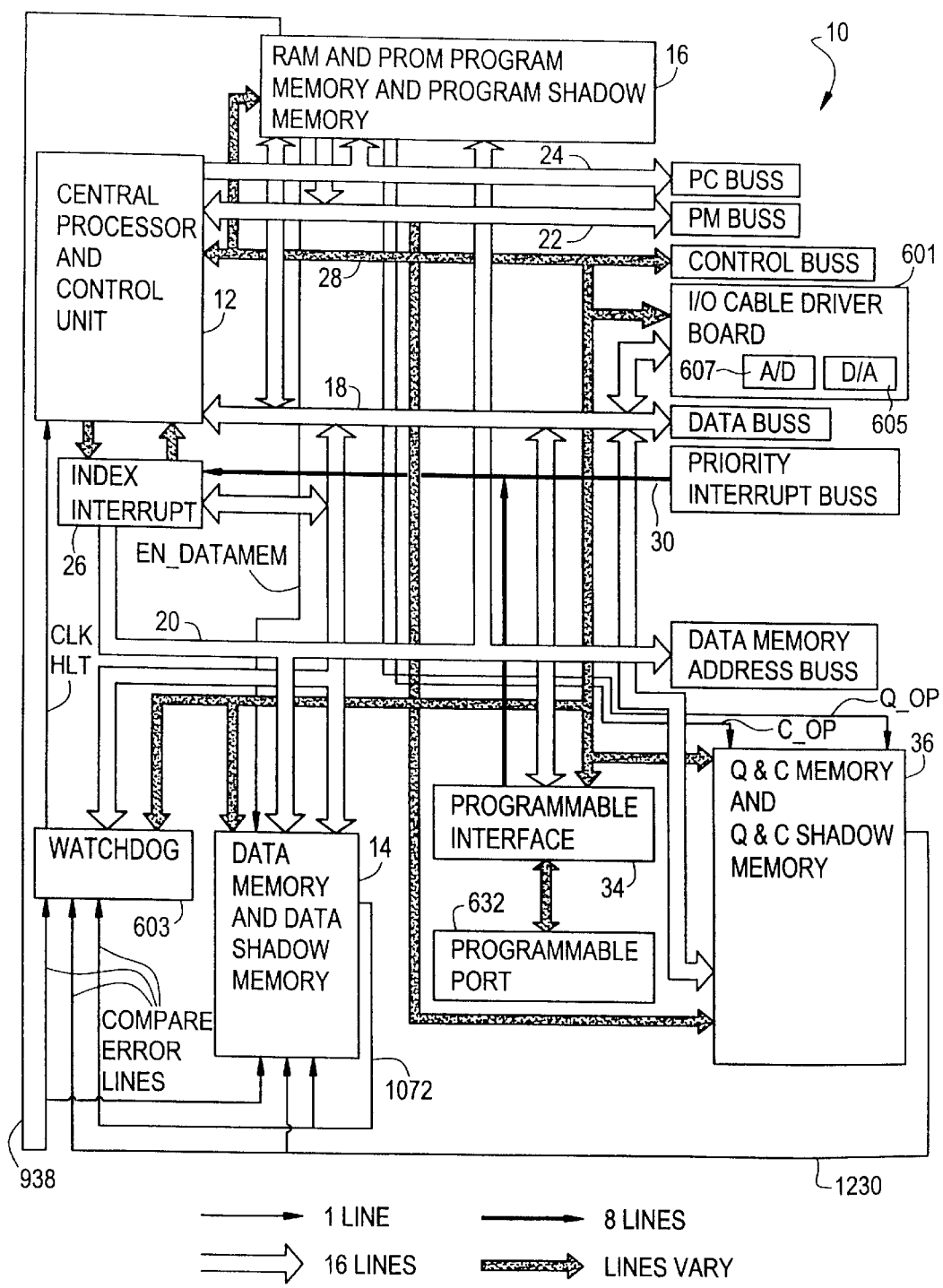
FIG. 3A presents a block diagram of a control computer.

Turning now to consideration of FIG. 3A, a block diagram of a preferred embodiment of control computer 82 is shown as control computer 10. Control computer 10 includes a Central Processor and Control Unit ("CPU") 12. In accordance with one embodiment herein, CPU 12 is based upon the MIPROC processor from Radstone Technology PLC, a Harvard architecture processor. However, it should be appreciated that other CPU circuits or microprocessors are conditionally used, and that the principles of the present invention are not limited to any particular CPU construction or integration. It should also be appreciated that all of the circuits in computer 10 are integrated into a single microcomputer chip in the appropriate application as might be achieved in a contemplated embodiment via use of ASIC (Application Specific Integrated Circuitry) technology (in conjunction with contemplated appropriate approval by the certifying agency as an acceptable certified embodiment).

Figure 19:
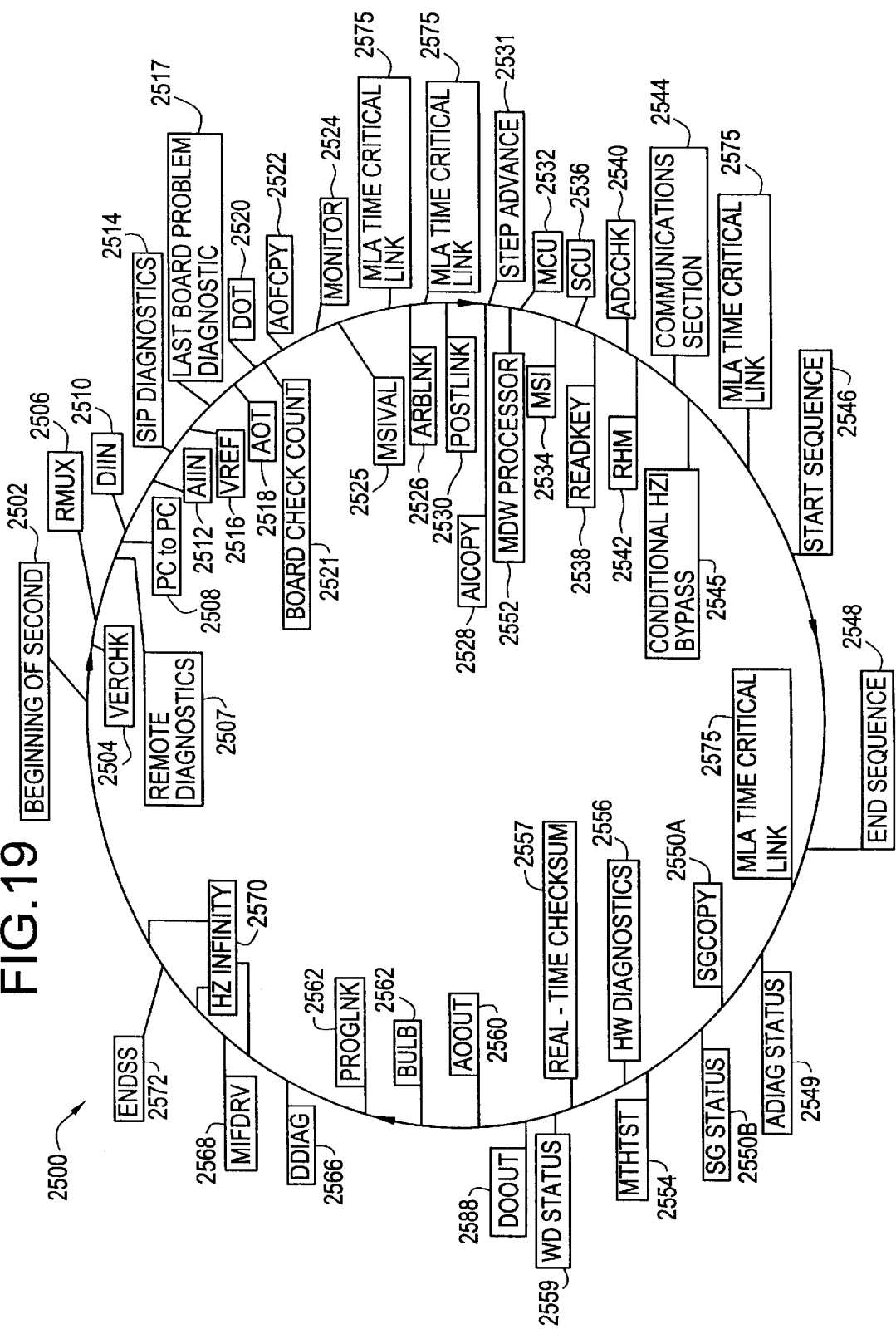
FIG. 19 presents an outline of execution of Hz1 subportions of the control program in real-time.

In accordance with a Harvard architecture configuration, computer 10 includes Data And Data Shadow Memory 14, Program And Program Shadow Memory 16, and a separate bus structure for each of these memories. Computer 10 also includes Q&C Memory And Q&C Shadow Memory 36 which receives control signals from Program And Program Shadow Memory 16, such as Q-operation (Q_OP) and C-operation (C_OP) signals. In this regard, the 64 K (and 64 K of Shadow) in Data Memory and Data Shadow Memory 14 interfaces data via Data Bus 18 (the "B" bus) and Data Memory Address Bus 20 in connection to the non-Shadow part of this memory. The 64 K (and 64 K of Shadow) Program And Program Shadow Memory 16 interfaces data via a Program Memory Data Bus 22 ("PM Buss") and Program Memory Address Bus 24 ("PC Buss") in connection to the non-Shadow part of this memory. The 320 K (and 320 K of Shadow) Q&C Memory And Q&C Shadow Memory 36 interfaces data via Data Bus 18 (the "B" bus) in connection to the non-Shadow part of this memory. In the preferred embodiment, the 64 K of Program Memory of Program And Program Shadow Memory 16 is referenced in 4 sets of memory: the first 16 K of Program Memory ROM is referenced as "Lo P ROM"; the next 16 K of Program Memory ROM is referenced as "Hi P ROM"; first 16 K of Program Memory RAM is referenced as "Lo P RAM"; and the remaining 16 K of Program Memory RAM is referenced as "Hi P RAM". Computer 10 also includes an Index Interrupt circuit 26, which enables CPU 12 to access data on Data Bus 18. More specifically, Index Interrupt circuit 26 provides a 16-bit address derived from one of eight address modes. The addressing mode is selected by the instruction to be executed. I/O Cable Driver Board 601 interfaces CPU 12 via Data Bus 18 to attached "Cans" and holds A/D converter 607 and D/A converter 605. Watchdog circuit 603 is bidirectionally interlinked to Data Bus 18 and unidirectionally (receptively) to memories of control computer 10 to receive inputs from memory compare operations (as further described herein). Index Interrupt circuit 26 is also linked to Priority Interrupt Bus 30. Watchdog circuit 603 provides a connection CLK HLT to CPU 12 for halting real-time execution of Machine Operation Code in control computer 10 if (a) the occurrence of a predetermined event output from Index Interrupt 26 and CPU 12 is not received via Data Bus 18 in a timely manner or (b) upon detection of a compare error signal 1230,1072,938 from the memories. In Task C operation, CPU 12 initiates operation of Watchdog 603. It should be noted that, while error compare lines 938, 1072, and 1239 are shown separately, any two or all three of these lines can be electrically conjoined in alternative embodiments prior to connection to Watchdog 603. In initiation, CPU 12 sends test patterns to memories 16, 36, and 14 to force an error condition and verify operations related to lines 1230, 1072, and 938. In Tasks B, D, E, and F, lines 1230, 1072, and 938 are monitored for indication of a memory compare error. An error via line 938 prompts immediate assertion of the CLK HLT connection signal to halt CPU 12; an error via lines 1230 or 1072 implements CLK HLT assertion if the partner control computer is acceptably operating in Tasks D, E, or F and the partner control computer Watchdog 603 grants permission to assert the CLK HLT signal. Watchdog 603 looks for milepost values via Data Bus 18 insuring that routines 2500 of FIG. 19 are executing in their predetermined methodology and within a predetermined increment of real-time between mileposts. Start and stop strobes respective to Hz10 and Hz100 operations are also monitored for complimentary arrival. Conditional shutdown in the manner discussed for lines 1230 and 1072 is implemented upon identification of unacceptable operation respective to milepost arrival, Hz10 start/stop strobe arrival, and Hz100 start/stop strobe arrival. Respective to the foregoing, Watchdog 603 circuits in a dual system have an independent communication linkage for fixed position status communications.

While computer 10 employs a 16-bit bus structure, it should be understood that other suitable bus widths are conditionally employed in the appropriate application. Similarly, the storage capacity of Data And Data Shadow Memory 14, Q&C Memory And Q&C Shadow Memory 36, and Program And Program Shadow Memory 16 are conditionally altered as well. Program And Program Shadow Memory 16 may utilize random access memory ("RAM"), electrically programmable read only memory ("EPROM"), or a combination of both to store program instructions, as described below, and the operating system. For example, the EPROM is used to store the operating system and those subroutines that are unlikely to be changed, while the RAM is used to store those subroutines that are more susceptible to updating. The Program And Program Shadow Memory 16 may also employ other suitable memory circuits in the appropriate application, such as EEPROM and Flash memory.

As shown in FIG. 3A, computer 10 also includes a control Bus 28, a priority interrupt Bus 30, and a Programmable Interface 34. The Programmable Interface 34 provides interface to programmable port 632 for input and output operations. In other words, the Programmable Interface 34 is configured to receive input signals which are representative of analog and digital values from various sensors, and configured to transmit output signals for one or more control devices. Additionally, the Programmable Interface is used to receive and transmit communication signals as well. Most I/O, however, is handled in the preferred embodiment via control Bus 28 (LINK 324a,b and Net Controller 328a,b— shown in FIG. 4—are interfaced in a similar manner to that of I/O Cable Driver Board 601).

Figure 3B:
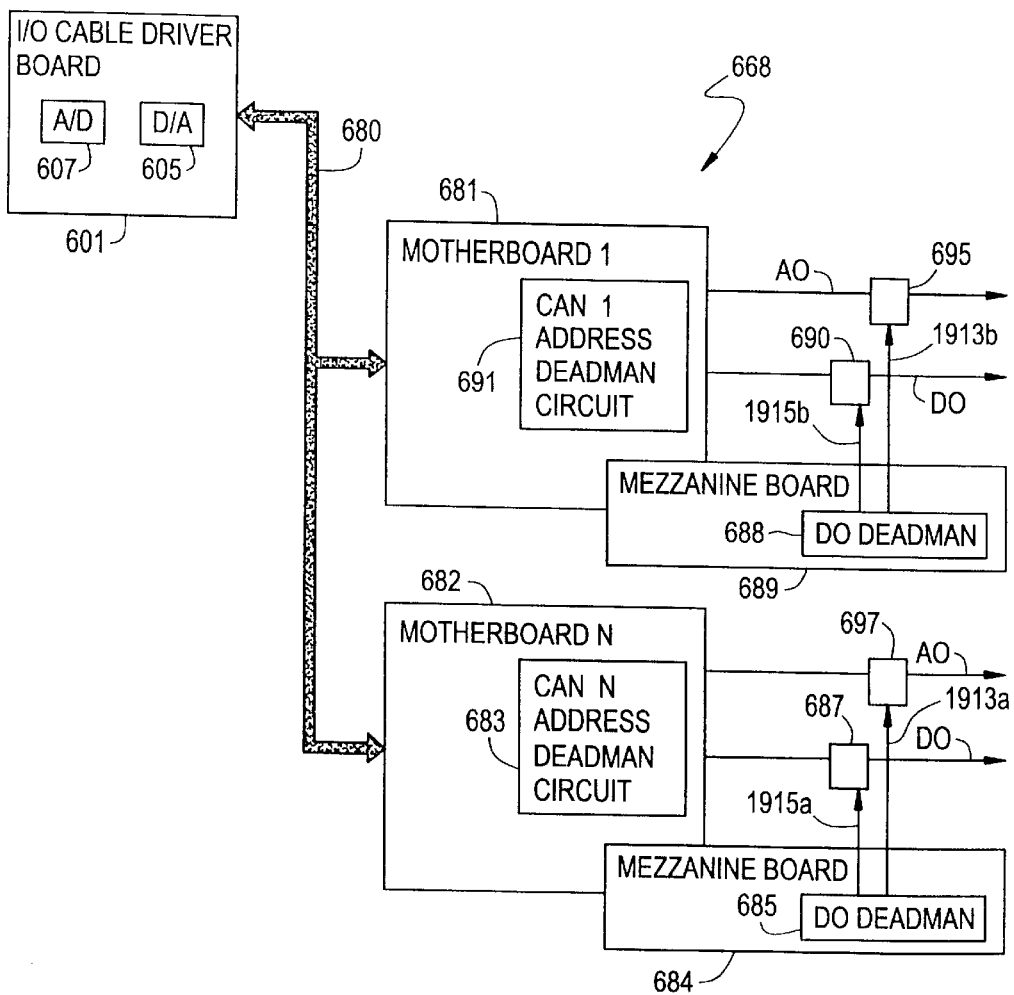
FIG. 3B presents an extension of the block diagram of FIG. 3A to include circuitry components located in an Input and Output signal "Can" respective to a control computer.

FIG. 3B presents an extension of the block diagram of FIG. 3A to include circuitry components 668 located in an Input and Output signal "Can" respective to a control computer. I/O Cable Driver Board 601 is reprised from FIG. 3A to show further connection via ribbon cable 680 to a set of Motherboards, illustrated with Motherboard (1) 681 and Motherboard (N) 682. Motherboard 1 has Can Address Deadman Circuit 691 and Mezzanine Board 689 upon which is disposed a Deadman Circuit denoted as DO Deadman Circuit 688. Motherboard N also has Can Address Deadman Circuit 683 and Mezzanine Board 684 upon which is disposed a Deadman Circuit denoted as DO Deadman Circuit 685. DO Deadman Circuit condenses reference to the "SIL Mezzanine Board Digital Output Deadman Circuit" herein. An RC circuit on each Can Address Deadman Circuit 683,691 is connected to an activity pulse receiver such that outputs are halted to controlled apparatus 84 from its Can if addressing inputs as first pulses from the control computer do not sustain the capacitor in the RC circuit in offset from (below) a threshold value. DO Deadman Circuit 688,685 implements a deadman to de-energize all digital outputs (DOs) from the Can if a output command from the control computer indicates non-standard operation of control computer 10; in this regard, the DO Deadman Circuit circuit has an RC circuit connected to an activity pulse receiver such that a DO Deadman output 1915 is implemented (that is, the Deadman "fires") to halt the provision of digital output signals (via switches 687,690) to apparatus 84 from its Can if a set of ongoing second pulses from the control computer do not sustain the capacitor in the RC circuit below a threshold value where the second pulses result from the execution by the control computer of a Machine Operation Code subset designed to be sufficiently complex to execute to conclusion only if the control computer is executing according to full conformance to designed capability above a very high threshold of probability. AO Deadman connection 1913a,b is alternatively implemented to de-energize Analog Output signals (via switches 695,697) to apparatus 84 control elements as needed.

The use of control computer 10 in a redundant control computer system is described with reference to FIG. 4 where a block diagram of an actively redundant control computer system 310 is presented. System 310 includes a pair of actively redundant control computers 10a and 10b, which are preferably each identical to control computer 10. Each of control computers 10a,b receive common input data from one or more Remote Field Units, such as Remote Field Units 314a–314b. These Remote Field Units are located remotely from actively redundant control computers 10a,b, as illustrated by use of fiber optic cables 316a–316d (note the use of crosshatch to designate fiber-optic linkages in FIG. 4). In this regard, U.S. Pat. No. 5,428,769 (69Glaser et al., referenced above) describes in detail the communication and control links between a pair of actively redundant control computers, such as control computers 10a,b, and the input/output devices directly associated with apparatus 84 being controlled via signals handled via a field computer unit 314 (such as flow rate sensor 318 and temperature sensor 320). Alternatively, local field instrumentation is used to more directly connect control computers 10a,b with input sensors and control devices; in this case, a signal is not handled in triply redundant mode as when a field computer unit 314 is used, but rather is handled in a dual redundant mode. In the dual redundant case, input signals (via I 44a, 44b) are arbitrated between two control computers 10a,b as further described herein, and output signals (via O 45a, 45b) are simultaneously impressed on one wire to a control device with use of an operational amplifier to maintain output circuit stability in the context of two voltages impressing to the same conductor.

While the redundancy of two actively operating control computers 10a,b has certain fault tolerance advantages over a single decision-making control computer, it should be understood that principles of the present invention are not limited to a configuration of two actively redundant control computers. Thus, for example, it is conditionally desirable to employ three control computers in the place of the two control computers 10a,b shown in FIG. 4 under appropriate circumstances.

In the present embodiment, control computers 10a,b preferably operate concurrently on one portion of signals being transmitted to and from one or more Remote Field Units and another (second) portion of signals being transmitted to and from the two control computers in direct linkage (that is, without benefit of Remote Field Units 314). Each of control computers 10a,b execute independent decisions based upon data received from the field via these two approaches. The decisions made by control computers 10a,b determine output signal values which are ultimately directed to specific output devices (for example, valves, pump motors and reactor heaters) by appropriate Remote Field Units in the case of one portion of the output signals; and decisions made by control computers 10a,b determine output signal values which are ultimately directed to specific output devices (for example, valves, pump motors and reactor heaters) directly in the case of a second portion of the output signals. In this regard, pump 322 is shown in FIG. 4 to illustrate one type of output device controlled by system 310.

While output signal values could be reconciled between two actively redundant control computers 10a,b, it should be understood that two independent sets of output signal values could otherwise be communicated to Remote Field Units 314a–314b. In this regard, input values received from a Remote Field Unit 314 could be arbitrated, which should make it unnecessary to reconcile or arbitrate output values. This is because both of control computers 10a,b would then be working with the same process control program and operating on the same set of arbitrated input values.

To facilitate input signal arbitration or reconciliation process, a parallel communication link 324 is provided between control computers 10a,b. Parallel communication link 324 is referred to as the "major" link, as it permits a direct transfer of data and timing signals between the control computers. It should also be noted that Left control computer 10a is labeled "Dog", while Right control computer 10b is labeled "Fox". These are logical designations for alternative operating modes of control computers 10a,b as defined previously. Accordingly, FIG. 4 shows link circuit 324a contained in or otherwise coupled to control computer 10*a*, as well as link circuit 324*b* contained in control computer 10*b*. As these link circuits are preferably identical in construction, link circuits 324*a*–324*b* are sometimes generically referred to herein as link circuit 324. This same referencing procedure is used herein to generically refer to other preferably identical components in actively redundant process control system 310. In the event that control computers 10*a,b* are temporarily not able to communicate over major link 324, each of these control computers continue their operations in a mode which assumes that they are operating alone.

While each of control computers 10*a,b* make independent decisions, the control computer in Task F transmits a timing signal to the control computer in Task D at the beginning of its process control program cycle (for example, a one second period), so that the control computer in Task D is prompted to begin a new process control program cycle as well. As control computers 10*a,b* operate under their own clock oscillators, detection and interpretation of this program cycle timing signal by the control computer in Task D periodically keeps the control computers in relative synchronization. However, it should be appreciated that the program cycle of the control computer in Task D typically follows the program cycle of the control computer in Task F by the period of time it takes to transmit and then detect the program cycle timing signal (for example, 20 microseconds to 1–2 milliseconds).

As previously noted, central processing unit 12 is preferably based upon a Harvard architecture, as this architecture permits both an op-code instruction and operand data for this instruction to be fetched in the same clock cycle. This is because a control computer based upon Harvard architecture includes physically separate instruction and data stores, and each of these stores have their own address and data lines to the central processing unit. In contrast, with control computers based upon the von Neumann architecture, it typically takes several computer clock cycles to fetch, decode and execute an instruction.

Each of control computers 10*a,b* includes a network controller 328*a*–328*b* to facilitate communication with Remote Field Units 314*a*–314*b*. Each network controller 328*a*–328*b* is, in turn, connected to one or more breakout circuits 330 via fiber optic cables 332,334. Breakout circuits 330 direct input signals from Remote Field Units 314*a*–314*b* to network controller 328. Similarly, breakout circuits 330 direct output signals from network controller 328 to appropriate Remote Field Units 314*a*–314*b*. In the case of a large process control system 310 which has many Remote Field Units 314, it should be noted that several breakout circuits 330 are connected in series to form a communication ring around network controller 328. Additionally, a second level of breakout circuit 330 may also be connected to the breakout circuits forming the communication ring in order to further distribute bi-directional signal communication between control computers 10*a,b* and each of Remote Field Units 314 needed in system 310. Furthermore, it should also be noted that network controller 328 is preferably capable of using either of fiber optic cables 332,334 to conduct bi-directional communication with breakout circuits 330 on the communication ring level.

Figure 4:
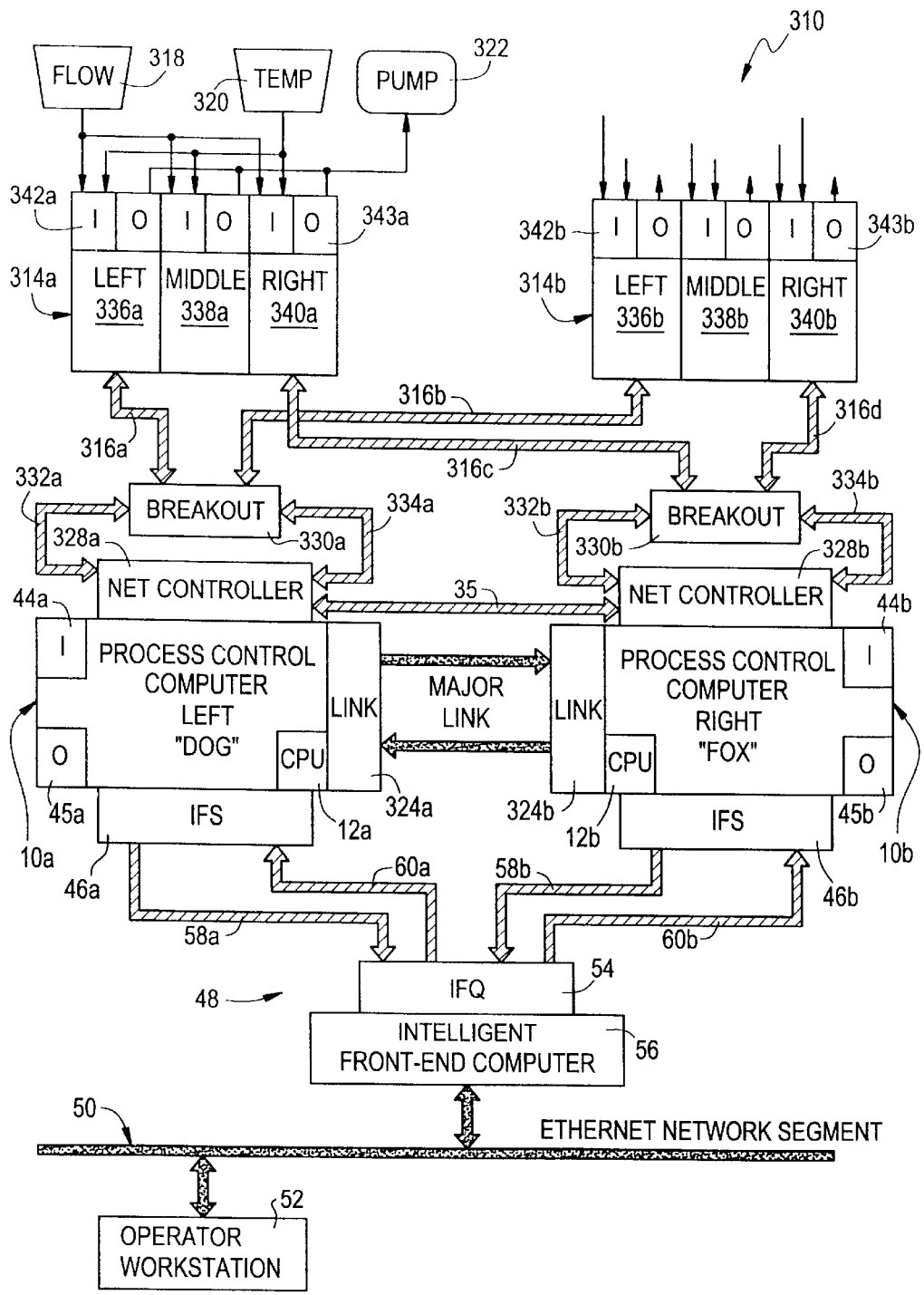
FIG. 4 presents a block diagram of an actively redundant control computer system.

As shown in FIG. 4, breakout circuit 330*a* is preferably connected to both Left control computer circuit 336*a* of Remote Field Unit 314*a* and Left control computer circuit 336*b* of Remote Field Unit 314*b*. Similarly, breakout circuit 330*b* is preferably connected to both Right control computer circuit 340*a* of Remote Field Unit 314*a* and Right control computer circuit 340*b* of Remote Field Unit 314*b*. In this way, Left control computer 314*a* receives input signals from all of Left control computer circuits 336 in Remote Field Units 314, while Right control computer 314*b* receives input signals from all of Right control computer circuits 340 in the Remote Field Units. Accordingly, it should be appreciated that two separate fiber optic based communication networks are provided between control computers 10*a,b* and Remote Field Units 314, even though each of the control computers are coupled to each of the Remote Field Units.

While Middle control computer circuits 338*a*–338*b* of Remote Field Units 314 do not communicate directly with any of control computers 10*a,b*, Middle control computer circuits 338 do communicate directly with the Left and Right control computer circuits in their respective Remote Field Units. Additionally, in the event that three control computers 10 were to be employed, it should be appreciated that Middle control computer circuits 338 could then communicate directly with this third control computer. As shown in FIG. 4, Middle control computer circuits 338 do receive all of the corresponding input signals that the Left and Right control computer circuits receive from various sensors, such as flow rate sensor 318 and temperature sensor 320. Similarly, Middle control computer circuits are also connected to each of the output devices to which Left and Right control computer circuits are connected, such as pump 322.

These input and output connections are made through one or more input circuits, such as input circuit 342*a*, and one or more output circuits, such as output circuit 343*a*. In this regard, each of the Left, Right and Middle control computer circuits include corresponding input and output circuits. In this way, each of the Left, Right and Middle control computer circuits in Remote Field Unit 314 are able to perform initial input signal arbitration and final output arbitration. For example, the input signal from flow rate sensor 318 is processed by each of the corresponding input circuits, such as input circuit 342*a*. Then, Left, Right and Middle control computer circuits exchange corresponding flow rate input signals in turn via serial communication lines. Each of the Left, Right and Middle control computer circuits then make independent decisions as to value of the flow rate input signal. Finally, Left control computer circuit 336*a* transmits its flow rate value to Left control computer 10*a*, while Right control computer circuit 340*a* transmits its flow rate value to Right control computer 10*b*.

Even though the Left and Right control computer circuits preferably perform an initial arbitration process, it should be appreciated that these control computer circuits could possibly arrive at different results. Such differences could arise from operation of corresponding input circuits or a temporary inability of control computer circuits in Remote Field Unit 314 to communicate with each other. Additionally, a fault could also arise in operation of one or more of the control computer circuits contained in Remote Field Unit 314. While it is preferred that each of Left, Right and Middle control computer circuits receive data from each input sensor, it is also possible that separate, but corresponding sensors could be provided for each of these control computer circuits to measure any given input parameter. In such a case, the sensors themselves could produce different input values, even though they are intended to observe the same physical phenomena. Accordingly, it should be appreciated that Left control computer 10*a* and Right control computer 10*b* could receive different values for corresponding input signals, such as the values for the corresponding flow rate signals.

While control computers 10*a,b* could receive all of their input signals from one or more Remote Field Units 314, they may also receive input signals from directly connected input circuit boards, either as an alternative to Remote Field Units 314 or in addition to input signals received from the Remote Field Units. Thus, for example, control computer 10a is shown to include an input circuit board 44a and an output circuit board 45a. While input circuit board 342a in Remote Field Unit 314a is used to receive analog input signals, input circuit board 44a is used to receive digital input signals. However, it should be appreciated that Remote Field Units 314a–314b and control computers 10a,b are provided with both analog and digital input circuit boards, as well as analog and digital output circuit boards.

Each of control computers 10a,b also optionally include IFS circuit 46 to facilitate communication with intelligent front end communication system 48 via a High Speed Interface (an HSI). Front end communication system 48 provides an intelligent interface between control computers 10a,b and a plant-wide or local-area network 50. In other words, front end communication system 48 provides a way to rapidly transfer input and/or output data from control computers 10a,b to one or more network entities, such as operator workstation 52. Similarly, front end communication system 48 enables an operator to send command signals to one or both of control computers 10a,b.

Front end communication system 48 includes IFS circuits 46a–46b, IFQ circuit 54, and front end computer 56. IFS circuit 46 provides an interface to the "Stealth" port (Stealthport) of a dual-ported Data Memory contained in control computer 10, while IFQ circuit 54 provides an interface to the Q-Bus of front end computer 56. In one embodiment, front end computer 56 is preferably a MICROVAX 3400 computer using a real-time ELN operating system from Digital Equipment Corporation. Front end communication system 48 also provides a fiber optic communication link between IFS circuits 46a–46b and IFQ circuit 54. In this regard, at least one optical fiber 58a enables signal communication from IFS circuit 46a to IFQ circuit 54, while another optical fiber 60a enables signal communication from the IFQ circuit to this IFS circuit. It should also be noted that redundancy is provided in front end communication system 48 by including an additional IFQ circuit 54 and front end computer 56 combination. A further description of front end communication system 48 is found in U.S. Pat. No. 5,519,603 (Allbery, Jr. et al.) issued on May 21, 1996 and entitled "Intelligent process control communication system and method having capability to time align corresponding data sets"; U.S. Pat. No. 5,428,745 (45de Bruijn et al.) issued on Jun. 27, 1995 and entitled "Secure communication system for re-establishing time limited communication between first and second computers before communication time period expiration using new random number"; and U.S. Pat. No. 5,561,770 (70de Bruijn et al.) issued on Oct. 1, 1996 and entitled "System and method for determining whether to transmit command to control computer by checking status of enable indicator associated with variable identified in the command". These patents have previously been expressly incorporated herein by reference in the present application for showing a manner of using the present invention; the system that they describe is denoted as the high speed interface (or HSI) in this specification.

Figure 5:
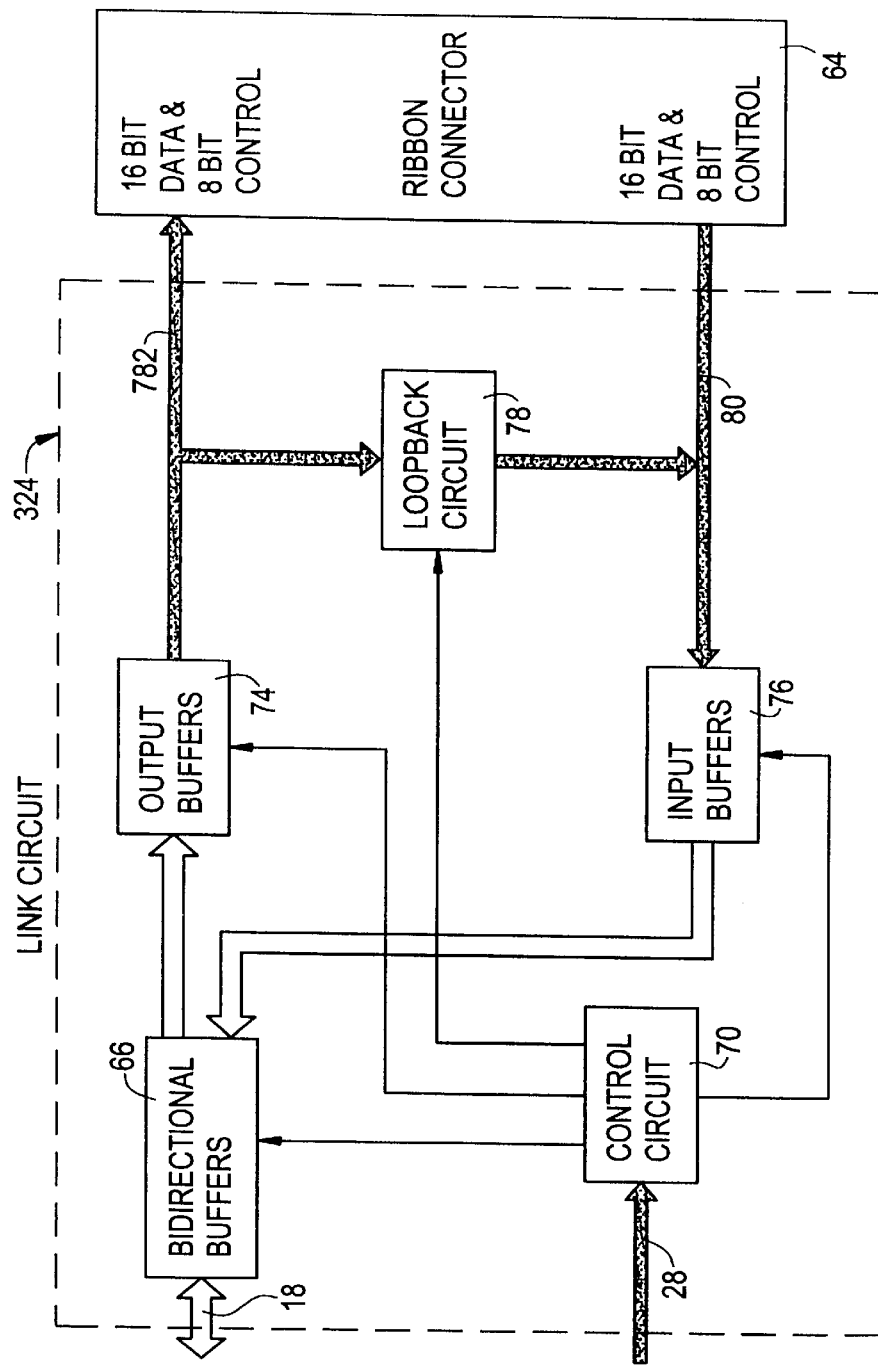
FIG. 5 presents a block diagram of a link circuit connected to the bus structure of the control computer.

Referring to FIG. 5, a block diagram of link circuit 324 is shown. Link circuit 324 is connected to Data Bus 18 and Control Bus 28 of control computer 10 at one end, and the link circuit is connected to a ribbon connector 64 at the other end. It should be noted at this point that two identical link circuits 324 could be provided at each of control computers 10a,b in order to build redundancy into major link 324 between the control computers.

Link circuit 324 includes drawing element 66 labeled "bi-directional buffers" connected to Data Bus 18 of control computer 10. In one embodiment, bi-directional buffers 66 are comprised of two 8-bit buffers, which are capable of receiving and transmitting data on Data Bus 18. Link circuit 324 also includes control circuit 70, connected to control lines 28 from control computer 10. In this regard, control circuit 70 is comprised of a Programmable Array Logic "PAL" circuit. Control circuit 70 is used to decode signals transmitted on control lines 28 in order to selectively access one or more of other circuits contained in link circuit 324. For example, control circuit 70 sends an enable signal and a input/output signal to bi-directional buffers 66 when data is to be transmitted or received across Data Bus 18.

Link circuit 324 also includes a set of output buffers 74 and a set of input buffers 76. Output buffers 74 are comprised of three octal latches, while the input buffers are comprised of three octal tri-state buffers. Two of the latches in output buffers 74 are used to provide a set of 16-bit output data lines to ribbon connector 64, while the remaining latch is used to provide a set of 8-bit code lines to the ribbon connector. Similarly, two of input buffers 76 are used to provide a set of 16-bit input data lines from ribbon connector 64, while the remaining buffer is used to provide a set of 8-bit code lines from the ribbon connector. Link circuit 324 may also include a loopback circuit 78, interconnected between input data/code lines 80 and output data/code lines 782. The loopback circuit provides a path to test the functionality of link circuit 324. Loopback circuit 78 is comprised of a set of three octal tri-state buffers.

While loopback circuit 324 could also include an additional line for sending an interrupt signal to central processing unit 12 of control computer 10, the use of interrupt signals across major link 324 are not required. In this regard, each of control computers 10a,b include a precision, oven-controlled oscillator as a source of accurate clock frequency signals for several distinct time domains. For example, the oscillator is used to increment a 12-bit up counter, which provides a Real-Time Clock "RTC". When the RTC times out, an interrupt signal is generated to create a Hz1200 time domain (that is, an interrupt every 0.83 milliseconds). A Hz1200 routine is also provided to adjust the RTC to the number of instruction cycles needed to generate the next Hz1200 interrupt. More specifically, the value of a counter referred to as INTCYC is added to the current value of the RTC counter to adjust for interrupt latency. Next, the Hz1200 routine tests the value of a counter referred to as CC300 to determine if it is time to execute an Hz300interrupt routine.

In order to provide phase locking in the Hz300 time domain, a 60 Hz square wave signal is produced from a precision crystal. A transition is detected by reading a voltage comparator to provide 60 Hz phase locking. Since a 60 Hz transition should be detected every 5th Hz300 interrupt, a counter referred-to as CYCLE is set up to count the Hz300 interrupt loops. A memory location referred to as LAST is used to contain the bit value of the comparator's 60 Hz detect last Hz300. Whenever a 60 Hz transition is detected from Low to High, the following test is performed. If the 60 Hz transition is detected when CYCLE is 4, the value of INTCYC is incremented by 1, because an early detection was made. If the 60 Hz transition is detected when CYCLE is 5, the ideal condition exists, and no clock signal correction is performed. If the 60 Hz transition is detected when CYCLE is 6, INTCYC is decremented by 1, because a late detection occurred. After any one of these three conditions is met, CYCLE is zeroed. If a 60 Hz transition-is detected when CYCLE is any other value or if not detected, no phase locking is performed until the testing described above results in the detection of two ideal conditions in a row.

However, it should be noted that 60 Hz phase locking is not performed in control computer 10 in Task D. Rather, a fixed value is used for the INTCYC counter. Additionally, a pseudo Hz150 time domain is created in both Fox and Dog control computers 10a,b by toggling a bit referred to as PHZ. When PHZ is Low, or Hz150, both control computers 10a,b toggle a SSTART line of major link 324 code lines. The Dog control computer (for example, control computer 10a) immediately reads the SSTART line, and the Dog control computer makes phase corrections at Hz150 to lock onto the frequency of the Fox control computer (for example, control computer 10b). This phase correction is accomplished by changing the current value in the RTC counter with a +/−64 counts. This rapid adjustment is made every Hz150 in either the positive or negative direction, depending upon whether the Dog is lagging or leading the Fox.

When a control computer is first started, it preferably initiates in Task D, and it waits for a Beginning of Second "BOS" signal by monitoring a FBOS (Fox beginning of second) bit on major link 324 code lines. This bit is toggled at the beginning of a second (that is, a new Hz1 cycle instance) by both of control computers 10a,b. As soon as the FBOS signal is detected, the Dog control computer starts running its normal one second process control time line in order to align itself with the Fox control computer. If no Fox control computer is detected, after a suitable period of time (for example, 5 seconds) the Dog control computer elevates to an operating (E) Task where it is assumed that it is the only currently operational control computer.

Figure 6:
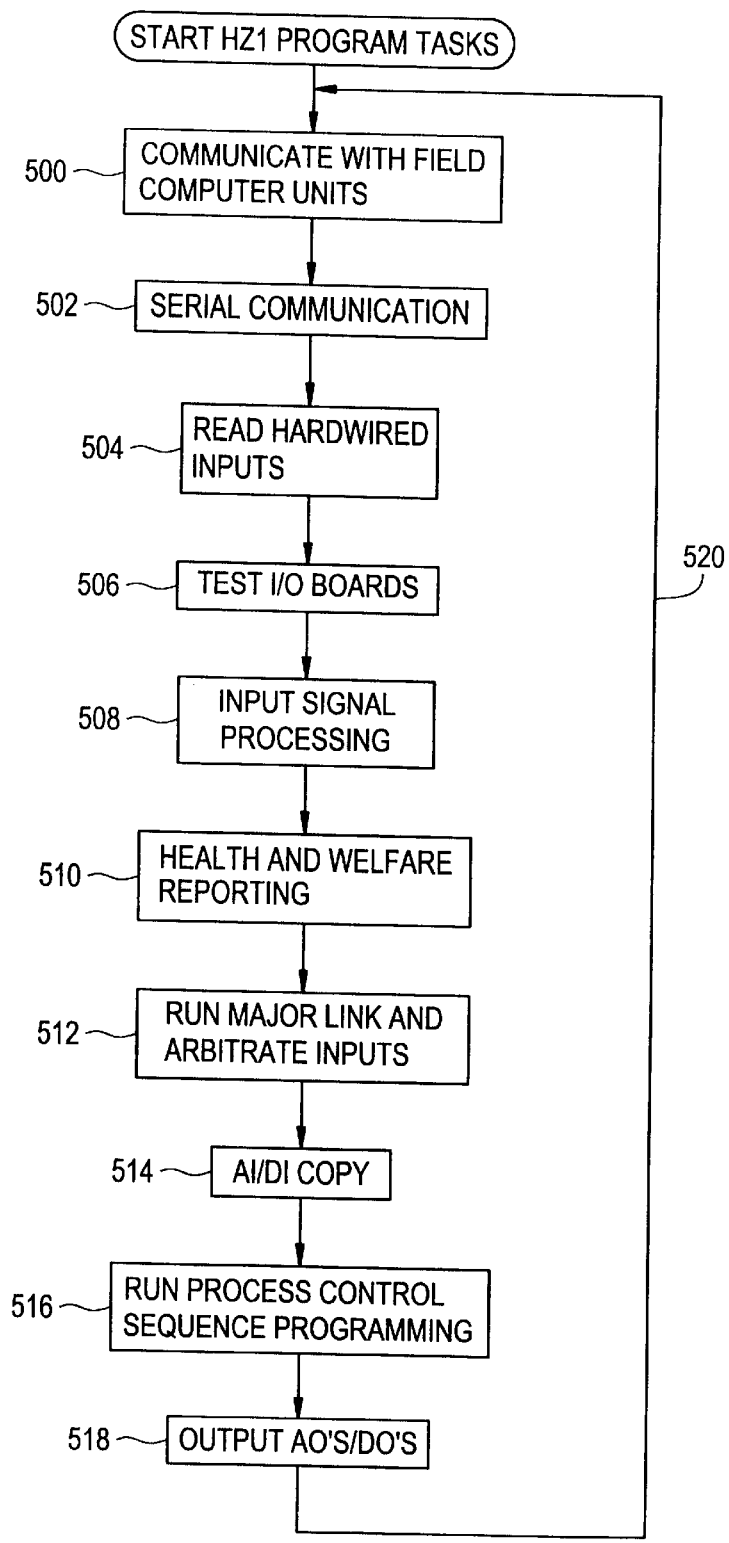
FIG. 6 presents a flow chart of the sequence of the program tasks performed in the Hz1 time domain in a control computer.

Referring to FIG. 6, a flow chart of the sequence of program tasks performed in the Hz1 time domain is shown. In this regard, it should be noted that this flow chart does not depict all possible tasks performed in the Hz1 time domain (for example, driving data displays). Rather, this flow chart serves to provide a general overview of the sequence of tasks which are programmed into control computers 10; a more detailed 41 step progression is discussed in conjunction with FIGS. 19 and 20. At the beginning of a one second Hz1 cycle instance, each control computer 10 conducts bi-directional communication with Remote Field Units 314 via network controller 328 (step 500). More specifically, the control computer transmits appropriate output signals to Remote Field Units 314, which were determined during the last Hz1 cycle instance (that is, the previous second). Then, the control computer requests Remote Field Units 314 to send their arbitrated input signals for the present Hz1 cycle instance.

As generally indicated by step 502, serial communication boards (not shown) conduct communications with each other over fiber optic serial communication link 35 (shown in FIG. 4). Another serial communication link (not shown) is used, for example, to transfer process status data to other control computers in a manner similar to network controller 328a,b; but the serial communication link has its own specific circuitry and firmware specific to its particular communication task. While this data is generally treated the same as calculated values, it should be noted that this data could also be treated as another form of input data to be subject to resolution as set forth below.

Next, control computer 10 reads the input signals from any input circuits which are connected directly to the control computer (step 504). AIF and DIF signals represent input signal values received from field instrumentation. AOT and DOT signals represent feedback signals used to verify output signals transmitted to output devices (for example, pumps, valves and switches) which physically control apparatus 84. Regardless of the origin of the input signals, it should also be noted that the input signals are generally comprised of a set of analog input "AIF" signals, a set of digital input "DIF" signals, a set of analog output track "AOT" signals and a set of digital output track "DOT" signals.

Assuming that control computer 10 has one or more input/output "I/O" circuit boards connected to it (for example, input circuit 44a), a test is performed to determine if the control computer is able to properly communicate with these I/O circuits (step 506). Then, input signals received undergo programmed processing steps, such as linearization and scaling (step 508). Next, control computer 10 prepares suitable health and welfare reports on input signals (step 510). In this regard, various problem bits are reported.

Control computers 10 then perform an exchange of processed input signals from the field across major link 324, and arbitrate/resolve exchanged signals (step 512). This method of exchanging signals across major link 324 is described in connection with flow charts of FIGS. 7A–8B. Arbitration then proceeds as is generally described in U.S. Pat. No. 5,583,757 (Baca, Jr. et al.) and with respect to FIGS. 15, 16, 17, and 18 of this specification.

Once all of these procedures have been performed, AI/DI COPY step 514 executes conditional upon the existence of Task E within a particular control computer to handle the case that two control computers 10a,b are not executing in actively redundant mode. Control computer 10 then runs programmed SEQUENCES which determine necessary output values from exchanged and arbitrated/resolved input values (step 516). Finally, control computer 10 transmits analog and digital output "AO" and "DO" signals required for any I/O circuits directly connected to the control computer (for example, output circuit 45a) as indicated in step 518. At this point, the control computer may perform any remaining Hz1 tasks that are not otherwise required to be performed or completed within the Hz1 cycle instance (for example, one second). For example, a process control program from one of control computers 10a,b could be transferred upon request to the other control computer during the time remaining in the Hz1 cycle instance to accomplish a program load. Then, as indicated by return line 520, the control computer returns to the starting position in order to wait for the beginning of the next Hz1 cycle instance.

Figure 7:
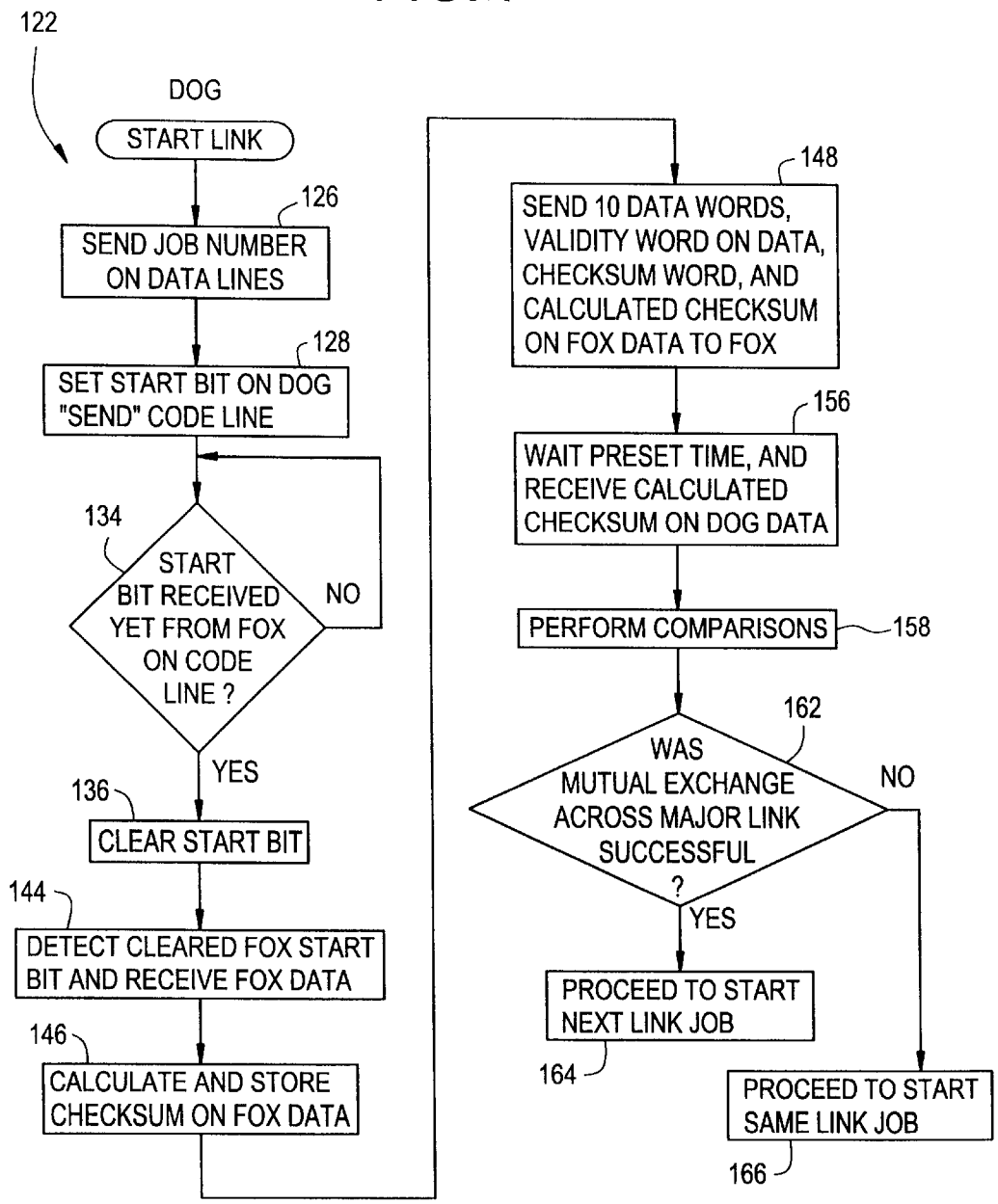
FIG. 7 presents a flow chart illustrating the process executed in a control computer defined as the Dog in mutual exchange of corresponding input signals by the actively redundant control computers.
Figure 8:
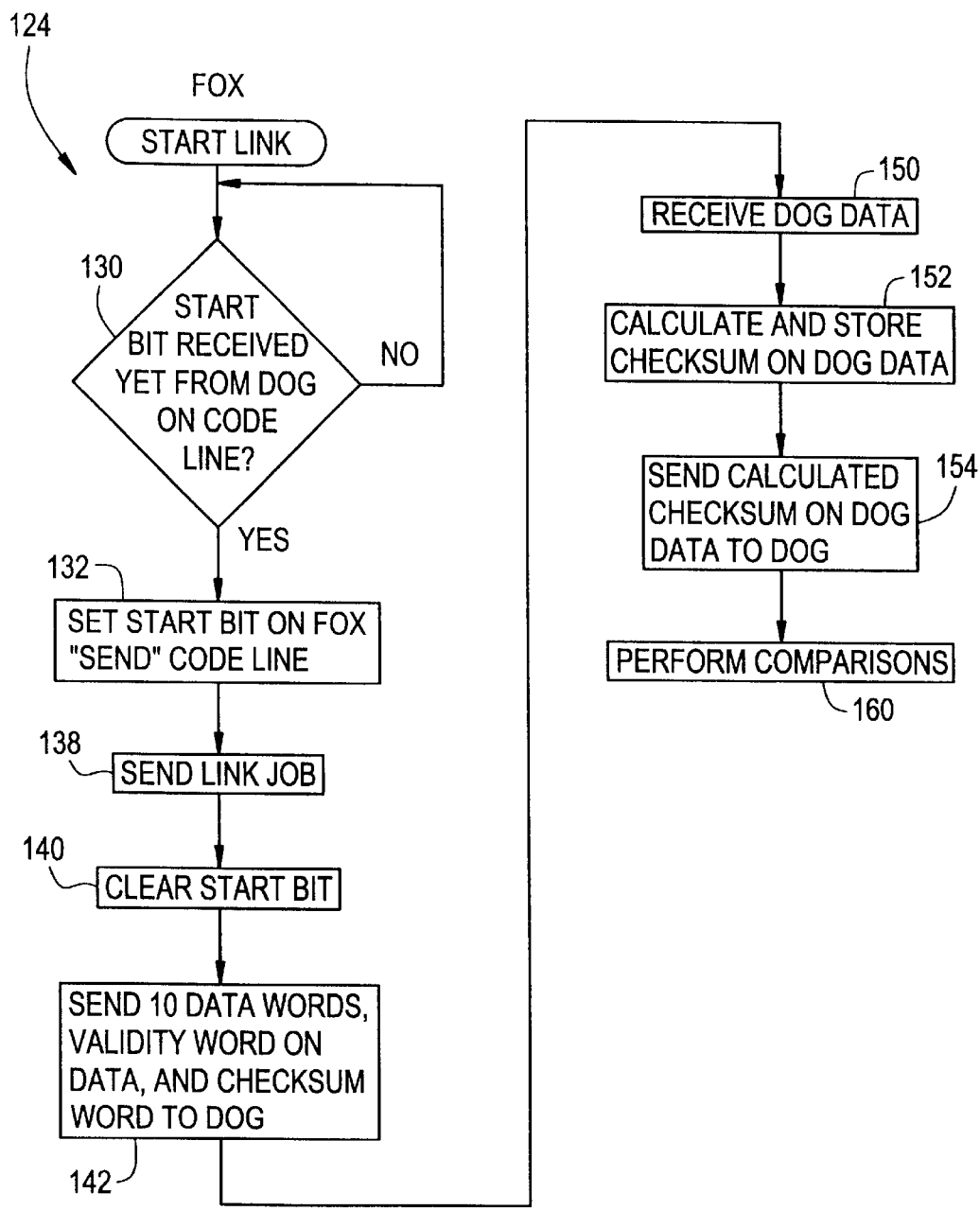
FIG. 8 presents a flow chart illustrating the process executed in a control computer defined as the Fox in mutual exchange of corresponding input signals by the actively redundant control computers.

Referring to FIGS. 7 and 8, a set of flow charts 122, 124 is shown to illustrate the mutual exchange of corresponding input signals by the actively redundant control computers 10a,b as described in steps 126–166. FIG. 7 represents the major link method 122 employed by the control computer currently in Task D (for example, control computer 10a). Similarly, FIG. 8 represents the major link method 124 employed by the control computer currently in Task F (for example, control computer 10b). Accordingly, FIGS. 7 and 8 show methods inter-related in time and operation.

Dog control computer 10a begins the major link 324 exchange by sending a link job number on the data lines of output data/code lines 782 of link circuit 324 (step 126). In one embodiment, the job number is used to represent the starting address of a set of data words to be exchanged. In this way, each of control computers 10a,b is programmed with a link list of corresponding memory address locations in a data table which should be mutually exchanged.

Next, Dog control computer 10a sets a start bit on its "send" code line in output data/code lines 782 in order to let Fox control computer 10b know that it is ready (step 128). Due to the close timing relationship between control computers 10a,b, as described above, Fox control computer 10b knows when to begin looking for the link job number and the start bit from Dog control computer 10a (decision action 130). Once this start bit has been received, the Fox control computer sets its start bit as well (step 132). Dog control computer 10a looks for the Fox's start bit (decision action 134), and it responds by clearing its start bit and looking for the Fox's start bit to have been cleared (step 136); if the Fox's start bit does not clear, the block is aborted until a timeout prompts Hz1 cycle continuation.

Meanwhile, due to the tightly controlled timing relationship of the major link method, Fox control computer 10b sends its link job number to Dog control computer 10a (step 138) and clears its start bit (step 140). Once these two steps are accomplished, Fox control computer 10b begins to send the first block or berth of data to Dog control computer 10a (step 142). In one embodiment, this berth of data is comprised of up to ten 16-bit data words, a "goodness" word indicative of the validity of the ten data words, and a checksum for this berth of transmitted data.

Dog control computer 10a detects the clearing of the Fox's start bit and it immediately begins receiving the Fox's link job number and the berth of data set forth above (step 144). Dog control computer 10a then calculates its own checksum on the data received from Fox control computer 10b (step 146). Thereafter, Dog control computer 10a immediately sends its berth of data to Fox control computer 10b (step 148 shown in FIG. 7). This berth of data includes up to ten 16-bit data words, the "goodness" word on the validity of this data, a checksum of this berth of Dog data, and the checksum that the Dog calculated on the Fox's berth of data.

Fox control computer 10b receives the Dog's berth of data (step 150), and calculates its own checksum on the data received (step 152). Fox control computer 10b then sends this calculated checksum to Dog control computer 10a (step 154). After Dog control computer 10a has transmitted its berth of data, it then waits a preset period of time in order to receive the checksum that the Fox calculated on the Dog's berth of data (step 156). In this regard, it should be noted that this period of time, as well as other suitable waiting times in the major link method, is related to the number of central processing unit instructions it takes to accomplish these steps.

Then, as illustrated in FIGS. 7 and 8, both control computers 10a,b perform a series of comparisons from the resulting exchange of data (steps 158–160). These comparisons include (a) a comparison of the link job numbers, (b) a comparison of the checksum sent with the Fox's berth of data vs. the checksum that the Dog calculated on this data, and (c) a comparison of the checksum sent with the Dog's berth of data vs. the checksum that the Fox calculated on this data. Assuming that all of these comparisons matched, the mutual exchange is determined as successful (decision action 162), and Dog control computer 10a begins another major link 324 exchange with the next link job number (step 164). If the exchange was determined to be unsuccessful, the Dog control computer begins another major link 324 exchange with the same link job number as used in the unsuccessful exchange (step 166). In this way, Dog control computer 10a attempts to repeat the same major link 324 exchange until it is successful, a predetermined number of attempts have failed, or the period of time allocated to the major link 324 exchange has expired, whatever occurs first. A similar procedure is also employed by Fox control computer 10b.

From the above, it should be appreciated that the possibility could arise where Dog control computer 10a determines that the link was successful, but Fox control computer 10b makes a determination that the link was unsuccessful. In such a case, the Dog transmits the next link job number, while the Fox transmits the last link job number. Due to the speed at which the major link 324 exchange is performed, the comparisons between the link job numbers is preferably performed after the data has been exchanged. Accordingly, Dog control computer 10a does not detect that the Fox sent a berth of data from the previous exchange until it has sent the next berth of data. In response to the mis-match of link job numbers, Dog control computer 10a could repeat the major link exchange with the previous link job number, in order that Fox control computer 10b may have the opportunity of successfully receive this berth of data. Otherwise, the mis-match continues for the remainder of this particular Hz1 cycle instance.

As previously noted in the discussion of FIG. 3A, Program And Program Shadow Memory 16, Data And Data Shadow Memory 14, and Q&C Memory And Q&C Shadow Memory 36 all provide memory for computer 10.

Each computer 10 in actively redundant control computer system 310 uses a plurality of separate physical memories to establish a Primary Memory and an essential Shadow Memory in each control computer 10. Use of these multiple memories also has benefits respective to efficiency and security in the operation of redundant control computer system 310 in so far as 16 bit addresses are smoothly facilitated and domains of Machine Operation Code are inherently segregated respective to the nature of their dynamic alteration in real-time. In the preferred embodiment of control computer 10, circuitry 899, 999, 1099, and 1199 of FIGS. 9A, 9B, 10, 11A, 11B, and 12 provides a substantial part of the functionality of Shadow Memory area 88 of FIG. 2.

Further details on the construction and coordinated operation of these memory components and subsystems are now described. In reviewing details of FIGS. 9A, 9B, 10, 11A, 11B, and 12, unless otherwise noted, a "communication linkage" drawing element is frequently constructed of 16 parallel physical lines with each line conducting a voltage representative of either a 0 (FALSE) datalogical value or a 1 (TRUE) datalogical value as indicated in the context of the discussion and with respect to the legend noted in FIG. 3A.

Figure 9A:
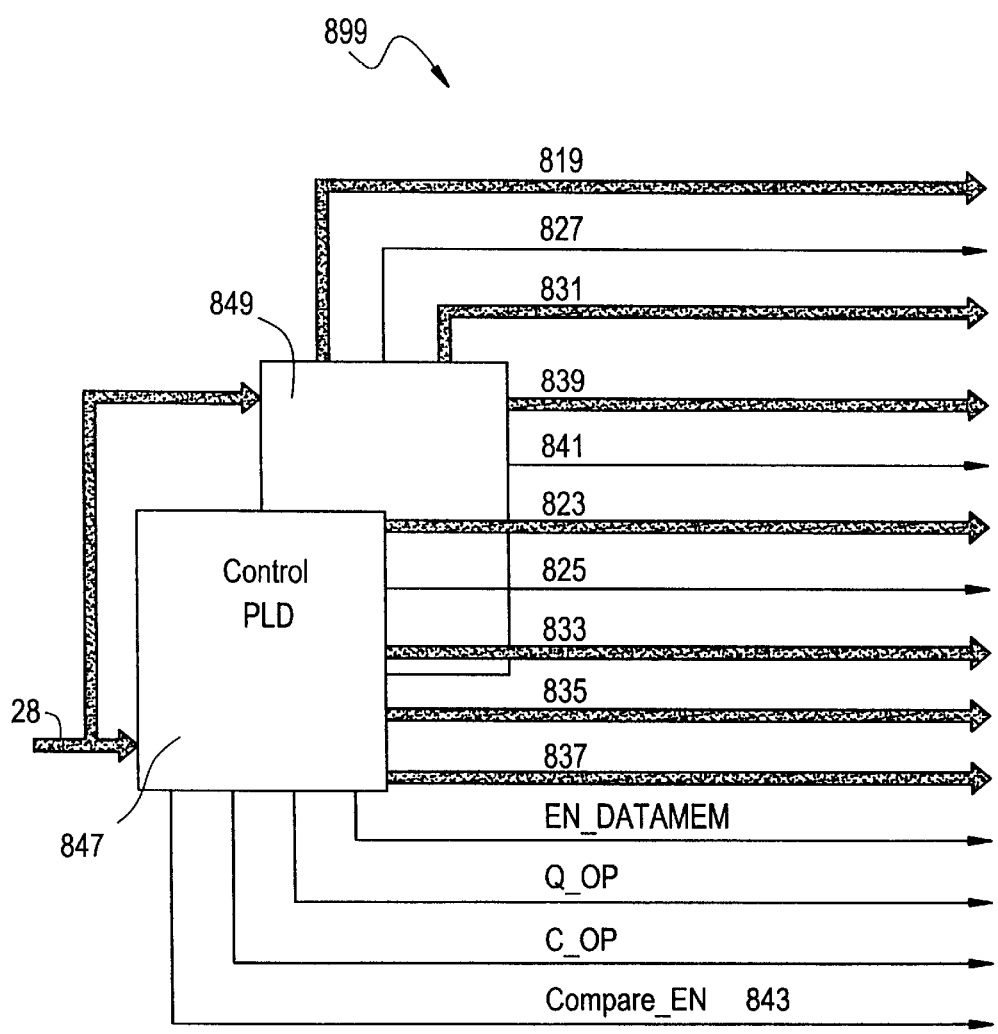
FIGS. 9A and 9B show Program (P) Memory RAM and ROM circuitry and Shadow circuitry in block flow as it is deployed in a control computer.
Figure 9B:
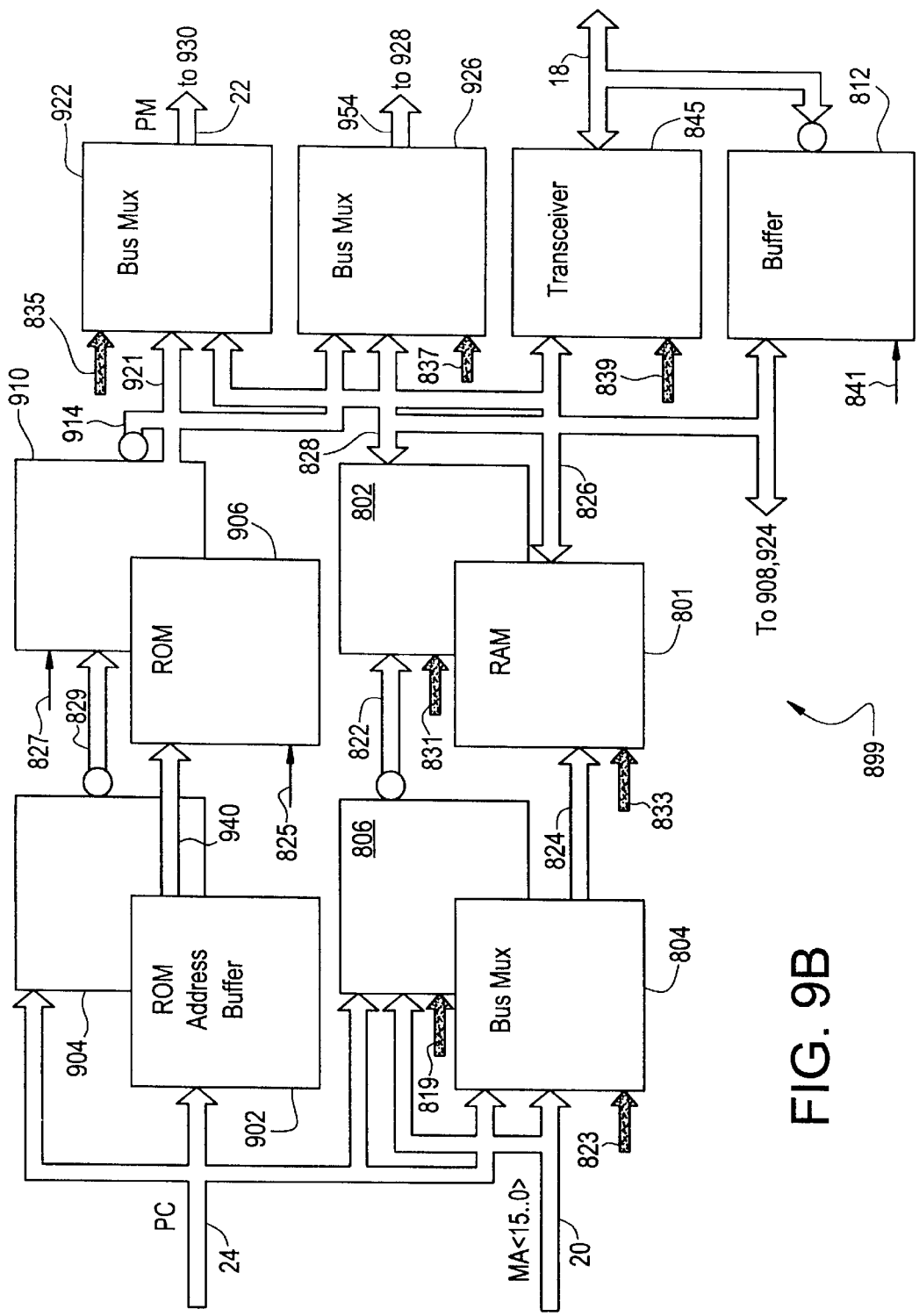
Figure 10:
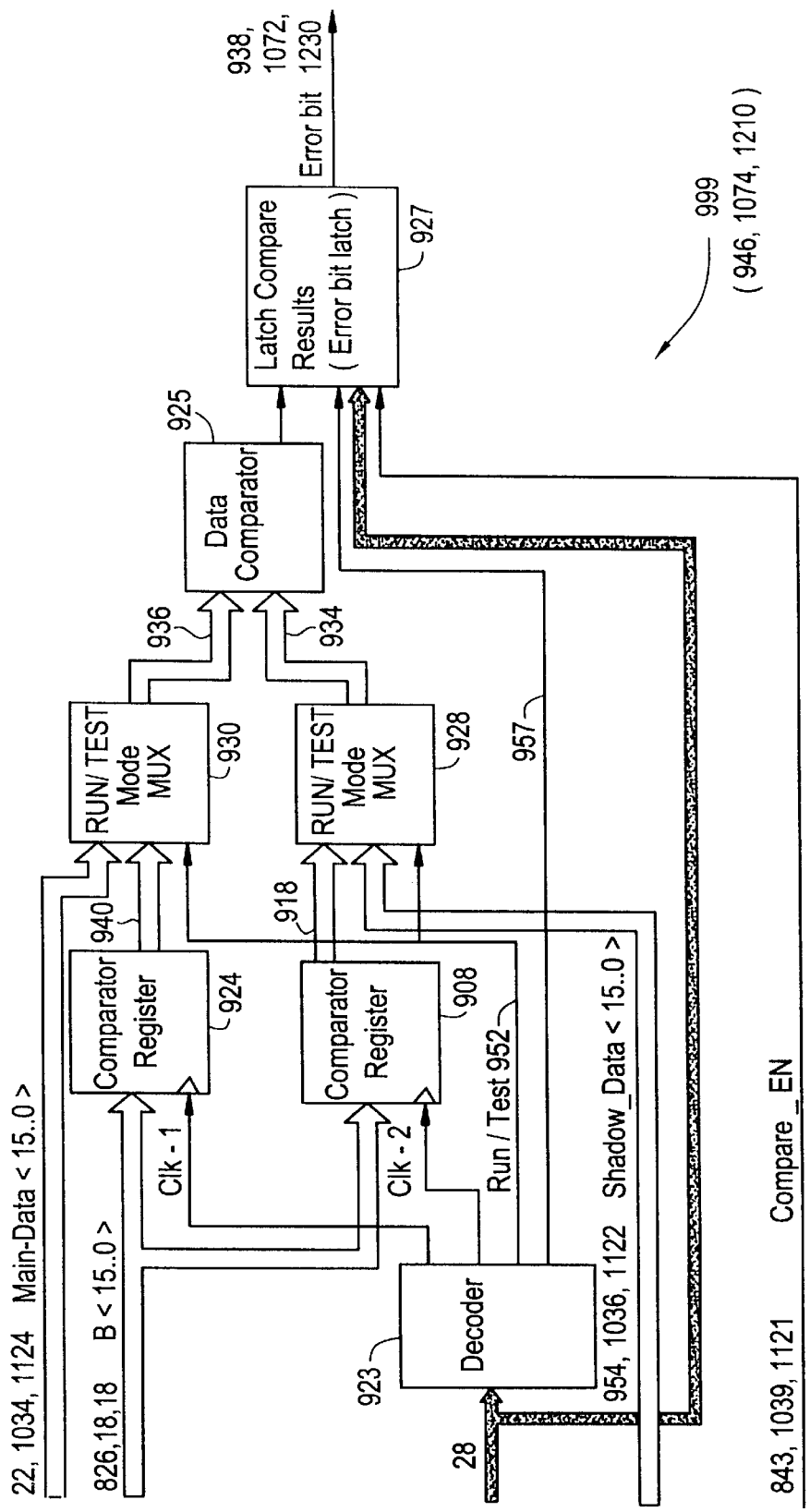
FIG. 10 presents comparator circuitry for memory and Shadow Memory diagnostic use in comparisons of Program (P) Memory RAM and ROM circuitry and Shadow circuitry, Data (D) Memory circuitry and Shadow circuitry, and Q Memory & C Memory (Q&C Memory) circuitry and Shadow circuitry.

FIGS. 9A, 9B, and 10 show detail respective to Program And Program Shadow Memory 16 (FIG. 3A). In FIGS. 9A and 9B (Program Memory RAM and ROM circuitry 899) ROM Address Buffer 902, Shadow ROM Address Buffer 904, Shadow RAM Bus Mux 806, and RAM Bus Mux 804 are connected to PC Bus 24. Proceeding via RAM Bus Mux 804 and Shadow RAM address buffer 806, these two elements are linked via communication linkages 824,822 as inputs to Program RAM 801 and Shadow Program RAM 802, respectively. Note that RAM Shadow Bus Mux 806 inverts its output to communication linkage 822. Program Memory RAM 801 is then connected to Bus Mux 922 and Transceiver 845 via communication linkage 826. A similar connection arrangement is used with Program Memory ROM in the similar interlinking of ROM Address Buffer 902, Shadow ROM Address Buffer 904, Program Memory ROM 906, Program Memory Shadow ROM 910, communication linkages 940 and (inverted) 829. Program Memory ROM 906 is also connected to Bus Mux 922 via a read-only linkage 921; Program Memory Shadow ROM 910 connects to Bus Mux 926 via read-only linkage 914, and Shadow Program RAM 802 connects to Bus Mux 926 and Buffer 812 via linkage 828. Bus Mux 922 links to PM Bus 22 (FIG. 3A); Bus Mux 926 outputs via linkage 954 to comparator circuitry as discussed in FIG. 10, and Transceiver 845 outputs to Data Bus 18 (FIG. 3A) with an inverted connection to Buffer 812. Control PLD 847 and Shadow Control PLD 849 control many of the operations in Program And Program Shadow Memory 16 via control lines as indicated in linkages 819, 827, 825, 823, 833, 835, 837, 831, 839, and 841. Note that a write operation from Data Bus 18 is written to both Program Memory RAM 801 and Shadow Program RAM 802 with the write and the address to Shadow Program RAM 802 being datalogically inverted via Buffer 812.

Turning now to FIG. 10, Comparator Circuitry 999 is presented. Comparator Circuitry 999 is duplicated in three physical instances for computer 10 for (a) Program And Program Shadow Memory 16, (b) for Data And Data Shadow Memory 14, and (c) for Q&C Memory And Q&C Shadow Memory 36. In other words: Program And Program Shadow Memory 16 has a comparator circuit according to comparator 999, Data And Data Shadow Memory 14 has a comparator circuit according to comparator 999, and Q&C Memory And Q&C Shadow Memory 36 has a comparator circuit according to comparator 999. Inputs from each of the three memory systems to their three independent and separate instances of comparator 999 are indicated on Main Data line 22,1034,1124 and on Shadow Data line 954,1036,1122 to show the linkages respective to the physically separate instances (see comparator elements 946, 1074, and 1210 of FIGS. 21A and 21B) of circuitry identical to comparator 999 for each of FIGS. 9A, 9B, 11A, 11B, and 12. Comparator register 908 and comparator register 924 both receive a test pattern via Data Bus 18 (FIG. 3A) used in confirming the reliability of comparator 925, Run/Test multiplexing circuit 928, and test multiplexing circuit 930 upon activation of Run/Test line 952 from Decoder 923. Comparator register 908 interfaces by use of communication linkage 918 with test multiplexing circuit 928 and Comparator register 924 interfaces by use of communication linkage 940 with test multiplexing circuit 930. Test multiplexing circuit 930 outputs to comparator 925 via communication linkage 936 and test multiplexing circuit 928 outputs to comparator 925 via communication linkage 934. Comparator and error bit latch 927 then outputs a signal on the compare error line respective to the specific comparator (any of physically different lines 938, 1072, and 1230 of FIG. 3A) to Watchdog 603 which halts the real-time execution of control computer 10 in the event of a mismatch of data between either (a) a read from Program And Program Shadow Memory 16, (b) a read from Data And Data Shadow Memory 14, or (c) a read from Q&C Memory And Q&C Shadow Memory 36. The circuitry in a preferred embodiment is enabled via programmable logic device inputs from COMPAR_EN lines 843,1039, 1121.

In this regard, several requirements in the certification process for a safety shutdown system under SIL3 require the detection of stuck buffered outputs, decoder failure, selection of unintended multiplexing circuits, and similar failures that cause memory access errors. CPU 12 can not perform these tasks alone; however, Shadow Memory functionality and affiliated determinism are achieved for Program And Program Shadow Memory 16 by use of CPU 12 and the circuitry of FIGS. 9A, 9B, and 10 to (a) assure a system appropriately predictable in its operation, (b) provide hardware to detect Program Memory RAM and ROM read failures, (c) provide a way of testing error checking hardware, (d) send an error signal 938 to Watchdog 603 to indicate that an error has occurred, (e) allow a command from CPU 12 to clear the latched error flag in the circuit upon restart after a halt of CPU 12, and (f) latch an LED indicator "ON" when a memory access error occurs. Equivalent functionality is achieved for Data And Data Shadow Memory 14 and for Q&C Memory And Q&C Shadow Memory 36 as shown by combining (a) FIG. 10 circuitry with FIGS. 11A and 11B circuitry and (b) FIG. 10 circuitry with FIG. 12 circuitry, respectively.

Use of Program And Program Shadow Memory 16 in enabling a SIL certified system is also achieved in conjunction with logic (Machine Operation Code) executing in control computer 10. Some of the techniques enabled in this regard are discussed in the following paragraphs.

An Address line stuck condition is detected in the following manner. Program Memory ROM 906 has an inverted duplicate copy in Shadow Program Memory ROM 910. When an Address line Stuck condition occurs, output from Program Memory ROM 906 does not compare with Shadow Program Memory ROM 910 because the data is read from different address locations where the data instances respective to the same input address are likely different shortly after the stuck line condition occurs.

In setting an error signal if a ROM read error occurs, address lines from control computer 10 back-plane are buffered, inverted, and connected to Shadow Program Memory ROM 910 (Shadow Program Memory ROM 910 is programmed with its data inverted), Shadow Program Memory ROM 910 output is sent to the comparator logic, the Primary ROM buffer output is sent to the comparator, PLD 847 asserts compare-enable 843, and error signal 938 is asserted if a compare error is detected.

In setting an error signal if the wrong address bus is selected, a Wrong Address Bus Select condition in selecting either PC Bus 24 or Data Memory Address Bus 20 is examined-for. Program Memory circuit 899 contains a duplicate copy (Shadow Program Memory RAM 802) of Program Memory RAM 801. When a Wrong Address Bus Select condition occurs, output from Program Memory RAM 801 usually does not compare with Program Memory Shadow RAM 902 output.

In detecting PLD 847 decoding failures, effective differences in instructions from Control PLD 847 and Shadow Control PLD 849 usually result in assertion of error signal 938.

Errors in Data Multiplexed via Bus Mux 922 or Bus Mux 926 are detected when an output from Program Memory 906,801 does not compare with the output from Shadow Program Memory 910,802.

In a manner which should be apparent from the foregoing, failures on Program Memory circuitry 899 that can cause RAM write errors to Program Memory RAM are sensed via use of comparator 946 when a read is attempted to the addressed "location" which was written-to.

To achieve Compare Error Signal reporting, the Compare Error Signal 938 is connected to Watchdog 603 and "Compare/Config." Buffer 1049 via use of a control computer backplane board.

Control computer 10 performs the following initialization procedures on startup and after software testing: (a) set all registers, multiplexers, and buffers to Run-Mode and (b) clear the bit respective to Program And Program Shadow Memory 16 error signal.

The safety certification process indicates that test circuitry needs to be checked to determine if it is working properly. The testing needs to be accomplished while Program And Program Shadow Memory 16 is being used in the system. Therefore, Program And Program Shadow Memory 16 is designed to allow control computer 10 to check comparators that are used to check the program memories and the respective Shadow memories. In one embodiment, software (executing logic and/or executing Machine Operation Code) in control computer 10 tests the comparators in the first initiation of the control computer into either Task D or Task B. In another embodiment, the software tests the comparators both in the first initiation of the control computer into either Task D or Task B and also tests the comparators on a preset schedule less than or equal to 24 hours. The registered values are defined by the logic (executing Machine Operation Code) of control computer 10 and input to the registers of the comparator for testing in conjunction with assertion of Run/Test signal 952 and test mode signal 957. Control computer 10 sets compare error conditions in its registers to determine if comparator 946 is working properly. Control computer 10 also sets Watchdog 603 with indicators that Program And Program Shadow Memory 16 is in test mode so that willful errors generated in testing do not halt CPU 12.

Figure 11A:
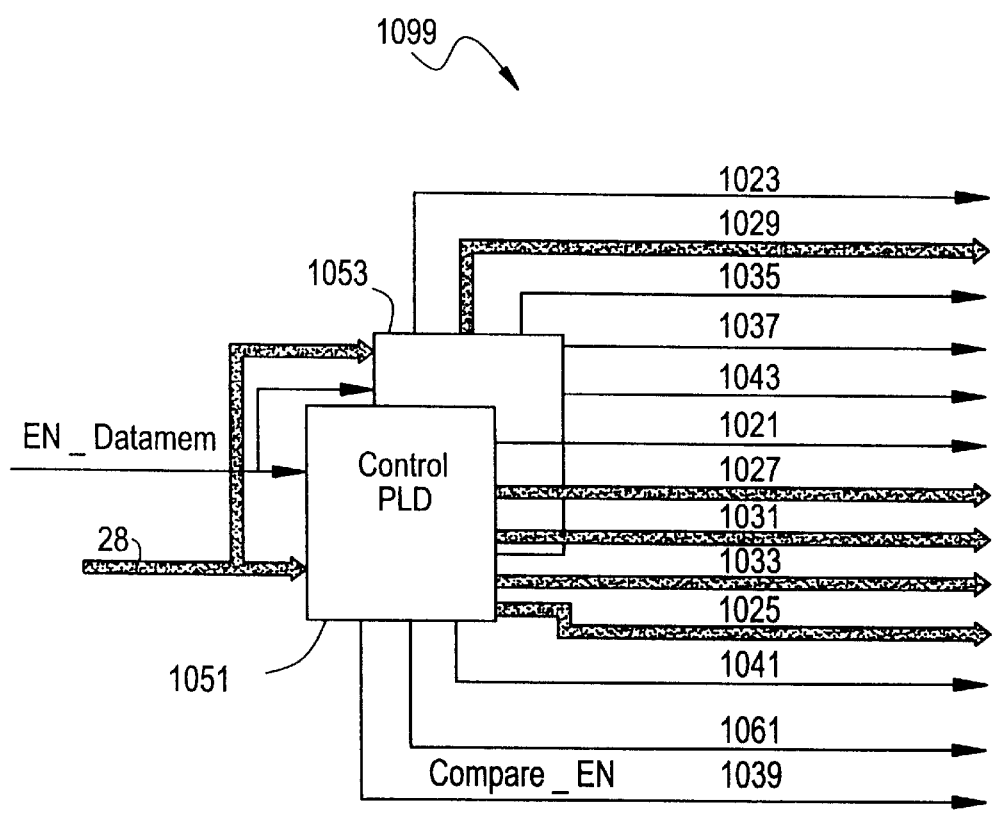
FIGS. 11A and 11B show Data (D) Memory circuitry and Shadow circuitry in block flow as it is deployed in a control computer.
Figure 11B:
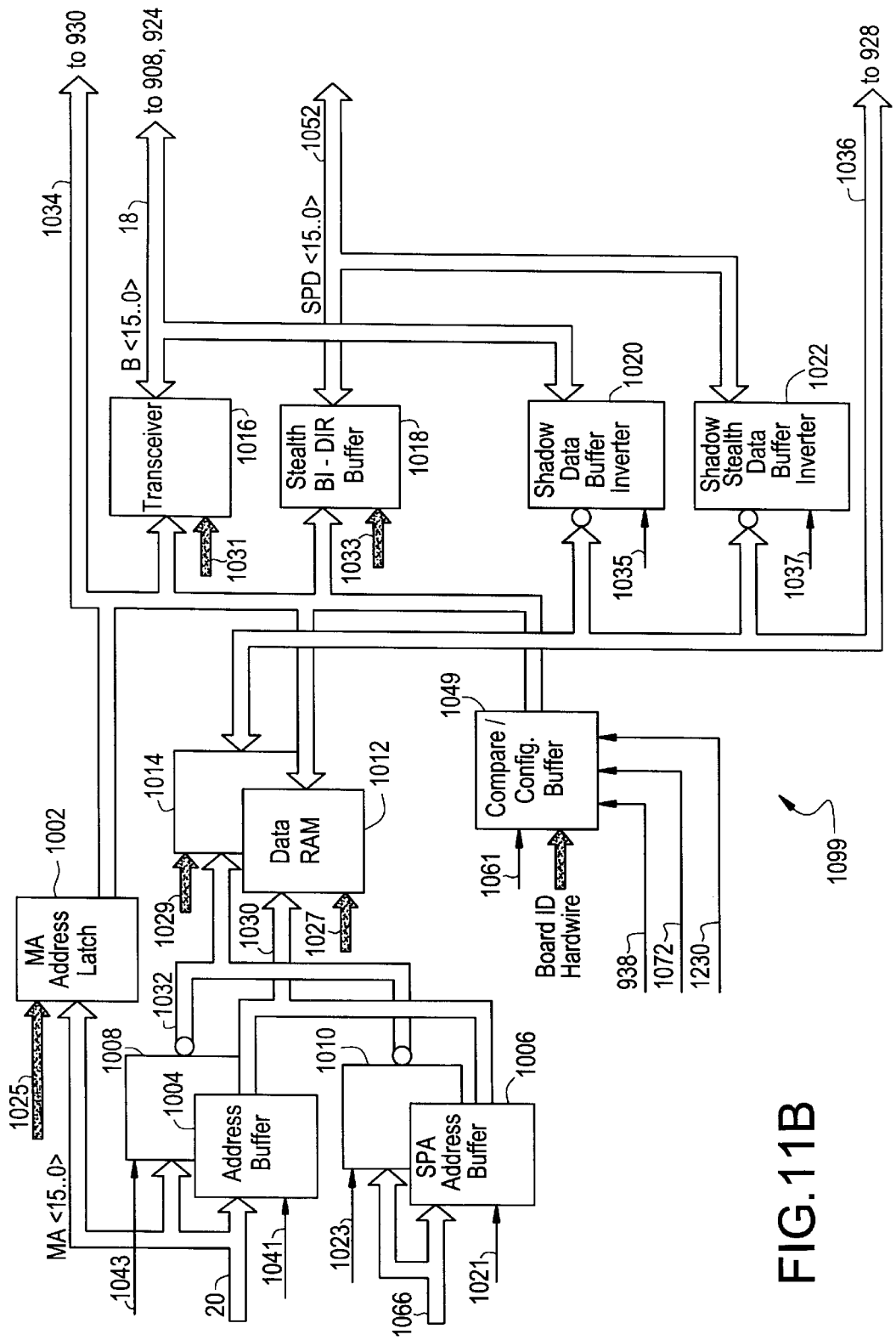

Turning now to FIGS. 11A and 11B and with reference to FIG. 10, Data And Data Shadow Memory 14 is depicted. While many of the details of operation of Buffers 1004, 1008,1006,1010, Data RAM 1012, Data Shadow RAM 1014, Shadow Data Buffer Inverter 1020, and Transceiver 1016 in Data And Data Shadow Memory 14 should be apparent after a study of the material respective to FIGS. 9A, 9B, and 10, Data And Data Shadow Memory 14 also shows MA address latch 1002 for latching the address to Data And Data Shadow Memory 14 so that diagnostics are implemented upon each write operation to Data And Data Shadow Memory 14 with the output being sent to CPU 12 via Data Bus 18 (FIG. 3A).

Figure 21A:
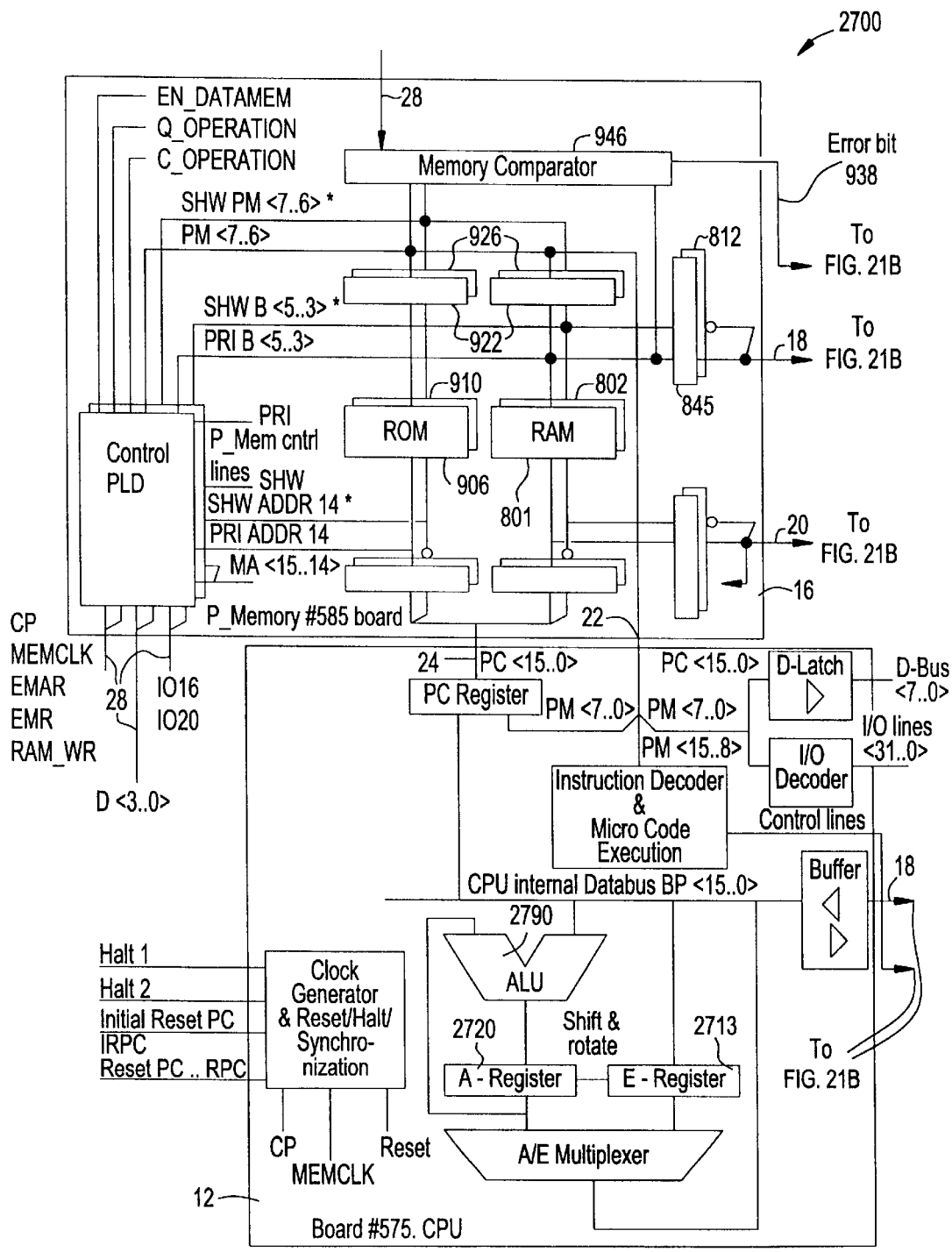
FIGS. 21A and 21B present a block flow diagram of a control computer showing components of importance in the execution of the diagnostic methods respective to a certified system.
Figure 21B:
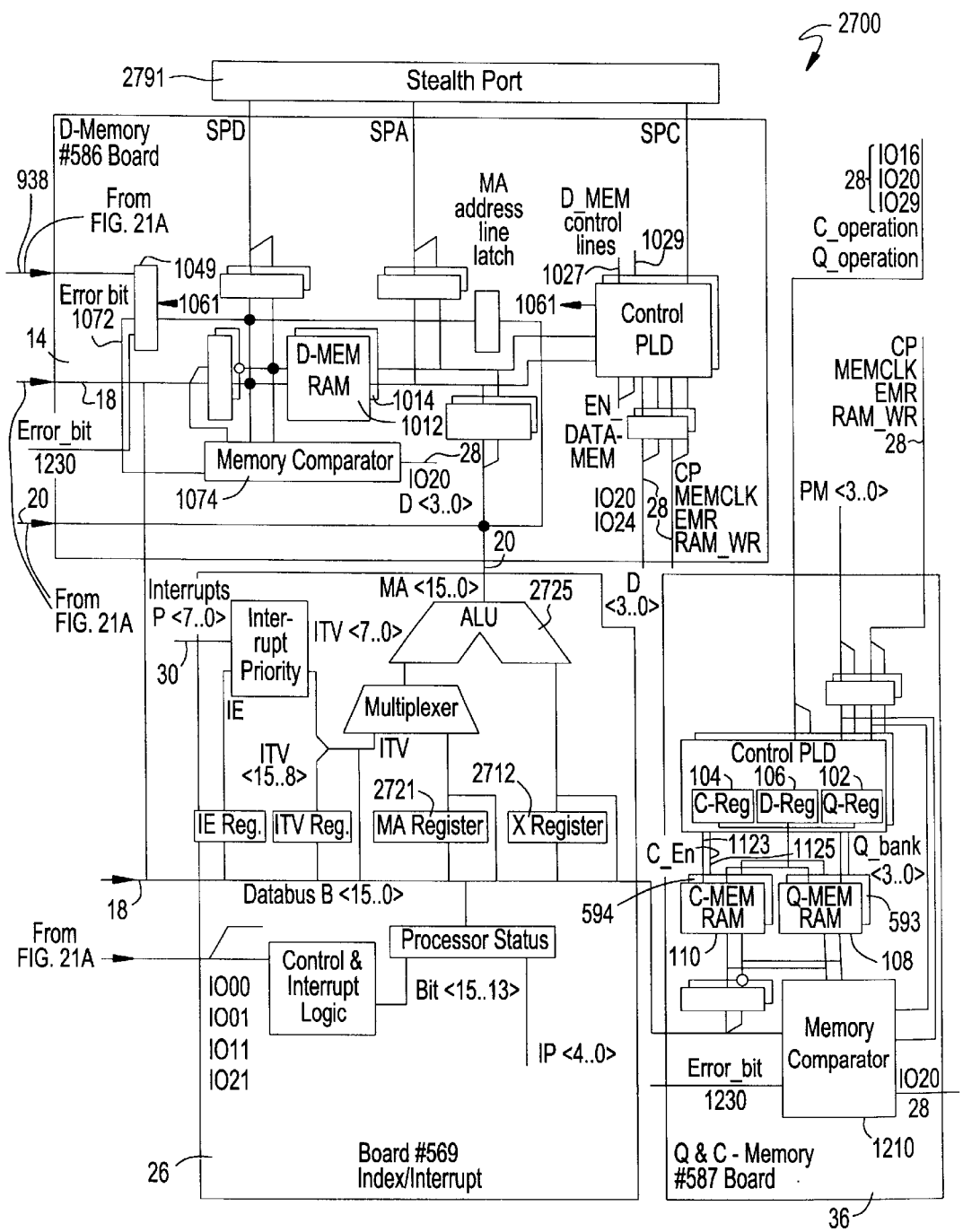
Figures 1, 34A:
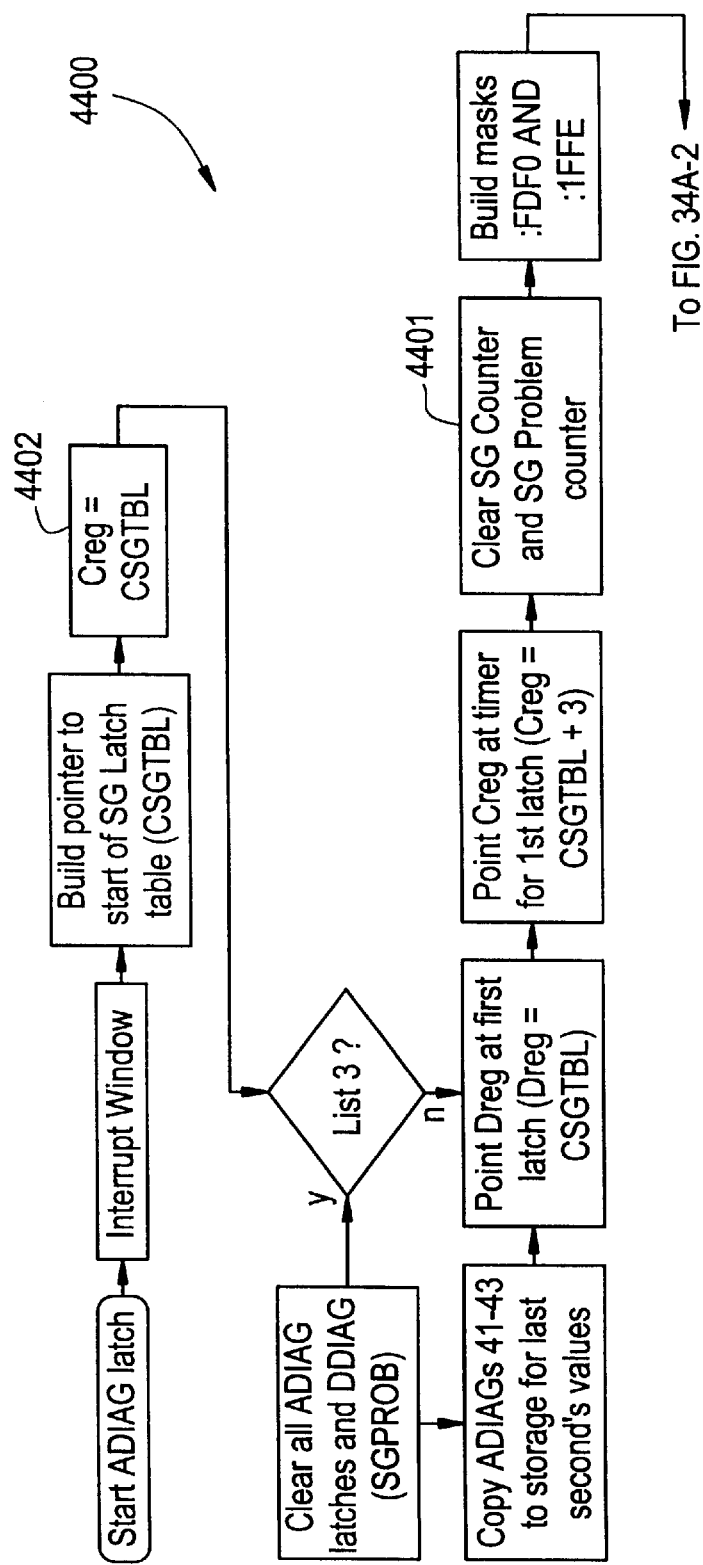
Figures 2, 34A:
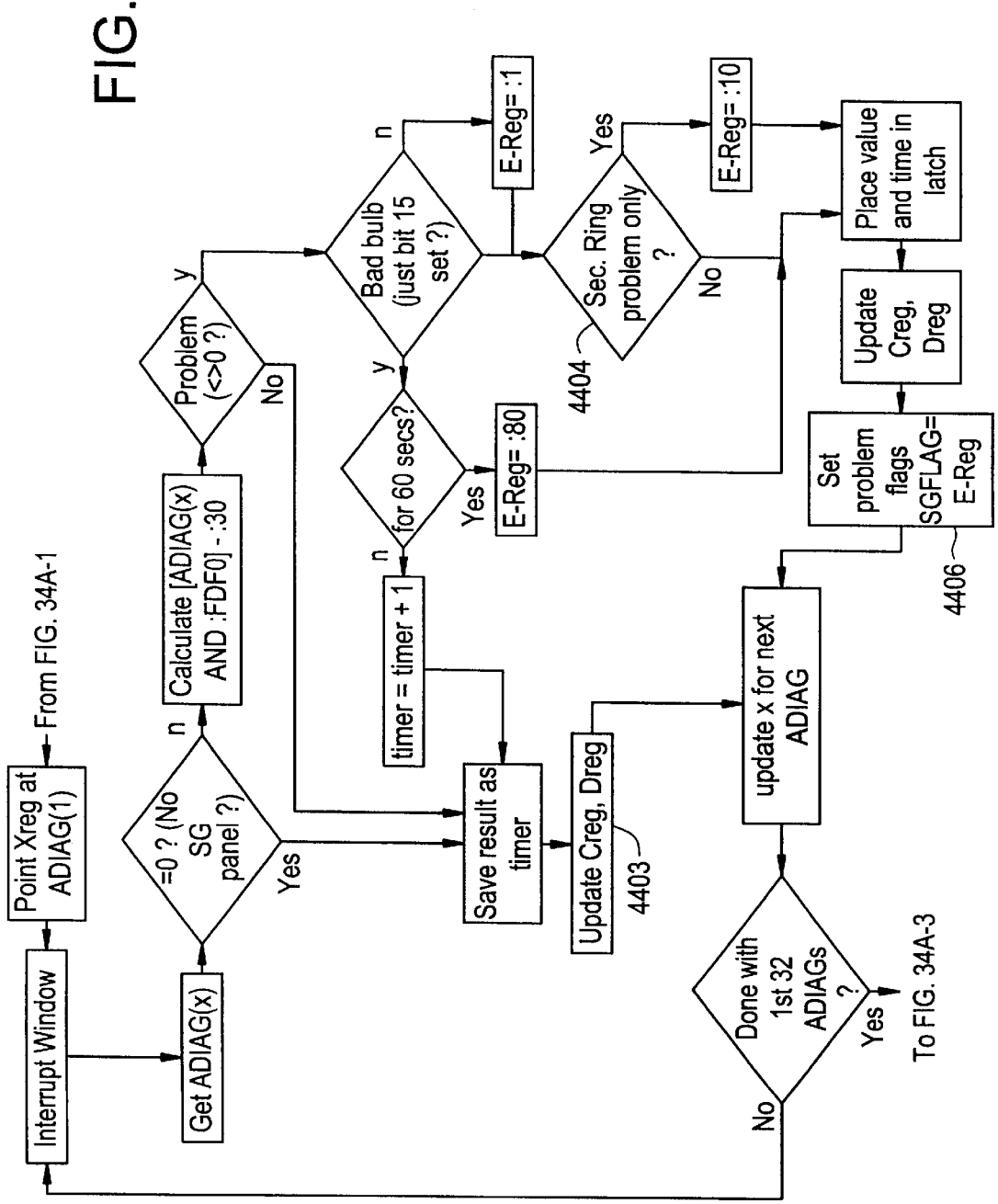
Figures 3, 34A:
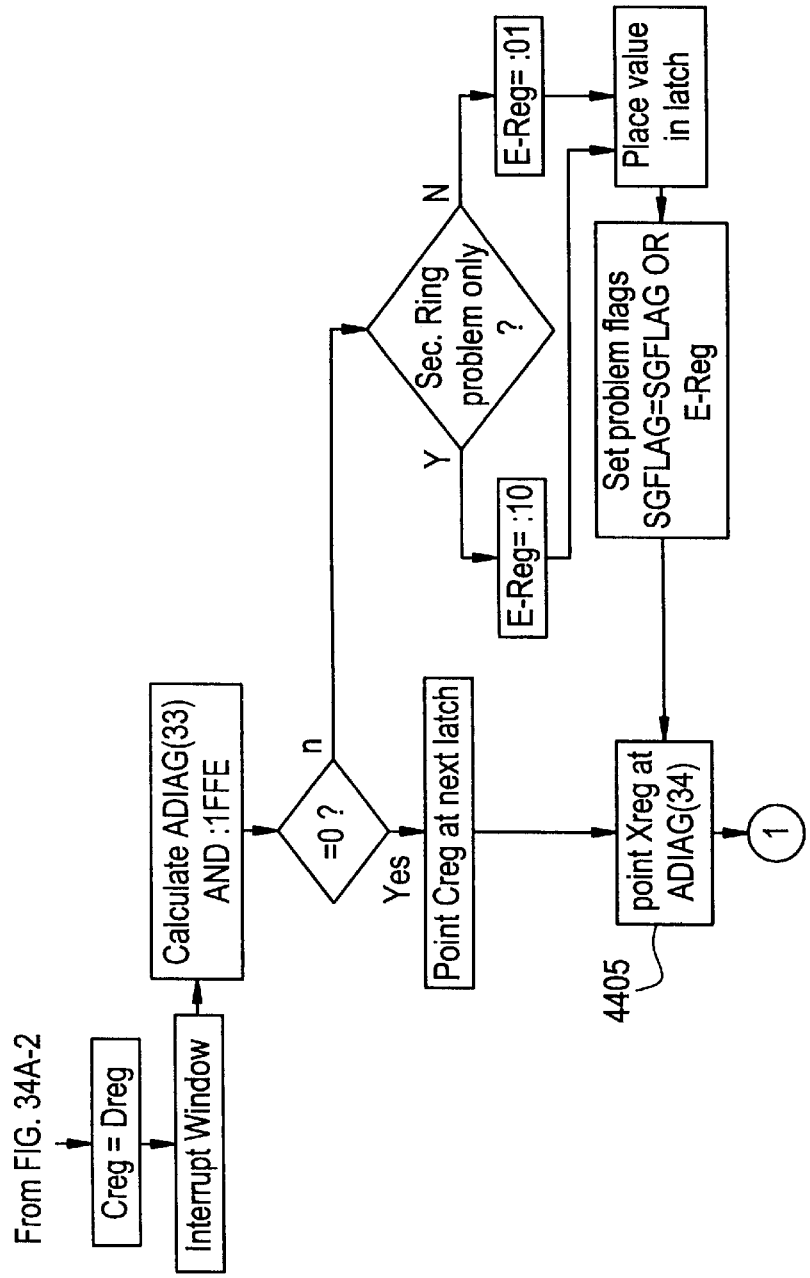
Figure 34B:
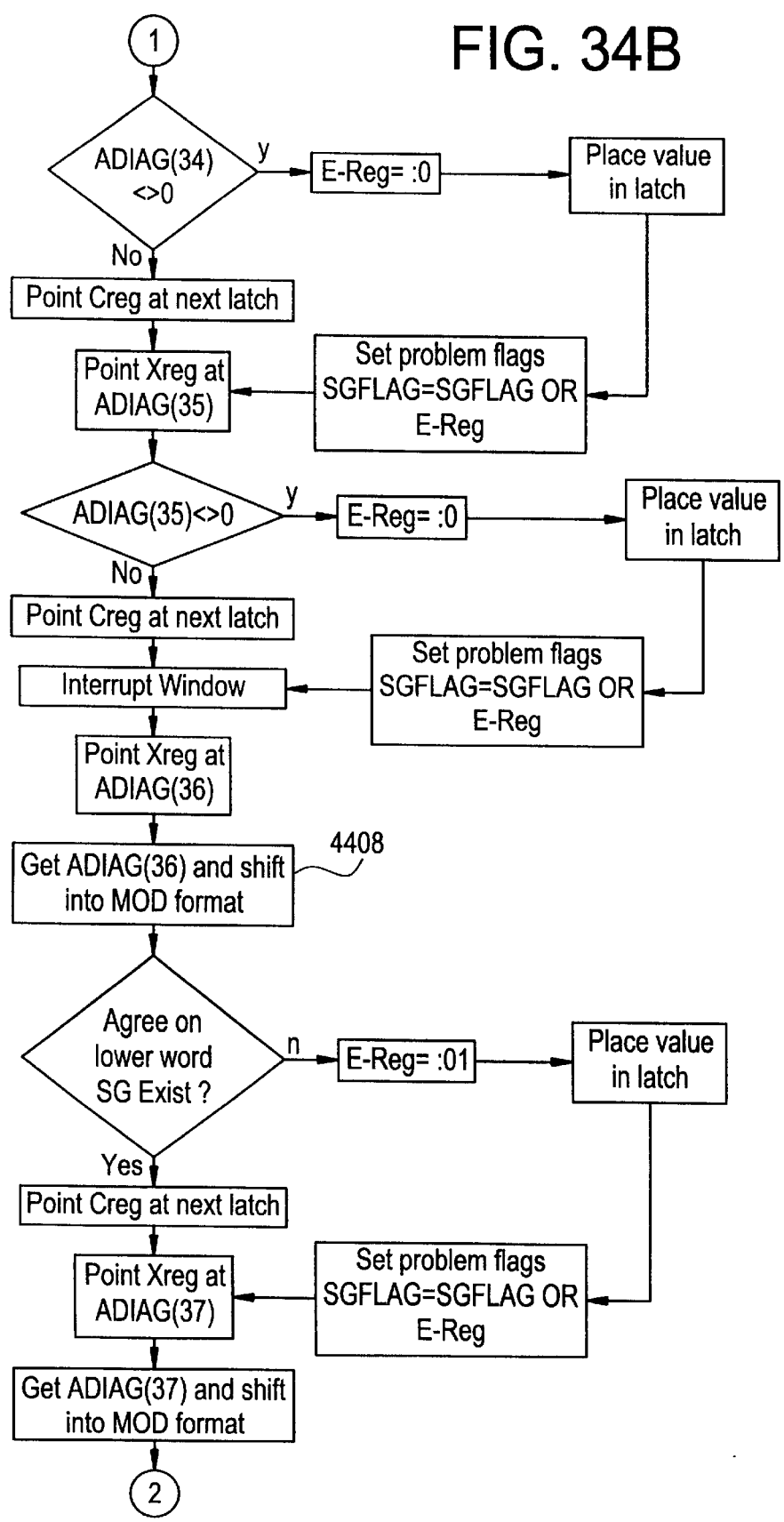
Figure 34C:
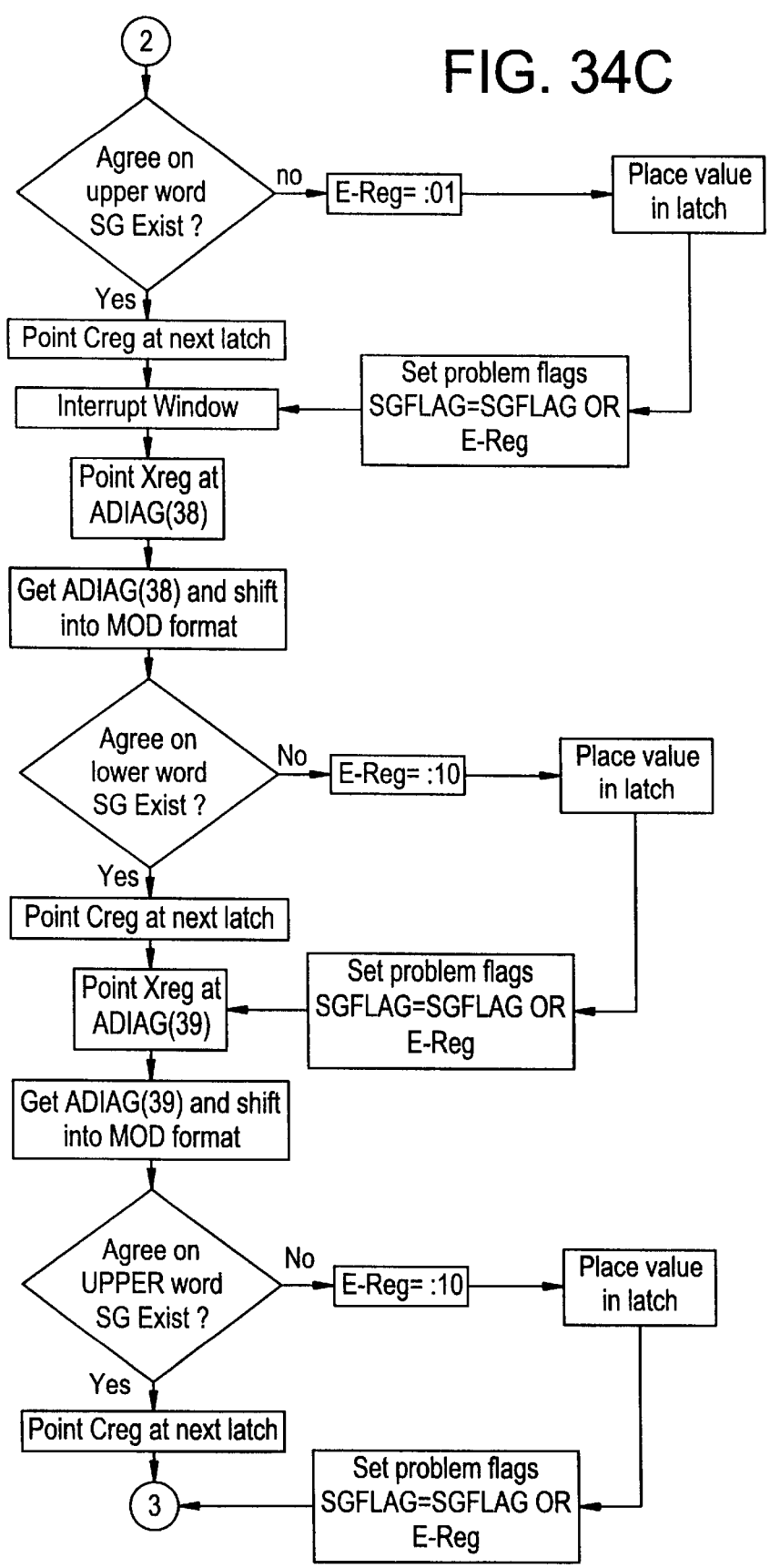
Figure 34D:
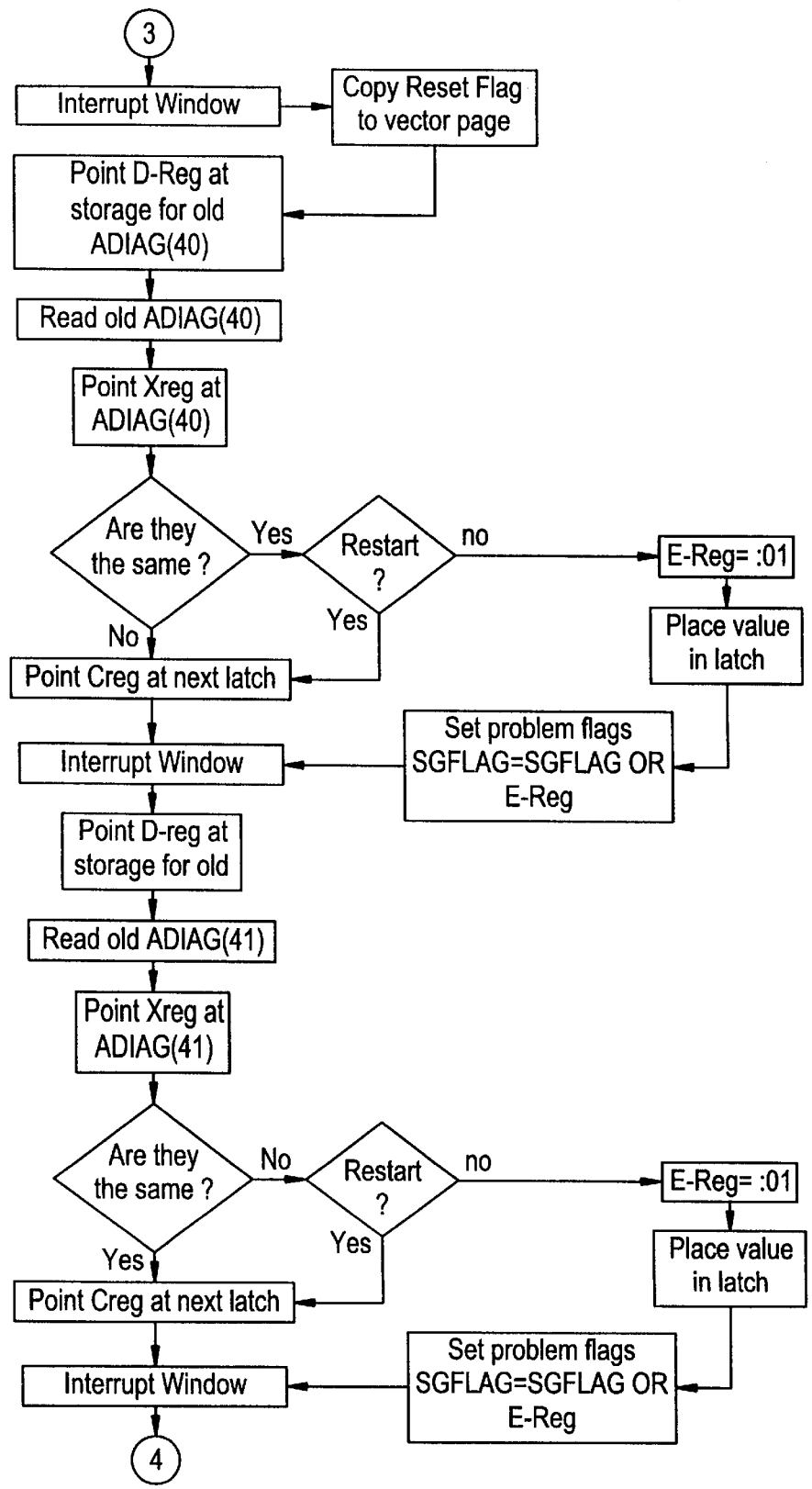
Figure 34E:
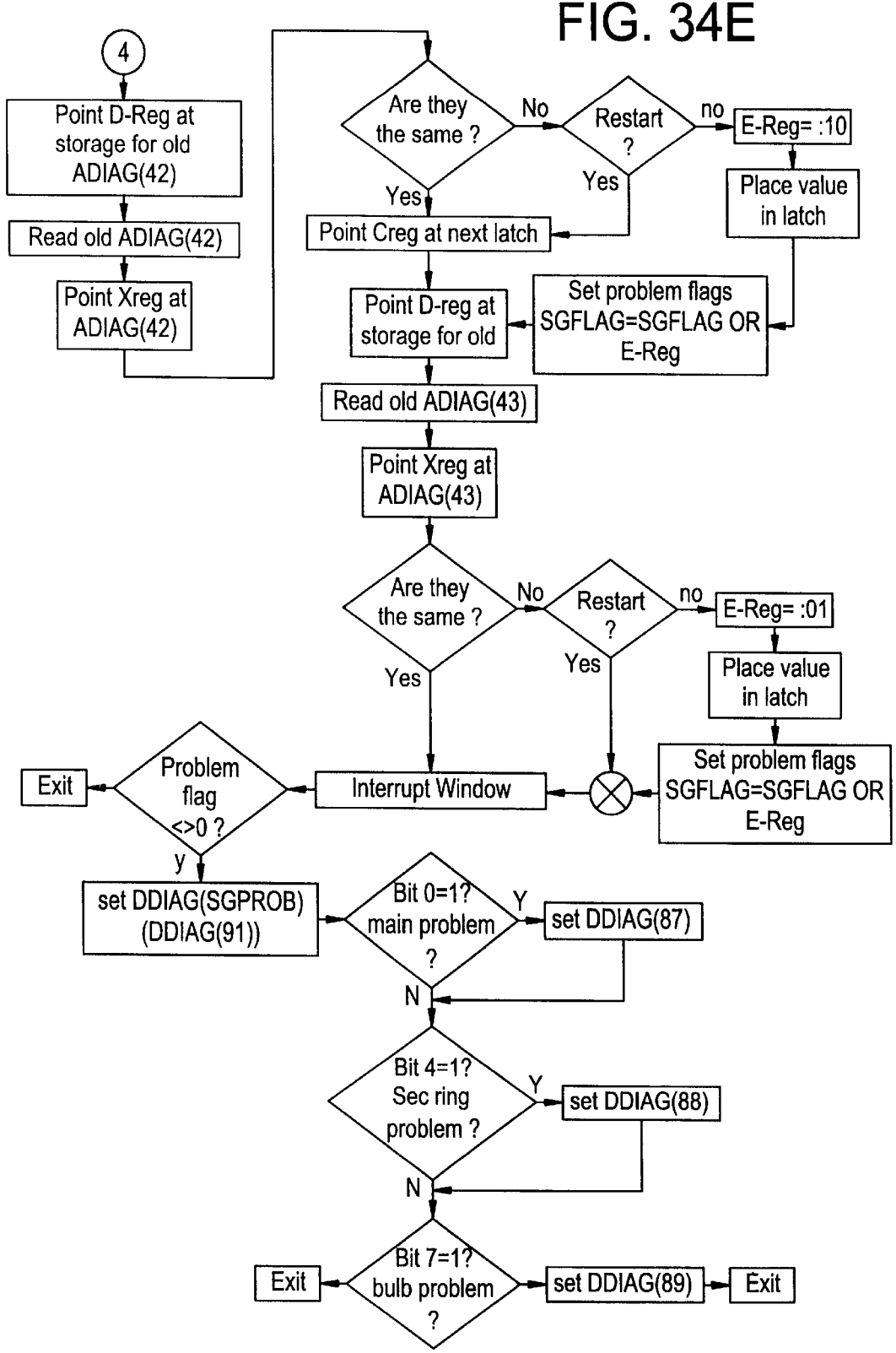

A second difference from FIGS. 9A and 9B is indicated in use of Stealth BI-DIR Buffer 1018 and Shadow Stealth Buffer Inverter 1022 which interface via linkage 1052 with stealth interface 2791 (FIGS. 21A and 21B). As was mentioned in the background discussion, an embodiment of a system for achieving data access for the control computer described in 24Sederlund et al. is described in U.S. Pat. No. 5,568,615 (15Sederlund et al.) issued on Oct. 22, 1996 and entitled "Stealth Interface For Control computers". The patent describes stealth interface 2791 for an intelligent front-end communication system which couples a plurality of actively redundant control computers to a computer network. Stealth interface 2791 in each of the actively redundant control computers includes a multi-ported memory for storing dynamic data associated with the physical process and for transferring this data to a front end computer in communication with the computer network. The multi-ported memory also includes a mailbox section for storing messages sent between the front end computer and its actively redundant control computer. Stealth interface 2791 also includes a guardian circuit which ultimately controls the ability of the front end computer to write information to specific memory locations in the multi-ported Data Memory. In the preferred embodiment, Data And Data Shadow Memory 14 has linkages and interfaces with the Stealth Port circuitry as discussed in that patent (see especially FIG. 3 of U.S. Pat. No. 5,568,615 for a convenient overview); however, as should be apparent, Data And Data Shadow Memory 14 could also be disposed on systems not having such interfacing functionality. The relationship to the stealth board circuitry is evidenced by use of the stealth control lines 1033,1037, Stealth BI-DIR Buffer 1018, and Shadow Stealth Buffer Inverter 1022. A further reference to the stealth interface 2791 (Stealthport) and its linkage is shown in FIGS. 21A and 21B.

A third difference is provided in "Compare/Config." Buffer 1049 which holds a bit respective to any of error signals 938,1230,1072 upon their assertion for diagnostics; "Compare Config." Buffer 1049 also holds a signature code respective to the design instance of Data And Data Shadow Memory 14 for prompting system configuration diagnostics.

Note that control lines 1021, 1023, 1029, 1035, 1037, 1043, 1027, 1031, 1033, 1025, 1041, 1061, and 1039 manage operations in circuitry 1099 for Data And Data Shadow Memory 14 as implemented from Control PLD 1051 and Shadow Control PLD 1053.

Several requirements in the certification process for a safety shutdown system under SIL3 require the detection of stuck buffered outputs, decoder failure, selection of unintended multiplexing circuits and other like failures that cause the memory access errors. CPU 12 can not perform these tasks alone; however, with the benefit of Data And Data Shadow Memory 14, CPU 12 and logic of control computer 10 is used to achieve shadow memory functionality and affiliated determinism to assure a system appropriately predictable in its operation. Safety certification requires that any Data And Data Shadow Memory 14 memory access error is detected. Such an error is generated due to failure in memory components, buffers, or PLD decoding. If an error occurs, the onboard error detection alerts Watchdog 603 to take appropriate action via error line 1072. The error detection is to insure that each control computer 10 memory read is correct and that wrong data is not sent to the control computer 10 data buss.

In implementing error detection, hardware is provided in Data And Data Shadow Memory 14 to detect read errors; a way of testing the error checking hardware is also provided; error signal 1072 is sent to Watchdog 603 to indicate that an error has occurred in Data Memory circuitry 1099 (and Watchdog 603 takes appropriate action as further discussed in this specification); Control computer 10 clears the latched error flag on Data Memory circuitry 1099 at startup; and an LED indicator is latched "ON" when the error signal is asserted (as is also the case in Program And Program Shadow Memory 16).

In a manner which should be apparent from a study of FIGS. 9A, 9B, and 10, the detection of (a) Data Memory failure, (b) buffer Control Line failure (c) mismatches in data read from Shadow Data Memory 1014 and Data RAM 1012, (d) Address Bus 1032,1030 line errors or (e) memory read address location errors assert error signal 1072.

Startup and testing of comparator 1074 in real-time also proceeds in an essentially identical fashion to the method discussed for comparator 946 in Program Memory and Shadow Program Memory 16.

Figure 12:
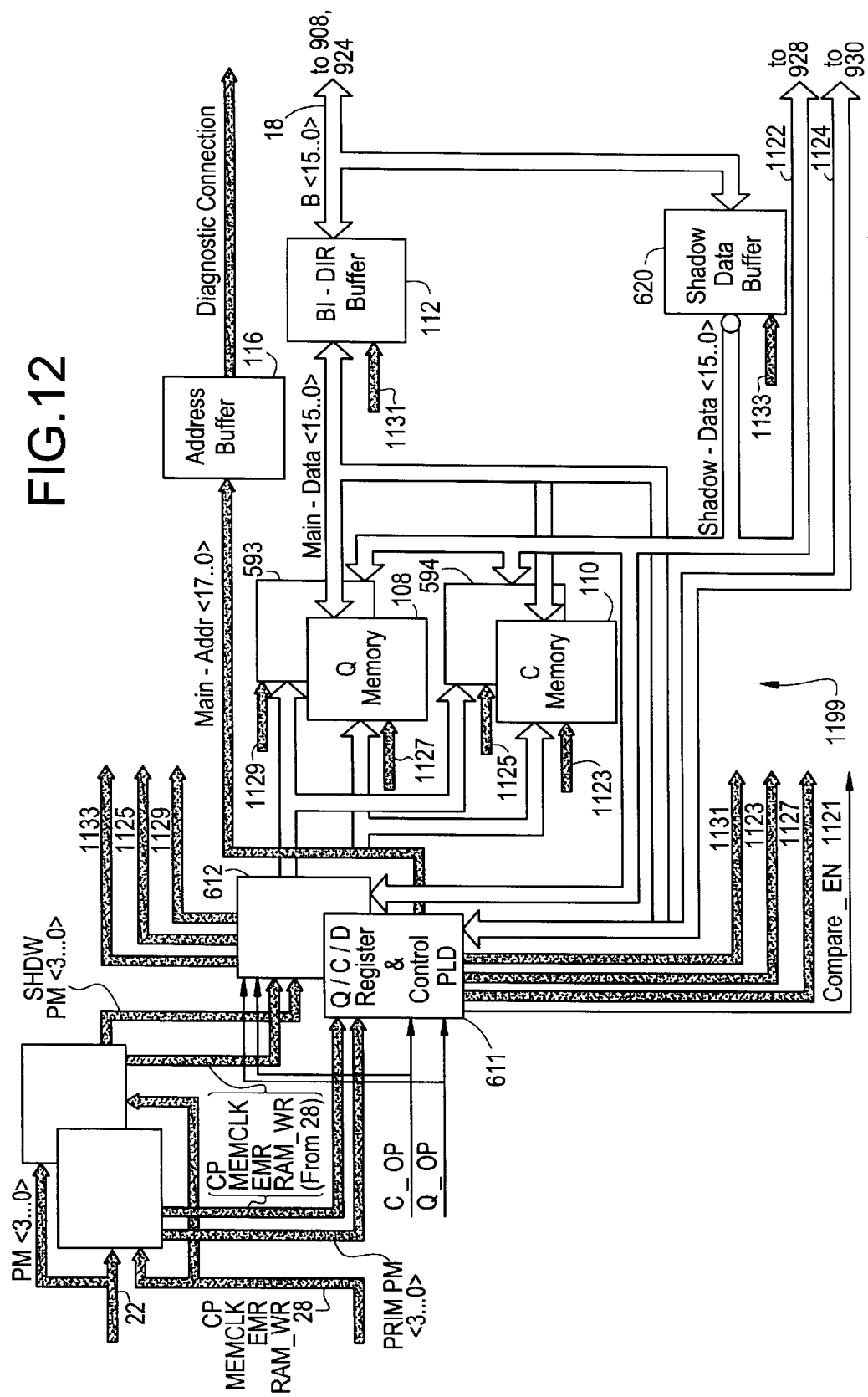
FIG. 12 shows Q Memory & C Memory (Q&C memory) circuitry and Shadow circuitry in block flow as it is deployed in a control computer.

Turning now to FIG. 12 and with reference to FIG. 10, Q&C Memory And Q&C Shadow Memory 36 is depicted in Q & C Memory circuitry 1199. While many of the details of Q&C Memory And Q&C Shadow Memory 36 should be apparent after a study of the material respective to FIGS. 9A, 9B, and 10, circuitry 1199 also shows address buffer 116 for interfacing the Q & C Memory address so that diagnostics are facilitated in maintenance operations. Q/C memory circuitry 1199 accesses and shadows C memory 110 and Q Memory 108 in control computer 10. Q/C memory register & programmable logic device 611 and Q/C memory Shadow register & programmable logic device 612 output control signals to other functional components in these Figures.

Control and addressing signals are selectively transmitted to three distinct registers inside of Q/C/D Register & PLD 611 and Q/C/D Shadow Register & PLD 612 including the Q-operation (Q_OP) signal from Program And Program Shadow Memory 16. Control lines 1129, 1127, 1125, 1121, 1131, 1133, and 1123 function to manage the interface of data from CPU 12 and memories 108, 110, 593, and 594.

Q Memory 108 stores an ordered sequence of memory addresses which ultimately defines the particular program implemented by Computer 10. In sharp contrast to typical programs that have been compiled and linked, the Application Program for Computer 10 is uniquely divided between Program And Program Shadow Memory 16 and Q&C Memory And Q&C Shadow Memory 36. In this regard, Program And Program Shadow Memory 16 is used to store the instructions, or opcodes, for a finite common set of subroutines used in a variety of Application Programs. Thus, for example, Program And Program Shadow Memory 16 may contain a number of different arithmetic and logical subroutines, such as for adding two numbers together, and IF . . . THEN expressions.

In comparison, Q Memory 108 stores address information associated with these subroutines. More specifically, Q Memory 108 stores the addresses of these subroutines, such as the address of the first instruction of a subroutine, in an ordered sequence to define the control computer Application Program. Preferably, Q Memory 108 also stores the addresses of any arguments required by these subroutines. These arguments, or operands, are in Data And Data Shadow Memory 14 or in C Memory 110 and C Shadow Memory 594. With this division of responsibility for storing the Application Program, it should be understood that the routines used by the program need only be stored once, even though they are used repeatedly throughout the program. Thus, a minimal amount of storage capacity is required for the Application Program in Computer 10. The use of Q Memory 108 also has other advantages as well. For example, execution speed is enhanced, because normal subroutine overhead is avoided, (for example, pushing one or more addresses on a stack).

C Memory 110 is controlled and accessed by the C register and, alternatively, the D register in Q/C/D Register & PLD 611; and Shadow C Memory 594 is controlled and accessed by the C register and, alternatively, the D register in Q/C/D Shadow Register & PLD 612. C Memory 110 stores data values, and, in this respect, C Memory 110 and C Shadow Memory 594 extend the storage capacity that would otherwise be provided by Data And Data Shadow Memory 14. However, the C register is designed to enable C Memory 110 to be accessed in increments varied automatically by program instructions, as is the case with Shadow C Memory 594 and the Shadow C register. C Memory 110 and C Shadow Memory 594 are accessed in address increments of one, two or four, depending upon the instruction employed.

Note that the D register in Q/C/D Register block 611 and the Shadow D Register in Q/C/D Shadow Register Block 612 are not to be confused with registers respective to Data And Data Shadow Memory 14. D register in Q/C/D Register block 611 and the Shadow D Register in Q/C/D Shadow Register Block 612 are used in order to access two different data tables in C memory without having to transfer address pointers into and out of memory. In other words, the counter contained in the C register points to the address of one data table in C memory (where an address increment greater than one would be useful), while the counter contained in the D register points to the address of another data table in C memory circuit (where an address increment of one is appropriate).

It should also be noted from FIG. 12 that Q Memory 108 and C Memory 110 are connected to Data Bus 18 via Buffer 112. Shadow Q Memory 593 and Shadow C Memory 594 are connected to Data Bus 18 via buffer 620. Accordingly, it should be appreciated that the writing and reading operations for Q Memory 108 and C Memory 110 are effectively multiplexed through Q-operation and C-operation control signals. Address Buffer 116 is also provided to present the current address of the Q, C, or D Register to a logic analyzer debugging device connector. The current address of the Q, C, or D Register may also be read by CPU 12 through buffer 112. In light of the fact that the ordered sequence of addresses in Q Memory 108 define the steps to be implemented by Computer 10, the current address of the Q, C, or D Registers provides another way to determine the current state of the programmed operations.

Control computer 10 Safety Certification requires the Q/C memory circuitry 1199 to detect all memory errors. These errors are generated on failure of memory components, buffers, and/or decoders. If an error occurs, the onboard error detection alerts Watchdog 603 via error signal 1230 to take appropriate action.

In a manner which should be apparent from a study of the discussion respective to FIGS. 9A, 9B, and 10, the detection of (a) read errors, (b) hardware errors, (c) hardware failures, (do memory address line errors, and (e) decoder errors assert error signal 1230. Startup and testing of comparator 1210 in real-time also proceeds in an essentially identical fashion to the method discussed for comparator 946 in Program Memory and Shadow Program memory 16.

The reader should note that line legend conventions used in FIGS. 3A–12 are not followed in FIGS. 13A, 13B, 21A, and 21B because of spacing considerations.

Figure 13A:
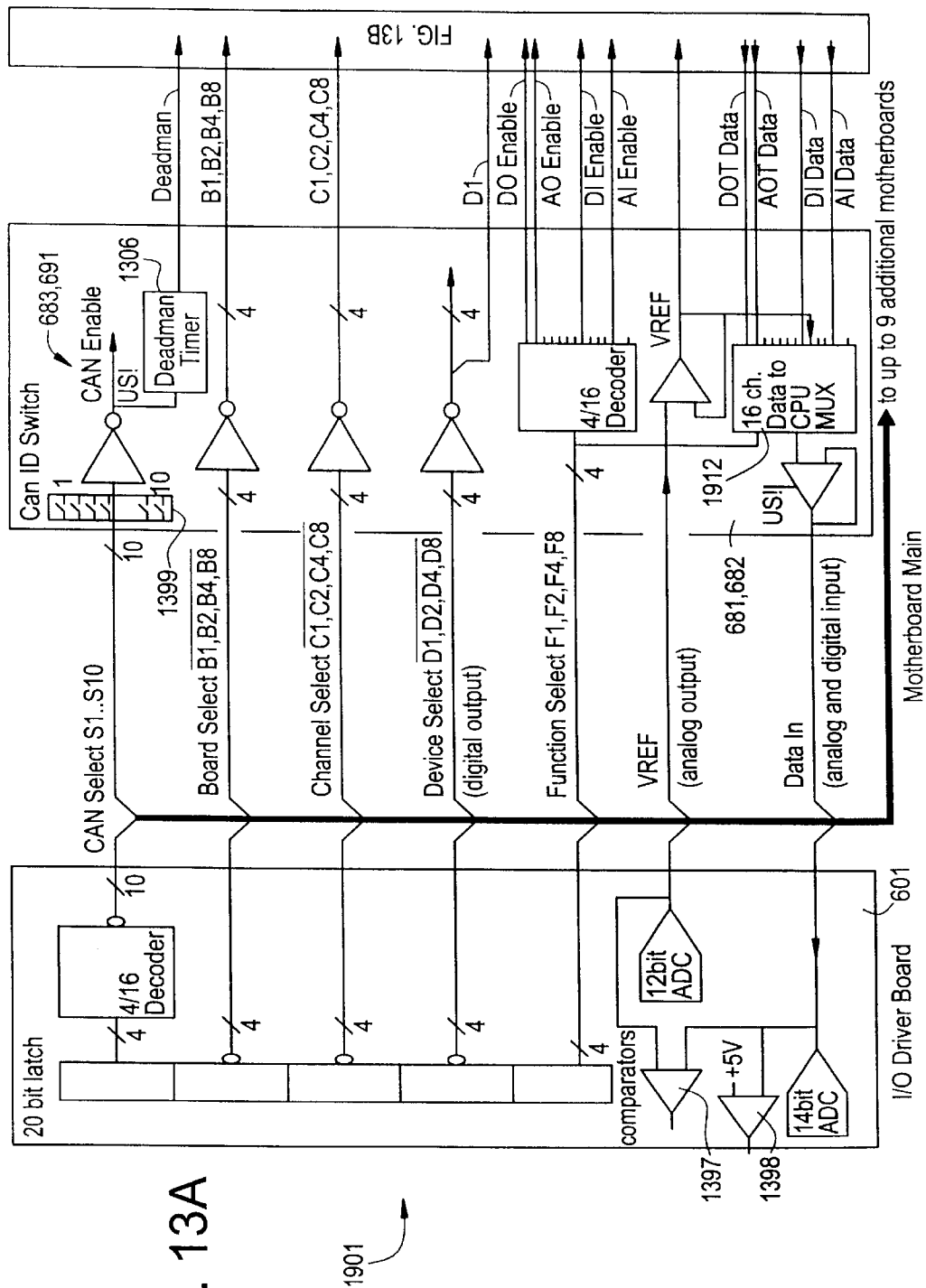
FIGS. 13A and 13B show Motherboard, I/O Driver Board, I/O Board, and Mezzanine Board circuitry.
Figure 13B:
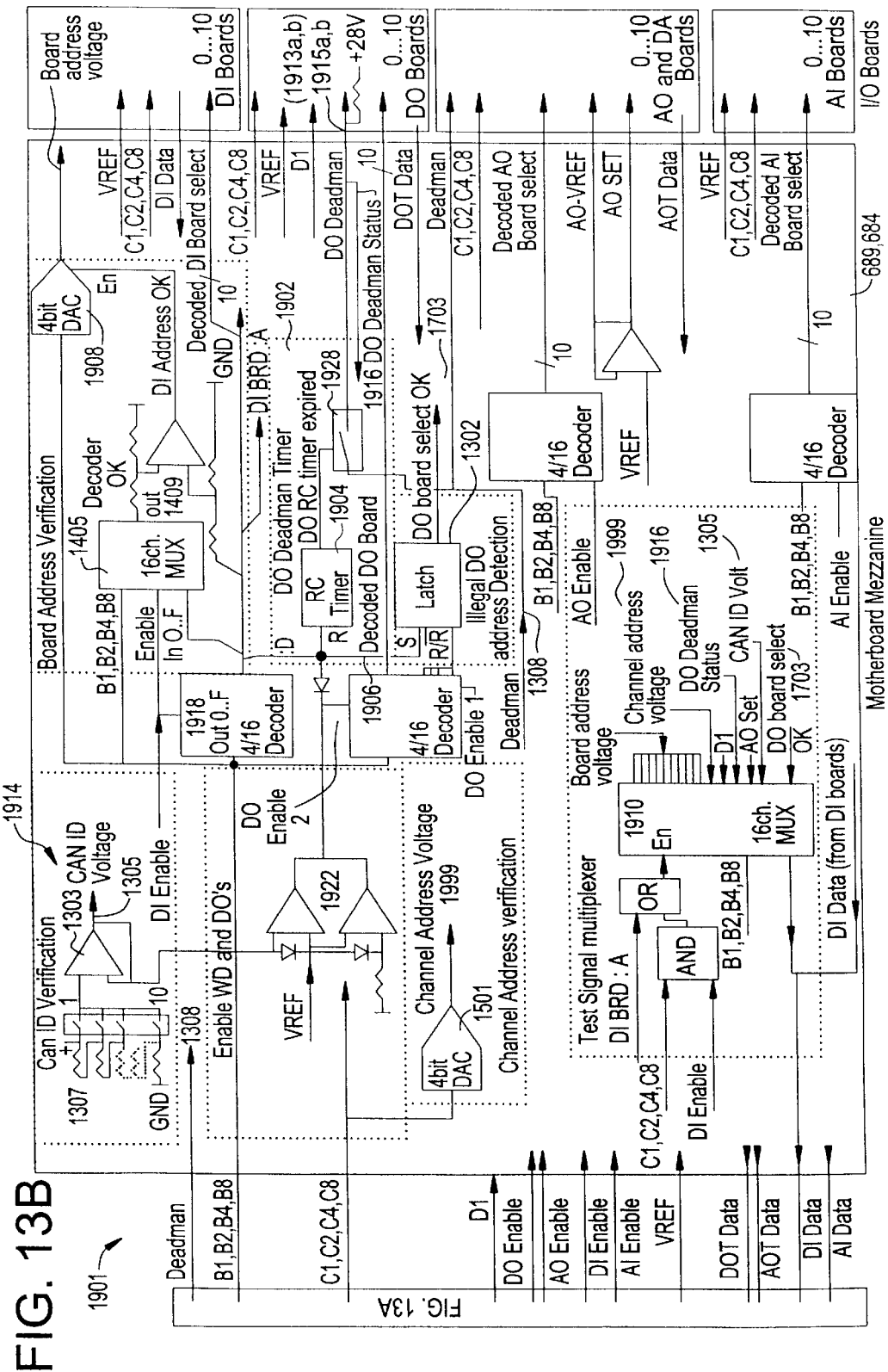
Figure 14:
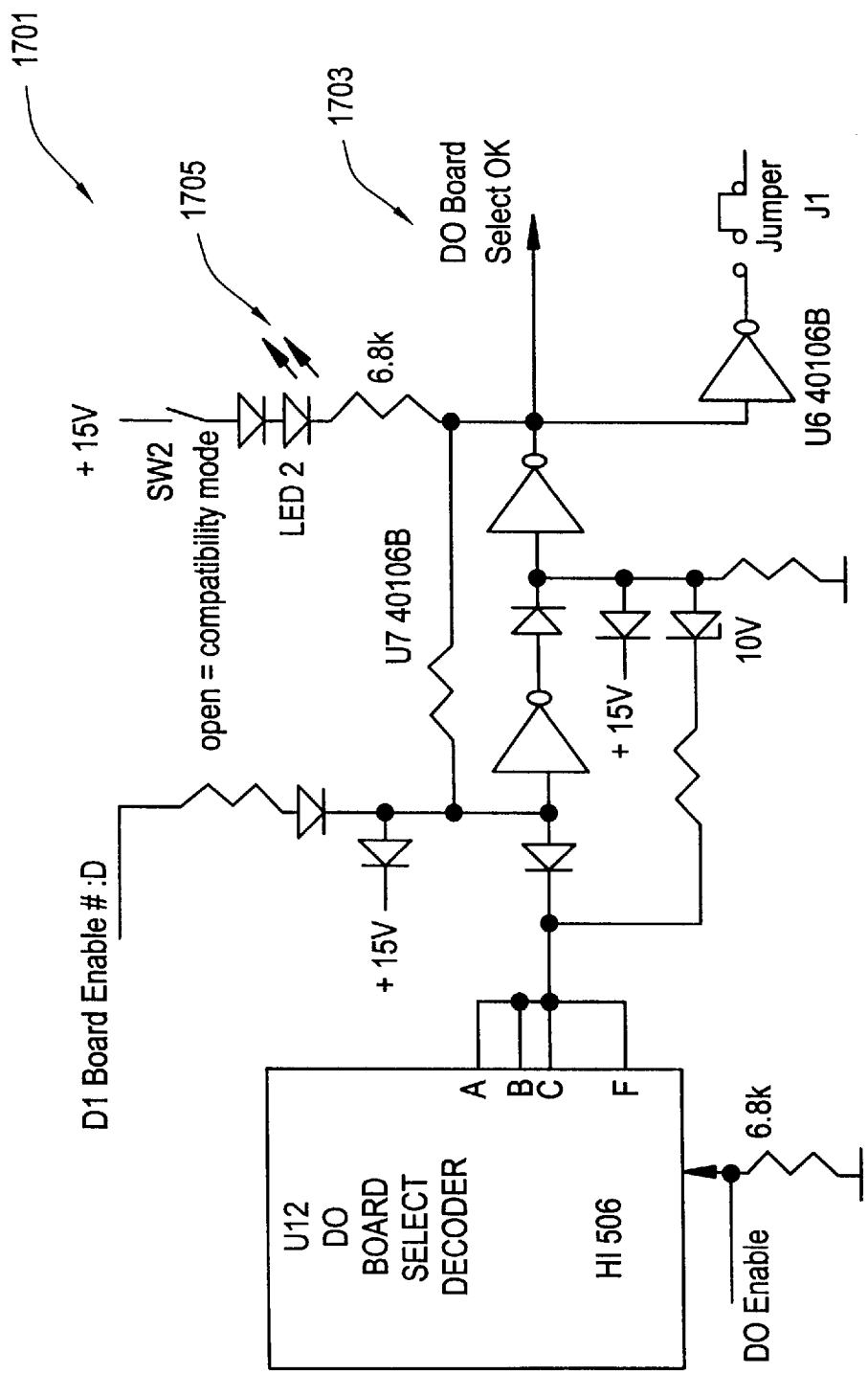
FIG. 14 presents digital output address validation circuitry.

FIGS. 13A, 13B, and 14 present circuit details respective to the deadman and address confirmation circuitry as deployed on each Motherboard in the set of Motherboards interfacing the control computers 10a,b to the input and output circuits. Each Mezzanine Board 684, 689 (FIG. 3B) has a SIL Mezzanine Board DO (Digital Output Signal) RC Timer And Deadman 1902 (key components of DO Deadman Circuit 688,685) with a DO Deadman connection 1915a,b for disabling each 'affiliated' digital output; an RC timer 1904 having a time of duration and timer reset; and a connection 1906 for receiving a predetermined event output from control computer 10 as the timer reset. RC timer 1904 is reset to the maximum time (full capacitor discharge) when the predetermined event is received and progressively charges toward the time of duration (to a charge threshold amount which opens switch 1928); if the time of duration is achieved by the short term timer (that is, if the circuit charges to the charge threshold amount which opens switch 1928 before the capacitor in RC timer 1904 is discharged by signal :D on connection 1906 to effectively reset RC timer 1904 to maximum time) and the predetermined event has not been received, DO Deadman connection 1913(a,b), 1915(a, b) is energized to switches 687,690,695,697 to disable digital outputs (and analog outputs as optionally noted in the discussion of FIG. 3B).

Each Motherboard also has Can Address Deadman Circuit 683,691 and Can address confirmation circuit 1922. With reference to FIGS. 13A and 13B as they show Motherboard circuitry 1901, in generating the output signal, each control computer 10 defines a digital address and an affiliated set of digital signals respective to each output signal; a first digital-to-analog circuit 1908 connected to control computer 10 converts the set of digital signals related to the output board address into a single analog signal; and multiplexing circuit 1910 interfaces the first digital-to-analog circuit 1908 to affiliated CPU circuitry 1912. In a similar manner, second digital-to-analog circuit 1914 converts the digital address related to the Can Identifier into a Can ID address-value analog signal; and the Can ID address-value analog signal is also interfaced via multiplexing circuit 1910 to computer 10 via circuit 1912. If the set of address-value digital signals and the digital address are not determined to be identical, digital outputs from that Can are, on expiration of the timer, terminated via switch 687,690 (FIG. 38); DO Deadman Status value 1916 is then monitored by computer 10, and computer 10 deactivates the sending of hexadecimal value:D (output from decoder 1918 as received from computer 10 in the set of Board Select addresses B1 . . . B8) via linkage 1906 to all Cans in the next second of real-time if the partner control computer is inactive (if a partner is active, control computer 10 enters Task 4); and the absence of the :D value in each Can then trips all switches 1928 in the system to deactivate all digital outputs (and, in an alternative embodiment, all analog outputs) configured as shown in FIG. 3B. Since the :D value is only provided by computer 10 upon the successful completion of all startup tests, the deactivation of any digital output via switch 1928 ultimately latches, in conjunction with the use of computer 10 monitoring of DO Deadman Status value 1916 and response to an indication of a change in DO Deadman Status value 1916, to position in fail-safe all digital outputs in the system until a restart of computer 10 from Task 4 is implemented.

In further consideration of actions which cause switch 1928 to terminate provision of digital outputs via DO Deadman connection 1913($a,b$),1915($a,b$), Can Address Deadman Circuit 683,691 implements use of Deadman Timer 1306 (which operates in a similar manner to RC Timer 1904} in reacting to a Can Enable signal to Provide a Can Deadman and output Deadman signal 1308 to switch 1928. At switch 1928, therefore, any discrepancy noted locally in Can addressing or in Board addressing in any part of the control system effects immediate fail-safe positioning of the affected outputs in that Can and subsequent fail-safe positioning of at least all digital outputs in the system within a very short time.

In enabling control computer 10 and its affiliated logic to test deterministic integrity of the Motherboard 681,682 address, 10-position DIP switch 1307 is installed on Mezzanine Board 685,688. Switch 1307 is set to the logical address of the Motherboard as identified in the logic of control computer 10 for addressing all circuitry accessible via the Motherboard. Together with affiliated resistors and operational amplifier 1303, Can address confirmation circuitry 1914 generates Can voltage 1305 proportional to the setting of switch 1307.

A self-test routine in the logic (executing Machine Operation Code) of control computer 10 reads each voltage returned through multiplexer 1910 and circuit 1912, compares it with the expected voltage based on the digital address for that Motherboard, and takes action to halt provision of :D in B1 . . . B8 to all Cans if the voltage is out of tolerance.

Can address confirmation circuitry 1914 and Comparator 1922 provide a mechanism to verify that the appropriate Motherboard 681,682 is being addressed before digital output boards are allowed to be addressed respective to Motherboard 681,682 and before onboard RC Timer And Deadman 1902 is reset via receipt of Board Select signals B1 . . . B8. The circuit consists of a resistor ladder, Can address switch, opamp, window comparator and another opamp. When this board is installed, the board address switch must correspond to the same switch position as on main Motherboard 681,682. The voltage from the resistor ladder is in increments of 1.5V +/–0.5V for each step on the resistor ladder. This voltage then becomes the signal CAN_ID (with reference to the term "Can" as earlier defined in this specification). When DO's in a particular Can are being addressed, the control computer must first apply a VREF value that is about a diode drop (0.6–07V) below the particular CAN_ID voltage of interest. Provided the VREF value is within +/– one diode drop of the CAN_ID voltage, comparator 1922 does not pull its output to ground. Provided window comparator 1922 does not pull to ground and the logic executing in control computer 10 permits, RC Timer 1904 is "reset" to continue restraint of DO Deadman connection 1913($a,b$),1915($a,b$) from assertion when :D is asserted from decoder 1918. Channel Address Voltage 1999 is also processed via Mux 1910 to control computer 10 in confirming the Channel Address Voltage in a manner similar to the Board Address Voltage.

Turning now to FIG. 14, digital output address validation circuitry 1701 is presented which further details circuitry in Latch 1302. Circuitry 1701 detects if an unused DO board address has been "attempted". Two CMOS inverters and a few diodes and resistors form a simple latch circuit in resolving this concern. Every second, the latch of circuitry 1701 is set together with RC Timer 1904 with the :D value in signal 1906 and is forced into a "normal on" state. The unused outputs A, B, C, and F of the DO board select decoder are not defined in value. Either a logical TRUE or a logical FALSE state indicates that an address error occurred since a value must be sent from computer 10 for A, B, C, or F to have a specific value. If any unused DO Address lines are enabled (either TRUE or FALSE), latch 1302 does not assert DO Board Select OK 1703. A self-test routine in the logic (executing Machine Operation Code) of control computer 10 reads output 1703 of circuitry 1701 via multiplexer 1910 and circuit 1912; and, if the output is low, the system effectively discontinues reset of latch 1302 and RC Timer 1904. LED#2 1705 enables an visual indication of the status of the output 1703. LED#2 1705 lights if a failure is detected.

In the preferred embodiment, a field signal such a temperature measurement or pressure measurement is input to a control computer via an input channel on an input board interfaced via a local Can Motherboard 681,682 and I/O Cable Driver Board 601 to control computer 10. Each instance of control computer 10 has its separate and distinct set of circuitry interfacing to the field signal, so two sets of these circuits operate in parallel with their respective redundant control computers 10*a*,*b* for safety critical circuitry. An incoming signal from the field is joined to two channels, and the data value from each channel (which eventually is datalogically valued within each instance of control computer 10) is available for comparison between the two control computers. Output signals are then generated through a reverse "control-computer-to-I/O-Driver-Card-to-local-Motherboard-to-output-board-to-output-channel" parallel circuit set where the voltages output from each of the output channels are concurrently impressed to the respective field control device. The output circuitry uses an operational amplifier to stabilize any impedance-related currents induced from simultaneous impression of multiple voltages on the same wire to the field control device when two control computers perform such simultaneous impression. U.S. Pat. No. 5,428,769 (69Glaser et al.) describes the system and method for stabilizing any impedance instability which might be induced from three voltages being simultaneously impressed on the same wire to the field control device when three control computers or field interface computers perform such simultaneous impression. When the hardware for two control computers execute the simultaneous impression, an operational amplifier is used to enable management of any induced instabilities.

As mentioned earlier in this specification, some modifications to the analog input signal arbitration methodology described in U.S. Pat. No. 5,583,757 to Baca, Jr. et al. are implemented in the system described herein; these modifications to the information disclosed in that patent are outlined in FIGS. 15, 16, 17 and 18.

Figure 15:
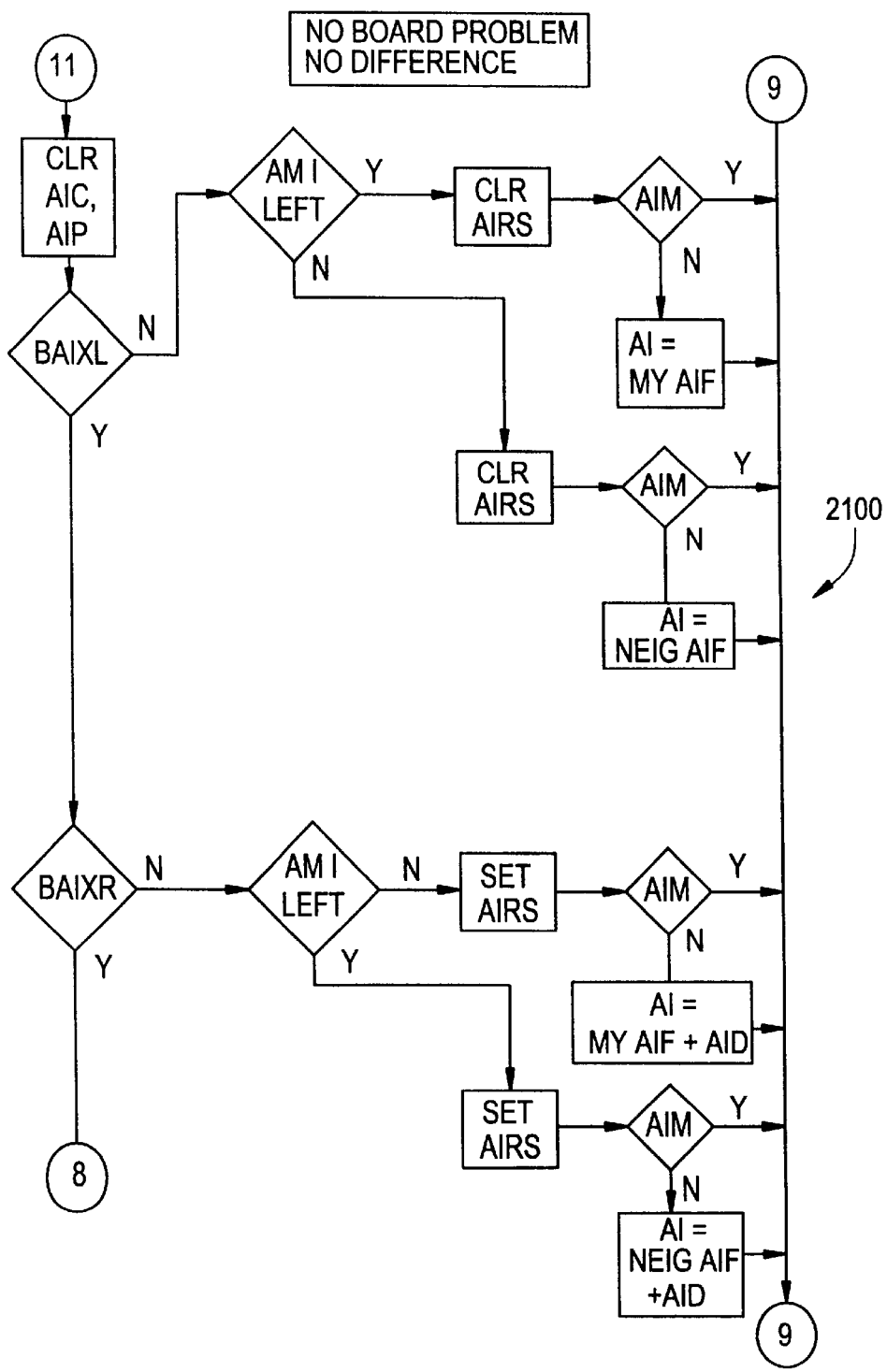
FIG. 15 presents modifications to FIG. 8(c) in U.S. Pat. No. 5,583,757 in which certain conditional logic in input signal arbitration (previously executed when the control computer was executing in the Task B mode) is removed in the system of the preferred embodiment from the method that was articulated with respect to that United States patent.

FIG. 15 presents modifications to FIG. 8(c) in U.S. Pat. No. 5,583,757 in which certain conditional logic in input signal arbitration (which previously executed when control computer 10 is executing in the Task B mode) is modified.

Figure 16:
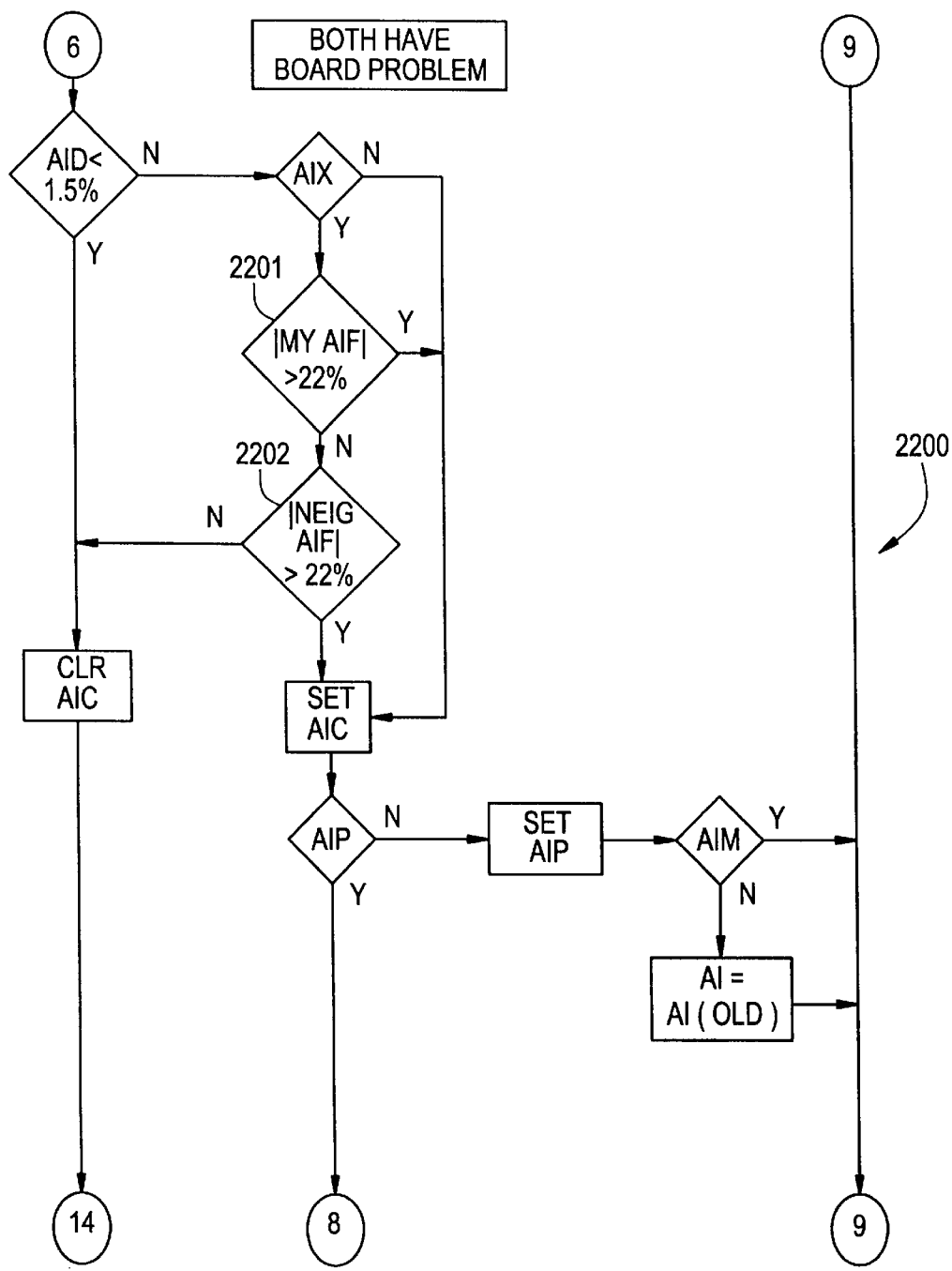
FIG. 16 presents modifications to FIG. 8(e) in U.S. Pat. No. 5,583,757 in which certain logic in input signal arbitration changed in the system of the preferred embodiment from the method that was articulated with respect to that United States patent.

FIG. 16 presents modifications to FIG. 8(e) in U.S. Pat. No. 5,583,757 in which certain logic in input signal arbitration is modified. As indicated in method steps 2201 and 2202, the AIF variable is modified to be the absolute value of the AIF.

Figure 17:
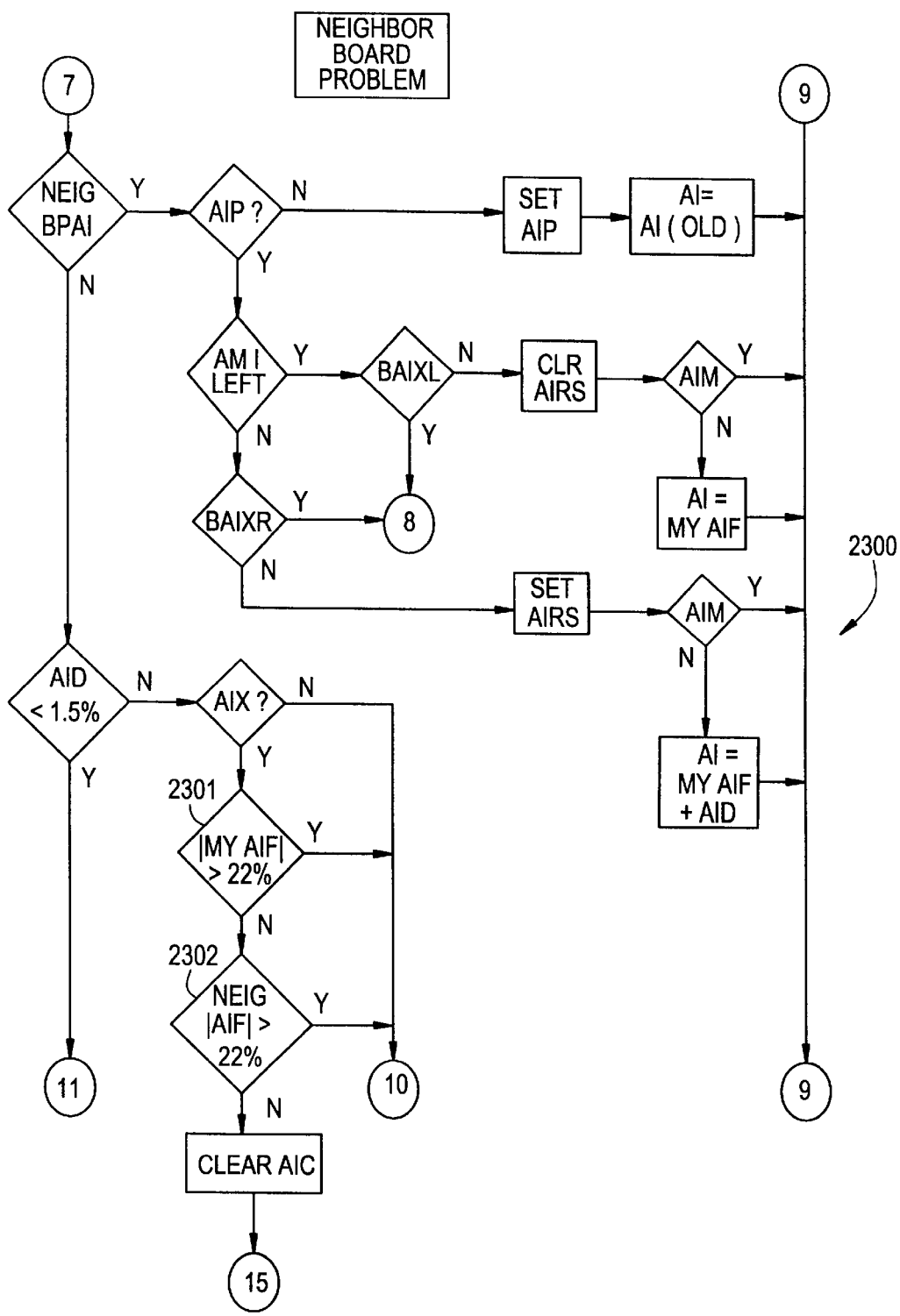
FIG. 17 presents modifications to FIG. 8(f) in U.S. Pat. No. 5,583,757 in which certain logic in input signal arbitration changed in the system of the preferred embodiment from the method that was articulated with respect to that United States patent.

FIG. 17 presents modifications to FIG. 8(g) in U.S. Pat. No. 5,583,757 in which certain logic in input signal arbitration is modified. As indicated in method steps 2301 and 2302, the AIF variable is modified to be the absolute value of the AIF.

Figure 18:
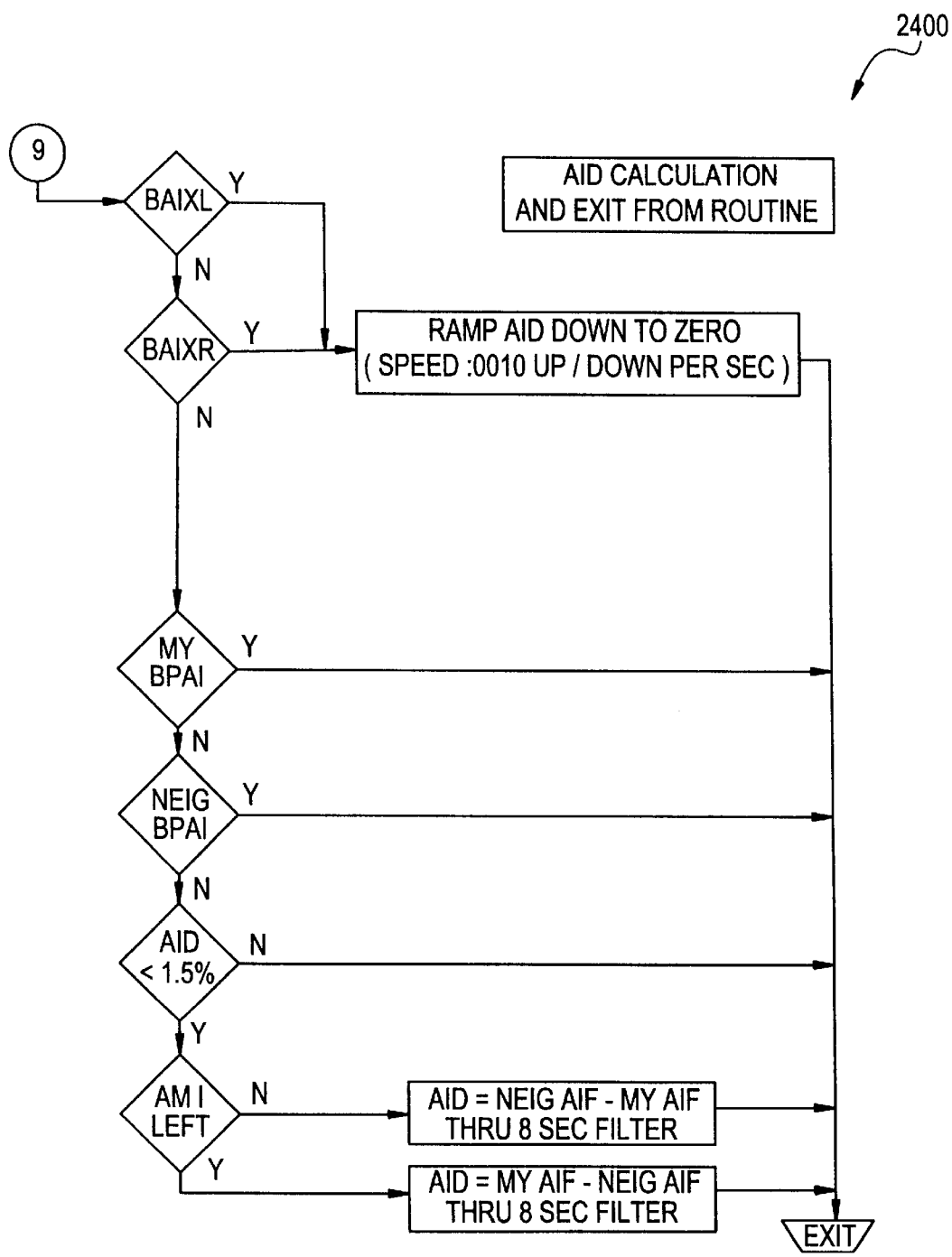
FIG. 18 presents modifications to FIG. 8(h) in U.S. Pat. No. 5,583,757 in which certain conditional logic in input signal arbitration (previously executed when the control computer was executing in the Task B mode) is removed in the system of the preferred embodiment from the method that was articulated with respect to that United States patent.

FIG. 18 presents modifications to FIG. 8(h) in U.S. Pat. No. 5,583,757 in which certain conditional logic in input signal arbitration (which previously executed when control computer 10 is executing in the Task B mode) is modified.

Real-time execution of the Machine Operation Code in the control program of the described embodiment occurs once per second. FIG. 19 presents an overview 2500 of the outline of execution of Hz1 subportions of the control program in real-time beginning with Hz1 Step 2502 which defines the beginning of the second related to that Hz1 cycle.

VERCHK Hz1 Step 2504 then implements a version check between control computer 10 executing the control program Machine Operation Code and the Application Program source code which was used to generate the control program Machine Operation Code.

RMUX Hz1 Step 2506 then executes in the Hz1 control program Machine Operation Code cycle to interface control computers 10a,b with the Remote Field Units introduced in U.S. Pat. No. 5,428,769 (69Glaser et al.) and as further described herein.

Figure 22:
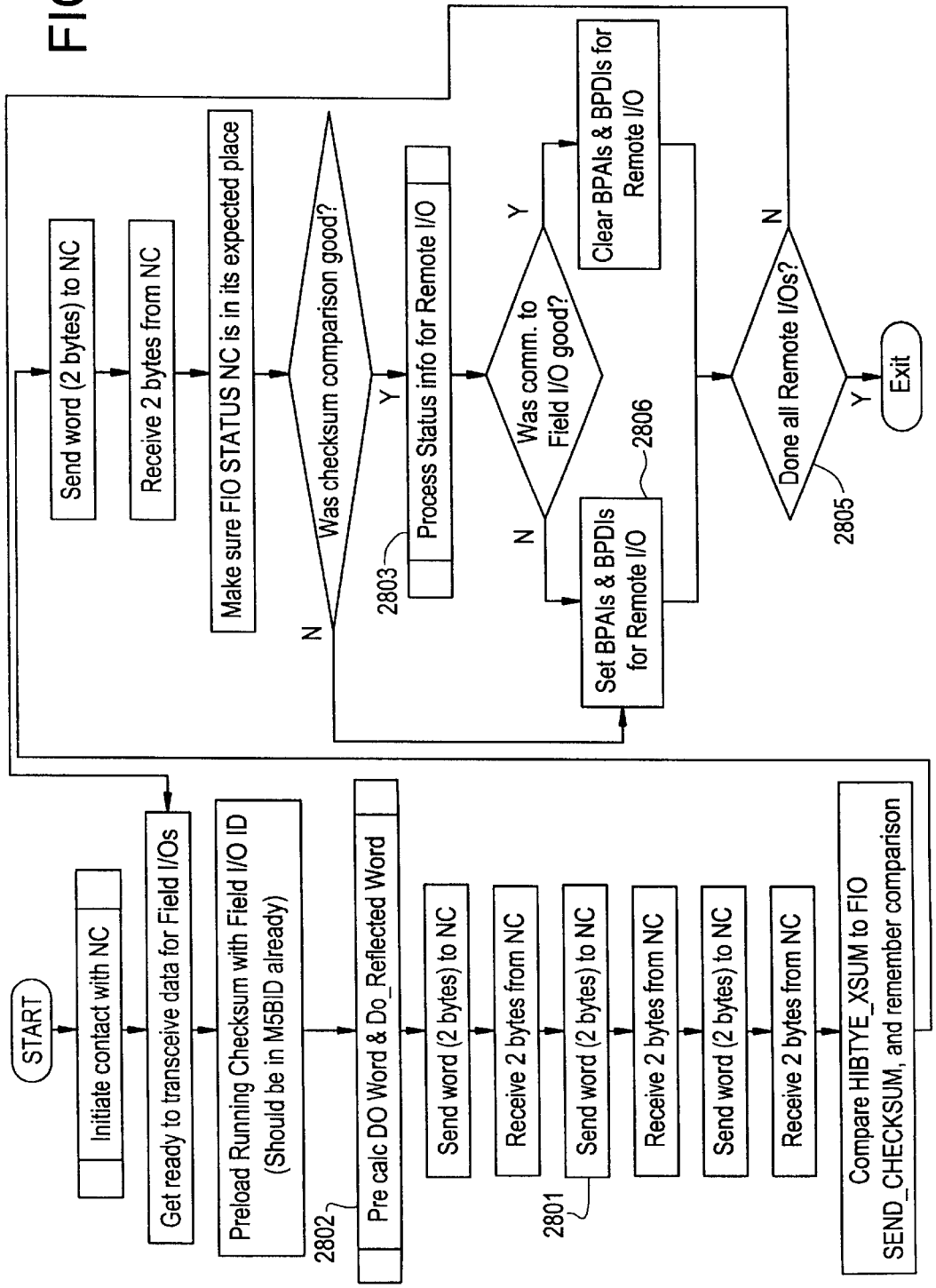
FIG. 22 presents a flowchart of the executable Machine Operation Code for interfacing a control connection to a network controller interfacing a control computer to a Remote Field Unit.
Figure 23A:
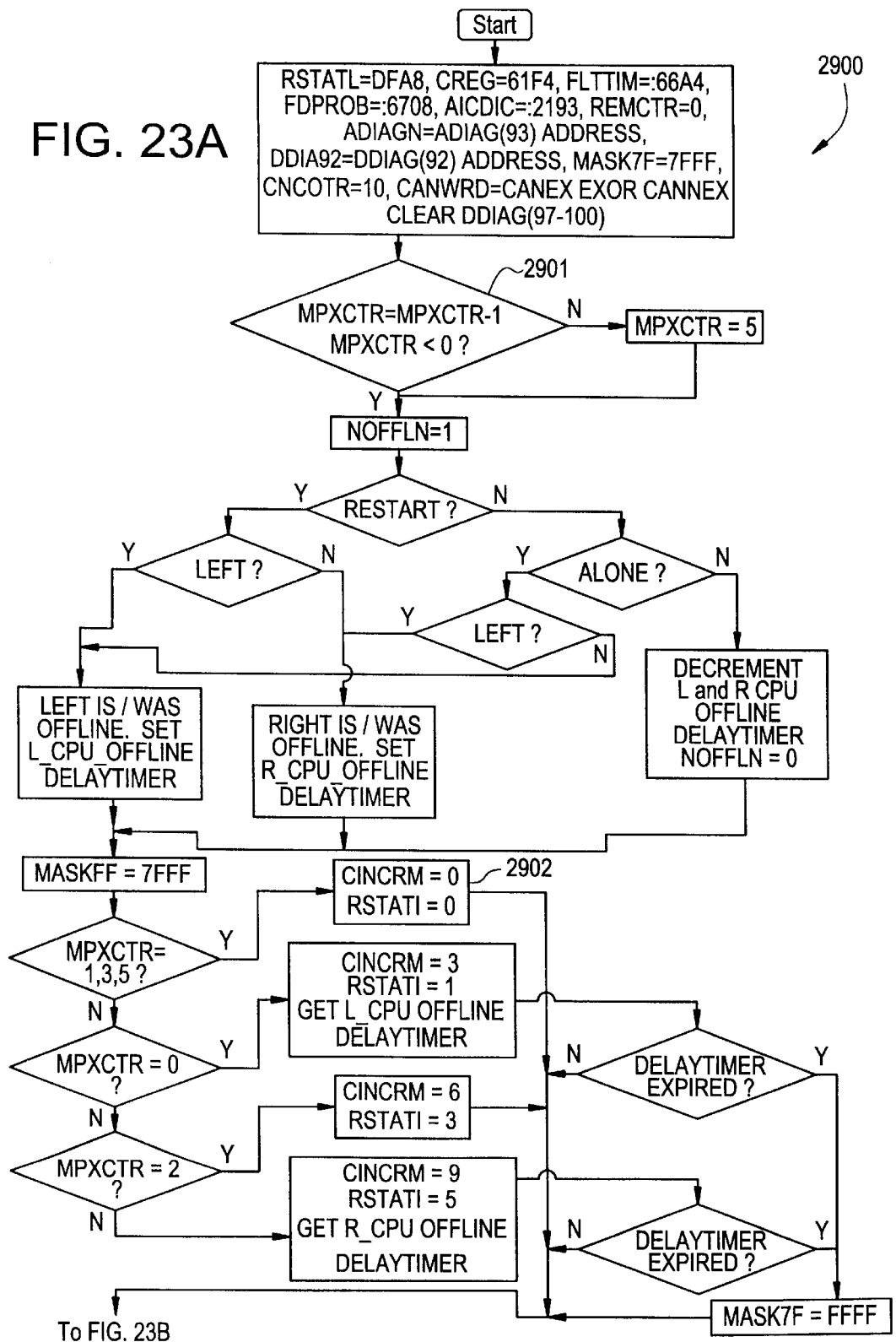
FIGS. 23A–23E present a flowchart of the executable Machine Operation Code for diagnostics executed in a control computer respective to a Remote Field Unit.
Figure 23B:
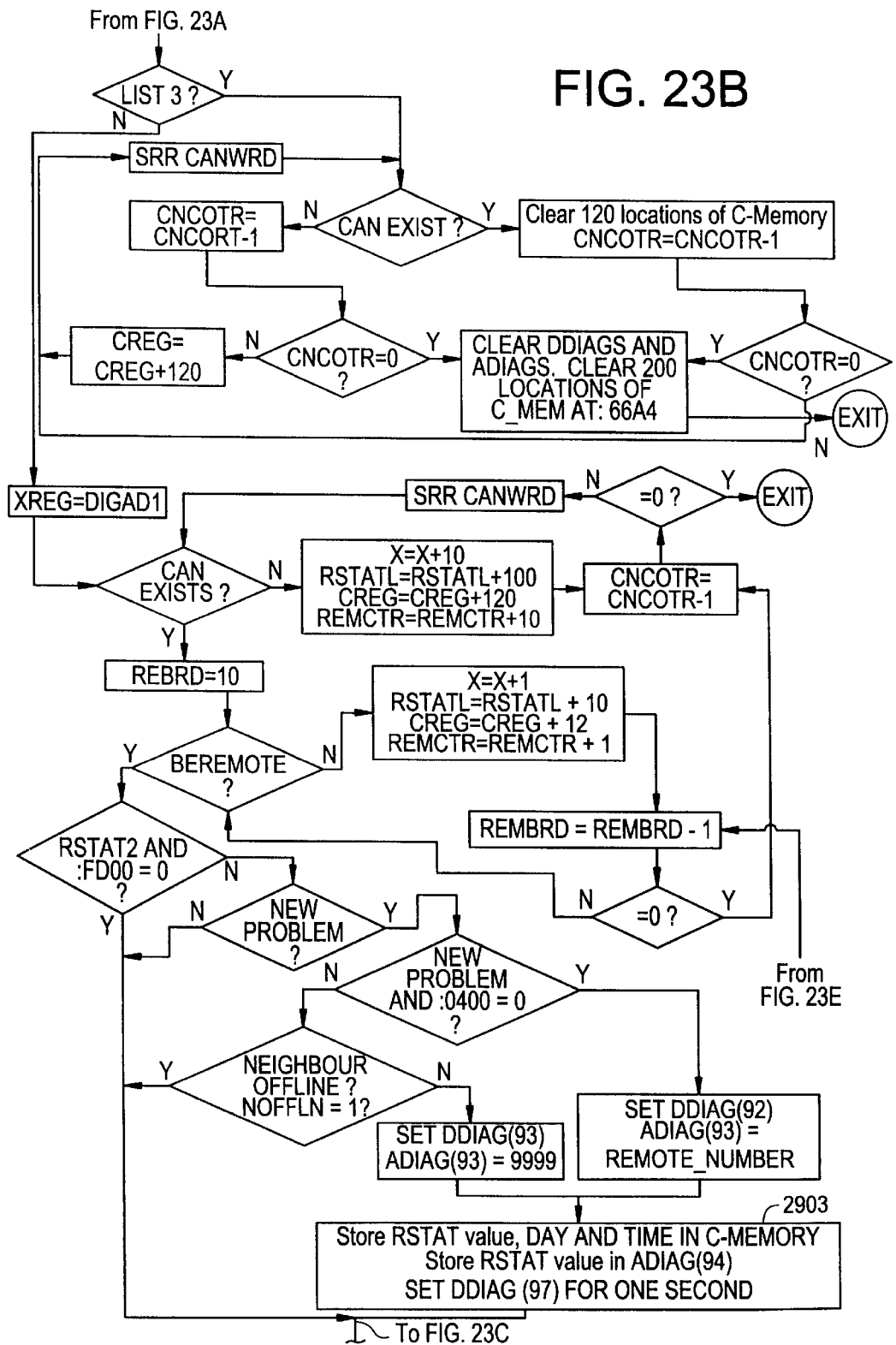
Figure 23C:
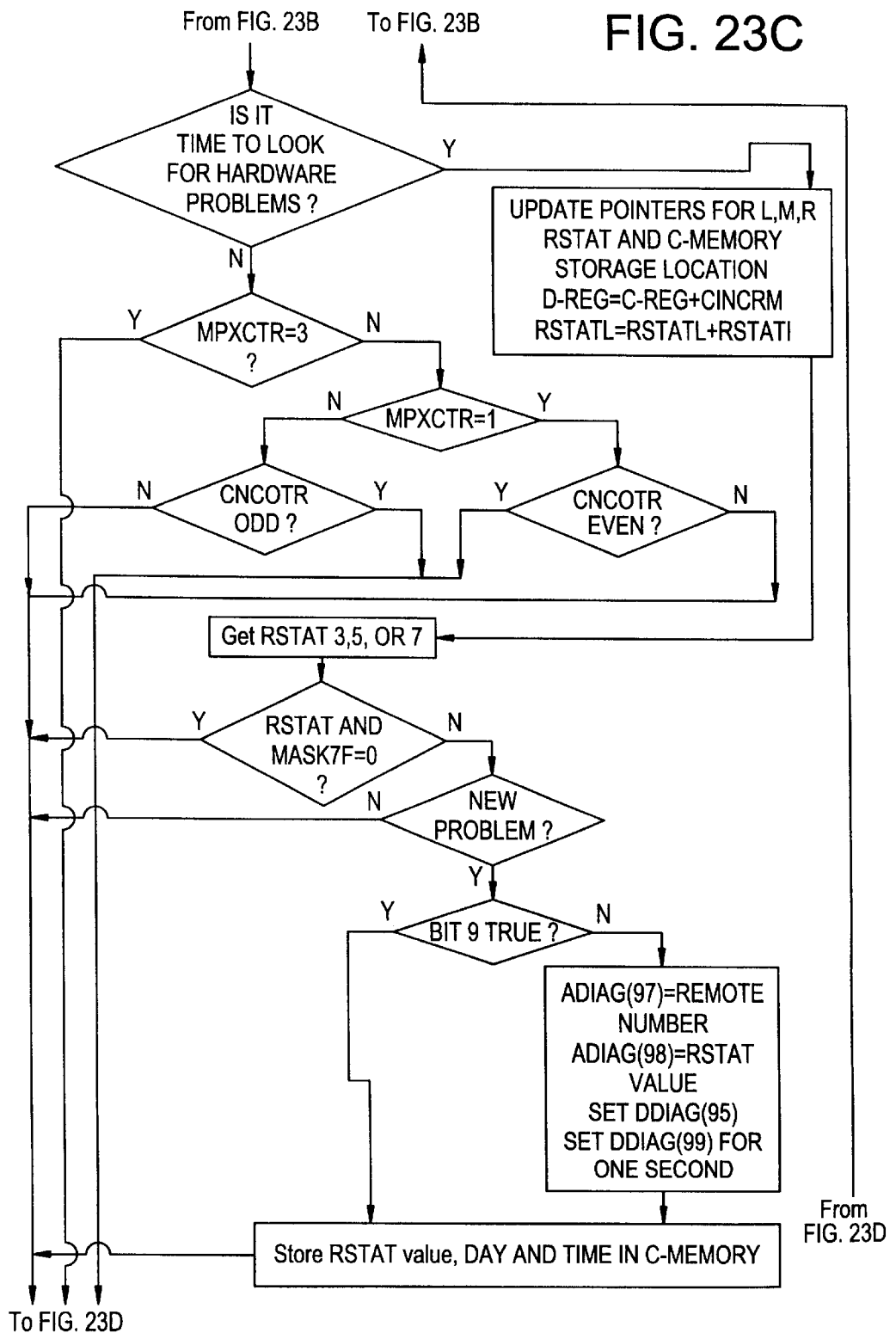
Figure 23D:
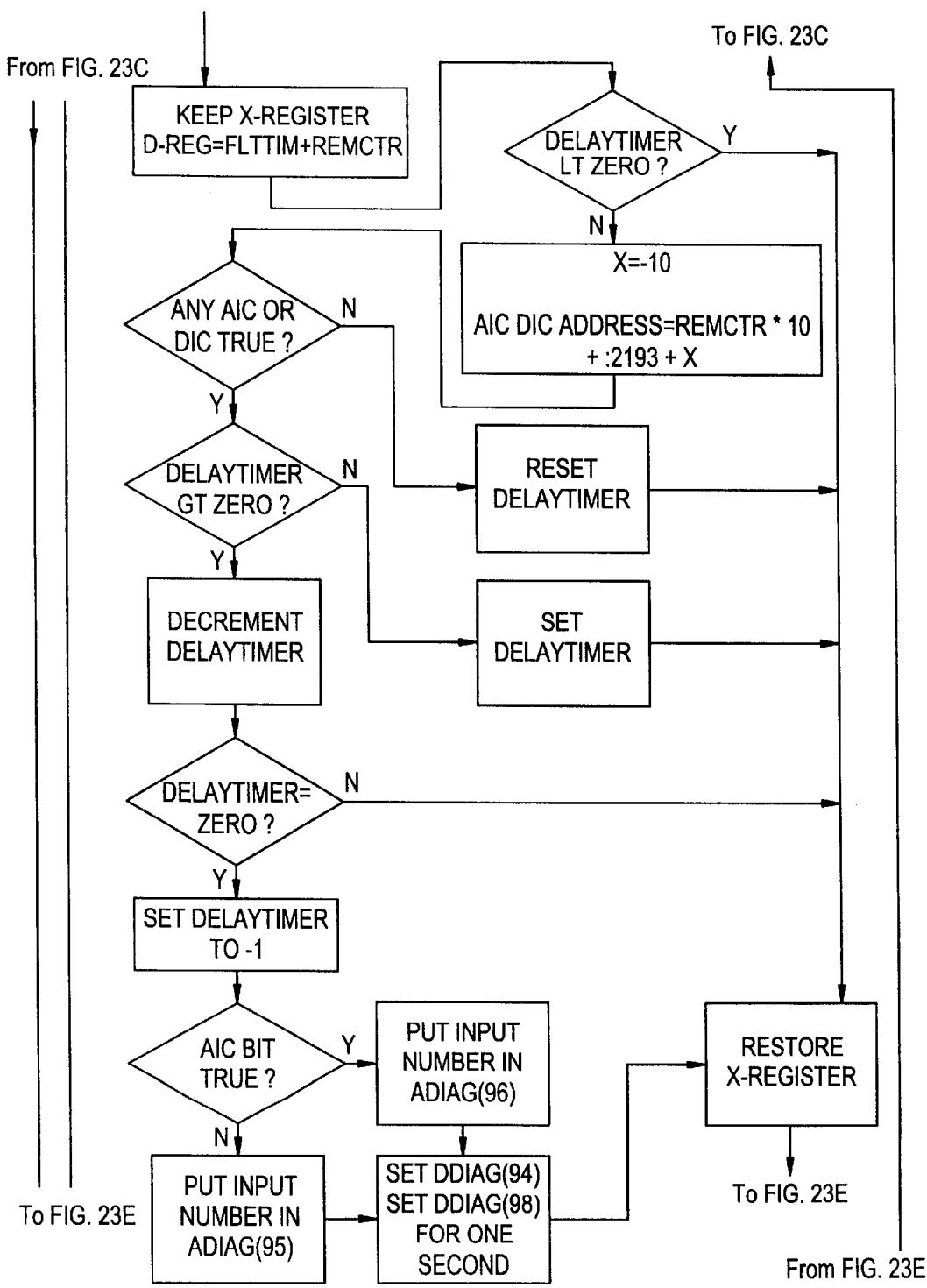
Figure 23E:
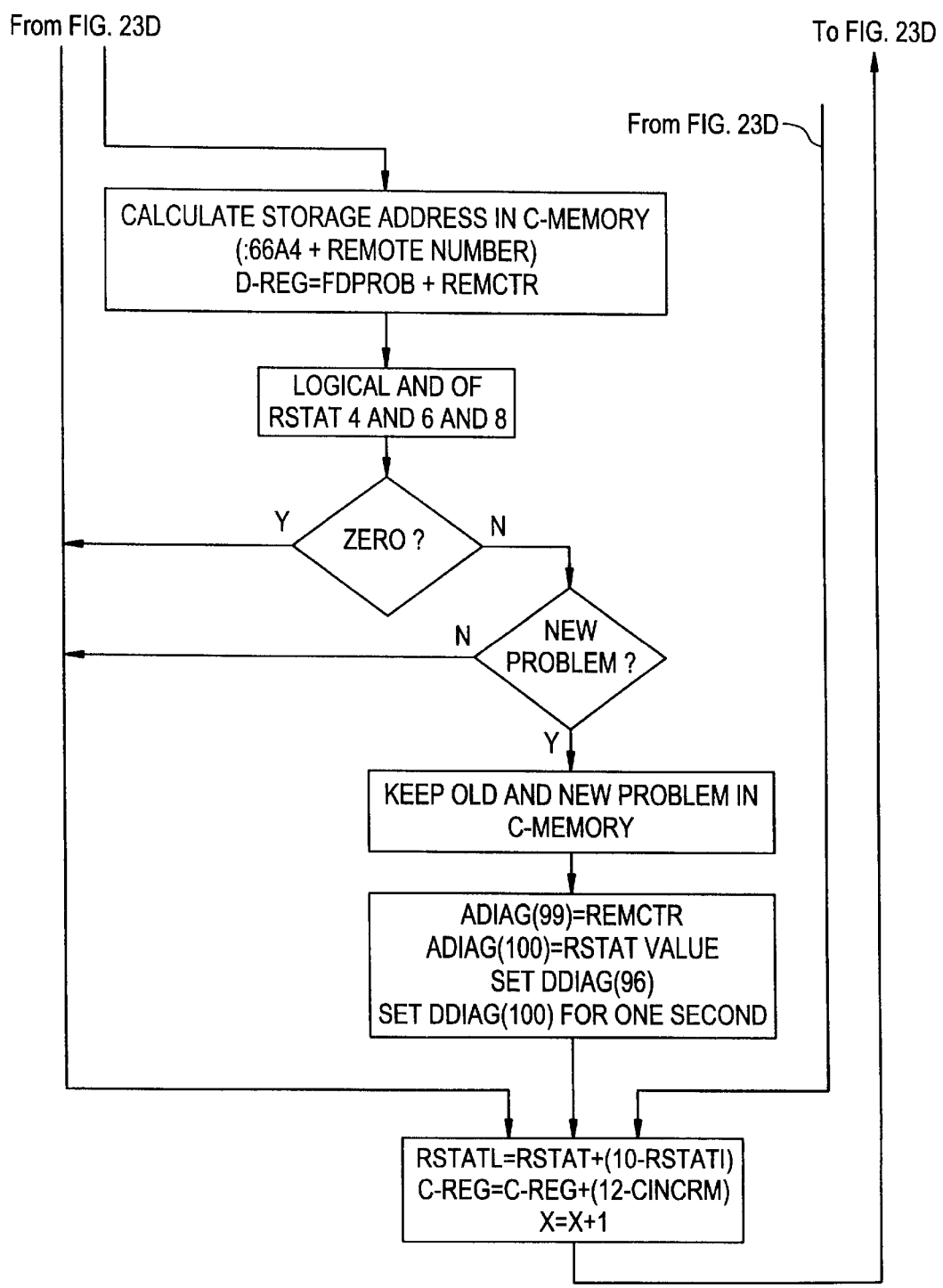

Implementing of RMUX Hz1 Step 2506 in each control computer 10 is enabled by the method outlined in FIG. 22. As indicated in FIG. 22 in method step 2802, the control computer calculates, for each digital output to be communicated to a Remote Field Unit, a "reflected digital output value" as a compliment of the digital output for communication via network controller 328A,B board to the field Remote. In examination of steps in the method such as in method step 2801, the "NC" refers to network controller card 328A,B essentially described in 69Glaser et al. If the received Checksum of method 2800 is not validated in control computer 10, a "bad" status is defined for the communication and the error is communicated to the Remotes via interruption of the communication cadence with affiliated implementation of Remote Field Unit 314 I/O use of the "still communicating" control computer's values. In the control computer, partner values for the affected Remote Input Signals are used in control of apparatus 84 until they are designated as (also) unacceptable. The term "BPAI", such as in step 2806, refers to "board problem analog input". In further discussion of the methodology executed in RMUX Hz1 Step 2506, FIGS. 23A through 23E present the Remote Field Unit diagnostic information method (executed in the control computer) respective to diagnostic values which are received from Remote Field Units 314a,b via network controller 328A,B boards.

Returning to FIG. 19, Field Remote Unit Diagnostic Hz1 Step 2507 executes according to FIGS. 23A–23E. In reviewing FIGS. 23A–23E, references to C memory, such as in step 2903, reference 64K C Memory 110 as indicated in FIG. 12, with affiliated C Shadow Memory 594. The MPXCTR values, such as indicated in step 2901 of the methodology described in FIGS. 23A through 23E, is used as a context indicator which controls multiplexing of the diagnostic data from the Remote Field Unit over a period of 6 seconds in that:

a value of 0 indicates that values of the Left computer (336A,B) in the Remote Field Unit are being examined;

a value of 1 indicates that values for input arbitration compare problems for even numbered Cans are being examined;

a value of 2 indicates that the Middle computer (338A,B) values of the Remote Field Unit are being examined;

a value of 3 indicates that field problem summary data from all of the Left, Middle, and Right computers in the Remote Field Unit (for example, DO's which might be shorted, AIs which indicate problems) are being-examined;

a value of 4 indicates that values of the Right computer (340A,B) in the Remote Field Unit are being examined; and a value of 5 indicates that values for input arbitration compare problems for odd numbered Cans are being examined.

Variables CINCRM and RSTATI, such as in method step 2902, are values which determine the storage locations in memory for holding status and diagnostic data within the general method described in FIGS. 23A through 23E.

Figure 24:
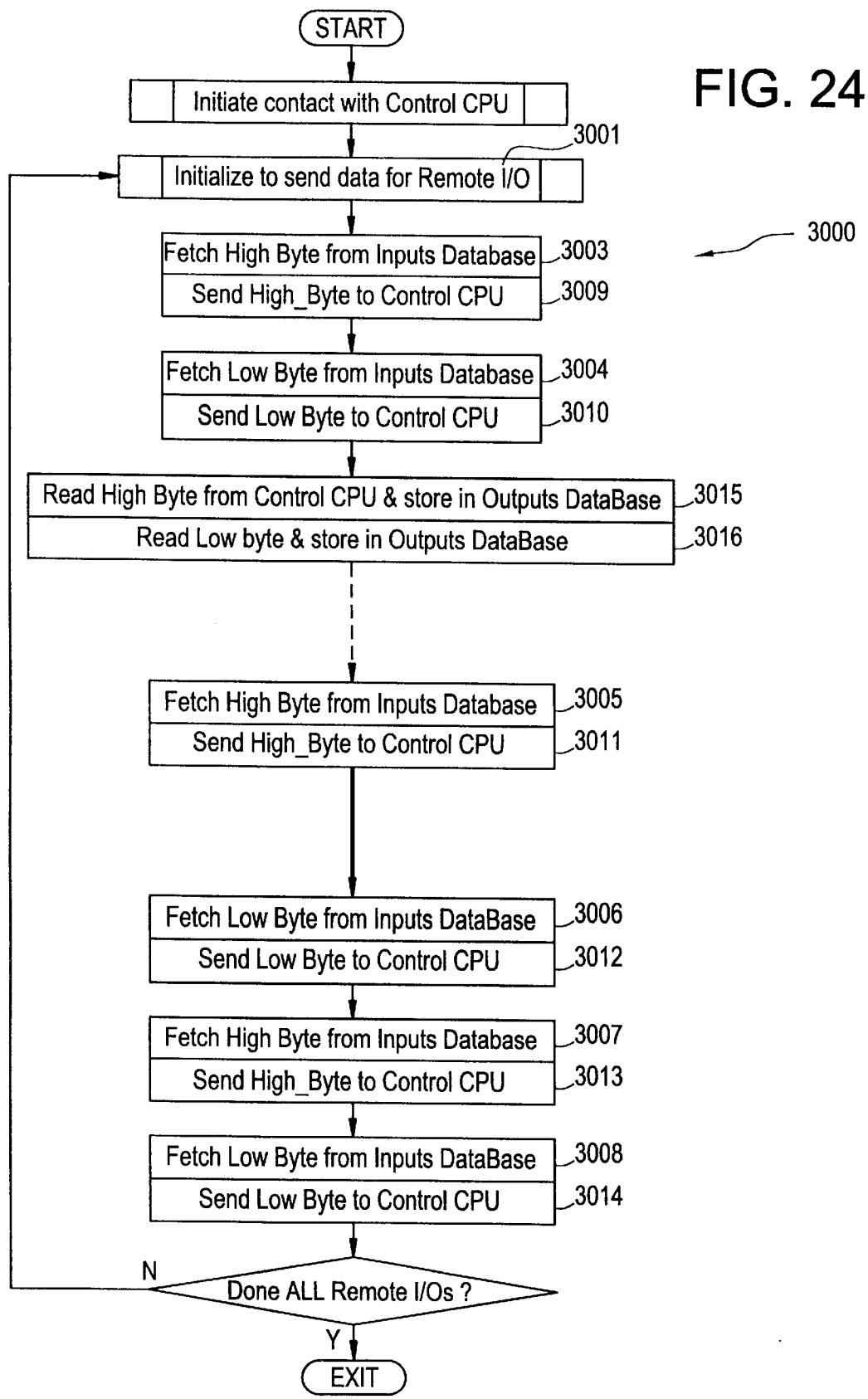
FIG. 24 presents a flowchart of the executable Machine Operation Code for a network controller circuit in interfacing to a Remote Field Unit.

FIG. 24 presents the general method which, at a high level, executes in network controller 328A,B to enable interface between Remote Field Units 314a,b and control computer 10. It should be noted that network controller 328A,B utilizes its own computer processor to execute this routine. With reference to step 3001 in FIG. 24, the reference to Remote Field Unit 314 IO is similar to the use of the terminology in step 2803 of FIG. 22. This routine handles the general status of the methodology executed in the network controller 328A,B as it interfaces with Remote Field Unit 314 and progresses from initialization in step 3001 through a set of steps which retrieve data from the input's database as in steps 3003, 3004, 3005, 3006, 3007, and 3008 and send that data from the input's database to the control computer as in steps 3009, 3010, 3011, 3012, 3013, and 3014. In those steps, the reference "Control CPU" is to control computer 10 CPU 12. It should be noted that a process executes in steps 3015 and 3016 to retrieve data from the control computer and store it in an output database for forwarding to the Remote Field Unit. The input database, as indicated, for example, in step 3003, holds data retrieved from Remote Field Unit 314.

Figure 25:
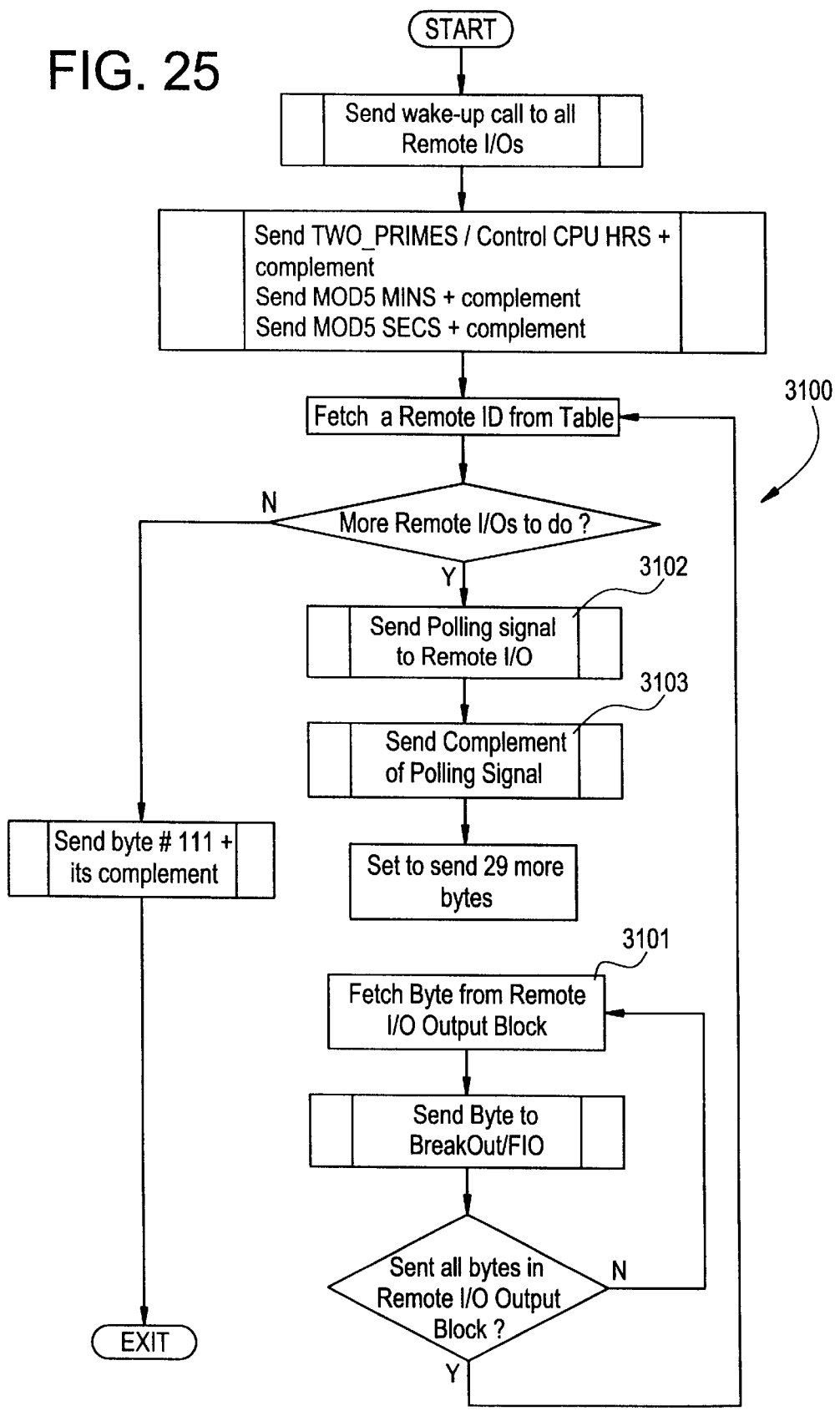
FIG. 25 presents a flowchart of the executable Machine Operation Code for methodology in a network controller circuit which sends information from the network controller to a Remote Field Unit.
Figure 26:
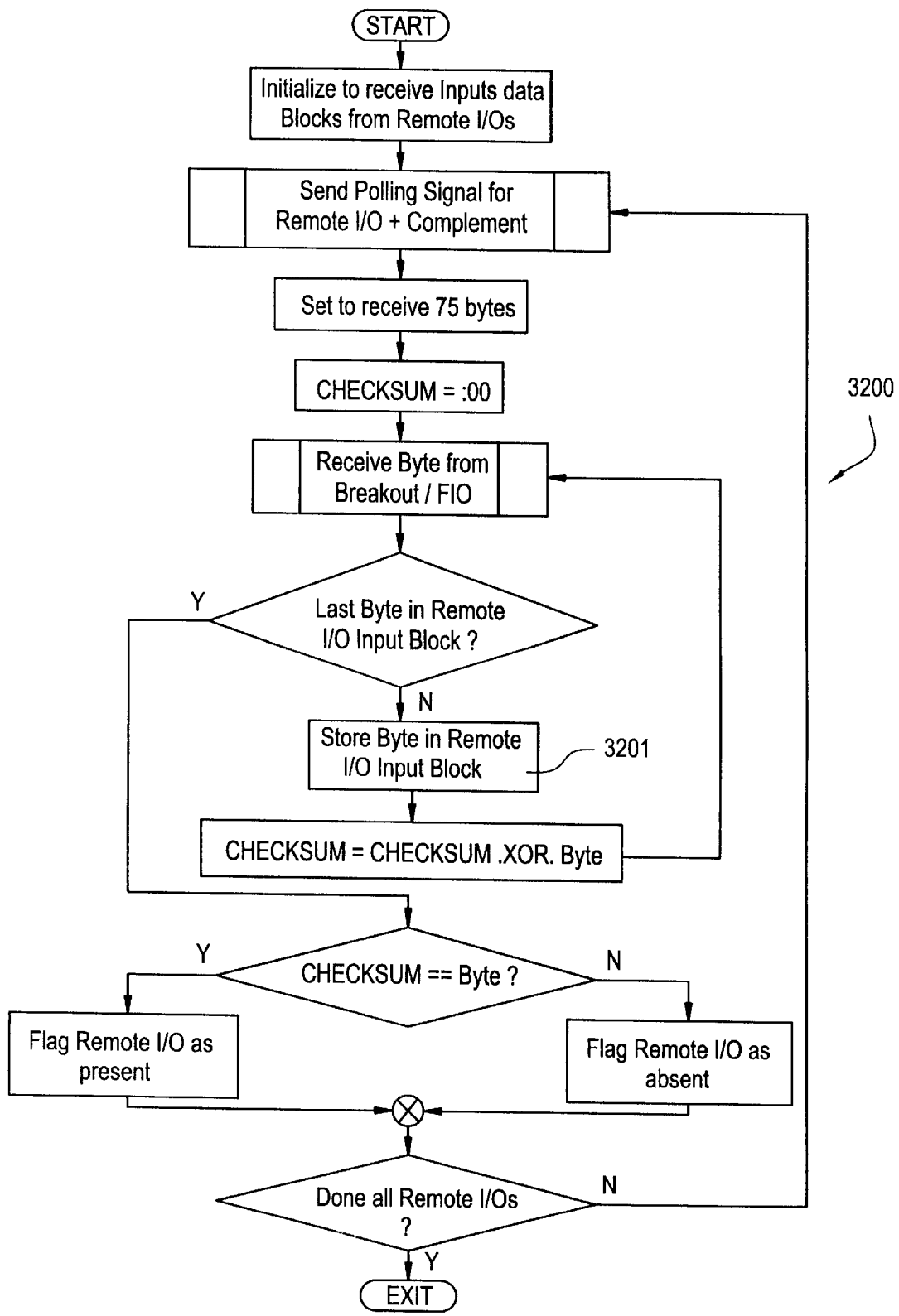
FIG. 26 presents a flowchart of the executable Machine Operation Code for methodology in a network controller circuit which receives information into the network controller from a Remote Field Unit.

Even as FIG. 24 depicts methodology in network controller 328A,B to interface network controller 328A,B information to the control computers, FIGS. 25 and 26 relate to the interface between network controller 328A,B and Remote Field Units 314a,b, where FIG. 25 describes methodology for sending information from network controller 328A,B to each Remote Field Unit. In this regard, the output's database, referenced in steps 3015 and 3016 of FIG. 24, is the source of information to be forwarded to Remote Field Unit 314. In FIG. 25 such information is accessed from the Remote Field Unit IO output block as in step 3101. It should also be noted that a polling signal is complimented in steps 3102 and 3103 with a second polling signal, where the second signal is the datalogical compliment of the first signal for further examination in Remote Field Unit 314 in assuring that data is exchanged between correctly addressed and identified Remote Field Unit 314 and the network controller.

FIG. 26 depicts methodology which executes in the network controller 328A,B to receive data from Remote Field Units 314a,b and to store that information in the input block referenced in step 3201 of FIG. 26.

Figure 27:
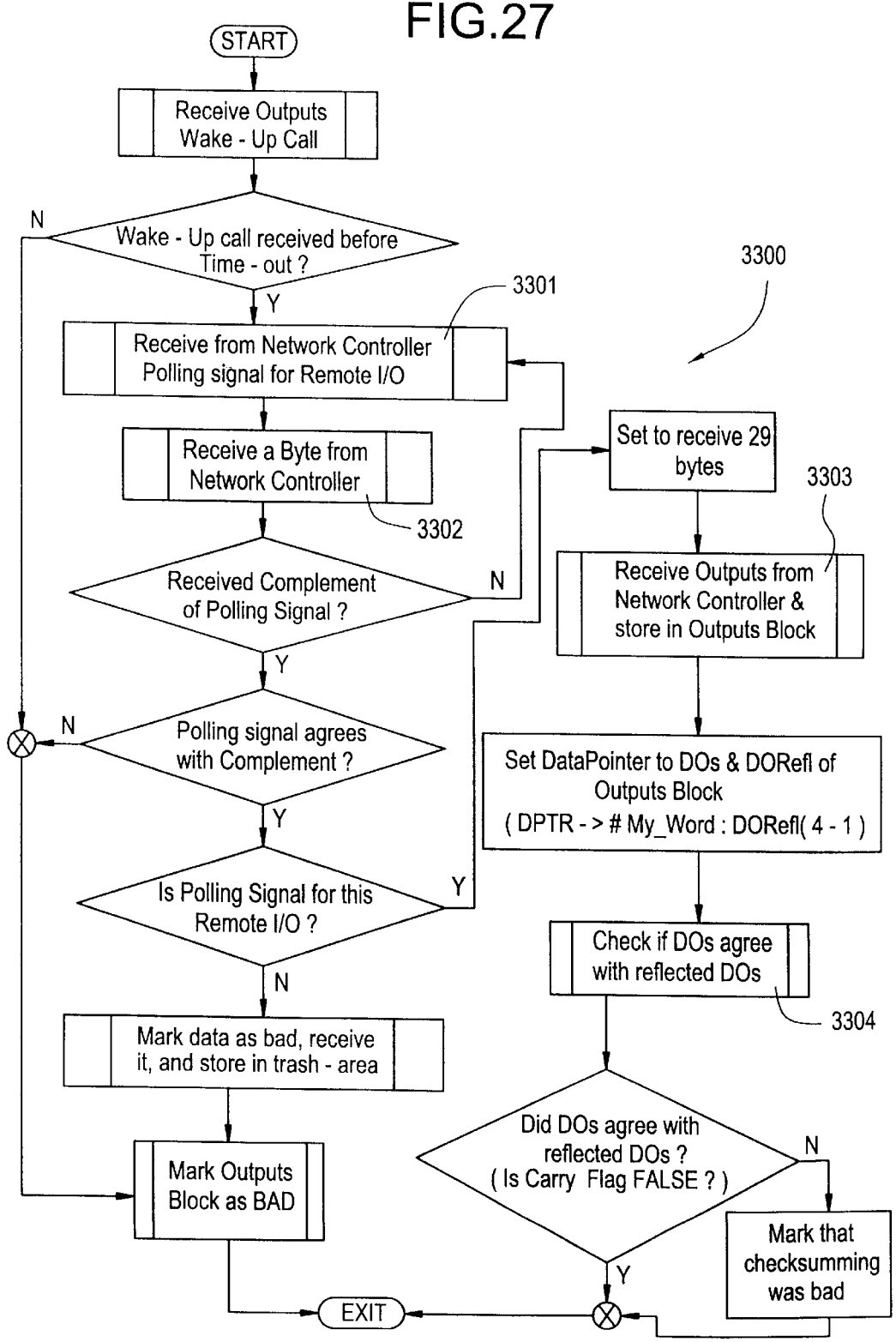
FIG. 27 presents a flowchart of the executable Machine Operation Code in a Remote Field Unit showing interaction with a signal and a compliment of the signal in communications with a network controller circuit.
Figure 28:
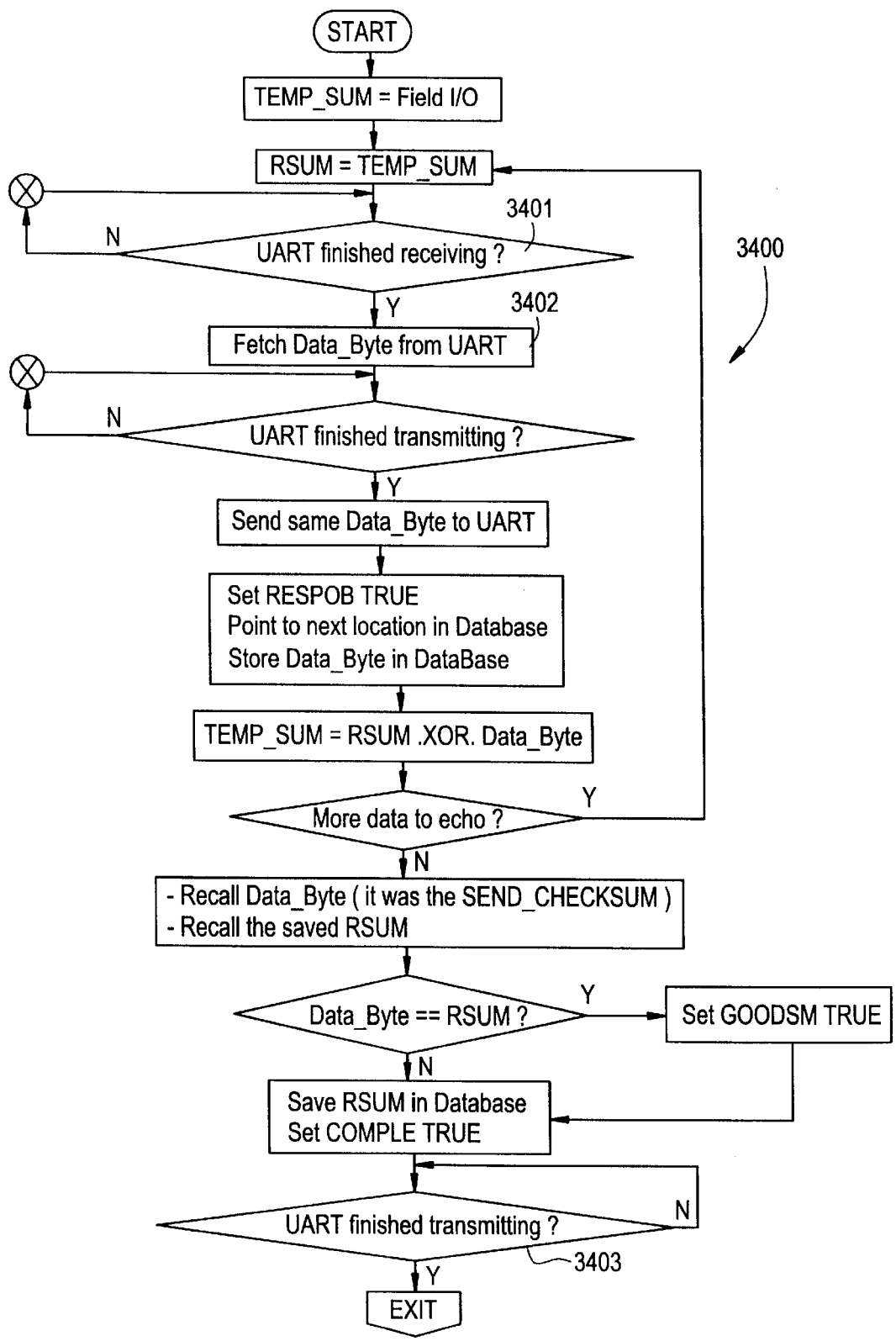
FIG. 28 presents a flowchart of echo functionality in the executable Machine Operation Code in a Remote Field Unit showing interaction with a signal and a compliment of the signal in communications with a network controller circuit.
Figure 29:
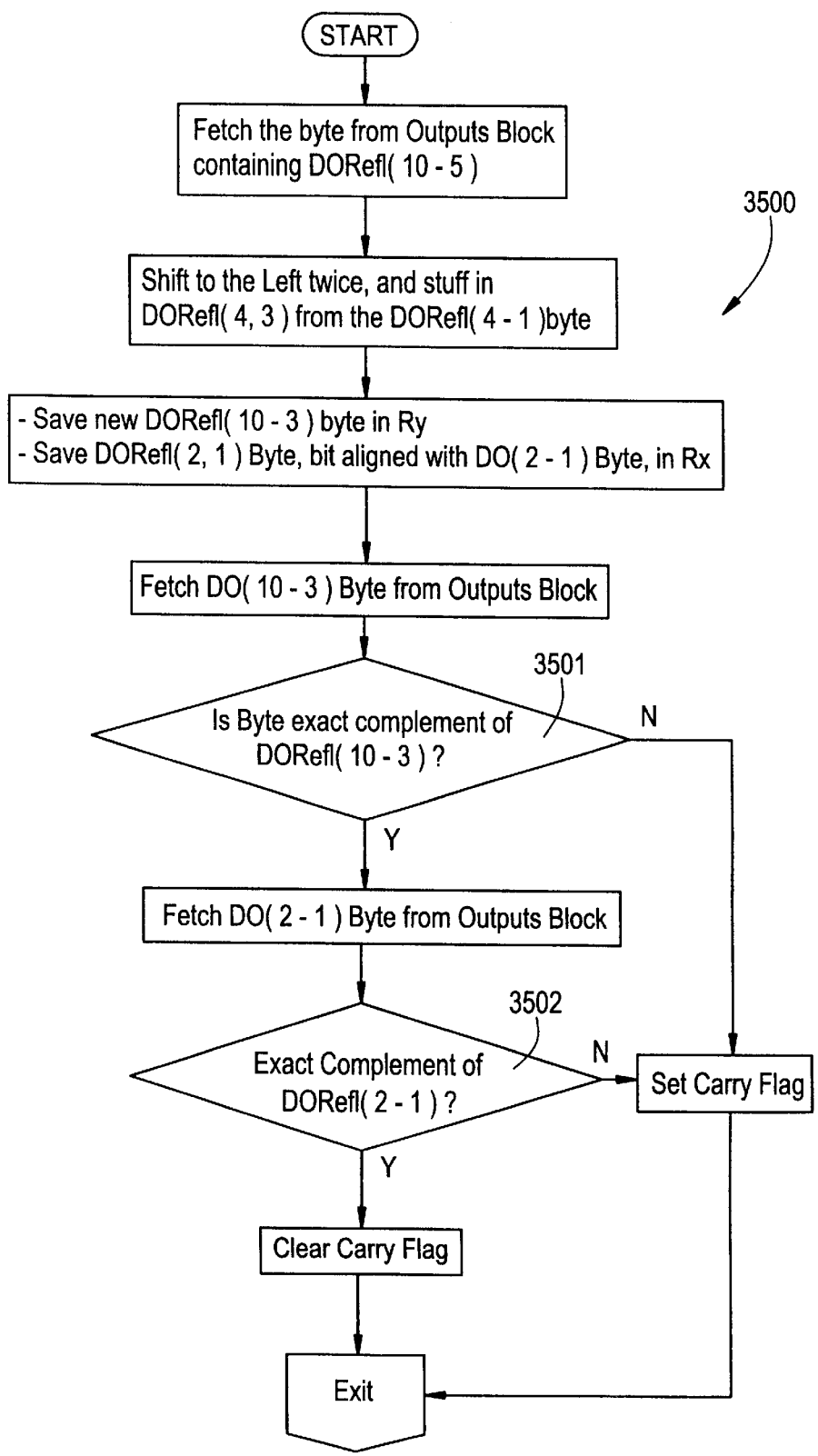
FIG. 29 presents a flowchart of digital output signal functionality in the executable Machine Operation Code in a Remote Field Unit showing interaction with a signal and a compliment of the signal in communications with a network controller circuit.

Whereas FIGS. 22 and 23A–23E describe methodology executed in the control computer for interfacing to Remote Field Units 314a,b, and FIGS. 24, 25, and 26 detail methodology in network controller board 328A,B interfacing with the Remote Field Unit, FIGS. 27, 28, and 29 detail methodology executed in Remote Field Unit 314 for interfacing to the control system as a certified safety shutdown system. In this regard, in FIG. 27, steps 3301 and 3302 show interaction with the signal and the compliment of the signal as introduced in steps 3102 and 3103 of FIG. 25. Methodology contained in step 3303 is further expanded upon in FIG. 28; and methodology (where "DO" refers to digital output and reflected digital output values) in step 3304 of FIG. 27 is further described in FIG. 29. With further respect to FIG. 34, the term UART references a Universal Asynchronous Receiver and Transmitter as is indicated in steps 3401, 3402, and 3403. In FIG. 29, use by the Remote Field Unit computer of the compliment of the reflected DO value (previously referenced with respect to the methodology of control computer 10 in step 2802) is indicated in steps 3501 and 3502.

Following exchange of information (returning to FIG. 19) with the Remote Field Units, PC TO PC Hz1 Step 2508 implements communications from one control computer system pair to another affiliated process control system pair so that (a) data which needs to be exchanged between these two systems is exchanged and (b) the systems are operated in a coordinated manner with each other respective to different parts of the process which might be under their separate control. This communication exchange is effected as described at column 10, lines 30–40 of U.S. Pat. No. 5,583,757 (Baca, Jr. et al.).

DIIN Hz1 Step 2510 then reads digital inputs into the real-time database in each of control computers 10a,b after Hz1 Step 2508, and then the analog inputs are acquired in a similar manner in AIIN Hz1 Step 2512. Following analog input and digital input value reading, a routine executes in SIP Diagnostic Hz1 Step 2514 implementing diagnostics to insure that input/output values are being properly addressed. This routine (also called "Voltage Keys") checks each Motherboard for correct addressing by examining each instance of CAN_ID voltage 1305 via multiplexer 1910.

In a similar manner, a diagnostic executes in the following VREF Hz1 Step 2516 to determine if the input/output boards properly respond with an echo signal to an output signal from each of control computers 10a,b—a routine also further directed to ensuring that the boards, respective to input/output signals, are being properly addressed by each control computer.

In Last Board Problem Diagnostic Hz1 Step 2517, all I/O board diagnostics data is queried to identify the highest-numbered board in the system having a board problem for facilitation of maintenance operations.

Figure 30:
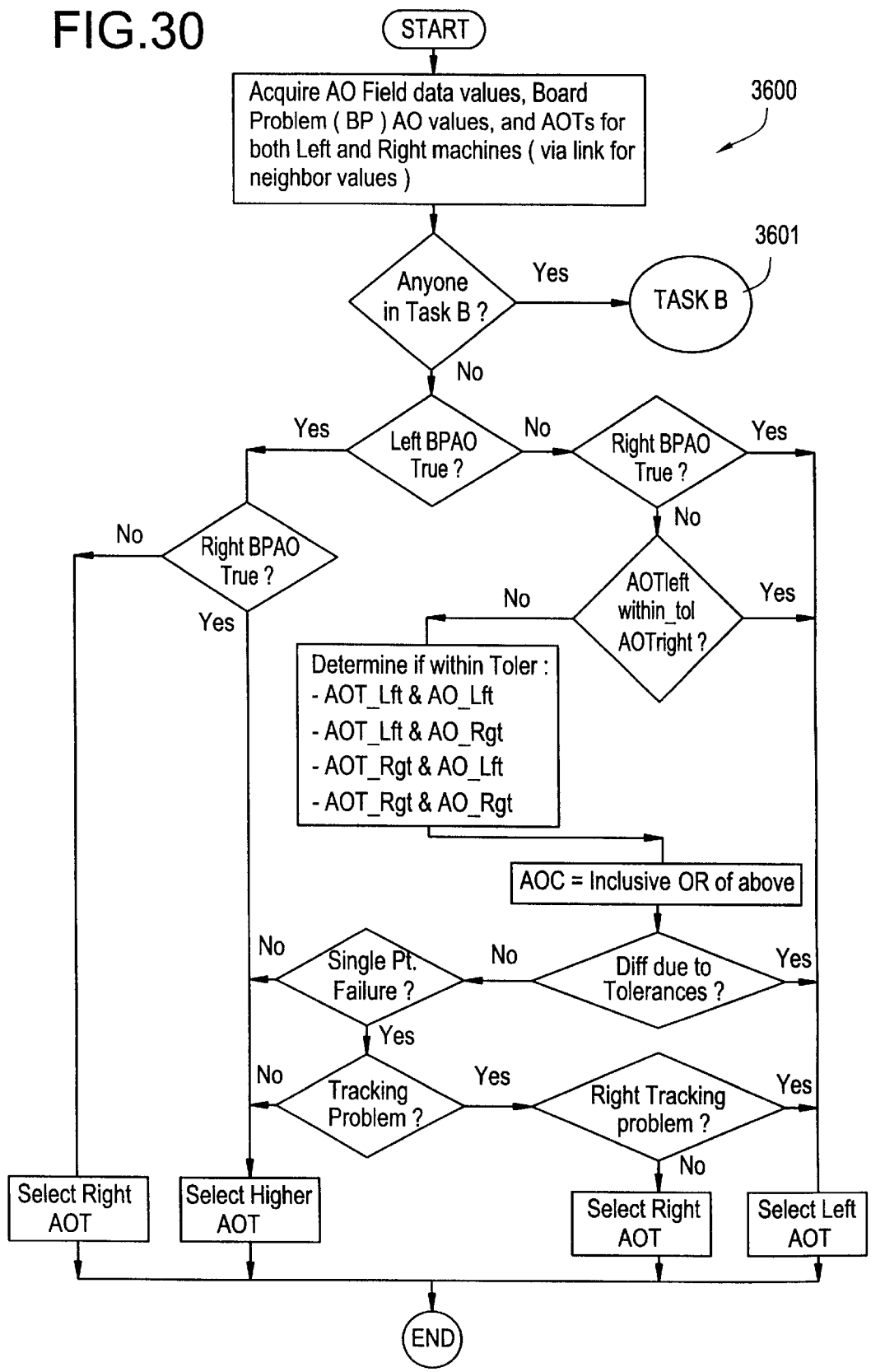
FIG. 30 presents a flowchart of analog output track signal functionality in the executable Machine Operation Code.
Figure 31:
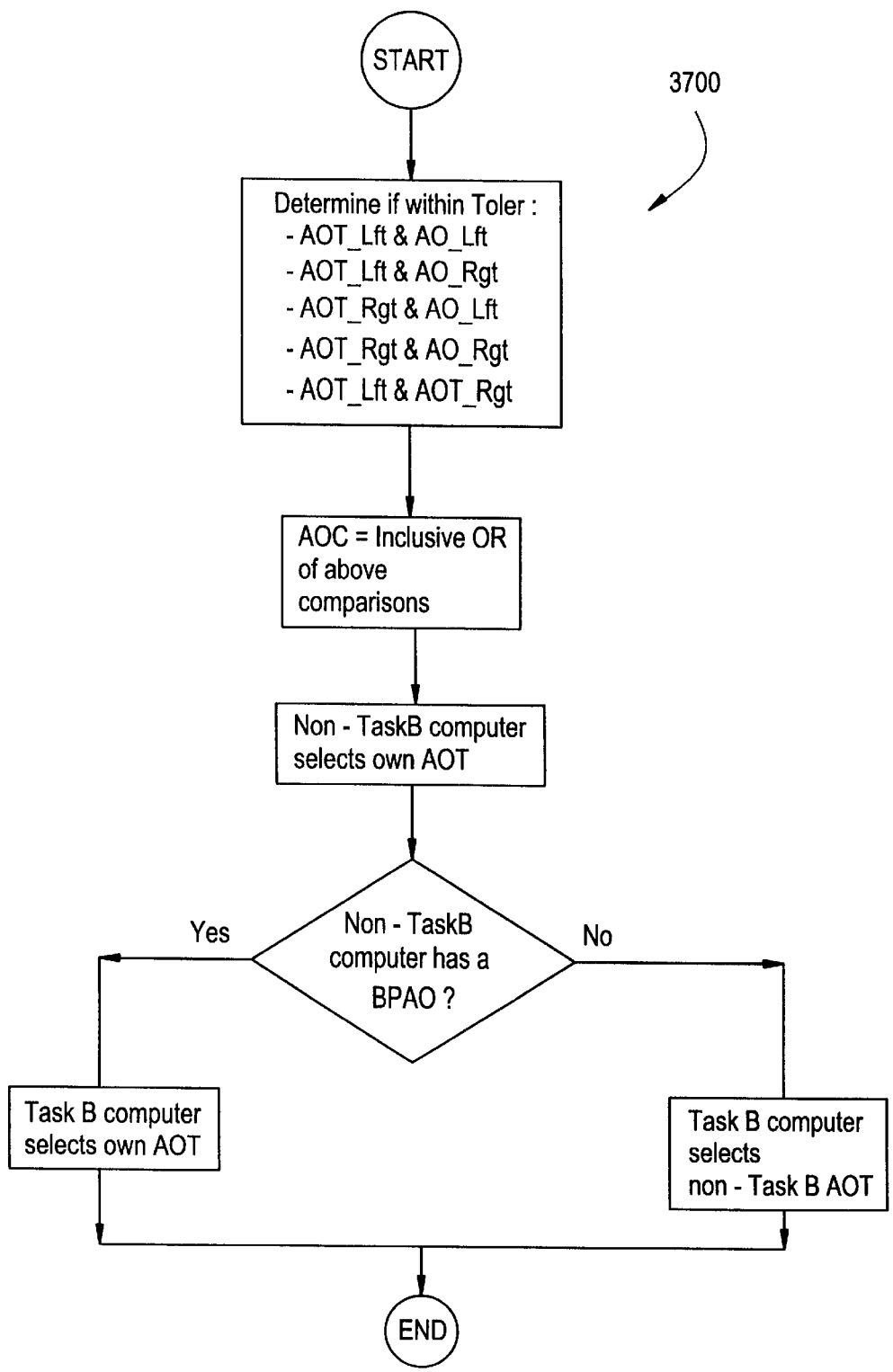
FIG. 31 presents a flowchart of analog output track signal functionality in the executable Machine Operation Code when each of two control computers executes a different application program version from the other control computer.

In AOT Hz1 Step 2518 and DOT Hz1 Step 2520, the AO (analog output) track and DO (digital output) track voltages are read into data values as they exist on the output wires from control computer 10 and as they actively drive the signal to the same field device (preferably in an actively redundant manner). "Active redundancy" involves the simultaneous impression of output voltages from each of redundant control computers 10a,b (or field control computers) to the field device. When triply redundant Remote Field Unit 314 is used as described in 69Glaser et al., three output voltages from each of the actively redundant field control computers are impressed to the field device (with impedance stability being managed as described in the 69Glaser et al. patent). When dual control computers 10a,b (control computers 14 as noted at column 6 lines 20–24 and shown in FIG. 1 of 69Glaser) generate analog and digital outputs directly to the field device, two output voltages from each of the actively redundant field control computers are impressed to the field device (with impedance stability being managed by an operational amplifier). In the latter (dual) case, the track value is based upon the concurrent and simultaneous impression of two voltages on the same wire to the analog or digital field device. The track value is read into each control computer 10 for further comparison with the output value that is being sent from that particular control computer and is useful in ascertaining the contribution of the individual control computer to the signal derived from both control computers 10a,b operating as a unified system. In the triple field control computer case, the track value is based upon the concurrent and simultaneous impression of three voltages on the same wire to the analog or digital field device; the track values are monitored and managed as described in 69Glaser. A track value measures the voltage from the computer control system being impressed to a control device in the apparatus 84 being controlled. Projecting forward to ARBLNK Hz1 Step 2526 and its TrackArb Step 2604, if no board problems are indicated from diagnostic data, and the value of the analog output track voltage values from both control computers 10a,b respective to a particular field device are within 1.5 percent of each other, then the Left control computer's analog output track voltage value is used in the database of both control computers. If a board problem is indicated from diagnostic data, the analog output track voltage value from the control computer 10 without the board problem is used. If no board problems are indicated from diagnostic data, and the value of the analog output track voltage values from both control computers 10a,b are more than 1.5 percent in difference, then the lowest analog output track voltage value is used in the database of both control computers. If no board problems are indicated from diagnostic data, and the value of the analog output track voltage values from both control computers 10a,b are more than 1.5 percent in difference, and the two analog output track voltage values out of tolerance with the analog output values, and one control computer is in Task B mode, then the analog output track voltage value from the control computer 10 not in Task B is used in the database of both control computers. If no board problems are indicated from diagnostic data, and the value of the analog output track voltage values from both control computers 10a,b are more than 1.5 percent in difference, and the two analog output track voltage values out of tolerance with the analog output values, and one control computer is in Task D mode and the other control computer is in Task F mode, then the lowest analog output track voltage value from the two control computers 10a,b is used in the database of both control computers. FIG. 30 presents a flowchart 3600 of analog output track signal management in the executable Machine Operation Code with Task B routine step 3601 referencing the flowchart 3700 of FIG. 31 presenting a further flowchart of analog output track signal functionality in the executable Machine Operation Code when one of the control computers is in Task B.

Turning now to a consideration of the digital output case, if no board problems are indicated from diagnostic data, and the value of the digital output track logical values from both control computers 10*a,b* respective to a particular field device agree, then the Left control computer's digital output track voltage value is used in the database of both control computers. If no board problems are indicated from diagnostic data, and the value of the digital output track logical values from both control computers 10*a,b* respective to a particular field device do not agree, then a zero digital output track logical value is used in the database of both control computers. If a board problem is indicated from diagnostic data, the digital output track voltage value from the control computer without the board problem is used. If a board problem is indicated from diagnostic data in both control computers, a zero digital output track voltage is used.

In Board Check Count Hz1 Step 2521 a total is defined for boards having diagnostic problems for maintenance purposes or for a shift to Task 4 if a threshold value is exceeded.

In the next AOFCPY Hz1 Step 2522 of the Hz1 cycle, AO (analog output) track and DO (digital output) track values which have been acquired are copied into Data Memory and Shadow Data Memory 14 for access in "raw" form. In this regard, in ARBLNK Hz1 Step 2526, analog track values are arbtitrated and digital output logical values are arbitrated to derive track values for use in the logic of the control programs. A separate copy of "raw" values read by the individual control computers 10*a,b* prior to arbitration in ARBLINK Hz1 Step 2526 is used in troubleshooting.

The Hz1 cycle continues from AOCPY Hz1 Step 2522 to MONITOR Hz1 Step 2524 to execute diagnostic checks respective to hardware affiliated with each of the control computers. Some of these diagnostics execute once each Hz1 cycle; some of these diagnostics require several Hz1 cycles to fully execute, and a portion of those particular diagnostics are implemented in each Hz1 pass through MONITOR Hz1 Step 2524. One method executed in MONITOR Hz1 Step 2524 implements a check of A/D 607 and D/A 605 on I/O Cable Driver Board 601 (FIGS. 3A and 3B). This method calculates a test value each second based on the values of the real-time minutes and seconds clock such that the test value starts at the minimum value of the range of D/A values and progressively increases throughout the hour up to the maximum value of the range of D/A values at the end of the hour. This test value is output by D/A 605 and converted by A/D 607 with the converted value being compared to the output test value to determine that the circuitry is operating correctly. MSIVAL Hz1 Step 2525 is a diagnostic determination step to establish a value for use in input button validation and accuracy in Hz1 Step 2536.

The first instance of MLA time critical link Hz1 Step 2575 then executes to gather data useful for enabling other systems to estimate CPU utilization of the control computer and determine available idle time in the Hz1 cycle so that a loaded program is not too large for use.

Figure 20:
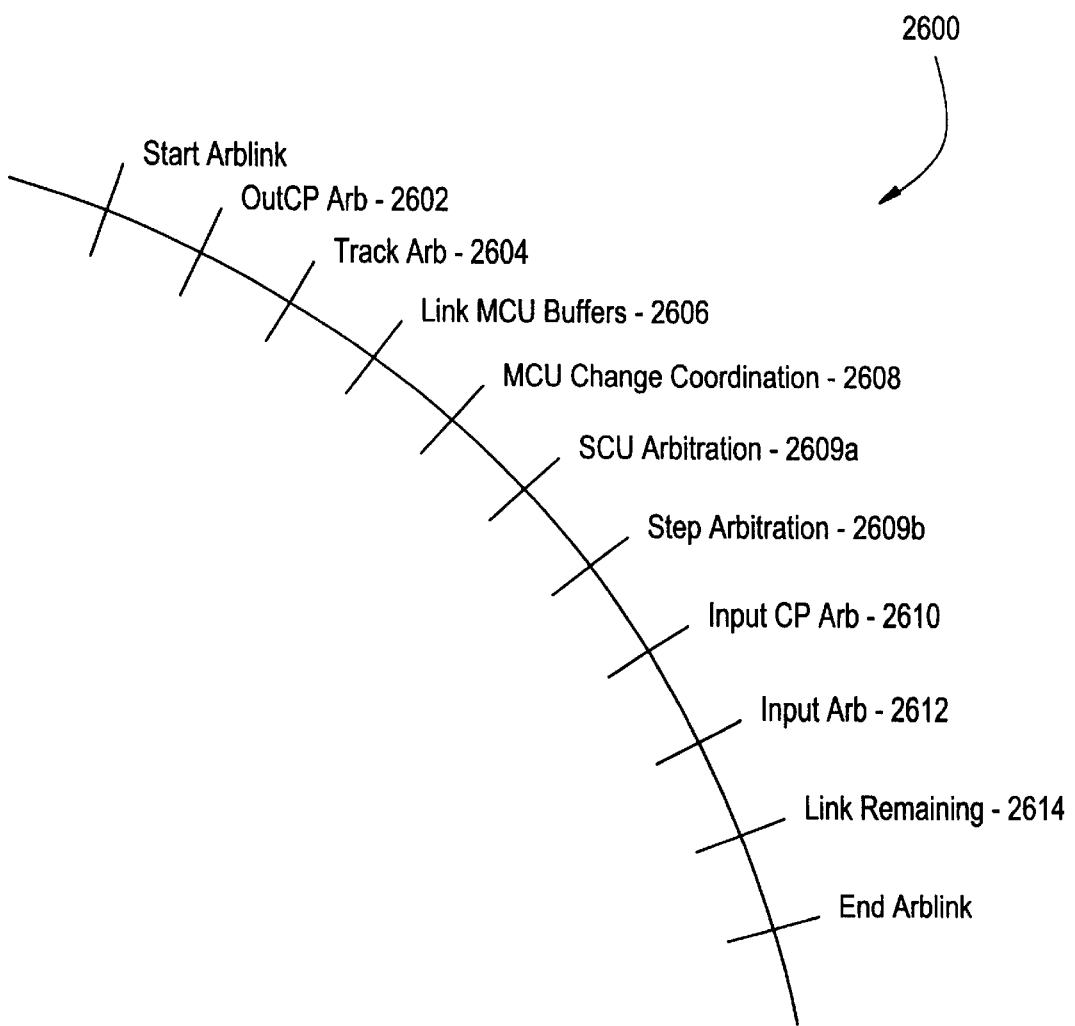
FIG. 20 provides link arbitration detail respective to the FIG. 19 overview.

Following diagnostic check Hz1 Step 2524, data exchange between control computers 10*a,b* via major link 324 executes in ARBLNK Hz1 Step 2526 to exchange data as basically described in U.S. Pat. No. 5,583,757 to Baca, Jr. et al. (see especially FIG. 1 elements 24a and 24b in Baca, Jr. et al.) and enable arbitration toward (a) definition of values for use in effecting the position of control elements and (b) arbitration diagnostics. Some modifications from the discussion of the arbitration process in that patent are discussed respective to FIGS. 15–18 in this specification. In discussion of the ARBLNK Hz1 Step 2526, FIG. 20 provides ARBLNK detail 2600.

ARBLNK Hz1 Step 2526 commences with OUTCPARB Hz1 Step 2602 which executes "change permissive" bit arbitration. In this regard, the ability for an output value to be manually overridden in software (that is, for an operating technician to input a value which overrides the value which has been defined by the executing real-time logic of the control computer program) is partially enabled by a comparison of a perceived attempt to change a value against a change permissive bit. The "change permissive" bit arbitration step ensures that both Left and Right control computers 10*a,b* agree respective to allowing a particular manual override value to be output to a control device.

Following OUTCPARB Hz1 Step 2602, TrackArb Step 2604 Hz1 Step executes to arbitrate analog and digital output track values as previously discussed with respect to steps 2518 and 2520.

In Link MCU Buffer Hz1 Step 2606, management and coordination logic is executed respective to values in input buffers interfacing the human input touch panel and the control computer database. The management and coordination logic executes to provide that both computers "agree upon" and utilize the same data in processing inputs originating from a human being through the touch pad. In MCU Change Coordination Hz1 Step 2608, values in input buffers which have been deemed useable are incorporated for control use into the database of the control computer. In this regard, further permissives are evaluated and range checking is performed on the amount of the change being defined prior to such incorporation.

As will be further detailed in the discussion of FIGS. 55–59, Hz1 cycle Steps 2609*a* and 2609*b* next execute to arbitrate SCU Process Unit Step change inputs and Process Unit Step changes from Hz1 SCU Step 2536.

Next, in a step similar to the arbitration of the output change permissive values, analog and digital input change permissive values are arbitrated in INPUT CP ARB Hz1 Step 2610. In this regard it is possible in some situations to manually override and define the value of a particular input signal into the process control program. In some cases this enables a usefully simulated value to be given to the control program without use of instrumentation during instrumentation repair. An example of this might be the temperature of the outside air where a value is not changing very frequently and is being monitored by the computer in its normal operation but is in a state of repair. However, some signals cannot be accepted in this way if they are critical to operation of the safety integrity part of the control computer program; accordingly, a change permissive is defined in the data schema of the process control program so that the manual override feature for an input value is implemented in some cases and not implemented in other cases. The INPUT CP ARB Hz1 Step 2610 in the control program (which arbitrates these change permissive values) ensures that both computers agree that a value input attempt by an operating technician is mutually executed by both computers either to accept or reject the manual override. Following this, the arbitrations are executed on all of the input signals in INPUT ARB Hz1 Step 2612 as is generally defined in U.S. Pat. No. 5,583,757 to Baca, Jr. et al. and further defined in the modifications described hereinafter for use in the safety integrity programming.

Finally, in LINK REMAINING Hz1 Step 2614, ARBLNK Hz1 Step 2526 concludes by enabling data exchange between the control computers 10a,b respective to other data needed for general coordination of the two control computers.

Figure 32:
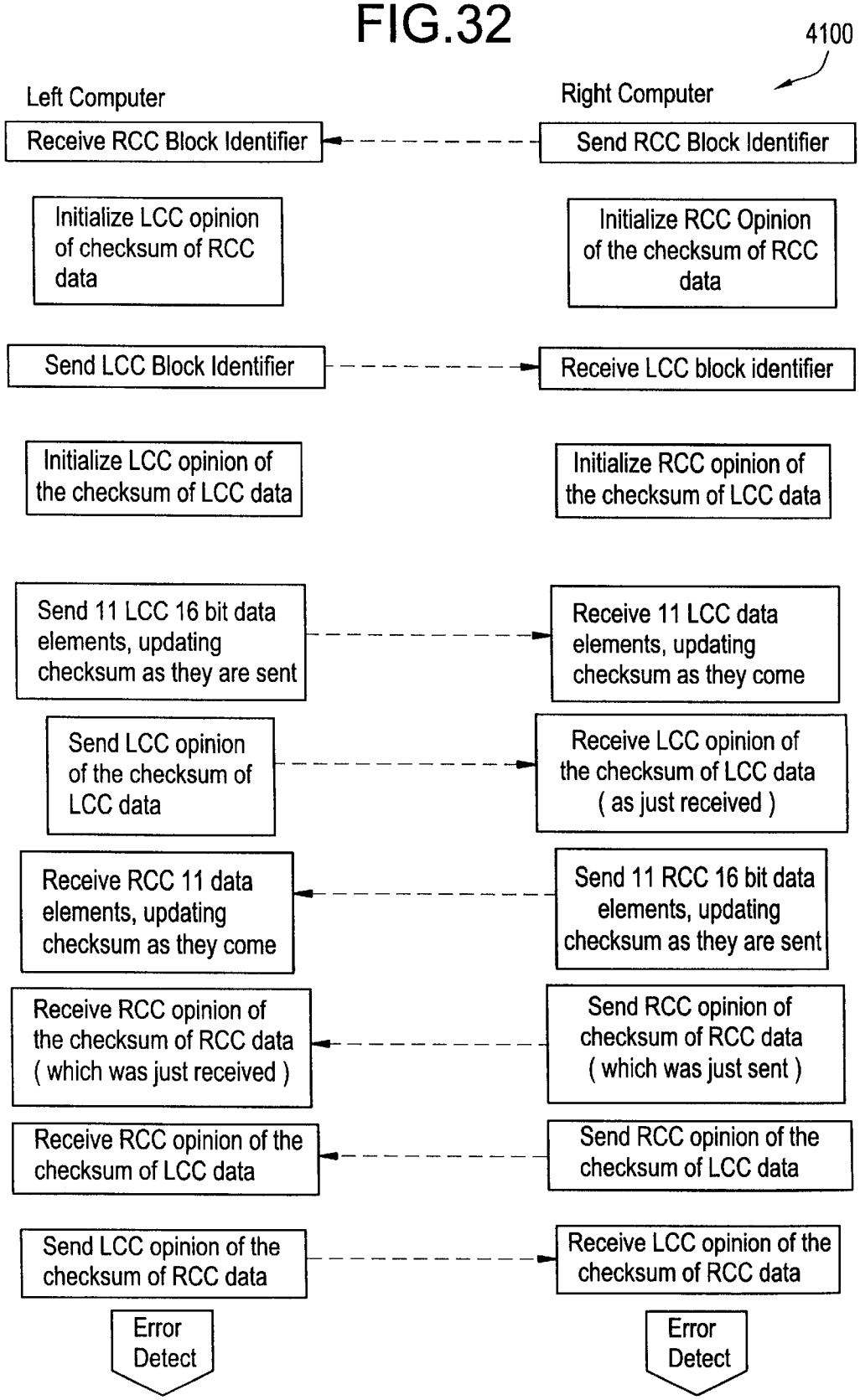
FIG. 32 presents a flowchart of the executable Machine Operation Code for exchange of data and arbitration of data between the Left control computer and the Right control computer.

FIG. 32 presents a further overview of the methodology executed in ARBLNK Hz1 Step 2526 in exchange of data and arbitration of data between the Left control computer and the Right control computer. In review of FIG. 32, the initials "LCC" refer to "Left control computer" and the initials "RCC" reference the "Right control computer". Close effective synchronization between Left and Right control computers 10a,b facilitates exchange of data blocks in Hz1 Step 2526 without use of interrupts; in this regard, the control computers align their relative position in their Machine Operation Code 150 times per second in Hz 300.

A second instance of MLA time critical link Hz1 Step 2575 then executes to gather data useful for enabling other systems to estimate CPU utilization of the control computer and determine available idle time in the Hz1 cycle so that a loaded program is not too large for use.

Following this step, any value change that was resident in the human touch pad interface is incorporated into the input buffer of the control computer in POSTLINK Hz1 Step 2530 if Hz1 Step 2608 did not execute (that is, if no partner is functioning).

AICOPY Hz1 Step 2528 then executes conditional upon the existence of Task E or Task F within a particular control computer to handle the execution of the output from digital and analog input arbitration in the case that control computers 10a,b are not simultaneously executing the control program in actively redundant mode.

Step Advance Hz1 Step 2531 then executes to handle all Process Unit Step changes respective to all SEQUENCES for this Hz1 pass as is further discussed with respect to FIGS. 55–59.

Process control data write routines execute in MDW PROCESSOR Hz1 Step 2552 respective to the descriptions in U.S. Pat. No. 5,519,603 issued on May 21, 1996 entitled "Intelligent process control communication system and method having capability to time align corresponding data sets" to Allbery, Jr. et al.; U.S. Pat. No. 5,428,745 issued on Jun. 27, 1995 entitled "Secure communication system for re-establishing time limited communication between first and second computers before communication time period expiration using new random number" to de Bruijn, Ronny P. et al.; U.S. Pat. No. 5,561,770 issued on Oct. 1, 1996 entitled "System and method for determining whether to transmit command to control computer by checking status of enable indicator associated with variable identified in the command" to de Bruijn, Ronny P. et al.; U.S. Pat. No. 5,568,615 issued on Oct. 22, 1996 entitled "Stealth interface for control computers" to Sederlund, Edward R. et al.; and U.S. Pat. No. 5,631,825 issued on May 20, 1997 entitled "Operator station for manufacturing process control system" to van Weele, Leonardus A. et al. In reference to the unique identifier described at column 17, lines 25–42 in U.S. Pat. No. 5,568,615, in the preferred embodiment, the version identifier respective to a Data Write Message (MDW) is evaluated by both Fox and Dog control computers independently.

MSI is an abbreviation in the preferred embodiment for "MCU" and SCU" "Interface" Panel, a physical panel which holds both the MCU and SCU touchpads as well as a set of liquid crystal alphanumeric variable displays which are driven to show the results of logic executed in the Machine Operation Code of MSI Hz1 Step 2534. MCU Hz1 Step 2532, MSI Hz1 Step 2534, and SCU Hz1 Step 2536 execute to drive values to the human graphical interface to present data in alphanumeric form to the operating technician and also to acquire any values which have been established in the primary buffer for use in the next Hz1 cycle. In this regard, two types of actual input touch pads are queried (an MSI supports two SCU touch-pad interfaces, 1 MCU touch-pad interface, and 10 liquid crystal value displays per Can Motherboard in the described embodiment). The first type of touch pad (also termed the "MCU" as an abbreviation for the Master Control Unit in this specification) provides a general interface to the database of the process control machine (via the input buffers) and a second SCU touch-pad type interface area has a number of input buttons which are specific to the attributes of the SEQUENCE object described in other parts of this specification. Examples of specific inputs respective to the SEQUENCE object would include input buttons such as alarm acknowledge, emergency status force, shutdown status force, change in the particular Process Unit Step executing in that SEQUENCE, and the input of a new recipe in that SEQUENCE. A form of arbitration (Hz1 Steps 2609a and 2609b) is executed for SCU touch-pad value entries. Control computers 10a,b share information regarding SCU entries and process the entry even if only one control computer actually locates the SCU entry upon execution of the SCU buffer read routine. SCU data entered into the MSI currently selected by a Fox/Dog switch is used by both control computers after being validated by the signal measured in Hz1 Step 2525; if validation fails, an error code is output to the display read by the operating technician. The next portion of the real-time control program (READKEY 2538 as subsequently discussed) reads the status of any abort keys or hardware keys which are provided to the system for humans to activate and override protected functions. In this regard, the keys are kept under the control of the responsible supervisory person affiliated with the particular manufacturing plant. (Following this operation, the real-time logic of the process computer program evaluates and arbitrates any shutdown decisions which may have been defined by execution of the computer logic or input by humans through the "SCU" (SEQUENCE control unit) touchpad so that both computers affect shutdown if desired in a uniform and consistent manner.)

Continuing discussion of MSI Hz1 Step 2534, logic executes to drive values for alphanumeric display without any query respective to inputs from an operating technician to the "MSI" interface. However, respective to MCU (2532) and SCU (2536) Hz1 steps and the MSI physical panel, in executing the acceptance of new values into the database of the control computers 10a,b of the operating process control system, a series of exist-bits are examined. There are exist-bits for different types of variables. An exist-bit enables the definition of a non-zero value for a variable respective to that variable type. In this regard, a SEQUENCE exist-bit is provided for each SEQUENCE defined by the Application Programming engineer at the time when the source code for the Application Program respective to the Machine Operation Code is compiled. In a similar manner, each Process Unit Step, defined by the Application Program engineer, is given an exist-bit. Exist-bits also are created for analog and digital constant values which are defined as gains in control schemes, for specific timers which are created, and for those values transmitted to other systems. Alarms which are defined are given exist-bits as are analog and digital values which are calculated by the control computer and which are thereby changed dynamically in real-time by the control computer (note that the values may change dynamically, but the exist bits are constant in real-time). When either of the Fox or Dog computers has been halted and then restarted, there is an issue respective to alignment of the databases in the two computers that must be addressed. In this regard, the computer beginning to operate usually receives the values of dynamic data from the computer which has been executing the process control program to control apparatus 84. During the start-up process of the computer "coming on-line", a process executes to transfer data from the running computer to the new computer and a certain time block has to be provided for this to occur. The arbitration processes in control computers 10a,b are confounded (during that start-up time) if a variable is not provided to repress some aspects of arbitration during the time when the two computers cannot possibly have an aligned database. In this regard, a digital variable is provided which suspends the execution of the Hz1 cycle code for one second in the computer controlling apparatus 84 when the "new partner" control computer 10 is ready to receive the values of the one second changeable dynamic data from the "established" control computer 10. In the next second, the "established" computer returns to its normal operation of executing Hz1 cycle code along with Hz10 and Hz100 code. It should be appreciated from the foregoing that it is not desirable for a series of seconds to occur in adjoined sequence where the normal process control logic is not executing to execute the Hz1 logic. Accordingly, in the event that there is not sufficient time in the one second to link time critical data of the "established" operating and controlling computer to the new computer coming on-line, then the new computer coming on-line halts and a re-start of this control computer into the Hz1 cycle is prohibited and blocked for sixty seconds. This restriction on immediate re-start is put in place to minimize the number of actual suspend intervals introduced into the control computer controlling apparatus 84.

Figure 33A:
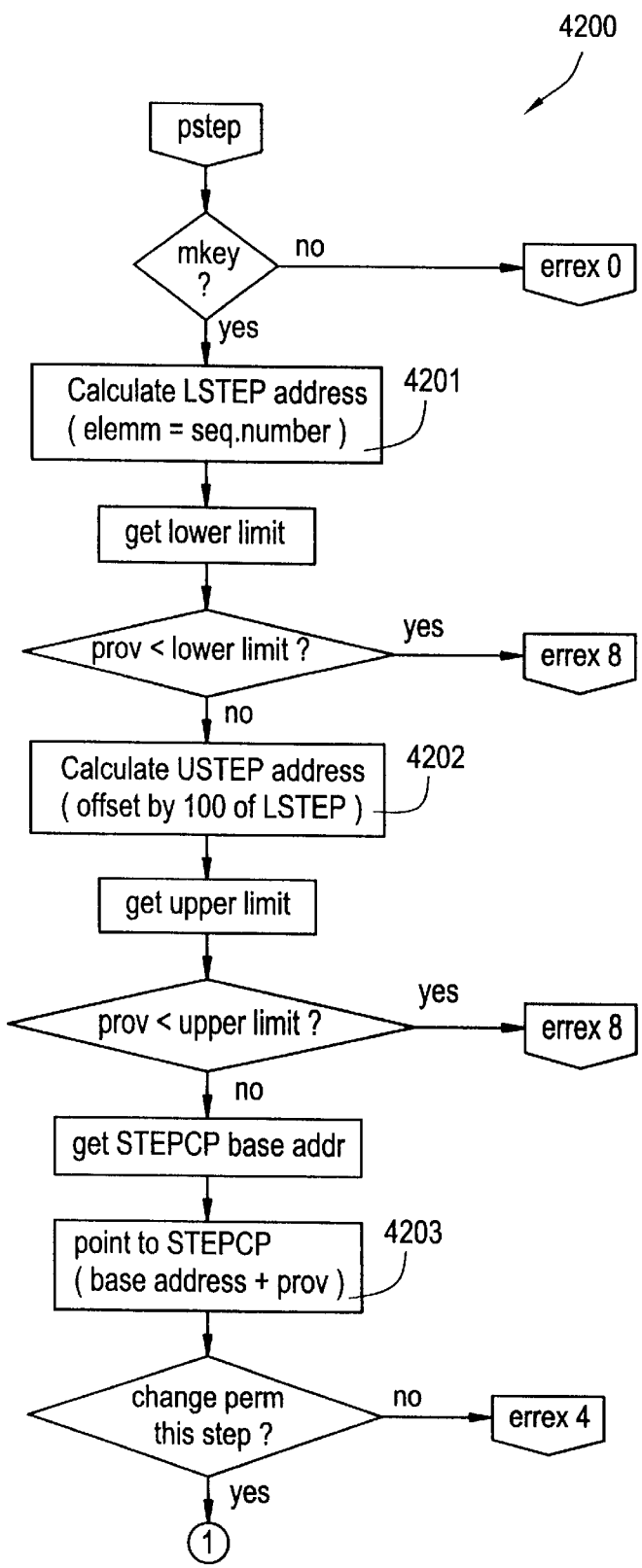
FIGS. 33A and 33B present a flowchart of the executable Machine Operation Code for implementing Process Unit Step changes input by an operating technician to the Master Control Unit of a control computer.
Figure 33B:
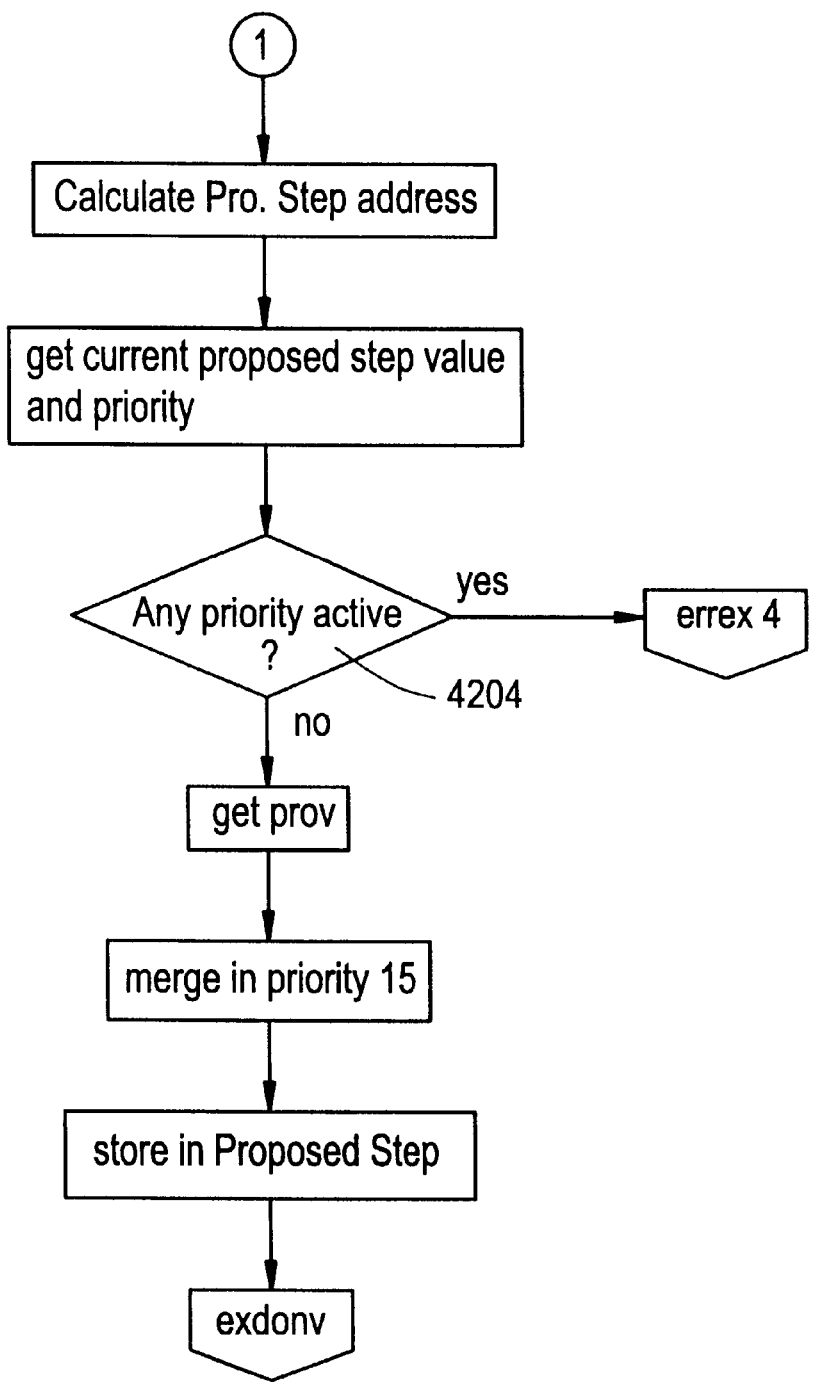

FIGS. 33A and 33B show further detail in methodology for interfacing control computer 10 to the SCU in SCU Hz1 Step 2536. In this regard, steps 4201 and 4202 show the variable USTEP and also variable LSTEP. These two variables refer to "upper step address limit" and "lower step address limit", respectively. In step 4203, reference to variable STEPCP refers to the "step change permissive", a variable in the database of the control computer regulating change by an operating technician of the active Process Unit Step from the Process Unit Step which has been defined at any particular moment by the control computer to a new Process Unit Step desired by the operating technician.

In method step 4204, the reference in the commentary to "priority" is partly to the JSTEP function call (a reference to a stinted-shutdown object type); the JSTEP function call is given active status conditionally respective to certain emergency status indicators, as further defined by alarm types or operating technician inputs. The definition of an active JSTEP function call status overrides any Process Unit Step Hold status in the SEQUENCE to initiate the modification of the dynamic state of apparatus 84 to (or toward) a Process Unit Step used in defining an operational state considered to be of less risk than "normal" operation. In this regard, the dynamic and comprehensive status of apparatus 84 might be such that complete and immediate cessation of dynamic fluid operations is not the safest course of action in some emergency contexts, but that, rather, an interim reduced risk state of operations (for example, without limitation, controlled cooling and controlled deceleration of the rate of fluid flow within the system) optimally defines a preferable approach (as an alternative to complete de-energerization of all control elements) in achieving the best safety in operation of apparatus 84 given that normal operations cannot be sustained. A metaphor in readily appreciating the approach facilitated by the JSTEP function call is of an aircraft which has experienced in-flight significant airframe vibration; the preferable corrective action in such a situation is not usually the immediate cessation of all engine operation, but rather the reduction of engine loading to a moderate level so that stress on the airframe is somewhat relieved and a controlled landing is effected. In effect, a "stinted" (that is a "restrained", "limited", and "restricted") operational shutdown of the aircraft is therefore being effected. Similarly, a "stinted" (that is a "restrained", "limited", and "restricted") operational shutdown of apparatus 84 under control is effected by the control computer 10 in response to the JSTEP function call when asserted as TRUE and when the Application Program in Hz1, Hz10, and Hz100 execution provides computer-executed logic for responsive movement to a Process Unit Step respective to the JSTEP function call. The JSTEP function call is therefore an attribute and data-logical object of the SEQUENCE and is utilized to initiate a stinted-shutdown modification in the characterized operational manner in which apparatus 84 is controlled by control computer 10. As such, the JSTEP function call constitutes a stinted-shutdown status process control object. In managing the many levels of the shutdown imperative, the present invention provides for a stinted-shutdown status process control object type having a priority attribute parameter supporting a plurality of (that is, five) priority levels.

Continuing with the Hz1 cycle of FIG. 19, READKEY Hz1 Step 2538 executes logic to evaluate the status of a hardware abort switch, the position of the Fox/Dog select switch for the MSI panel (defining which partner's values are displayed in the MSI/MCU/SCU interface for that Can), and the MCU key (used for modifying certain variables).

ADCCHK Hz1 Step 2540 executes to coordinate the action of locally generated diagnostics that institute a computer halt.

In RHM Hz1 Step 2542, the status of data respective to diagnostics which have been calculated in Remote Field Units 314a,b are acquired to handle data requests from a process information system.

In COMMUNICATIONS SECTION Hz1 Step 2544, high priority communications to other control computers are formulated for conveyance in Hz1 Step 2508.

Conditional Hz1 Bypass Step 2545 then executes for use in startup operations when a new partner is implementing Task D or B entry to facilitate essential alignment (that is, loose synchronization in real-time). The purpose of this routine is to provide an additional amount of time, if necessary, to coordinate a starting-up computer with the running (Task E or F) computer. If the transfer of the coordinated data has not completed by the time this routine executes, then execution of code respective to the space between Hz1 Steps 2546 and 2548 is skipped for one second in the running computer. The time that would have been used for the interim is available for transfer of the coordinated data to the new partner.

A third instance MLA time critical link Hz1 Step 2575 then executes to gather data useful for enabling other systems to estimate CPU utilization of the control computer and determine available idle time in the Hz1 cycle so that a loaded program is not too large for use.

At this point, the real-time process computer code executes all code related to each of the SEQUENCEs beginning with START SEQUENCE Hz1 Step 2546. In this regard, each SEQUENCE has usually four subsections of code which are executed. The first subsection of code is related to any special calculations which might be appropriate to that particular SEQUENCE. The second subsection of code in each SEQUENCE is the definition of alarms for that SEQUENCE. The third subsection of code is directed to execution of Process Unit Step termination logic and Process Unit Step definition logic for the SEQUENCE. The final subsection of code is directed to the determination of outputs for that particular SEQUENCE and proceeds in two subpieces. The first subpiece is directed to the definition of all digital outputs which are affiliated with that SEQUENCE, and the second subpiece is directed to analog outputs which are affiliated with that particular SEQUENCE. The execution of the SEQUENCE logic is usually the largest single time chunk in the Hz1 execution, and it executes the specific logic for a particular instance of controlled apparatus 84 that is essentially written by the control engineer affiliated in accountable and responsible management for the apparatus.

At the end of the execution of all SEQUENCE logic as denoted by END SEQUENCE milestone 2548, a fourth instance MLA time critical link Hz1 Step 2575 then executes to gather data useful for enabling other systems to estimate CPU utilization of the control computer and determine available idle time in the Hz1 cycle so that a loaded program is not too large for use.

ADIAG Status Hz1 Step 2549 then executes on analog values in 16 bit form to store status data in variables for optional reference in the Application Program.

SGCOPY Hz1 Step 2550A next executes to provide communications to the graphical interface described in the Clement patent. FIGS. 34A1–34A3 and 34B–34E present further detail in the method executed in SGCOPY Hz1 Step 2550A. In this regard, "FIG. 34" represents FIGS. 34A1–34A3 and 34B–34E as one unified method. In discussing "FIG. 34", references to "SG", as for instance noted in method step 4401, is to the concept of the serial graphics system as described in U.S. Pat. No. 5,726,668 (Clement) issued on Mar. 10, 1998 and entitled "Programmable graphics panel" to John L. Clement. The reference in method step 4402 to C-REG is to the C register as is also done in method step 4403 where there is also a reference to D-REG which references the D register. These registers are denoted in the specification as drawing elements 104 and 106 in FIGS. 21A and 21B. In a similar manner, in step 4406, reference is made to the E-REG for the E register as shown in element 2713 of FIGS. 21A and 21B; and, in method step 4405, reference to the X-REG is to the X register as shown in element 2712 of FIGS. 21A and 21B. The reference in step 4408 to CC format is a reference to the control computer format that is appropriate to the database of the control computer in characterizing the variable ADIAG, a 36 bit variable periodically received from the serial graphics system.

SG Status Hz1 Step 2550B executes to handle graphic bulb action on the serial graphics panel.

The MTHTST Hz1 Step 2554, HW DIAGNOSTICS Hz1 Step 2556, REAL-TIME CSUM Hz1 Step 2557, and WDSTATUS Hz1 Step 2559 are directed to diagnostic tests and health tests respective to individual control computers 10a,b where (a) power levels and reference voltages are measured and compared to acceptable reference values and (b) internal tests execute to ensure that the CPU 12 is creating a predictable result from signature routines which execute to confirm proper execution of the logic and arithmetic circuits in the system. In implementing HW DIAGNOSTICS Hz1 Step 2556, the method for monitoring Watchdog 603 is indicated in FIG. 35. In this regard, as in step 4501, WD references the Watchdog 603. In step 4501, reference is also made to a "heartbeat" the signal which predictably alternates each second in Watchdog 603 and is conveyed via Data Bus 18 to CPU 12. In Step 4501 the datalogical compliment of this predictable signal from Watchdog 603 is evaluated in CPU 12. In step 4502, the Watchdog 603-time-out flag is the same as the latched error flag on Data Memory circuitry 1099, as has been previously discussed in this specification. REAL-TIME CSUM reconfirms the CRC at least about every 3 hours as the control program Machine Operation Code executing in the computer is compared with the program that was loaded into the computer by use of a cross-check of a CRC (cyclic redundancy check) affiliated with the logic at the time of load with a CRC determined at a recent moment of real-time.

In DOOUT Hz1 Step 2558 and AOOUT Hz1 Step 2560, digital outputs are generated to the field interface hardware affiliated with the control computers, and analog output signals are output to the field devices via affiliated analog output processing hardware.

The routine for BULB Hz1 Step 2562 executes to activate and deactivate light bulbs used for depicting to the operating technician the status of different data values in the process control system.

The PROGLNK Hz1 Step 2564 executes logic directed to the implementation of activities associated with either Task A or Task C as further referenced in this specification.

A diagnostic summary routine then executes in DDIAG Hz1 Step 2566 on individual bit data to simplify diagnostic data respective to general operation of the system into key individual digital (TRUE or FALSE) reference values for optional access in the Application Program.

The HZ-INFINITY Hz1 Step 2570 of the real-time control logic executes general communications which do not have to be fully effected within any one particular second but which execute in the time available in the execution of a particular Hz1 cycle within one second of real-time process control logic.

MIFDRV Hz1 Step 2568 is the first routine to execute in HZ-INFINITY Hz1 Step 2570 to assimilate and enable the exchange of data with the process control communications interface described in U.S. Pat. Nos. 5,519,603; 5,428,745; 5,561,770; 5,568,615; and 5,631,825. This routine also executes in each Hz10 cycle.

Following this, a final routine in the ENDSS Hz1 Step 2572 executes to strobe the process control communication interface as described in U.S. Pat. Nos. 5,519,603; 5,428, 745; 5,561,770; 5,568,615; and 5,631,825 signaling the end of the Hz1 cycle to the interface.

The computer then finishes the Hz1 execution with HZ-INFINITY Hz1 Step 2570 operations (while continuing other Hz10 cycle and Hz100 cycle executions) to wait for the beginning of the next second of real-time and initiation of the next Hz1 cycle with BEGINNING OF SECOND Hz1 Step 2502.

Logic which executes in either Hz10 or Hz100 in the control computer executes intermittently at the appropriate interim times as the logic of the Hz1 cycle executes. In this regard, Hz10 logic executes on signals to read signals and process derived logic and output signals without arbitration occurring in the Hz10 or Hz100 time frames except as described further in this specification.

Figure 36A:
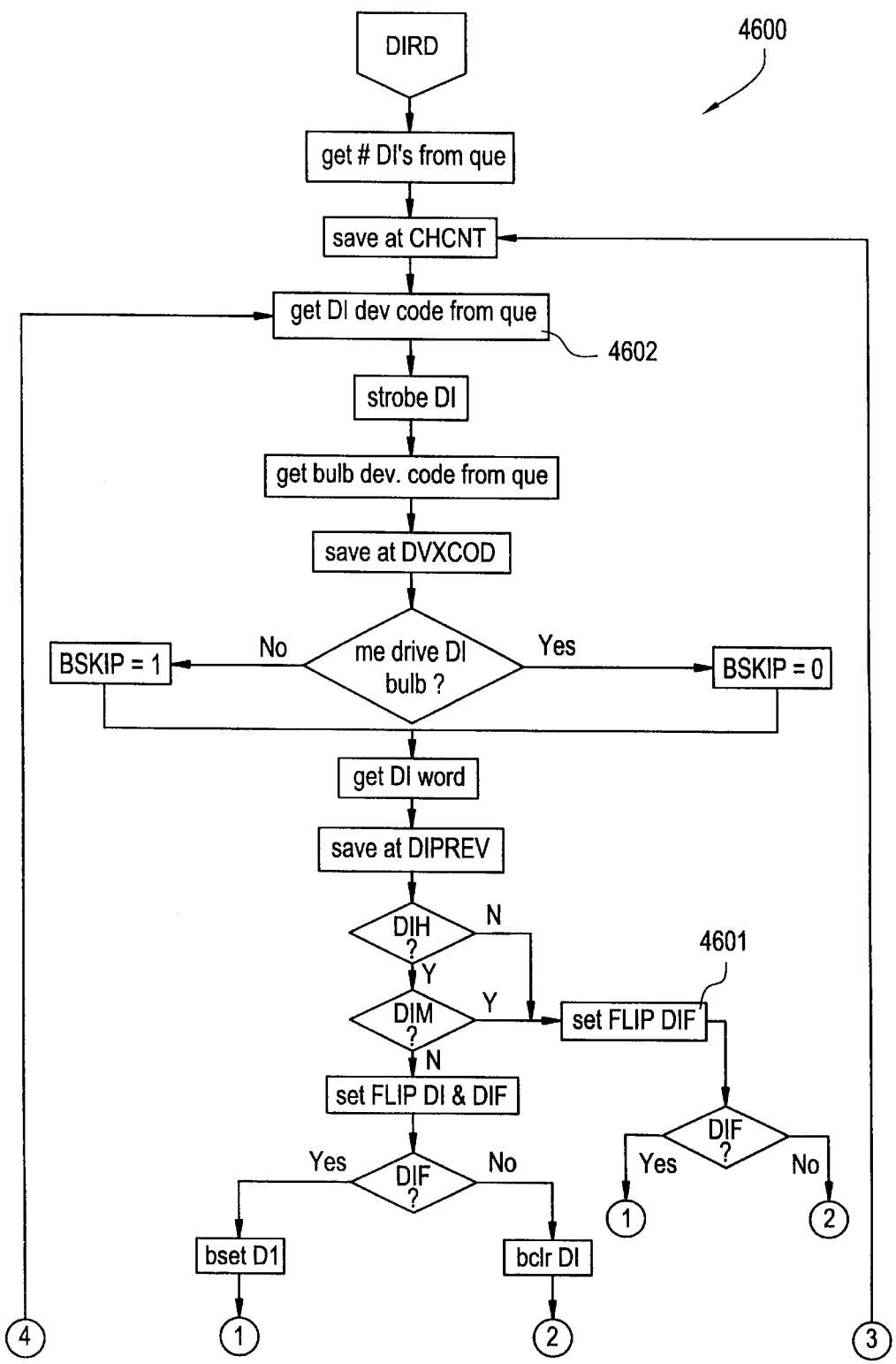
FIGS. 36A and 36B present a flowchart of the executable Machine Operation Code for DIREAD (digital input read) and DIFREAD (digital input field value read) functionality in Hz10.
Figure 36B:
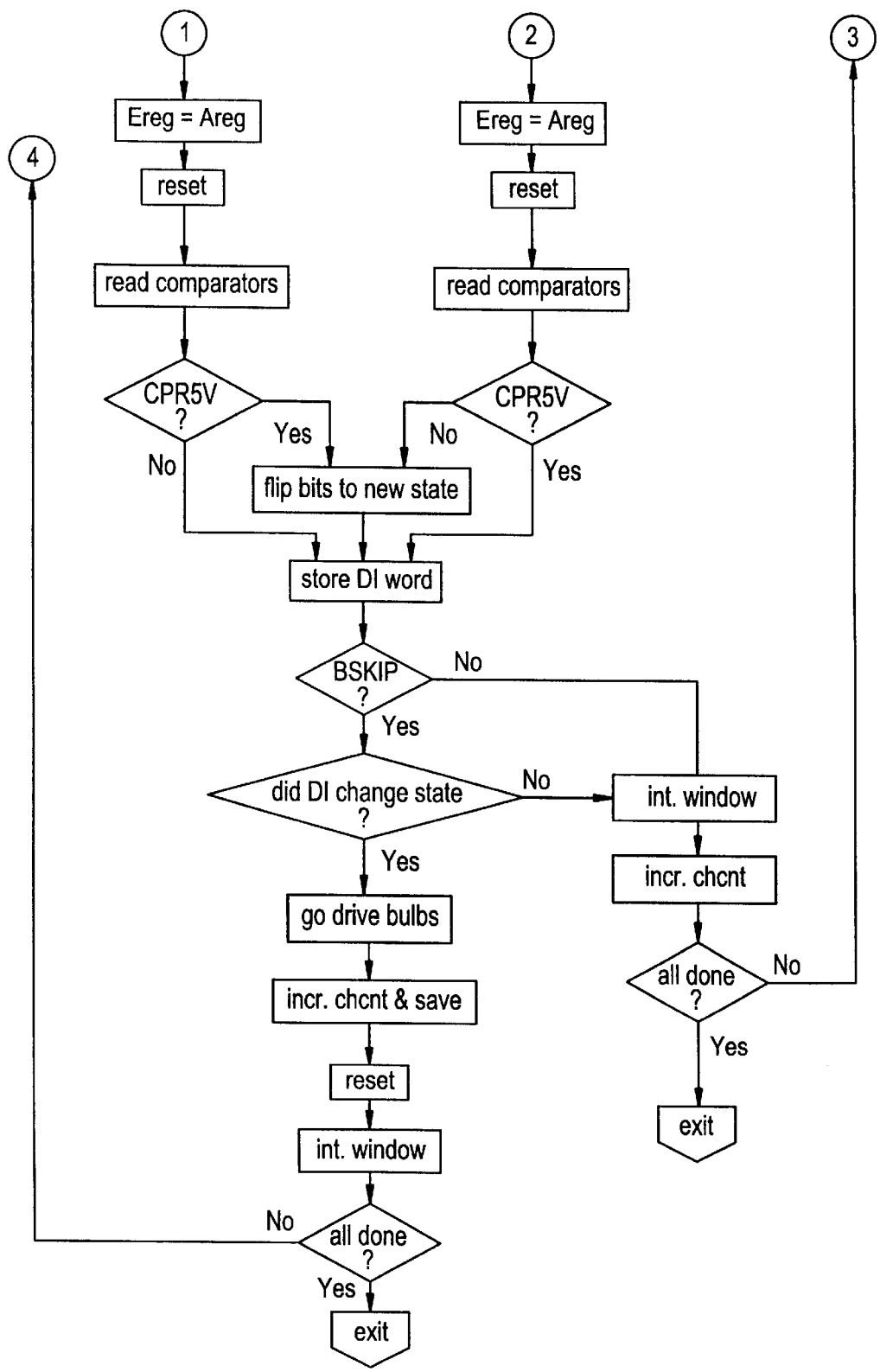
Figure 37:
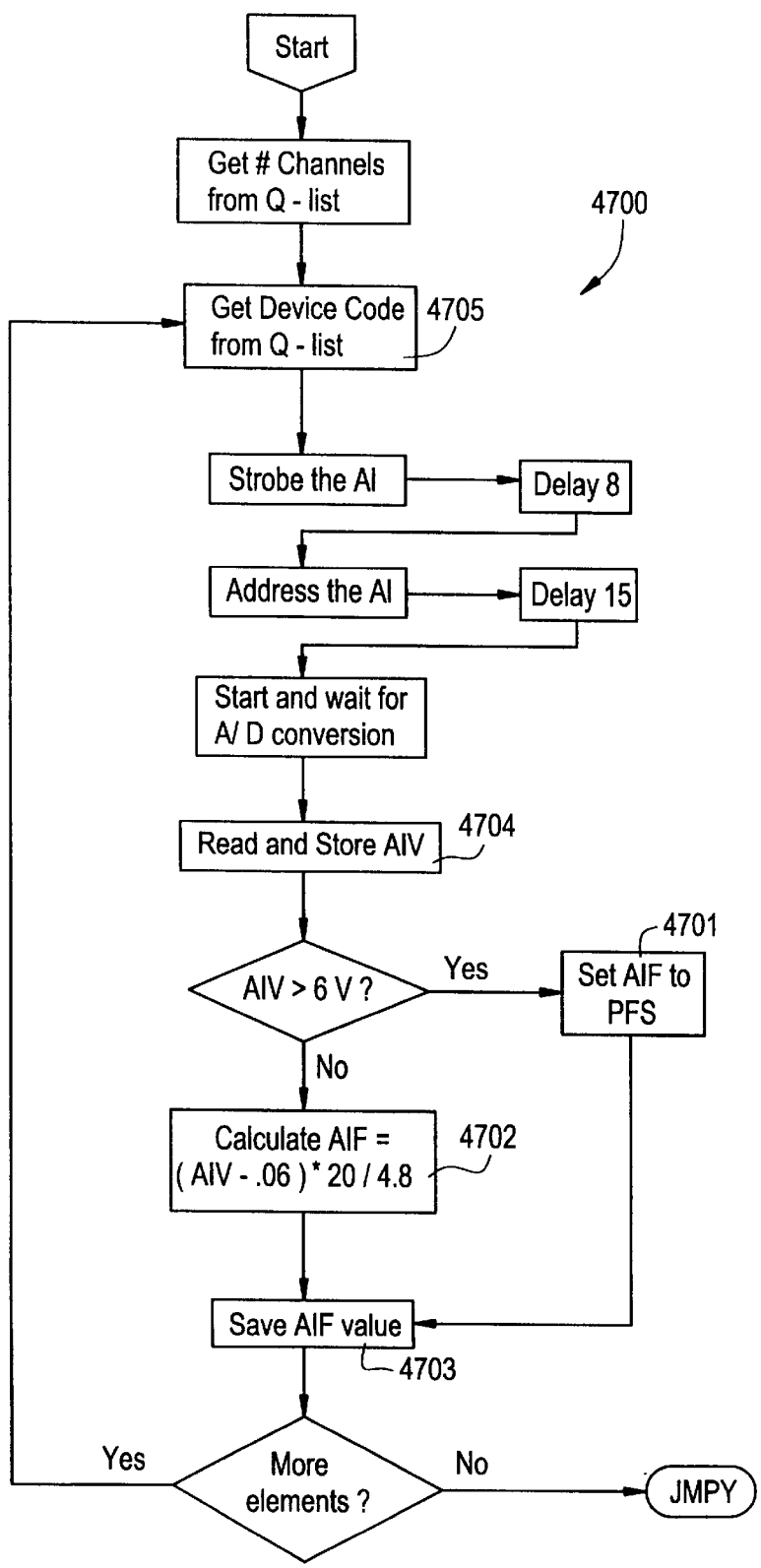
FIG. 37 presents a flowchart of the executable Machine Operation Code for AIREAD (analog input read) and AIFREAD (analog input field value read) functionality in Hz10.

Hz10 time frame logic respective to safety aspects is depicted in FIGS. 36A, 36B, and 37. FIGS. 36A and 36B describe the logic related to DIREAD (digital input read) functionality and FIG. 37 is logic which executes with respect to AIREAD (analog input read); logic of MIFDRV Hz1 Step 2568 also executes in each Hz10 cycle. DIREAD references reading of digital inputs, and logic of FIGS. 36A and 36B executes in the control computer to enable monitoring and reading of digital inputs in Hz10 or Hz100. If a change in a digital input occurs within a particular read frame, it is immediately trapped and utilized for execution in Hz1 logic. In this regard, the use of DIREAD and DIFREAD occurs in Hz10 and Hz100 logic cycles (even as the acquired data is used in Hz1) so that the digital input is timely available in updated form when it is referenced is effected essentially without delay (that is, without waiting for a full one second Hz1 cycle to have completed and for the next Hz1 cycle to have initiated). In this regard, response to a digital input change can occur within the same second in which it was initiated so that rapid response of control computers 10*a,b* to effect change in apparatus 84 is affected within time frames necessary for a certified safety shutdown system. FIGS. 36A and 36B show logic for implementing the functionality respective to digital inputs, and FIG. 37 shows logic for implementing similar functionally for an analog input. The DIH value is set TRUE by the Compiling Translator if DIREAD is defined in the Application Program for a digital input; this suppresses arbitration and diagnostic reporting on Digital Inputs so declared. The DIH being set to FALSE implements arbitration and diagnostics on the Digital Input value once per second respective to the latest Digital Input acquired in (for example) Hz10 prior to reading of the acquired Digital Input value by the arbitration logic. The analog input is stored in an AIF variable, as indicated in steps 4701, 4702 and 4703. The AIF stands for "analog input field" value. The AIV, referenced in step 4704, relates to the "analog input voltage" as a raw voltage which has just been digitized but has not been necessarily scaled to a scale factor value (in this regard, it should be noted that analog variables in the database of control computers 10*a,b* are stored in fixed-point format with a affiliated scale factor for use in spanning and communications). In FIGS. 36A and 36B, at step 4601, the aforementioned changing in the value of a digital input is sensed and queried. The intent of the routine is to establish a system for updating the value in the database of the digital input so that it is used as soon as possible in the Hz1 cycle after the value has changed. However, in this regard, since the Hz1 cycle executes only once per second, a digital input being acquired in this manner may not actually be effecting an output within a Hz10 time frame but within one second of the time when it is acquired. This is superior to the prior case where a digital input was only queried once per second and then used in the logic executing in that second. In that regard, if a digital input is acquired only once per second it is possible for a two second time period to transpire between (a) the time when the conditions defining the digital input actually changed in the field apparatus under control by the control computer and (b) the time when that digital input would effect an output from the control computer (this occurs when the change in apparatus condition occurs immediately after the moment of read for a particular digital input and when the use of the digital input occurs shortly before digital input read). When the digital input is being queried ten times per second, the maximum amount of time which could transpire in the Hz1 cycle between when the digital input was acquired and when it affected a digital output to the field would be one second. In a similar manner, in FIG. 37, the updating of the value of the AIF to the latest value as represented in apparatus 84 within a period of 1/10 of one second enables the use of that change in the value of the attribute being monitored by that analog input to control computer 10 within the same second in which it occurred. If the analog input value were only being queried once per second, an analog input (which had changed respective to the attribute being measured in apparatus 84 shortly after analog input read in the prior second) would not affect an output until (a) the prior second's program had expired, (b) the analog input had been queried in the following second, and (c) the analog output respective to the analog in put had also been determined in the subsequent second. In FIGS. 36A and 36B, the reference to "queer in method step 4602 is a reference to a read from Q Memory 108, as indicated in FIG. 12, at drawing element 108. In a similar manner, in FIG. 37, the access to the Q-list in method step 4705 also points to Q memory and to the information stored in Q Memory 108 in FIG. 12 at element 108. FIG. 12 Q Memory 108 is contained in Q&C Memory And Q&C Shadow Memory 36 in FIG. 3A.

Task B defines a special run state in control computers 10*a,b*. When a control computer is in Task B, it is executing the real-time process control program except that all outputs are set to ZERO (abort output signals, however, are set to full scale). This run state assists in startup and check out of new process control program instances by providing operations personnel with an additional means to assure the functional integrity of a new program load. While in Task B, digital and analog outputs are calculated, but the Task B control computer outputs ZERO voltages respective to those outputs to the field devices in all time domains. Abort outputs in the Task B control computer are set to full scale to provide a ground path to prevent the control computer executing Task B from "shutting down" the manufacturing process being executed in the controlled apparatus. When Task B is initiated by the operating technician from Task 4, the control computer performs startup diagnostics, proceeds to execute Task C, and then executes Task B. If a Task B control computer is then taken to Task D it does not again go through Task C, but goes directly to Task D. While in Task B, no output signal testing is performed (that is, neither the DO Test nor the AO Test are performed by the Monitor Routine in either control computer). If a Task F control computer should fail diagnostics while the companion control computer is in Task B, the Task F control computer does not halt. Note that, in SIL/SIP mode, Safety Digital Outputs fail-safe in case of a failure for the entire system via the DO Deadman as discussed in reference to FIG. 13. If one control computer 10 is in Task B, the Watchdog 603 treats the companion Task F control computer as a lone control computer (that is, the Watchdog 603 does not halt the Task F control computer). Process Unit Step arbitration for a Task B control computer is the same as if it were a Task D control computer. AI and DI arbitration is based on Left control computer to Right control computer, so new program loads are best executed in the Right control computer.

In discussion of AI and DI arbitration, further reprised reference is noted to (as mentioned earlier in this specification) modifications to the analog input signal arbitration methodology described in U.S. Pat. No. 5,583,757 to Baca, Jr. et al.; these modifications to the information disclosed in that patent are outlined in FIGS. 15, 16, 17, and 18 of this specification and the discussion related to those figures. In this regard, FIG. 15 and FIG. 18 present modifications to FIGS. 8(c) and 8(h) in U.S. Pat. No. 5,583,757 in certain conditional logic in input-signal arbitration when a control computer is in Task B).

In the preferred embodiment, each input and output (I/O) signal as well as some of the other types of variables in the process control database has an affiliated change permissive value defined by the programming engineer during the time of application source code generation. The change permissive value either enables or prohibits modification to a particular variable in the database of the executing real-time process control program from the human interface touchpad. There are times when there is a need to override this feature for I/O signals, and a software-abort physical key is accordingly provided for such times; however it should be noted that, in the preferred embodiment, change permissives for Process Unit Step movement are not overridden by use of the key. As a manner of operating procedure and discipline, the software-abort physical key is securely maintained in the custody of an accountable individual. When the software-abort physical key is turned, all I/O change permissive data values are set to a value of one. This enables all input and output signals whose values are protected by a routine which normally prohibits change from the interface used by the operating technician, as well as those not protected, to be placed in manual. As soon as the software abort physical key is restored, the change permissive data values are restored as compiled. The software-abort physical key is used when any safety override of programmed protection is implemented from either the MCU or from the Operator Station 52 and affiliated HSI described in U.S. Pat. Nos. 5,519,603; 5,428,745; 5,561,770; 5,568,615; and 5,631,825. When used, the software-abort physical key activates a call in the control program which applies to both control computers 10a,b in the system. The logic also provides Process Unit Step-change permissives to prevent a SEQUENCE from being manually placed into a certain Process Unit Step from either the MCU or SCU, and these Process Unit Step-change permissives are also defined by the programming engineer during Application Program creation.

Abort signals (DAs) are expressly calculated in the executing control program as derived from the Application Program (abort signals are individually and specifically defined by the programming engineer to handle certain situations where overriding logic and circuitry is desired for conditionally shorting specific output signal voltages to ground). Abort signals are expressed as a type of digital output signal to a switch wired to open a particular output signal to ground and thereby, upon activation, a DA establishes an open circuit removing electrical energy from the field device associated with the signal, forcing the field device to its designed fail position when calculated. But, in this regard, the abort signal is expressed in the preferred embodiment as a non-zero high voltage when the database has a value of "0" or "FALSE" for the abort signal, and the abort signal is expressed in the preferred embodiment as a zero voltage when the database has a value of "1" or "TRUE" for the abort signal; and the voltage is set to the switch immediately after computation of the value. This treatment of the abort signal is different than the treatment for other digital outputs which are expressed in the preferred embodiment as a non-zero high voltage when the database has a value of "1" or "TRUE" and as a zero voltage when the database has a value of "0" or "FALSE"; and the voltage is set to the switch in DOOUT Hz1 Step 2558. A second hardware abort key is provided to override the abort signals by providing a ground path for all connected outputs protected by a DA (to override the programmed DA safety action). In like manner to the software abort key, in use of the preferred embodiment, the hardware-abort physical key is securely maintained in the custody of an accountable individual. It should also be noted that, in the preferred embodiment, analog and digital output signal routines and circuitry output a zero signal for those channels which do not exist (were not identified by the Compiling Translator), but are on a board which does exist (and for which the Compiling Translator has established an exist-bit). Further, in the preferred embodiment, the abort signal and its affiliated digital output is calculated and driven in any of Hz1, Hz10, or Hz100.

A check is provided to ensure that Machine Operation Code related only to authorized source code programs is started in a control computer used in the preferred embodiment. The control computer is provided with a set of toggle switches which are configured to provide a specific identifying signature bit pattern respective to the particular redundantly deployed control computer pair. If the data value defined by the switches does not match a companion value specified in the instance of the Application Program authored by the control engineer and then defined by the Compiling Translator into a particular data location, control computer 10 is not able to start full execution of the Task B or Task D (and, implicitly, Task E or Task F) modes of operation. The control-computer-implemented control program verifies that the companion value specified in the instance of the Application Program matches the data value defined by the switches at start-up. If these values do not match, the control computer executes a Task 4 and displays an error code to the interface being used in the loading process.

In providing a process control system and a safety shutdown system as an integrated and combined system, the capability of the combined system (a) to effect predictable operation and (b) to provide for effective logical independence between (1) functions respective to the safety domain and aspect of the combined system and (2) functions respective to the general process control domain and aspect of the combined system is achieved through the implementation of a set of techniques in the overall logic of the system; in this regard, the collective execution of the different individual techniques in the set achieves the necessary rigor in confirming the acceptability and utility of the system as a whole, but individual techniques frequently execute in a relatively independent manner from other techniques in the set and, in many cases, may execute in any order as long as each executes at a frequency sufficient to enable acceptable predictability in the aspect(s) of the overall system addressed by the individual technique. Some of the techniques are achieved with logic as expressed in the form of classic Boolean circuitry, others of the techniques are achieved with logic effected through real-time CPU 12 execution, and still others of the techniques are achieved with logic effected through features in the Compiling Translator which converts an instance of Application Program source code into a respective instance of Machine Operation Code for execution by a control computer. For purposes of discussion, the techniques are organized in this specification into general categories of (1) start-up diagnostics executed by each control computer whenever Task D, Task E, Task F (or, conditionally, Task B) is initiated; (2) run-time diagnostics executed by each control computer while Task D, Task E, Task F (or, conditionally, Task B) are executing the Hz1 cycle in real-time after initiation is completed which are directed to confirming that (a) conditions validated by the start-up diagnostics continue in acceptable status and (b) the input and output signals are valid for use; (3) comparisons of Shadow Memory and regular memory values; (4) arbitration and alignment of Process Unit Steps between two control computers 10a,b functioning to execute actively redundant control; (5) run-time diagnostics executed by each control computer while Task D, Task E, Task F (or, conditionally, Task B) are executing the Hz1 cycle in real-time after initiation is completed which are directed to confirming that the Application Program Machine Operation Code which was intended for use by the programming engineer is the Application Program Machine Operation Code being used; and (6) enforcement of independence and "necessary domain separation" between (a) functions respective to the safety domain and aspect of the combined system and (b) functions respective to the general process control domain and aspect of the combined system.

The reader should again note that line legend conventions used in FIGS. 3A–12 are not followed in FIGS. 13A, 13B, 21A, and 21B because of spacing considerations.

FIGS. 21A and 21B present a block flow diagram of the preferred control computer showing components of importance in the execution of the diagnostic methods respective to a certified system to achieve reliable and safe operation using the control system in the context of fulfilling the requirements of the international standard for Functional Safety of Programmable-Electronic Safety Related Systems (IEC 61508).

A subset of diagnostics are identified as start-up diagnostics which are executed by each control computer in the process of initiating Task D, Task E, Task F (or, conditionally, Task B) via Task C. It should be noted that "startup" of an Application Program addresses a different aspect of startup than fundamental system boot in that it involves a series of operations which begin the active execution of particular instance of the Application Program in real-time. In this regard and with reference to FIGS. 21A and 21B, control computers 10a,b perform the following tests, with a failure of any of the following tests resulting in an effective halt of the ability of a particular control computer in proceeding into either Task F, Task E, or Task D status:

The control computer program memories are verified with a calculation of a checksum related to the memory contents every time CPU 12 is started during Task C. Control computer Q Memory 108,593 is also verified with a calculation of a checksum related to the memory contents every time CPU 12 is started during Task C.

The presence of SIP (Safety Integrity Program) Shadow Memory boards as being installed is verified if a SIP datalogical value is declared in the source Application Program. In this regard, the declaration of a SIP Application Program indicator in one embodiment initiates a check of all hardware to confirm that SIP compliant hardware is in use (in the case where the embodiment also supports configurations which use hardware which is not SIP compliant for executing Machine Operation Code from an Application Program which is not designated as having a SIP section).

The status related to a correct loading of all memories is further confirmed with a test to see if the SIP Loading Semaphore is correct every time CPU 12 is "started-up" during Task C. The SIP Loading Semaphore location is initialized with :5555 and changed to :AAAA by the Loading Assistant which transfers the Application Program into control computer 10 from a Machine Operation Code source computer on network 50 if all integrity tests have been passed respective to tests run between the Loading Assistant as it loads a new Application Program into the control computer. Any read access by the LSI (low speed interface) or HSI (high speed interface) modifies the location value to:5555 to prevent capture and reload via a loading system; this forces use of certified loading software (resident in an external system) for loading new Machine Operation Code in a manner conformant with other features in the control computer.

Program And Program Shadow Memory 16 comparator according to comparator circuit 999 is checked for output every time CPU 12 is started during Task C as discussed in reference to FIGS. 9A and 9B. Data And Data Shadow Memory 14 comparator according to comparator circuit 999 is checked for output every time CPU 12 is started during Task C as discussed in reference to FIGS. 11A and 11B.

Q&C Memory And Q&C Shadow Memory 36 comparator according to comparator circuit 999 is checked for output every time CPU 12 is started during Task C as discussed in reference to FIG. 12. Failure of the D-Memory comparator also triggers this error code because the output of the C&D Memory comparator is connected to the output of the D-Memory comparator.

ROMS 906,910 are verified every time CPU 12 is started during Task C for a correct software version indicator appropriate to SIL operations. In the preferred embodiment, ROMS 906,910 are implemented using EPROM technology.

The logic executed in Task C protects against an unverified start of a simulation program in a plant process control system by querying for a simulation status verification indicator.

In certain circumstances, the Task F computer does not execute the entire Hz1 cycle in control of apparatus 84 for a limited time of 1 second (1 Hz1 cycle) if there is not sufficient time to link during PROLINK Hz1 Step 2562. During the time when an F Task computer is transferring data to a C Task computer, F Task CPU 12 doesn't control the process but sends active data to C Task CPU 12. The time between two startup attempts must not be less than 1 minute if the Task F computer suspended process control during the prior startup attempt.

The CPU ID in the database of control computer 10 is compared to a physical switch setting for the same value to assure alignment between the intended use of the control computer and the Application Program which has been loaded.

CPU Left/Right switches in the two process computers are verified to be set to opposite values so that two Left process computers or two Right process computers do not attempt to execute control on apparatus 84.

The active link list of each process computer is compared against the link list of its neighboring process computer to assure that the Compiling Translator and operating system version match.

Compiling Translator and process computer operating system version identifiers are compared for identity.

The appropriate version identifier for the ROMs (EPROMS) are compared against the version number within the database of the loaded Application Program.

A second subset of diagnostics are identified as run-time diagnostics which are executed by each control computer after operations in Task D, Task E, Task F (or, conditionally, Task B) have been established. In this regard and with continuing reference to FIGS. 21A and 21B, control computers 10a,b each perform the following tests, with a "failure" in meeting acceptable results in any of the following tests resulting in the indicated action.

Figure 42A:
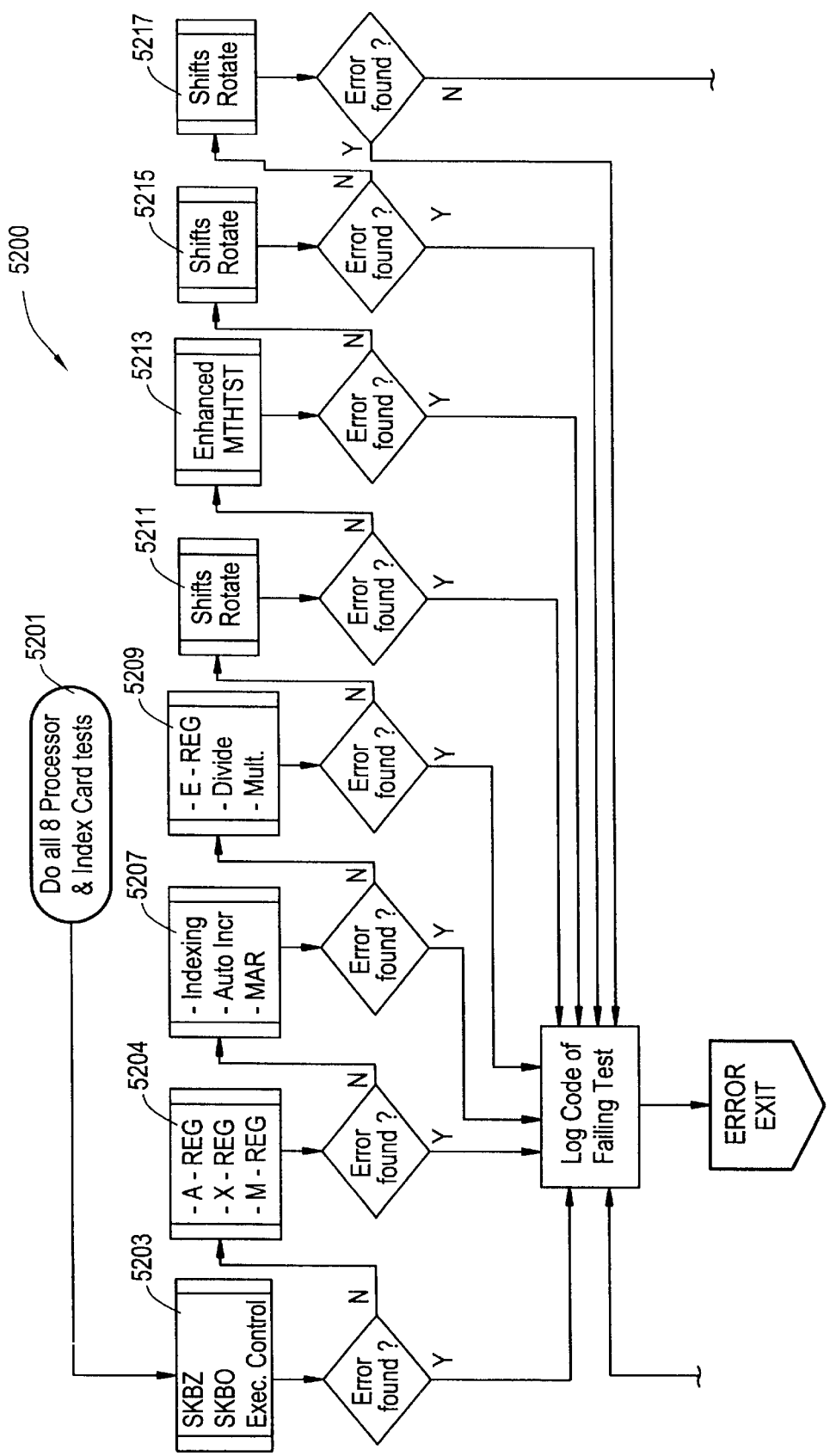
FIGS. 42A and 42B present a first nested flowchart of the executable Machine Operation Code of FIGS. 41A and 41B for the diagnostic set executed in real-time during a normal Hz1 cycle.
Figure 42B:
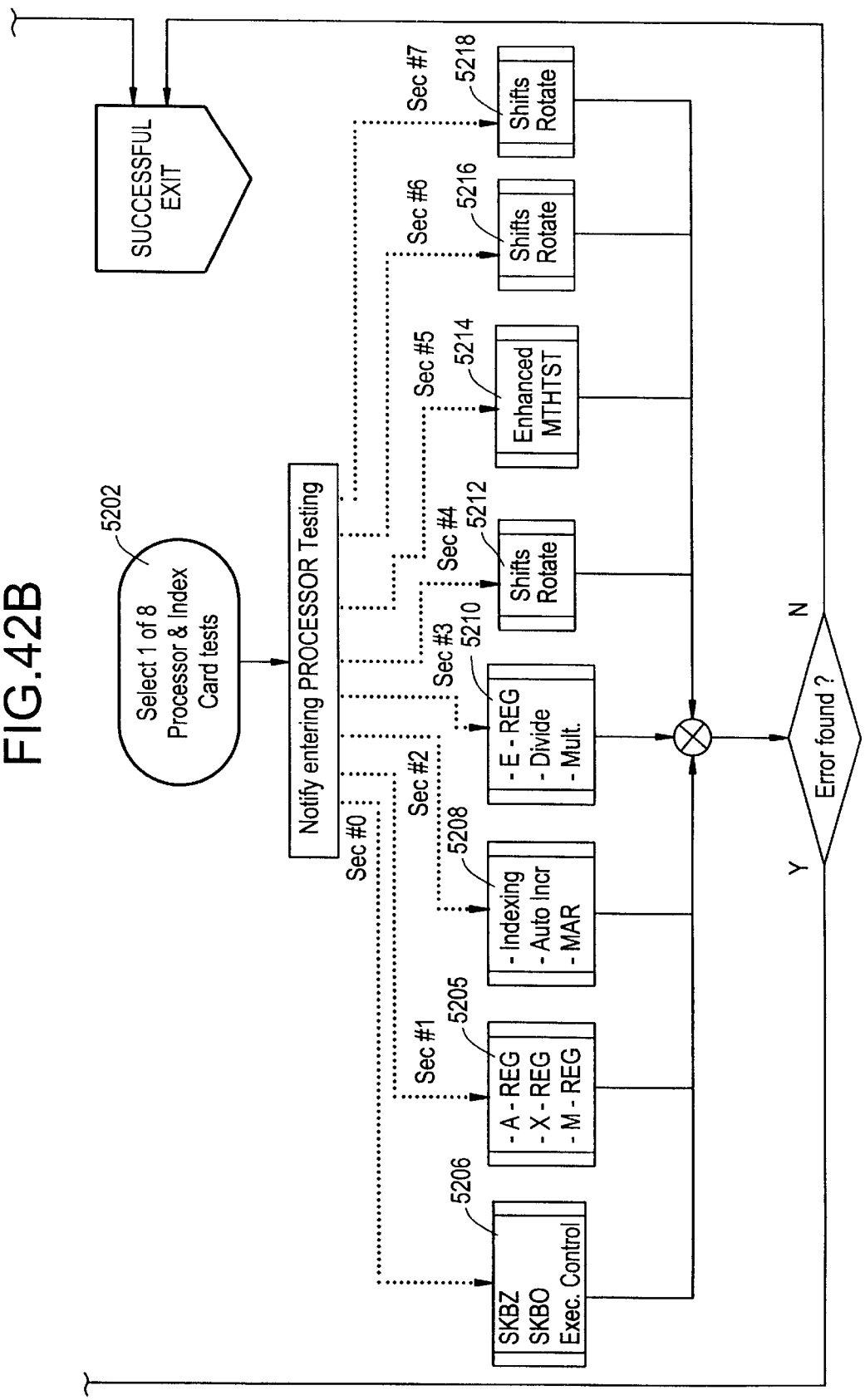

The Processor, Index Interrupt & CPU Support test (a) performs a walking bit test on major CPU 12 Registers (A, E, MA, X, Byte-Swap) and busses (B, PM, PC, MA) and (b) tests all major instructions in a rotating sequence. When two control computers 10a,b are executing process control in an actively redundant manner, this complete diagnostic is executed at a frequency of about (but not less frequently than) once every 5 seconds in 8 subsets (reference FIGS. 42A and 42B). When one control computer 10 is executing process control, this diagnostic is executed at a frequency of about (but not less frequently than) Hz1. When this diagnostic determines that a problem exists, the control computer halts execution of its Hz1, Hz10, and Hz100 cycles and all Digital Outputs driven by the control computer are deenergized to fail-safe mode.

The following paragraph presents a discussion of the Q Memory 108 diagnostic.

A representative checksum for Q Memory 108 is calculated and then compared with an affiliated checksum calculated by the Compiling Translator at the time when the Application Program source code was converted to Machine Operation Code. This diagnostic is executed at a frequency of at least once every 4 hours. When this diagnostic determines that a problem exists, the control computer halts execution of its Hz1, Hz10, and Hz100 cycles and all Digital Outputs driven by the control computer are deenergized to fail-safe mode if a neighbor exists.

The following paragraph presents a discussion of the P Memory 906,801 diagnostic.

A representative checksum for P memory 906,801 is calculated and then compared with an affiliated checksum calculated by the Compiling Translator at the time when the Application Program source code was converted to Machine Operation Code. This diagnostic is executed at a frequency of at least once every 4 hours. When this diagnostic determines that a problem exists, the control computer halts execution of its Hz1, Hz10, and Hz100 cycles and all Digital Outputs driven by the control computer are deenergized to fail-safe mode if a neighbor exists.

The following paragraph presents a discussion of the Watchdog 603 Halt Line diagnostic.

Failure of the Watchdog 603 Halt line is monitored. Watchdog 603 in control computer 10 communicates via Data Bus 18 to CPU 12 when a CLK HLT is asserted. Each second, a status word is examined to see if Watchdog 603 halt has been attempted. If Watchdog 603 attempts to halt CPU 12 and CPU 12 continues to execute, then CPU 12 will identify the decision to halt via the status word conveyed via Data Bus 18. This diagnostic is executed at a frequency of at least Hz1. When this diagnostic determines that a problem exists, control computer 10 halts execution of its Hz1, Hz10, and Hz100 cycles, and all Digital Outputs driven by the control computer are deenergized to fail-safe mode.

The following paragraph presents a discussion of the Self-Diagnostics diagnostic.

This logic monitors the successful execution of the self-test set by defining a signature value of all tests in real-time. The real-time signature value is compared with a constant (defining acceptable status). This diagnostic is executed at a frequency of at least Hz1. When this diagnostic determines that a problem exists, all Digital Outputs driven by the control computer are deenergized to fail-safe mode.

In the following set of diagnostics (and with reference to FIGS. 43A and 43B), to the Function Select Lines diagnostic, when two control computers 10*a,b* are executing process control in an actively redundant manner, the diagnostic is executed at a frequency of about (but not less frequently than) once every 5 seconds. When one control computer is executing process control, the diagnostic is executed at a frequency of about (but not less frequently than) Hz1. When the diagnostic determines that a problem exists, the control computer halts execution of its Hz1, Hz10, and Hz100 cycles, and all Digital Outputs driven by the control computer are deenergized to fail-safe mode.

The following paragraph presents a discussion of the Can Address Lines (5301,5306) diagnostic.

Each Can Motherboard has a DIP switch 1399 installed which is set to the same position as Can ID 1307. The settings of switch 1307 generates a voltage via a resistor network. The voltage is read and compared with the expected value by the logic executing in the control computer.

The following paragraph presents a discussion of the I/O Board Address Lines (5302,5307) diagnostic.

This test exercises all ten board addresses on each Can's Motherboard, reads the voltages generated with the Board Address DAC 1908, and compares them with expected values.

The following paragraph presents a discussion of the DI Board Select Decoder (5302,5307) diagnostic.

Using the I/O Board Address Test, the correct function of the DI Board Select Decoder 1405 is verified. This test also detects shorts between DI Board Select lines.

The following paragraph presents a discussion of the I/O Channel Address Lines (5303,5308) diagnostic.

This test exercises thirteen channel addresses on each Mezzanine Board 689,684, reads the voltages generated with Channel Address DAC 1501, and compares them with the expected voltages.

The following paragraph presents a discussion of the 5V DATAIN Comparator Test diagnostic.

Using the I/O Channel Address Test (5303,5308), the correct function of the 5V DATAIN comparator 1399 is verified by checking for a shift in output from comparator 1398 upon transition from the channel address below 5V to the first channel address above 5V.

The following paragraph presents a discussion of the D1 Line (5304,5309) diagnostic.

This test performs a loopback test with the D1 line. The D1 line is the least significant device select line and is mainly used to drive all DO's and graphic bulbs.

The following paragraph presents a discussion of the A/D Converter (5305,5310) diagnostic.

This test performs an enhanced D/A and A/D converter loopback test via MUX 1912. The voltage used for the loopback test is derived from the seconds and minutes of the clock and, therefore, changes each second to ensure that a plurality of data combinations are provided for detecting A/D Converter failures.

The following paragraph presents a discussion of the Function Select Lines (part of 5305,5310) diagnostic.

Using the A/D Converter test, stuck-at failures on the function select lines are detected. The function select code to enable MUX 1912 is inverted to the function select code of MUX 1910.

The following paragraph presents a discussion of the Illegal DO Address diagnostic.

If a illegal DO Board on a Mezzanine 684,689 is addressed, the unacceptable addressing is detected by latch circuit 1302. The output is read in Hz1. This diagnostic is executed at a frequency of at least Hz1. When this diagnostic determines that a problem exists, the control computer halts execution of its Hz1, Hz10, and Hz100 cycles, and all Digital Outputs driven by the control computer are deenergized to fail-safe mode.

In the following diagnostics, to the DA field short diagnostic, when the diagnostic technique defines the existence of an abnormality, a status variable is changed in the database of the control computer for use by the programming engineer, an alarm and/or printed message is output in one embodiment, and the value is automatically communicated to other systems.

The following paragraph presents a discussion of the Watchdog 603 Status diagnostic.

To verify if the Watchdog 603 is running properly, the heartbeat of Watchdog 603 is "read". This diagnostic is executed at a frequency of at least Hz1.

The following paragraph presents a discussion of the Remote Field Unit RSTAT's diagnostic.

A scan progresses through status values of each Remote Field Unit to define analog and digital diagnostic values and a Remote Field Unit 314 diagnostic alarm. This diagnostic is executed at a frequency of at least once every minute.

The following paragraph presents a discussion of the Serial Graphic ADIAG's diagnostic.

A scan progresses through status values respective to the Serial Graphic system to define summary digital diagnostic values, the nature of any difficulty, and a Serial Graphic diagnostic alarm.

The following paragraph presents a discussion of the This Can Power diagnostic.

The Can supply voltage on the Left power bar of each Can is measured on Motherboard 681,682. The Left bar is usually powered from this Can power supply. A graphical lamp lights if the voltage is not between 26 and 30 volts. This diagnostic is executed at a frequency of at least Hz1.

The following paragraph presents a discussion of the Next Can Power diagnostic.

The Left bar is usually powered from "this" Can's power supply. The Can supply voltage on the Right power bar of each Can is measured on Motherboard 681,682. The Right bar is usually powered from "next" Can's power supply (neighbor Can). A graphical lamp lights if the voltage is not between 26 and 30 volts. This diagnostic is executed at a frequency of at least Hz1.

The following paragraph presents a discussion of the Can Battery diagnostic.

The Can supply voltage on the Left power bar of each Can is measured on Motherboard 681,682. The Left bar is usually powered from "this" Can's power supply). A graphical lamp lights if the voltage is not above a batter threshold reference value. This diagnostic is executed at a frequency of at least Hz1.

The following paragraph presents a discussion of the AC Power diagnostic.

Each CPU 12 monitors for an AC power signal generated from a power supply monitor board. This diagnostic is executed at a frequency of at least Hz1.

The following paragraph presents a discussion of the AI Compare and Arbitration diagnostic.

Left and Right AIF values are compared in Hz1. In case of differences, the fail-safe value is selected for output to the control device of apparatus 84. Board failures are also taken into account. This diagnostic is executed at a frequency of at least Hz1 and reported within one minute respective to any particular analog input signal.

The following paragraph presents a discussion of the DI Compare and Arbitration diagnostic.

Left and Right AIF values are compared in Hz1. In case of differences the safe value is selected. Board failures are also taken into account. This diagnostic is executed at a frequency of at least Hz1. This diagnostic is executed at a frequency of at least Hz1 and reported within one minute respective to any particular digital input signal.

The following paragraph presents a discussion of the AO Track Compare and Arbitration diagnostic.

Calculated AO value and measured AO Track (AOT) value of both computers 10a,b are compared in Hz1. In case of differences, the higher AOT value is selected. This diagnostic is executed at a frequency of at least Hz1 and reported within one minute respective to any particular analog output track signal.

The following paragraph presents a discussion of the DO Track Compare and Arbitration diagnostic.

Calculated DO value and measured DO Track (DOT) value of both computers 10a,b are compared in Hz1. In case of differences, the higher DOT value is selected. This diagnostic is executed at a frequency of at least Hz1 and reported within one minute respective to any particular digital output track signal.

The following paragraph presents a discussion of the DA Track diagnostic.

A calculated DA value and the respective voltage drop measured over the DA transistors (AOT) are compared in Hz1. This diagnostic is executed at a frequency of at least Hz1 and reported within one minute respective to any particular DA signal.

The following paragraph presents a discussion of the AO Test diagnostic.

Using an analog signal, a 5 percent step change is used in 80 ms to verify the ability of each AO channel to modify its output. This diagnostic is executed at a frequency of at least Hz1 and reported within one minute respective to any particular analog output signal.

The following paragraph presents a discussion of the DO Test diagnostic.

Using a 50 $\mu$s test pulse the ability of each DO channel to change the output state is verified. This diagnostic is executed at a frequency of at least Hz1 and reported within one minute respective to any particular digital output signal.

The following paragraph presents a discussion of the DA Field Short diagnostic.

The voltage drop over digital abort transistors of each channel where a digital abort variable with a FALSE value is defined in the Application Program (normal state is transistors conducting) is measured. A low voltage indicates either a shorted transistor or a short in the field to ground. This diagnostic is executed at a frequency of at least once each minute.

The following paragraph presents a discussion of the Hardware Abort Key diagnostic.

The voltage drop of the Hardware Abort Key in each Can is monitored in READKEY 2538. This diagnostic is executed in Hz1 and is reported at least once every 3 minutes. When this diagnostic technique defines the existence of the abort key being asserted for abort override of control computer decisions, a status variable is changed in the database of the control computer for use by the programming engineer, and an alarm and/or printed message is optionally output.

The following paragraph presents a discussion of the Can I/O Board diagnostic.

In Hz1 all defined I/O boards are tested in VREF 2516. If a board fails to respond, a corresponding Board Problem bit is set to TRUE. This diagnostic is executed at a frequency of at least Hz1. If more than a constant number (2) boards fail, control computer 10 halts execution of its Hz1, Hz10, and Hz100 cycles, and all Digital Outputs driven by the control computer are deenergized to fail-safe mode.

The following paragraph presents a discussion of the MCU Address diagnostic.

Verification that the MCU points to the same address in Fox and Dog computers is executed. This diagnostic is executed at a frequency of at least Hz1. MCU becomes "read only" if the addresses are different.

The following paragraph presents a discussion of the MCU VREF Test diagnostic.

The 5V supply voltage of the MCU and SCU keypads are read in MSIVAL 2525 and compared to a threshold value. This diagnostic is executed at a frequency of at least Hz1. SCU becomes "read only" if the supply voltage deviates unacceptably.

The following paragraph presents a discussion of the CPU Off-line diagnostic.

Verification as to if neighbor CPU 12a/b is online is executed. This diagnostic is executed at a frequency of at least Hz1. When this diagnostic technique defines the existence of an abnormality, a status variable is changed in the database of the control computer for use by the programming engineer, and an alarm and/or printed message is optionally output. Loss of partner (neighbor) is examined for 150 times per second, and three consecutive finds of neighbor loss are required to effect a CPU off-line status. In a similar manner, return of a neighbor CPU requires three consecutive finds of neighbor presence to effect a CPU on-line status.

The following paragraph presents a discussion of the Major Link Failure diagnostic.

Major link 324 problems are detected and indicated. This diagnostic is executed at a frequency of at least Hz1. When this diagnostic technique defines the existence of an abnormality, a status variable is changed in the database of the control computer for use by the programming engineer, and an alarm and/or printed message is optionally output.

The following paragraph presents a discussion of the Major Link Timeout diagnostic.

An indication is defined respective to link activity being used up all or almost all available time being used up and that a link time-out occurred or is likely to occur. This diagnostic is executed at a frequency of at least Hz1. When this diagnostic technique defines the existence of an abnormality, a status variable is changed in the database of the control computer for use by the programming engineer, and an alarm and/or printed message is optionally output.

The following paragraph presents a discussion of the Major Link Communication Retries diagnostic.

The number of Major link 324 communication failures and retries are counted and the data is made available for the control computer Health Monitor. This diagnostic is executed at a frequency of at least Hz1. When this diagnostic technique defines the existence of an abnormality, a status variable is changed in the database of the control computer for use by the programming engineer, and an alarm and/or printed message is optionally output.

The following paragraph presents a discussion of the Hz100 Overrun diagnostic.

Hz100 Overruns are indicated and the information is made available for the control computer Health Monitor. This diagnostic is executed at a frequency of at least Hz1. When this diagnostic technique defines the existence of an abnormality, a status variable is changed in the database of the control computer for use by the programming engineer, and an alarm and/or printed message is optionally output.

The following paragraph presents a discussion of the Hz10 Overrun diagnostic.

Hz10 Overruns are indicated and the information is made available for the control computer Health Monitor. This diagnostic is executed at a frequency of at least Hz1. When this diagnostic technique defines the existence of an abnormality, a status variable is changed in the database of the control computer for use by the programming engineer, and an alarm and/or printed message is optionally output.

The following paragraph presents a discussion of the Hz1 Overrun diagnostic.

Hz1 Overruns are indicated and the information is made available for the control computer Health Monitor. This diagnostic is executed at a frequency of at least Hz1. When this diagnostic technique defines the existence of an abnormality, a status variable is changed in the database of the control computer 10 for use by the programming engineer, and an alarm and/or printed message is optionally output.

The following paragraph presents a discussion of the Hz1 Time Remaining diagnostic.

The time remaining after Hz1 has finished is indicated. This diagnostic is executed at a frequency of at least Hz1 to define a reference resource value for the particular system instance.

The following paragraph presents a discussion of the Link Time Remaining diagnostic.

Time used in arbitration (ARBLINK 2526) is subtracted from time allowed to identify the difference (or "time remaining"). This diagnostic is executed at a frequency of at least Hz1 to define a reference resource value for the particular system instance.

The following paragraph presents a discussion of the Memory diagnostic.

A memory test is performed by storing data in 4 memory locations, writing a test pattern to those locations, reading the test pattern for comparison, and then writing the original data back into the locations. This optional diagnostic (specifically selected by the programming engineer in the Application Program) executes on any memory location at a frequency of at least once every 24 hours. When this diagnostic technique defines the existence of an abnormality, a status variable is changed in the database of the control computer for use by the programming engineer, and an alarm and/or printed message is optionally output.

The following paragraph presents a discussion of the CPU Temperature diagnostic.

CPU 12 temperature is read using a temperature sensor on the power supply board. This diagnostic is executed at a frequency of at least Hz1. When this diagnostic technique defines the existence of an abnormality, a status variable is changed in the database of the control computer for use by the programming engineer, and an alarm and/or printed message is optionally output.

The following paragraph presents a discussion of the Programmable Graphic diagnostic.

Verification is made that all Programmable Graphic processors are executing via a data communication handshake. This diagnostic is executed at a frequency of at least once every 2 min. When this diagnostic technique defines the existence of an abnormality, a status variable is changed in the database of the control computer for use by the programming engineer, and an alarm and/or printed message is optionally output.

The following paragraph presents a discussion of the Serial Graphic diagnostic.

Failures with the Serial Graphic hardware and communication are detected by monitoring for data semaphores. This diagnostic is executed at a frequency of at least once every 2 seconds. When this diagnostic technique defines the existence of an abnormality, a status variable is changed in the database of the control computer for use by the programming engineer, and an alarm and/or printed message is optionally output.

The following paragraph presents a discussion of a first "Control Computer" to "Control Computer" Communication diagnostic.

A loop-back test is performed on every "Control Computer" to "Control Computer" port. This diagnostic is executed at a frequency of at least once every 2 seconds. When this diagnostic technique defines the existence of an abnormality, a status variable is changed in the database of the control computer for use by the programming engineer, and an alarm and/or printed message is optionally output.

The following paragraph presents a discussion of a second "Control Computer" to "Control Computer" Communication diagnostic.

Any failures in operation (no response, differences L/R) are indicated with single messages. This diagnostic is executed at a frequency of at least once every 2 seconds. When this diagnostic technique defines the existence of an abnormality, a status variable is changed in the database of the control computer for use by the programming engineer, and an alarm and/or printed message is optionally output.

The following paragraph presents a discussion of the Control Computer to Process Information System Communication diagnostic.

Problems with control computer to Process Information System communication or other serial data communications are indicated. When this diagnostic technique defines the existence of an abnormality, a status variable is changed in the database of the control computer for use by the programming engineer, and an alarm and/or printed message is optionally output.

In the following Remote Field Unit 314 diagnostics, to the Remote Field Unit DI short to ground diagnostic, when the diagnostic technique defines the existence of an abnormality, a status variable is changed in the database of the control computer for use by the programming engineer, and an alarm and/or printed message is optionally output. When used, Remote Field Unit 314 (as described in U.S. Pat. No. 5,428,769) takes appropriate action to maintain safe operations in response to a communication of the data value respective to the abnormality.

The following paragraph presents a discussion of the Remote Field Unit Communication diagnostic.

Problems with Remote Field Unit 314 communication are indicated. This diagnostic is executed at a frequency of at least once every 2 seconds.

The following paragraph presents a discussion of the Remote Field Unit Power Supply diagnostic.

Problems with Remote Field Unit 314 Power Supplies are indicated by evaluating a data value in the communication from the Remote Field Unit 314. This diagnostic is executed at a frequency of at least once every 6 seconds.

The following paragraph presents a discussion of the Remote Field Unit FIO Controller diagnostic.

Problems with Remote Field Unit 314 FIO Controller are indicated by evaluating a data value in the communication from the Remote Field Unit 314. This diagnostic is executed at a frequency of at least once every 6 seconds.

The following paragraph presents a discussion of the Remote Field Unit AI Board diagnostic.

Problems with Remote Field Unit 314 AI boards are indicated by evaluating a data value in the communication from the Remote Field Unit 314. This diagnostic is executed at a frequency of at least once every 6 seconds.

The following paragraph presents a discussion of the Remote Field Unit DI Board diagnostic.

Problems with Remote Field Unit 314 DI boards are indicated by evaluating a data value in the communication from the Remote Field Unit 314. This diagnostic is executed at a frequency of at least once every 6 seconds.

The following paragraph presents a discussion of the Remote Field Unit AO Board diagnostic.

Problems with Remote Field Unit 314 AO boards are indicated by evaluating a data value in the communication from the Remote Field Unit 314. This diagnostic is executed at a frequency of at least once every 6 seconds.

The following paragraph presents a discussion of the Remote Field Unit DO Board diagnostic.

Problems with Remote Field Unit 314 DO boards are indicated by evaluating a data value in the communication from the Remote Field Unit 314. This diagnostic is executed at a frequency of at least once every 6 seconds.

The following paragraph presents a discussion of the Remote Field Unit Input Arbitration diagnostic.

Problems with Remote Field Unit 314 Inputs are indicated by evaluating a data value in the communication from the Remote Field Unit 314. This diagnostic is executed at a frequency of at least once every second.

The following paragraph presents a discussion of the Remote Field Unit Output Arbitration diagnostic.

Problems with Remote Field Unit 314 Outputs are indicated by evaluating a data value in the communication from the Remote Field Unit 314. This diagnostic is executed at a frequency of at least once every second.

The following paragraph presents a discussion of the Remote Field Unit FIO (Field Input/Output) Controller Neighbor Communication diagnostic.

Problems with Remote Field Unit 314 FIO Neighbor communication are indicated by evaluating a data value in the communication from the Remote Field Unit 314. This diagnostic is executed at a frequency of at least once every 6 seconds.

The following paragraph presents a discussion of the Control computer—Remote Field Unit output communication diagnostic.

Problems with control computer to Remote Field Unit 314 output communication are indicated by evaluating a data value in the communication from the Remote Field Unit 314. This diagnostic is executed at a frequency of at least once every second.

The following paragraph presents a discussion of the Remote Field Unit AO/DO loop resistance diagnostic.

Problems with detected with Remote Field Unit 314 AO/DO loop resistance monitoring are indicated by evaluating a data value in the communication from the Remote Field Unit 314. This diagnostic is executed at a frequency of at least once every 6 seconds.

The following paragraph presents a discussion of the Remote Field Unit DI short to ground diagnostic.

Problems because of Remote Field Unit 314 DI's shorted to ground are indicated by evaluating a data value in the communication from the Remote Field Unit 314.

The following paragraph presents a discussion of the A/D converter (ADC) and D/A converter (DAC) diagnostic.

The 28V Can Supply Voltage on each Motherboard 681, 682 is read using Analog to Digital converter circuit 607. The same measurement is performed using the Digital to Analog converter circuit 605 and the VREF comparator 1397. The measured values are compared for agreement within a predetermined tolerance. This diagnostic is executed each second. When this diagnostic technique defines the existence of an abnormality, a status variable is changed in the database of the control computer for use by the programming engineer, and an alarm and/or printed message is optionally output.

The following paragraph presents a discussion of the Program flow supervision by Watchdog 603 diagnostic.

The Compiling Translator inserts milepost instructions into the Q-List. The correct order and the timing in which these mileposts are executed is supervised by the Watchdog 603. This diagnostic is executed at a frequency of at least Hz1. When this diagnostic determines that a problem exists, the control computer is halted if the neighbor computer is active.

The following paragraph presents a discussion of the D/A and A/D converter loopback test on each Motherboard diagnostic.

This test performs an enhanced D/A and A/D converter loopback test via a multiplexer interfacing Motherboard-related signals which do not transmit via Mezzanine Board 684,689. The voltage used for the loopback test is derived from the seconds and minutes of the clock and therefor changes each second to ensure that all kinds of A/D Converter failures are detected. When this diagnostic (executing each second) determines that a problem exists, the control computer halts execution of its Hz1, Hz10, and Hz100 cycles, and all Digital Outputs driven by the control computer are deenergized to fail-safe mode within 2 seconds of detection.

The following paragraph presents a discussion of the A/D converter (ADC) and D/A converter (DAC) on all Motherboards diagnostic.

If the D/A and A/D converter loopback test fails on all Motherboards, the control computer halts execution of its Hz1, Hz10, and Hz100 cycles, and all Digital Outputs driven by the control computer are deenergized to fail-safe mode.

The following paragraph presents a discussion of the 5V CPU Supply Voltage diagnostic.

Verification via use of a hardware comparator on the power supply board for the computer that the 5 Volt supply voltage is within tolerance (±5 percent) is performed. This diagnostic is executed at a frequency of at least Hz1. When this diagnostic determines that a problem exists, the control computer halts execution of its Hz1, Hz10, and Hz100 cycles, and all Digital Outputs driven by control computer 10 are deenergized to fail-safe mode.

The following paragraph presents a discussion of the CPU Can Voltage diagnostic.

Verification via use of a hardware comparator on the power supply board that the CPU Can supply voltage is >21.6V is performed. This diagnostic is executed at a frequency of at least Hz1. When this diagnostic determines that a problem exists, the control computer halts execution of its Hz1, Hz10, and Hz100 cycles, and all Digital Outputs driven by control computer 10 are deenergized to fail-safe mode.

The following paragraph presents a discussion of the CPU 60 Hz Clock or Crystal diagnostic.

Using Real-Time Clock phase lock looping, the CPU 12 clock is compared with the Real-Time Clock for agreement within a predefined tolerance. This diagnostic is executed at a frequency of at least Hz1. When this diagnostic determines that a problem exists, the control computer halts execution of its Hz1, Hz10, and Hz100 cycles, and all Digital Outputs driven by the control computer are deenergized to fail-safe mode.

The following paragraph presents a discussion of the L/R DIP Switch diagnostic.

If either two Left or two Right computers are declared to the system and the Major Link is functioning, a (Task Dog) control computer halts execution of its Hz1, Hz10, and Hz100 cycles, and all Digital Outputs driven by the control computer are deenergized to fail-safe mode.

The following paragraph presents a discussion of the "Control Computer" to "Control Computer" Communication diagnostic.

An optional diagnostic is available for Application Program definition which monitors critical "control computer" to "control computer" communication links and halts CPU 12 if a communication failure occurs. This diagnostic is executed at a frequency of at least Hz1 and becomes effective after a predetermined number of consecutive occurrences. When this diagnostic determines that a problem exists, the control computer halts execution of its Hz1, Hz10, and Hz100 cycles and all Digital Outputs driven by control computer 10 are deenergized to fail-safe mode.

Figure 38A:
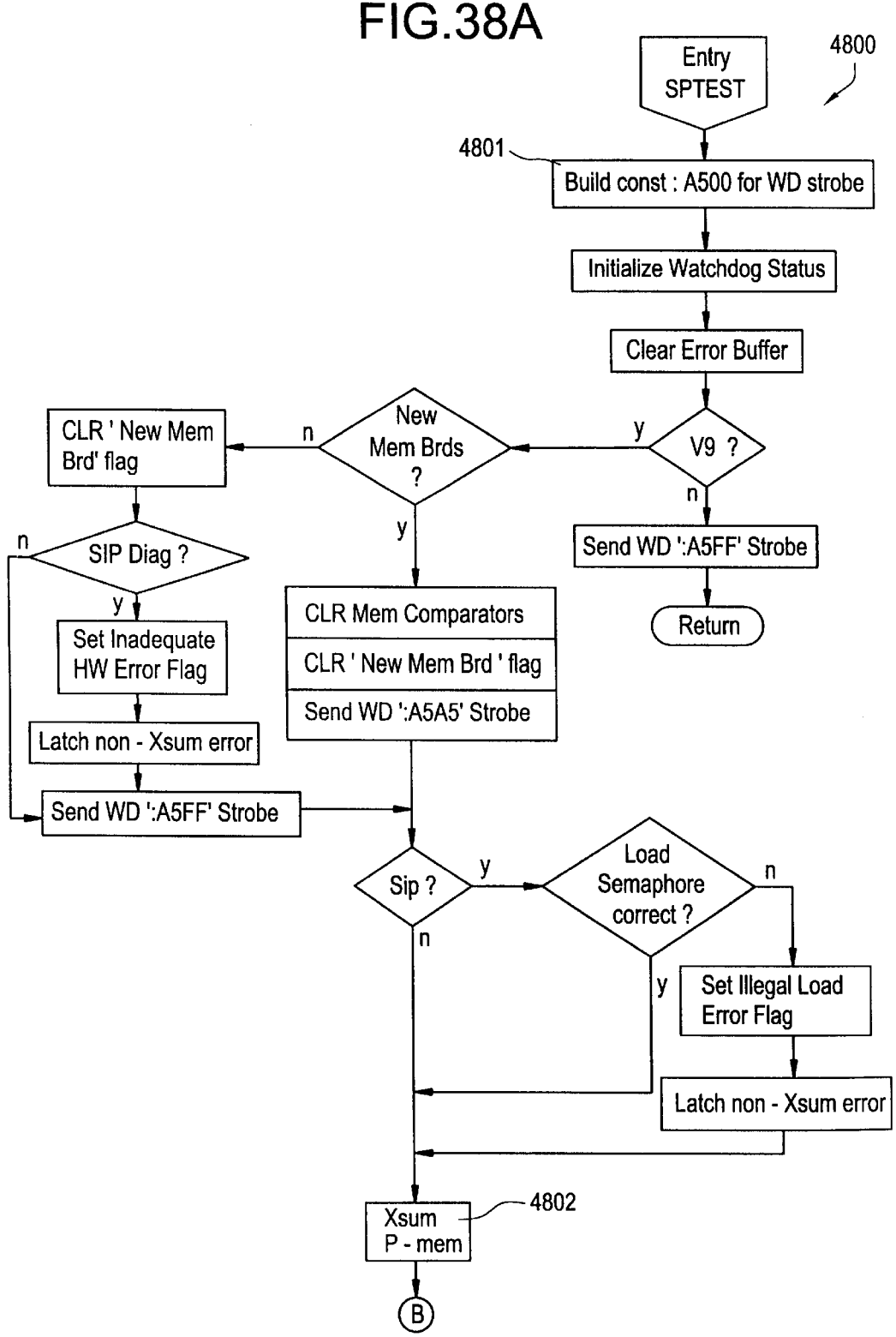
FIGS. 38A–38E present a flowchart of the executable Machine Operation Code for implementing checksum and Shadow Memory startup diagnostics in a control computer.
Figure 38B:
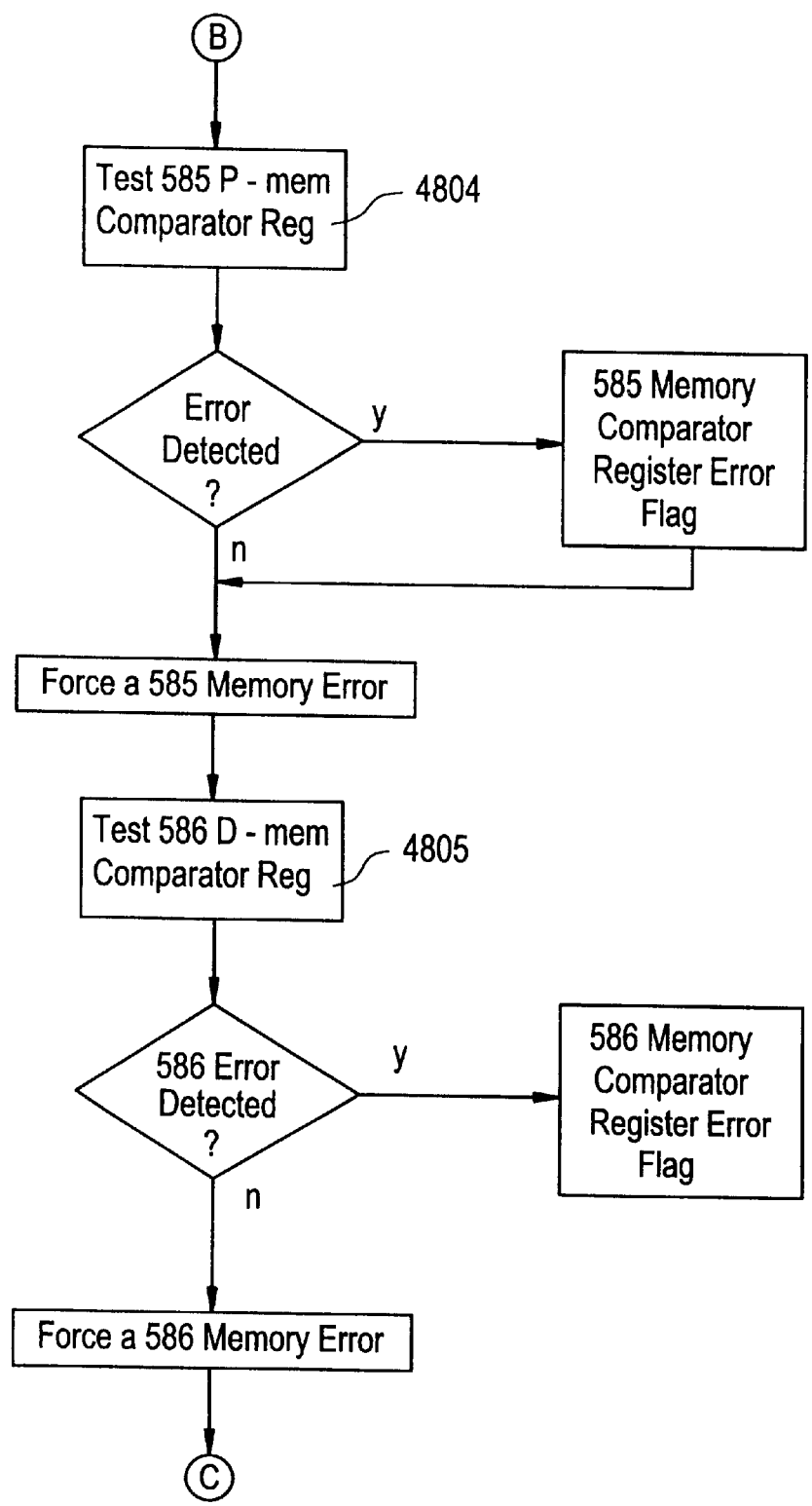
Figure 38C:
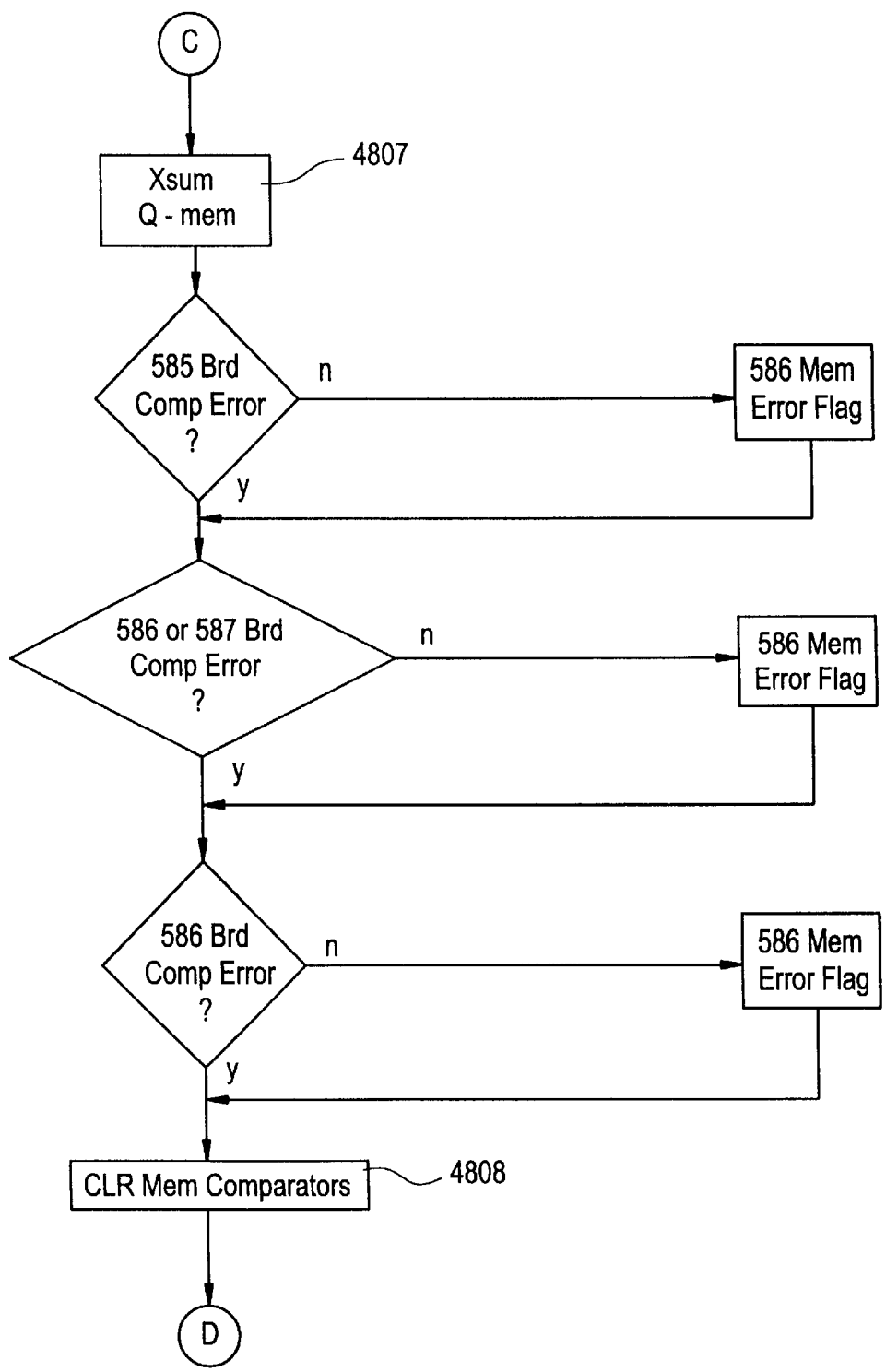
Figure 38D:
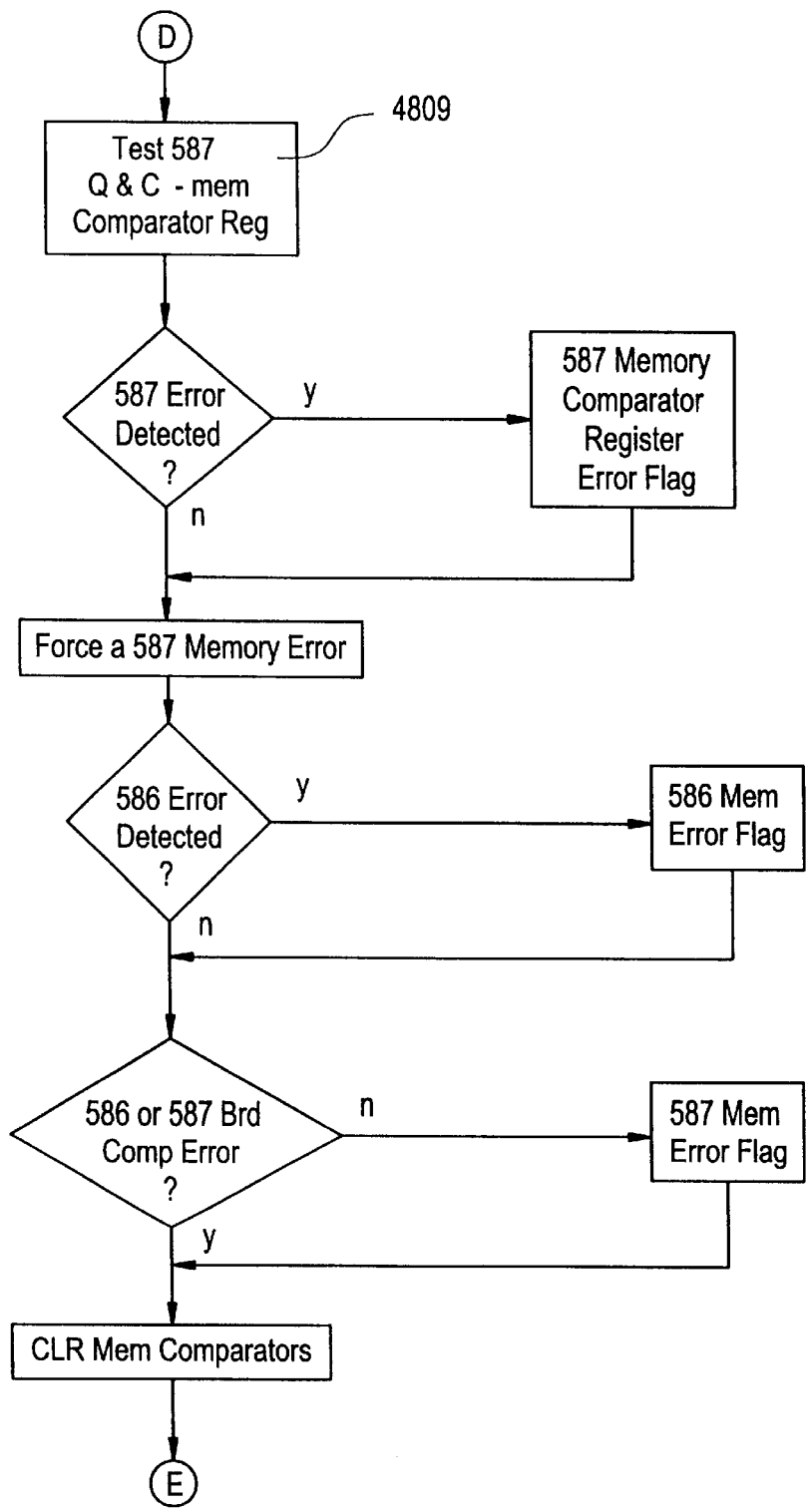
Figure 38E:
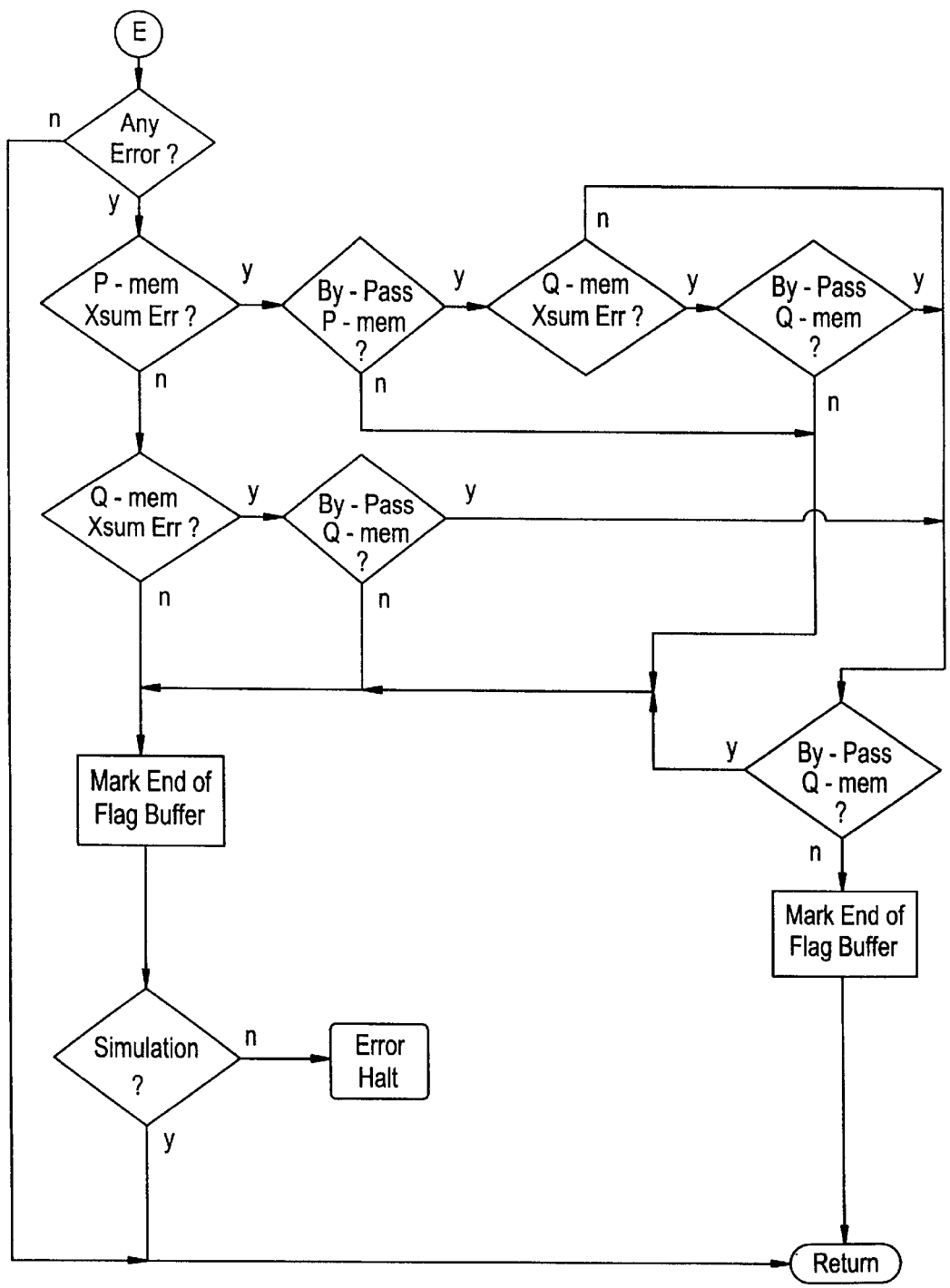
Figure 39:
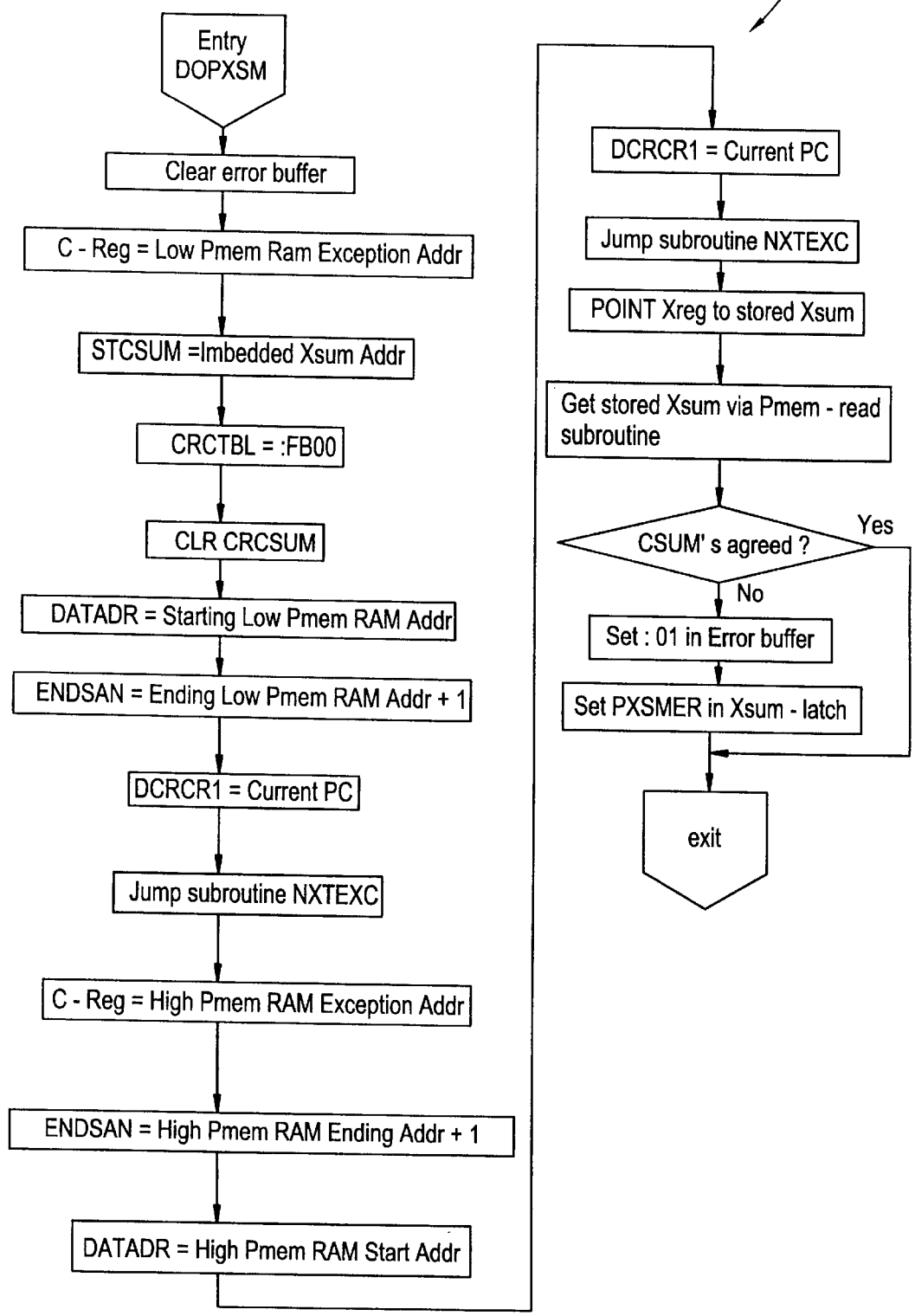
FIG. 39 presents a flowchart of the executable Machine Operation Code for calculation of a P Memory checksum in a control computer startup.
Figure 40:
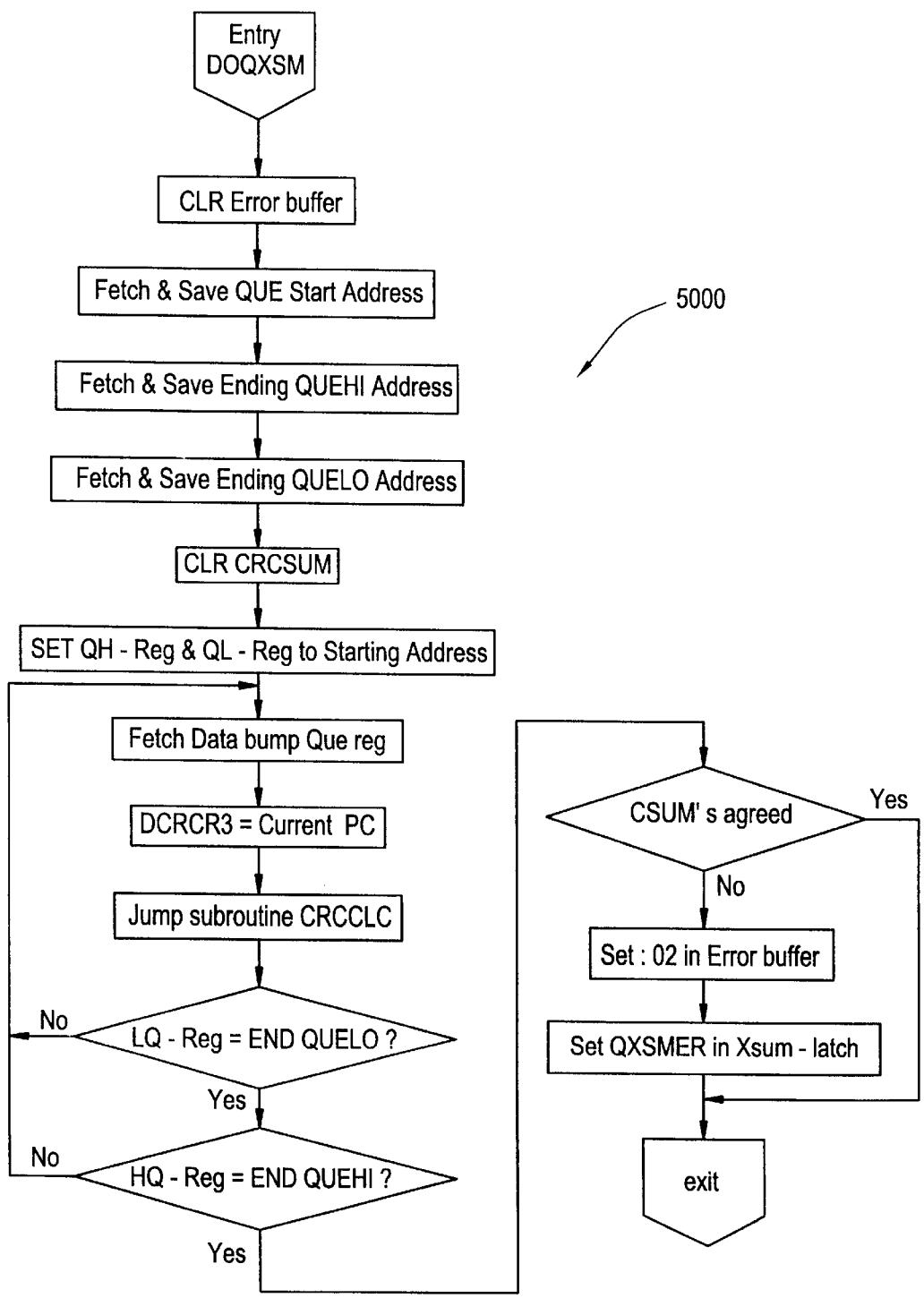
FIG. 40 presents a flowchart of the executable Machine Operation Code for calculation of a Q Memory checksum in a control computer startup.

FIGS. 38A through 54 describe the manner in which the aforementioned diagnostics are executed and utilized. In FIG. 38 (which uses FIGS. 38A through 38E), startup diagnostics fundamental to the "acceptance for use" of memory boards and to other hardware connected with the system are charted. In this regard, and with cross-reference to elements depicted in FIGS. 21A and 21B, step 4801 (in FIG. 38A) uses WD to reference Watchdog 603. In step 4802, the term Xsum P-mem relates to the execution of a checksum with respect to P-mem. The P-mem is in reference to Program Memory which, in FIGS. 21A and 21B, is connoted with drawing elements 801 and 906—the random access memory and the read only memory of the P-mem area. Continuing on FIG. 38B, the 585 reference in step 4804 is in reference to the 585 board depicted in FIGS. 21A and 21B which contains P-mem. The 586 board, referenced in step 4805, is the same board referenced in FIGS. 21A and 21B as the 586 board which is the location of the D memory circuitry holding drawing elements Data RAM 1012 and Shadow Data RAM 1014 in FIGS. 21A, 21B, 11A and 11B. Continuing with FIG. 38C, step 4807 references a checksum for Q Memory where Q Memory is as depicted in FIGS. 21A and 21B on the 587 board with drawing elements 593 and 108. The memory comparators indicated in FIG. 38C, at step 4808, are depicted in FIGS. 21A and 21B at drawing elements 1210, 946, and 1074. Continuing on with FIG. 38D, step 4809 references "Test 587 Q&C mem comparator reg"; this is in reference to the 587 board of FIGS. 21A and 21B, the Q Memory 108 and C Memory 110 areas which are referenced in drawing elements 494, 110, 593, and 108, and the comparator register related to memory comparator 1074. With further reference to FIG. 38A, at step 4802, the method (executed in achieving a comparison of the checksum and Program RAM 906) is further shown in FIG. 39. With respect to FIG. 38C and the checksum for Q Memory 108 depicted at step 4807, FIG. 40 shows the method executed in handling this particular step in the startup diagnostics.

Figure 41A:
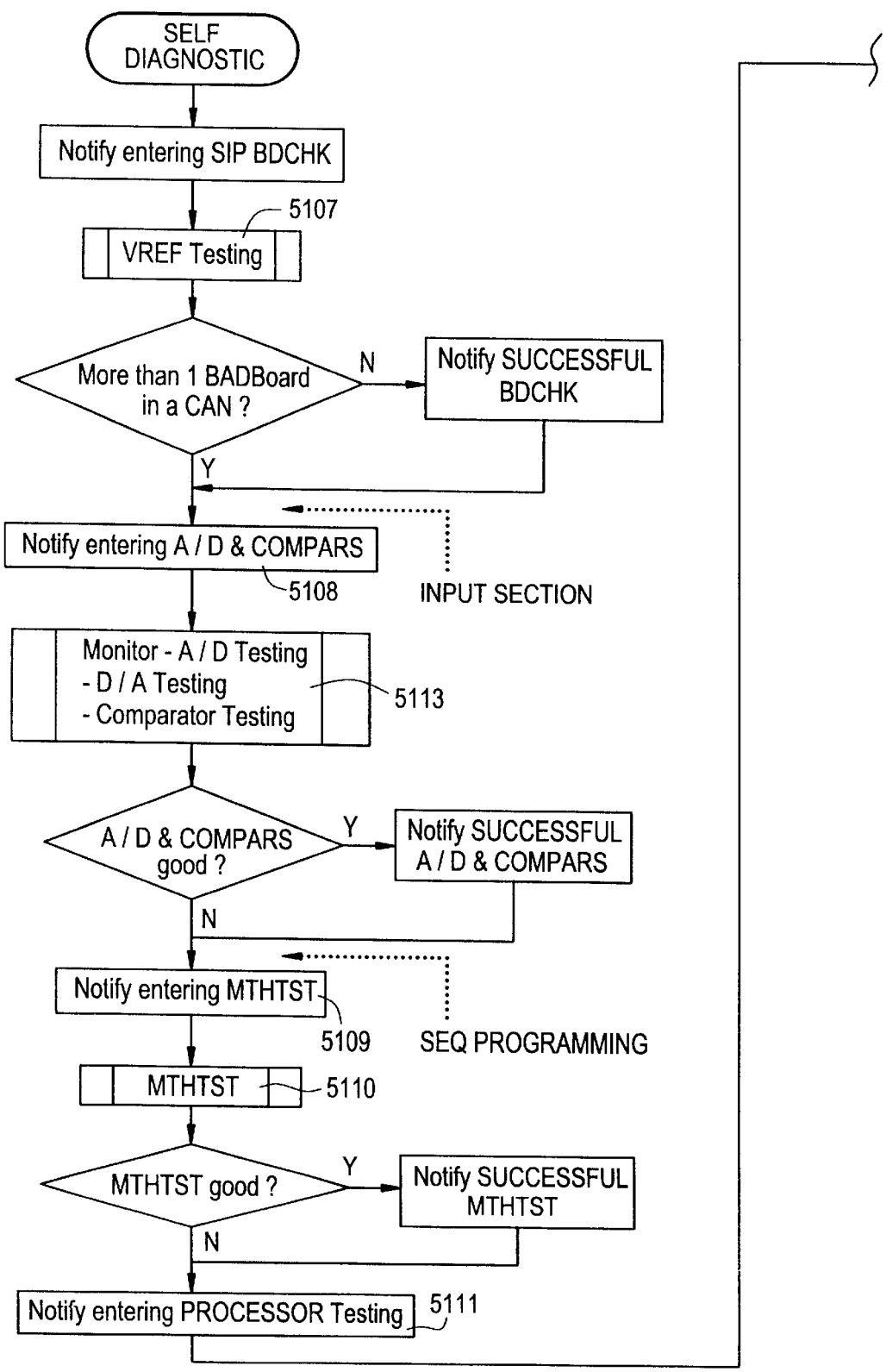

Continuing with the discussion of the diagnostics which are executed after startup in real-time, FIGS. 41A and 41B show the diagnostics as they execute in the context of the Hz1 cycle. A cross comparison between FIGS. 41A and 41B and FIG. 19, in this regard, is useful at step 5107 denoted as VREF Testing. The control-computer-executed logic of this method executes the testing in VREF Hz1 Step 2516 in FIG. 19. Continuing on in this regard, at step 5108 of FIGS. 41A and 41B, the entry to the A to D comparison is aligned with step MONITOR of FIG. 19 (Hz1 Step 2524). In FIGS. 41A and 41B, step 5113 also shows and aligns with the MONITOR operation shown in FIG. 19, at Hz1 Step 2524. The entry into MTHTST at step 5109 of FIGS. 41A and 41B is comparable to the entry into MTHTST at Hz1 Step 2554 of FIG. 19 with the MTHTST routine being executed at step 5110 of FIGS. 41A and 41B. The entry into processor testing at step 5111 of FIGS. 41A and 41B is comparable to the SELF DIAGN Hz1 Step 2556 of FIG. 19. In FIGS. 41A and 41B, steps 5101 and 5102 show two alternate routes for handling processor and index card tests. These processor and index card tests are executed in a somewhat different way if one control computer (that is, one CPU 12) is executing or if a redundant set of control computers 10*a,b* (that is, redundant CPUs) are executing. This is further depicted in FIGS. 42A and 42B, where step 5201 is the beginning of the routine executed respective to step 5101 in FIGS. 41A and 41B and where step 5202 expands upon the step indicated at drawing 5102 in FIGS. 41A and 41B. As is seen in a further discussion of FIGS. 42A and 42B, the different processor and index card tests relate to the registers which are disposed on the separate and individual cards of FIGS. 21A and 21B. In this regard, on FIGS. 42A and 42B, step 5203 depicts the SKBZ and SKBO and exec control test instructions of CPU 12 in FIGS. 21A and 21B. In elements 5204 and 5205 of FIGS. 42A and 42B, the A register, X register and M register correspond to those registers as depicted in FIGS. 21A and 21B at drawing elements 2720, 2712 and 2721. Similarly, in steps 5207 and 5208, addressing modes are tested on Index Interrupt Board 26 in cooperation with CPU 12. In FIGS. 21A and 21B, MA Reg 2721 is the same as M-Reg in Blocks 5204,5205 and MAR in Blocks 5207,5208 of FIGS. 42A and 42B (the physical register denoted by "MA" is designated as "M-Reg" for one type of use and as "MAR" for a second type of use to simplify reference in the culture of the inventors). In steps 5209 and 5210 of FIGS. 42A and 42B, E register and divide register and multiply operations are checked as indicated in FIG. 21A using ALU 2790 and E register 2713. The enhanced math test of steps 5213 and 5214 is executed on the ALU 2725 of FIG. 21B. The "shifts rotate" tests of steps 5211, 5215, 5217, 5212, 5216, and 5218 are instituted to implement arithmetic and logical bit pattern shifts on E Reg 2713 and A Reg 2720 of FIG. 21A.

Figure 43A:
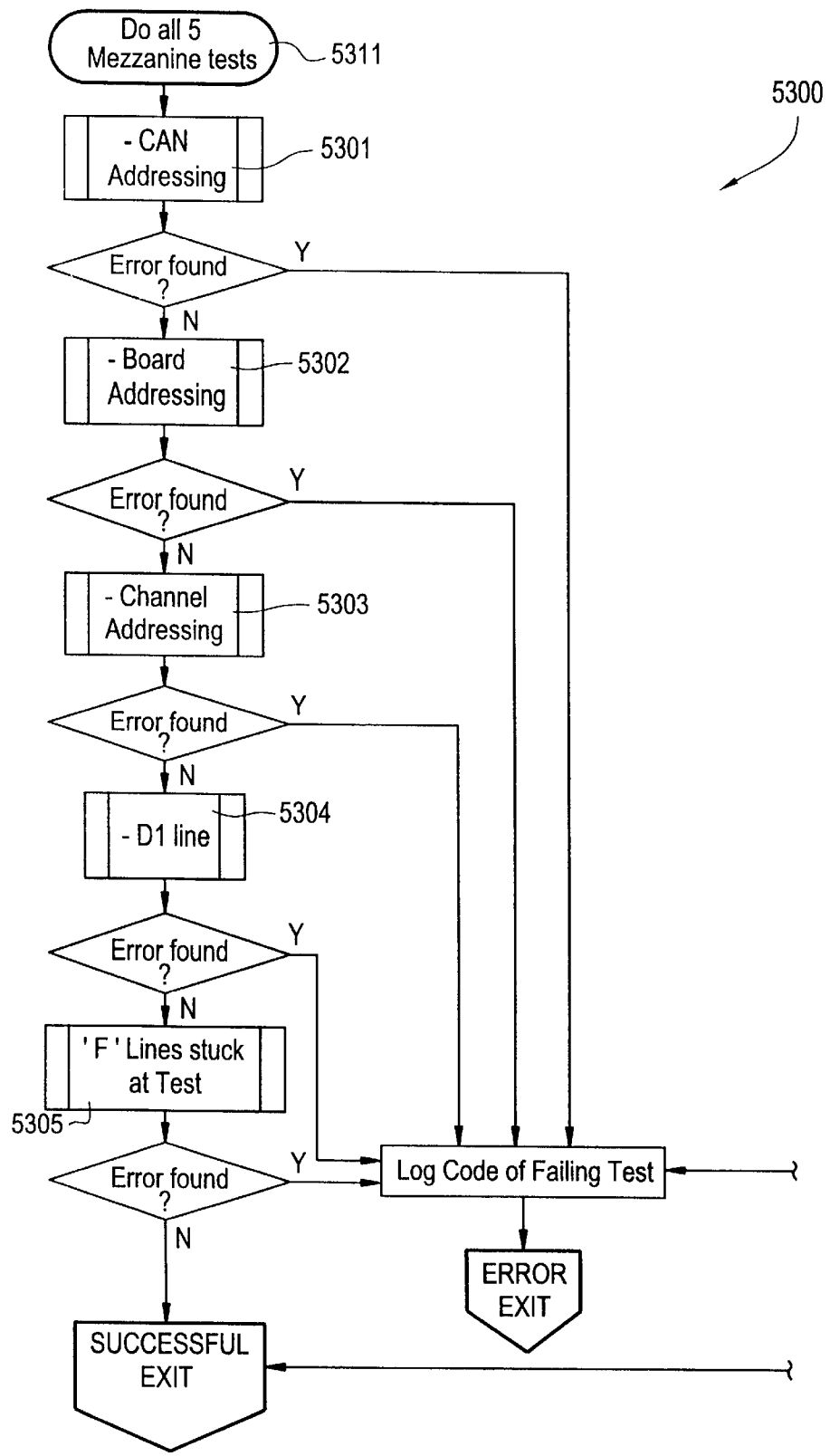
FIGS. 43A and 43B present a second nested flowchart of the executable Machine Operation Code of FIGS. 41A and 41B for the diagnostic set executed in real-time during a normal Hz1 cycle.
Figure 43B:
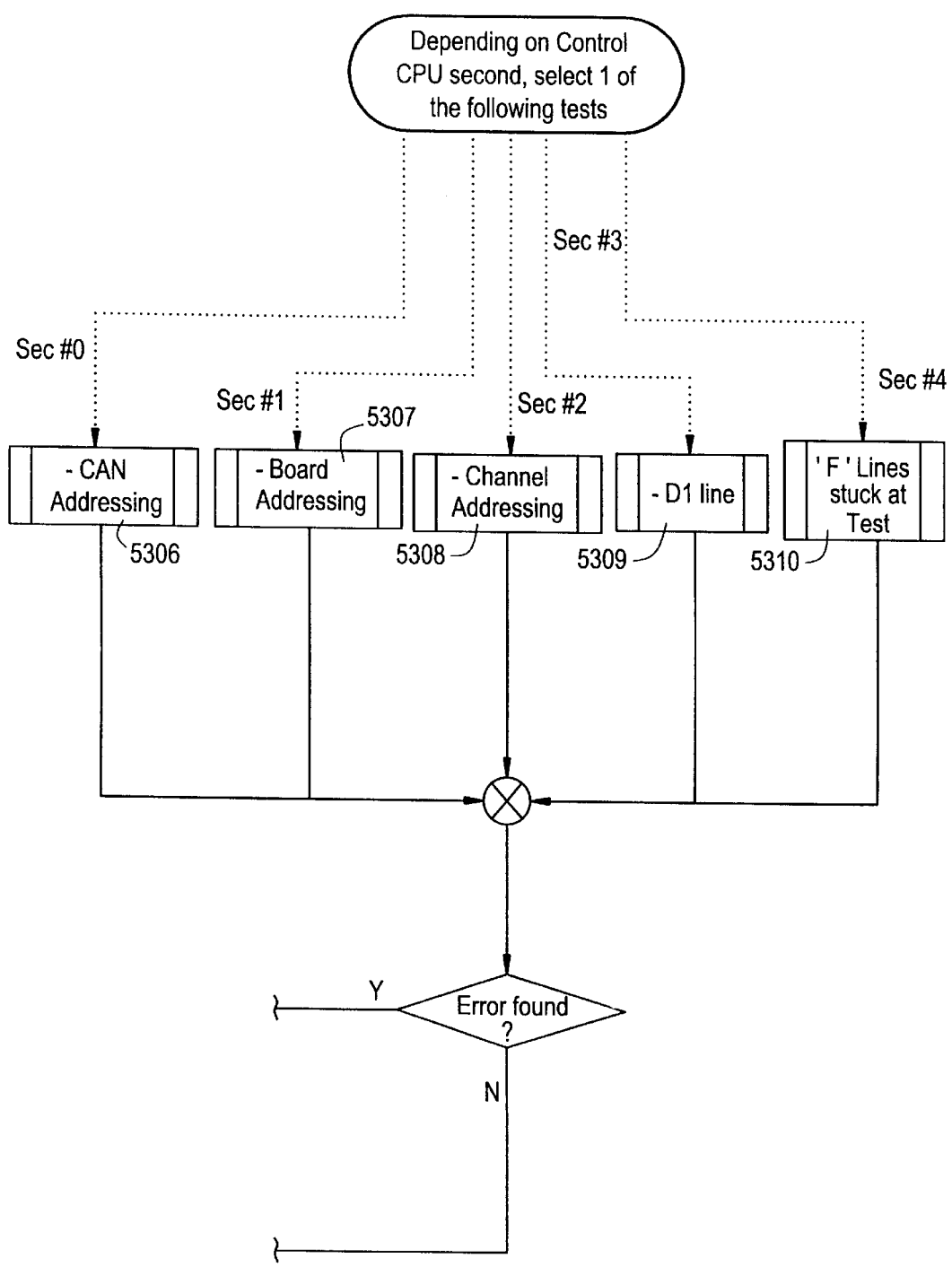
Figure 44A:
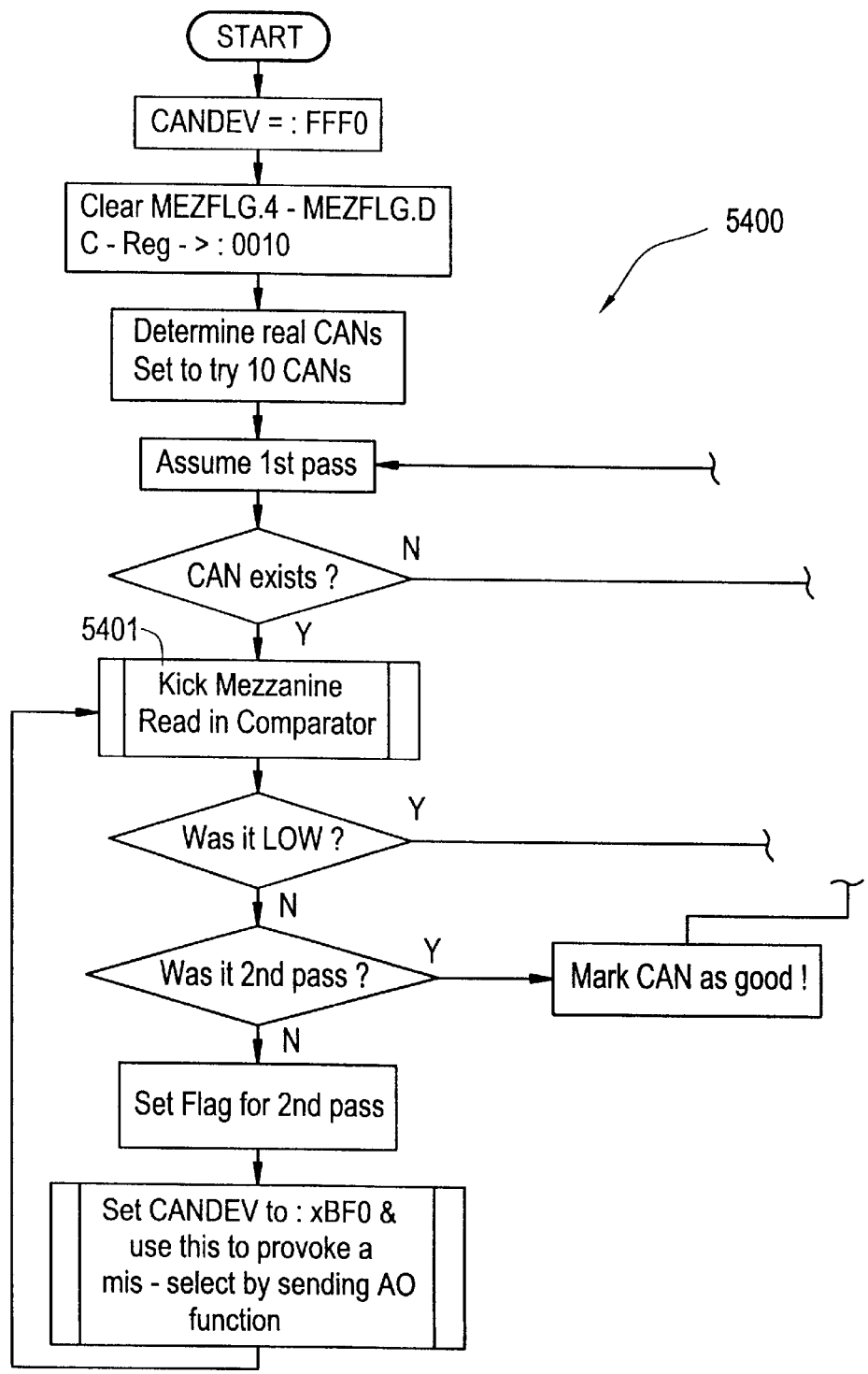
FIGS. 44A and 44B present a flowchart of the executable Machine Operation Code details in diagnostically testing the DO Deadman Circuit.
Figure 44B:
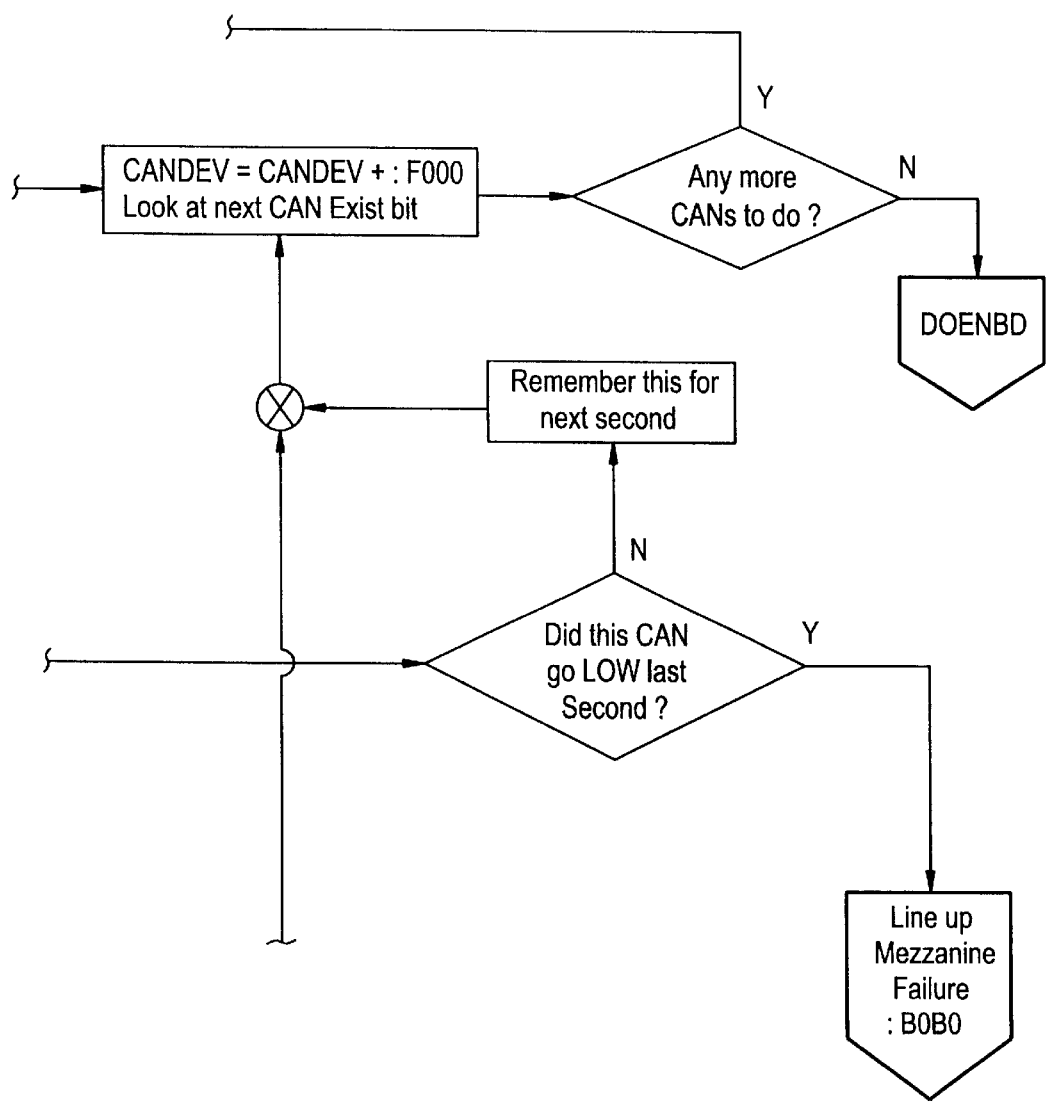

Returning to the discussion of FIGS. 41A and 41B, the successful execution of the processor and board tests in steps 5101 and 5102 terminates to the set of mezzanine tests which begin execution at step 5117, with the nature of the approach again depending upon whether one control computer or whether two control computers are executing control of apparatus 84. In this regard, the mezzanine tests are executed as indicated in steps 5103 or 5104. The individual tests respective to steps 5103 and 5104 are further discussed with respect to FIGS. 43A and 43B. In this regard, step 5103, in FIGS. 41A and 41B, where all five mezzanine tests are done when a sole control computer is executing control of the manufacturing apparatus, is further elaborated on beginning at step 5311 of FIGS. 43A and 43B; and the rotating set of mezzanine tests, as depicted in step 5104 of FIGS. 41A and 41B, is expanded-upon in steps 5306–5310 of FIG. 43B. The tests performed at steps 5301 and 5306 of FIGS. 43A and 43B are further defined in FIG. 46. The methodology executed in FIGS. 43A and 43B at step 5302 and 5307 is further defined in FIG. 47. The methodology executed in FIGS. 43A and 43B at steps 5303 and 5308 is further depicted in FIG. 49. The diagnostics which are implemented with respect to steps 5304 and 5309 in FIGS. 43A and 43B are further depicted in FIG. 50. The diagnostics which are implemented with respect to steps 5305 and 5310 in FIGS. 43A and 43B are further depicted in FIG. 51.

As FIGS. 43A and 43B indicate in comparing steps 5306–5310 with steps 5301–5305, these tests proceed differently if one control computer is available to-control apparatus 84 or if two separate control computers 10a,b are available. In this regard, with respect to FIGS. 42A, 42B, 43A, and 43B, the tests execute once per several seconds when the redundant systems are available so that enough time is available to do the arbitration process when the two control computers 10a,b are executing in actively redundant mode; all the tests are done each second each Hz1 cycle when only one computer is available.

Figure 45:
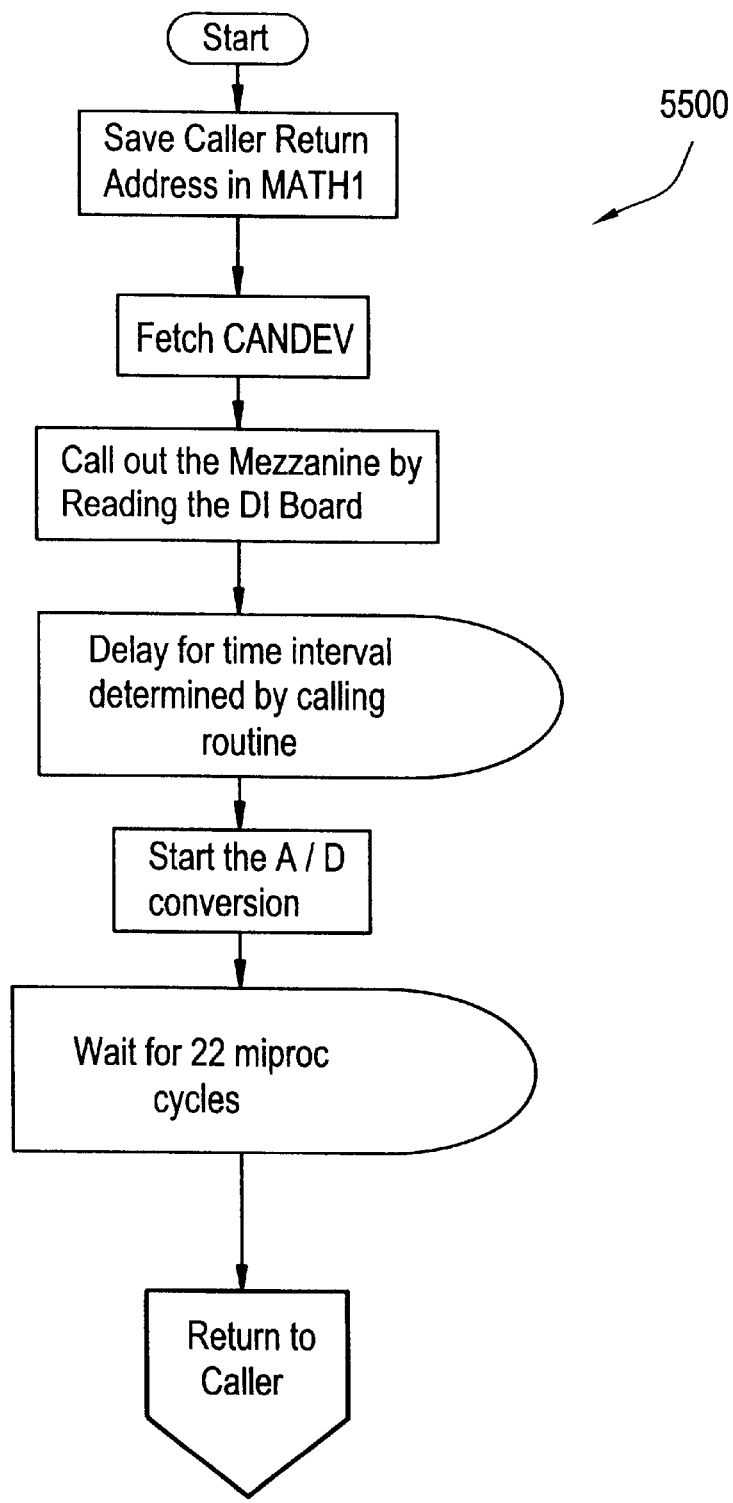
FIG. 45 presents a flowchart of the executable Machine Operation Code diagnosing the DO Deadman Circuit in real-time.
Figure 46:
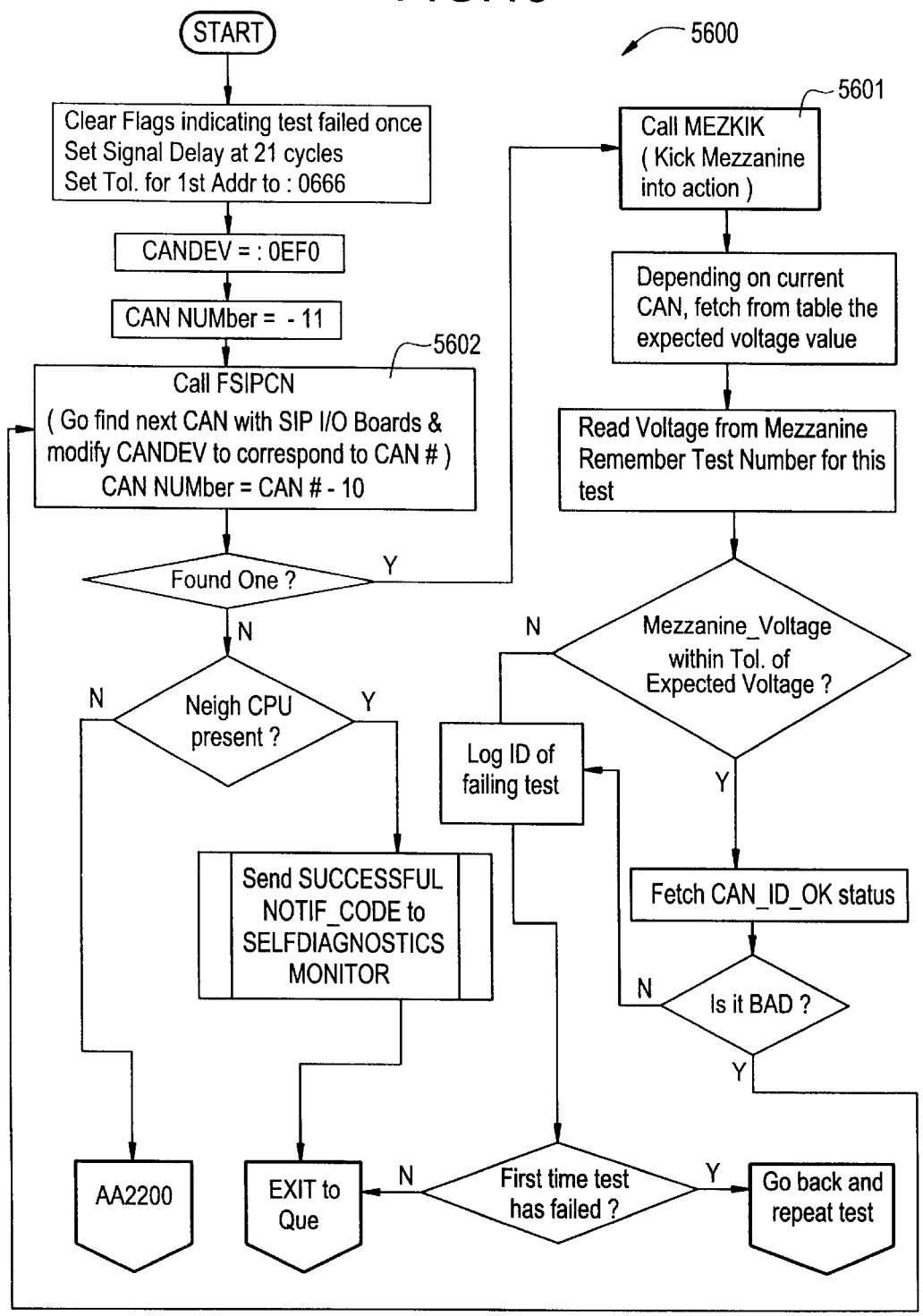
FIG. 46 presents a flowchart of the executable Machine Operation Code for Can address testing during a normal Hz1 cycle.
Figure 47:
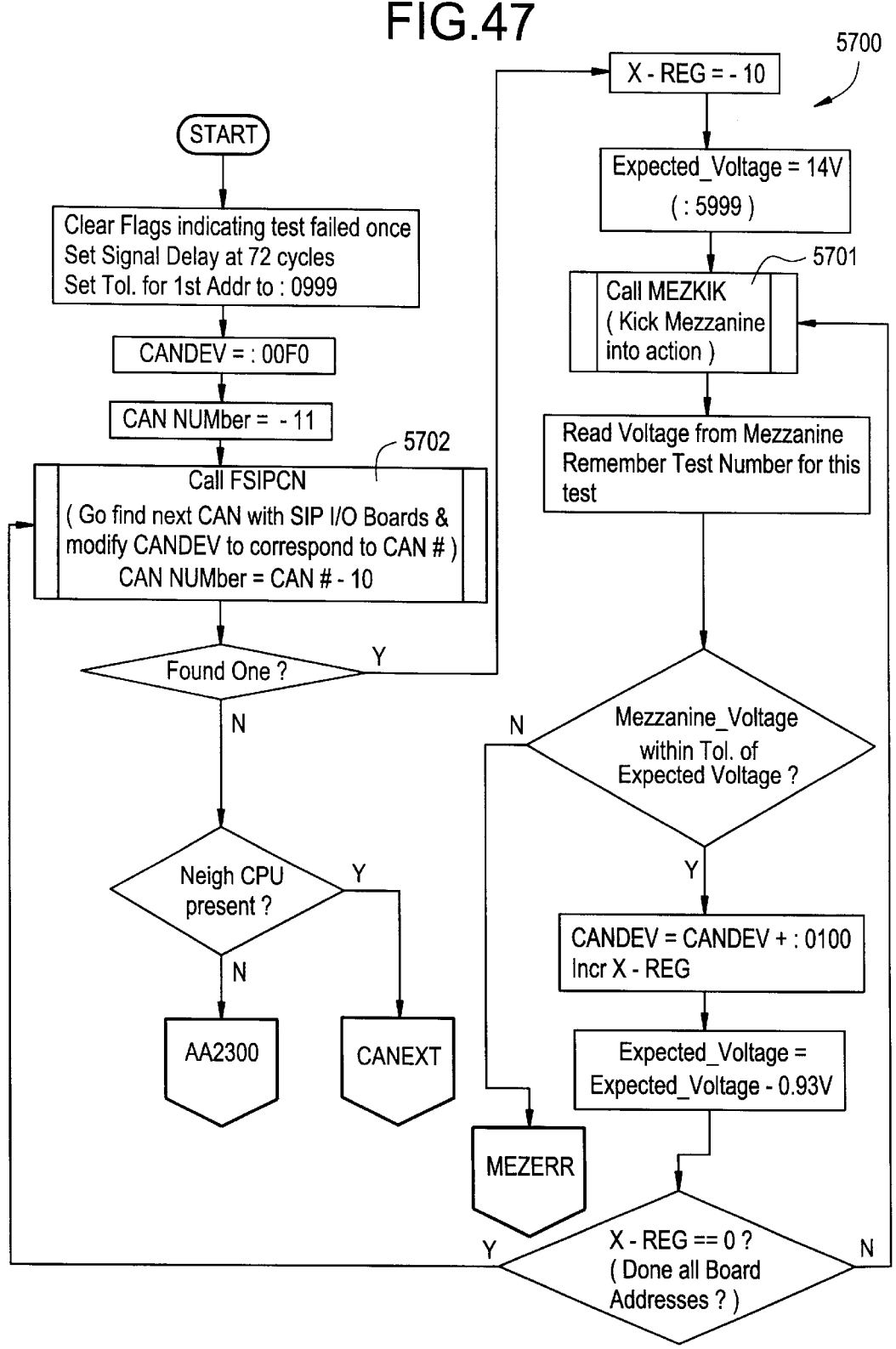
FIG. 47 presents a flowchart of the executable Machine Operation Code Board address testing during a normal Hz1 cycle.
Figure 48:
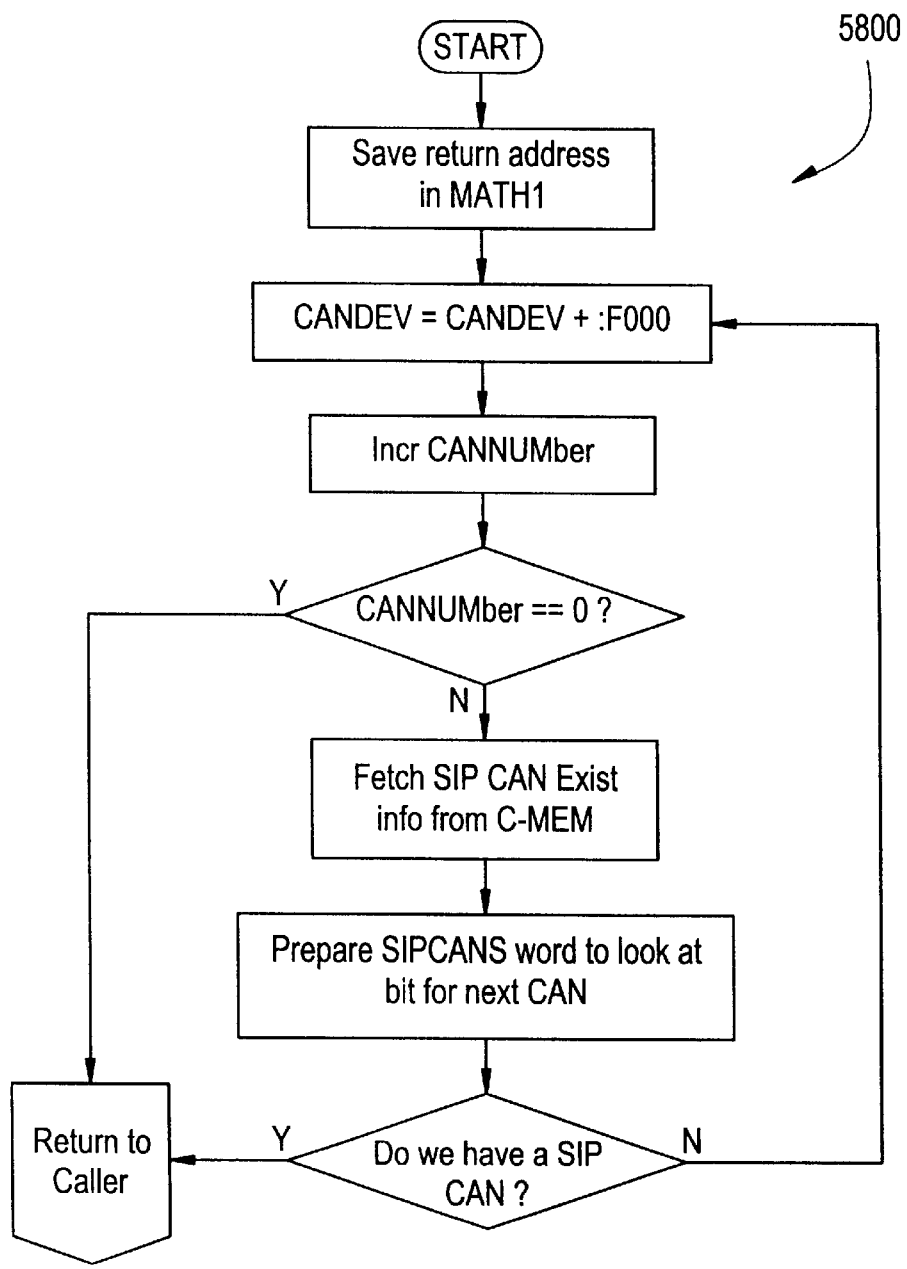
FIG. 48 presents a flowchart of the executable Machine Operation Code for locating and indexing I/O boards qualified for operations under SIL1, SIL2, or SIL3; halting Hz1 cycle execution if mixed (SIL and non-SIL) boards are in the system; foregoing activation of a strobe to the DO Deadman Circuit if mixed boards are in the system; and communication of a diagnostic to the control computer if mixed boards are in the system.
Figure 49:
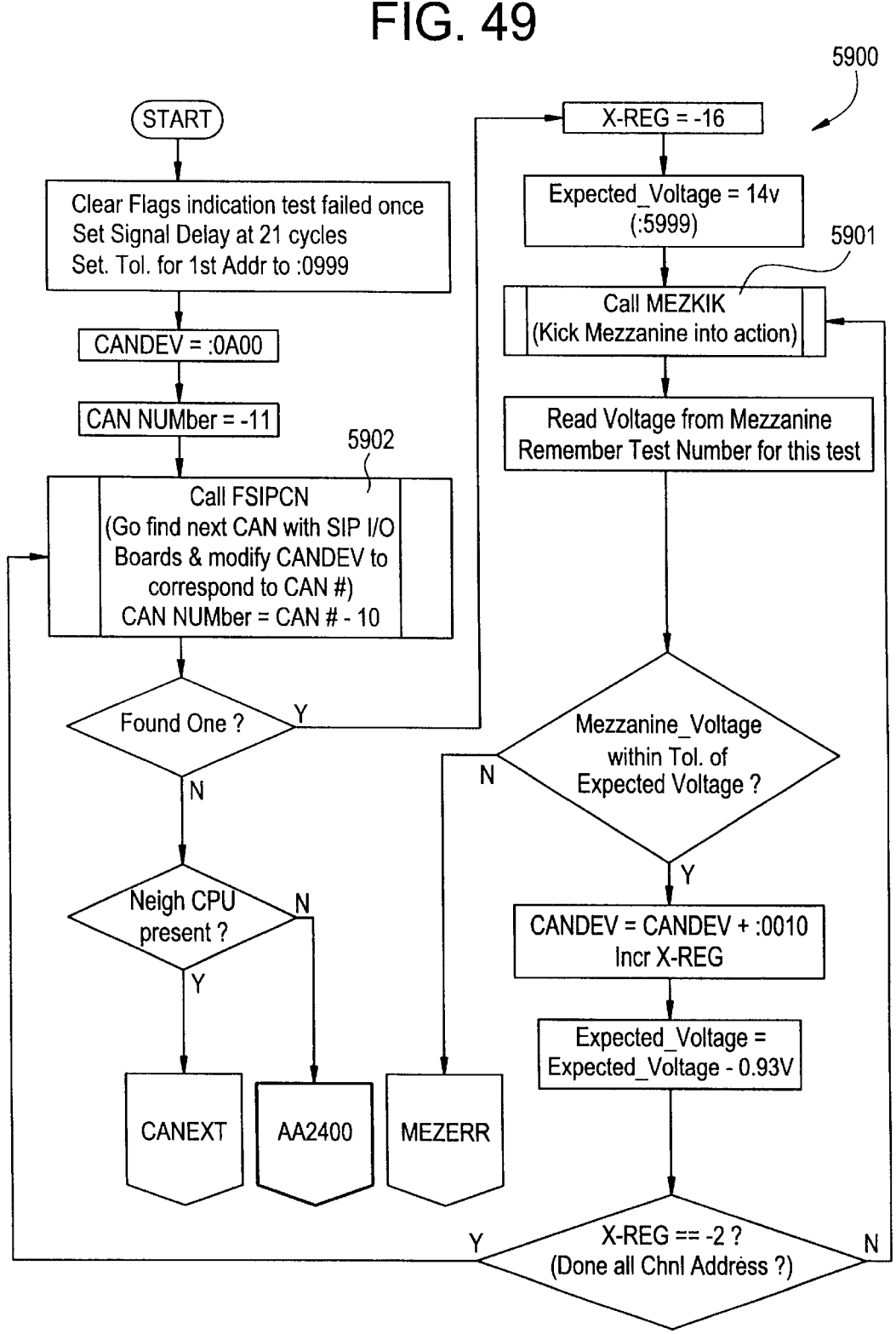
FIG. 49 presents a flowchart of the executable Machine Operation Code for a third nested flowchart of the executable Machine Operation Code of FIGS. 43A and 43B for the diagnostic set executed in real-time during a normal Hz1 cycle to test Channel addresses on Boards.
Figure 50:
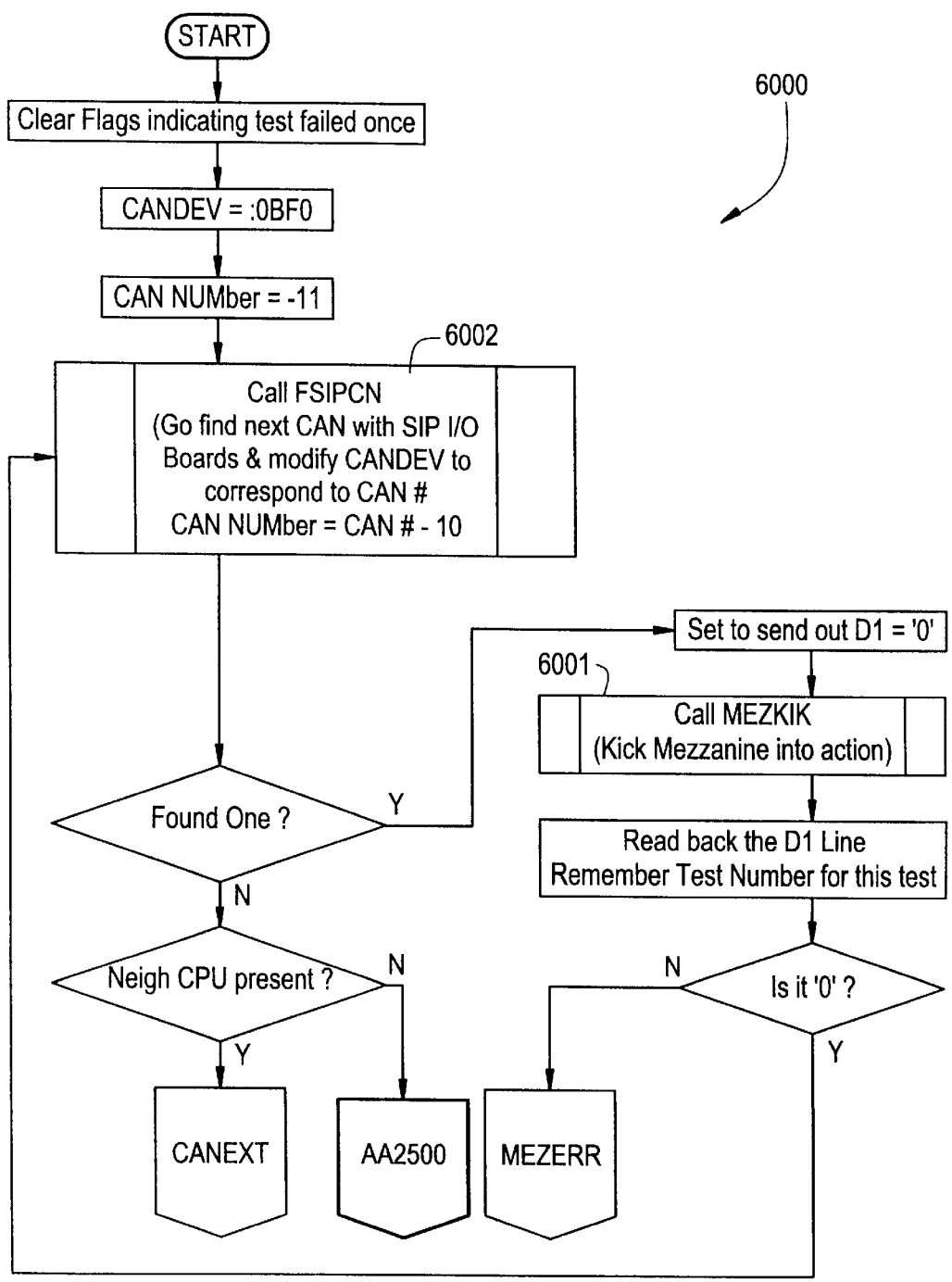
FIG. 50 presents a flowchart of the executable Machine Operation Code for a fourth nested flowchart of the executable Machine Operation Code of FIGS. 43A and 43B for the diagnostic set executed in real-time during a normal Hz1 cycle to test the ability to set and reset Digital Outputs.
Figure 51:
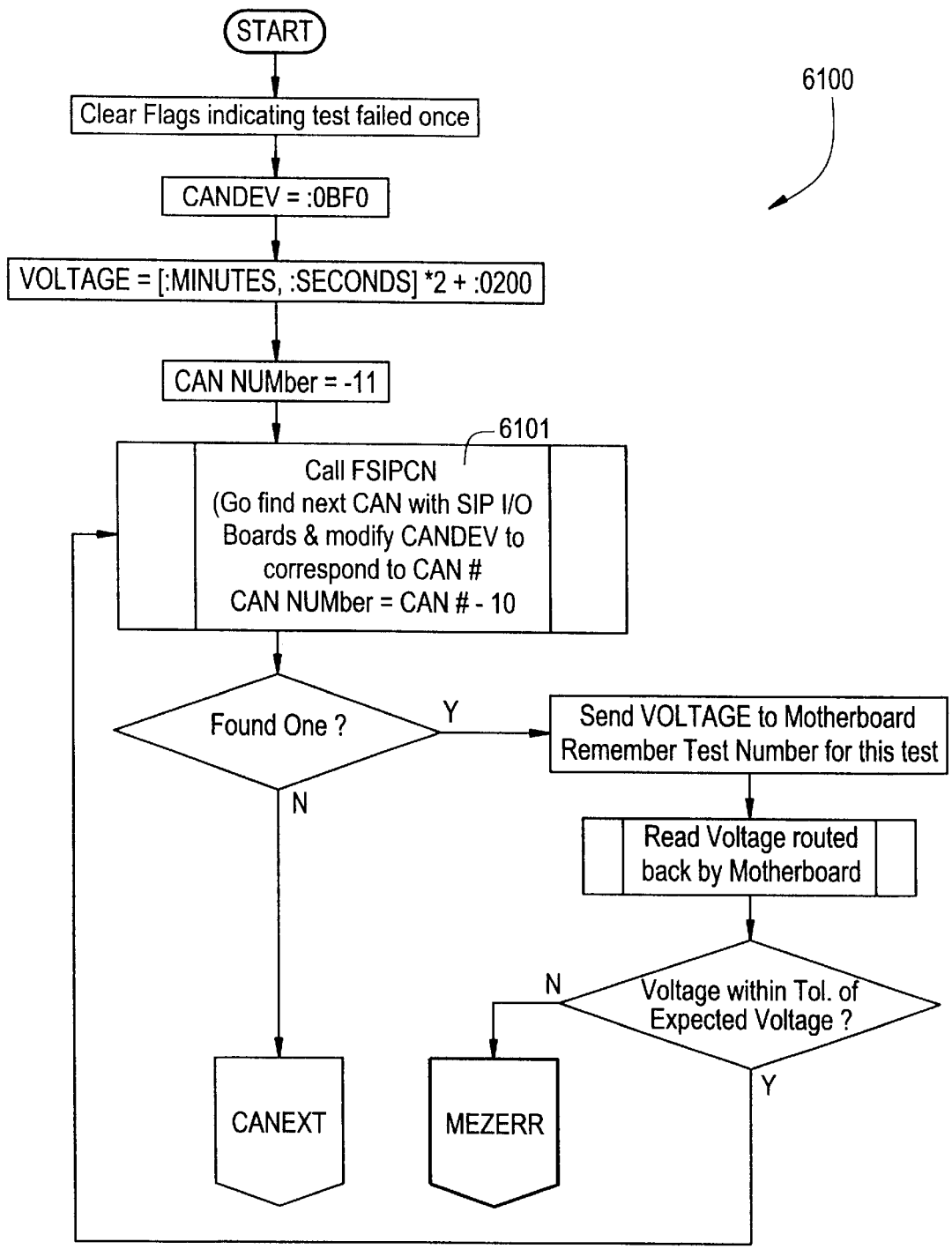
FIG. 51 presents a flowchart of the executable Machine Operation Code for a fifth nested flowchart of the executable Machine Operation Code of FIG. 53 for the diagnostic set executed in real-time during a normal Hz1 cycle to test Analog Output set functionality.
Figure 52:
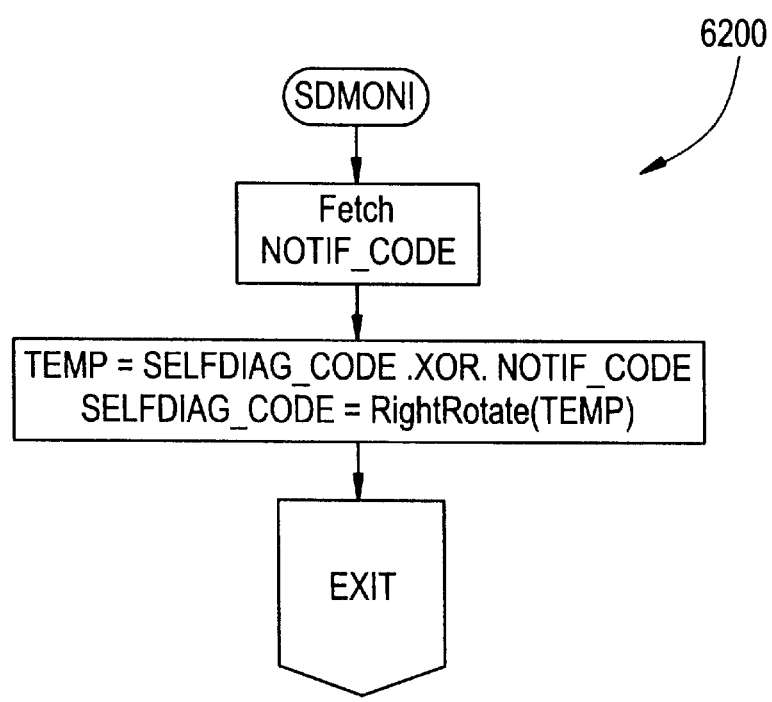
FIG. 52 presents a flowchart of the executable Machine Operation Code for monitoring the execution of self diagnostics.
Figure 53:
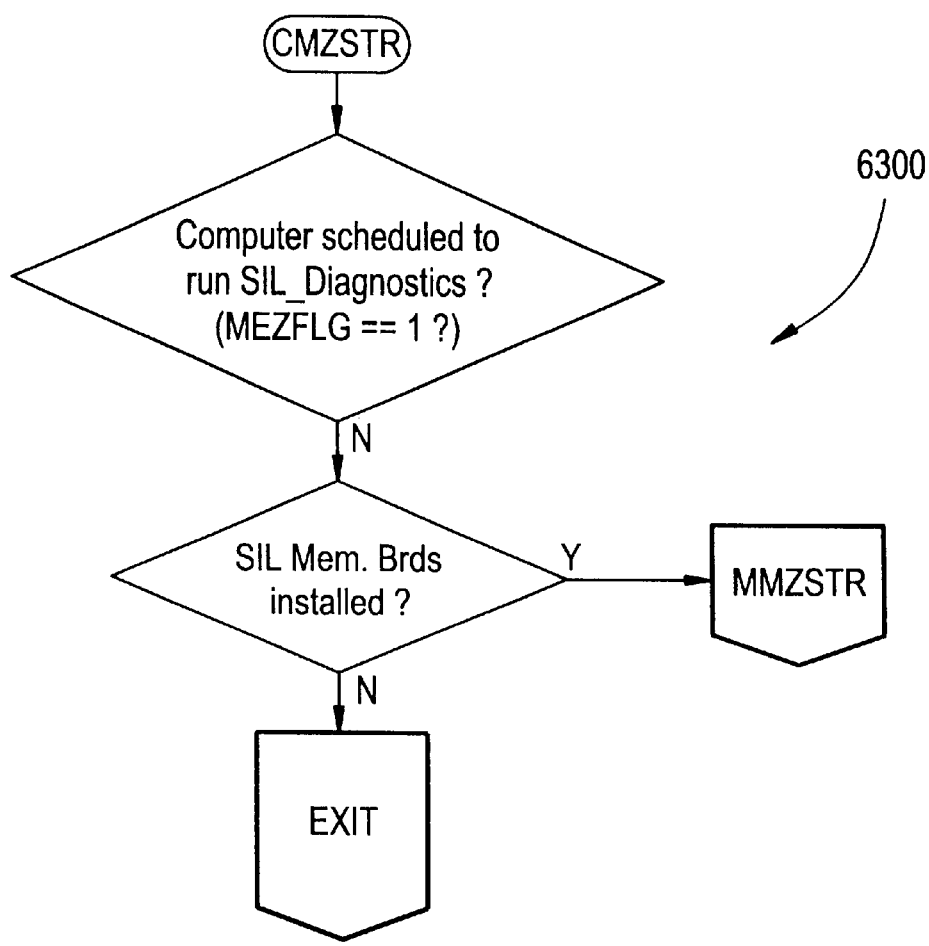
FIG. 53 presents a flowchart of the executable Machine Operation Code for determining if the Deadman should be strobed in a non-SIL rated system.
Figure 54:
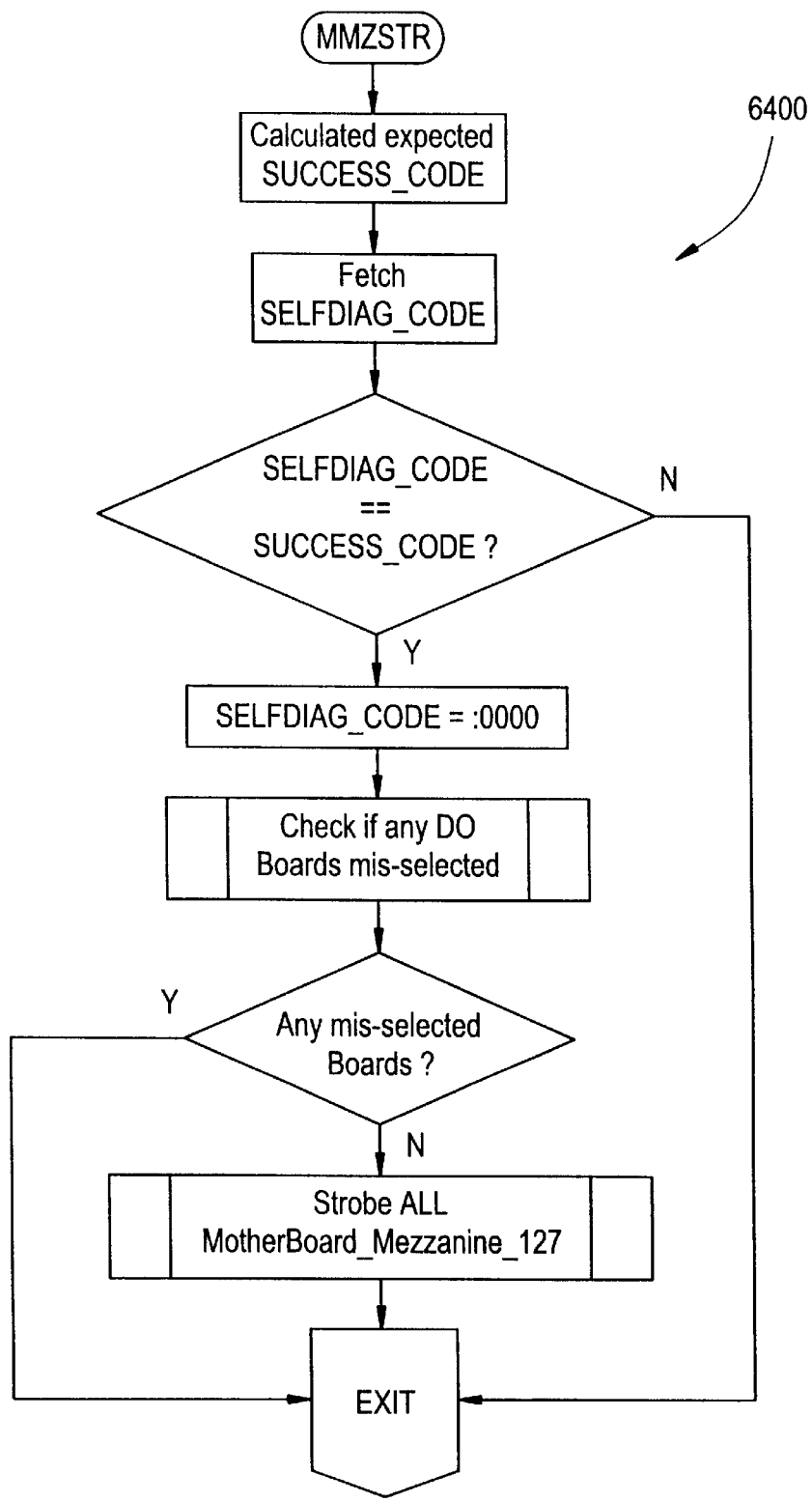
FIG. 54 presents a flowchart of the executable Machine Operation Code for determining if the Deadman should be strobed in a system rated under SIL1, SIL2, or SIL3.

Continuing the description with respect to FIGS. 41A and 41B, after conclusion of the mezzanine tests of either step 5103 or 5104, the processor testing is concluded and the mezzanine Deadman strobe is queried in step 5112. Details of this particular test are demonstrated in FIGS. 44A and 44B. With further respect to FIGS. 44A and 44B, step 5401 indicates that the mezzanine read comparator is activated as indicated by "kick mezzanine—read in comparator". The details of this particular routine are further shown in FIG. 45. FIG. 45 shows the accessing of the Mezzanine Boards as indicated. In this regard, and as earlier stated, the Motherboards of the individual cans have much of the Deadman circuitry disposed on boards which are known as the Mezzanine Boards. Continuing with a discussion of FIG. 46, FIG. 46 utilizes the FSIPCN routine executed as indicated in step 5602. This same routine is indicated in FIG. 47 at step 5702, in FIG. 49 at step 5902, in FIG. 50 at step 6002, and in FIG. 51 at step 5601. This routine is shown in FIG. 48 and is executed in order to determine, in each case, whether the relevant Can has safety integrity programming (SIP) IO boards. The MEZKIK routine, depicted in FIG. 45, is also called in each of the individual Mezzanine Board subroutines. In FIG. 46, this MEZKIK routine (the routine of FIG. 45) is activated at step 5601. In FIG. 47 it is activated at step 5701. In FIG. 49 it is activated at step 5901. In FIG. 50 it is executed at step 6001. The self diagnostics, depicted in FIGS. 41A and 41B, closes step 5112 and the strobing of the mezzanines; further details for this are indicated in FIG. 54 where the MMZSTR, or mezzanine strobe routine is executed. FIG. 52 shows the monitoring routine for monitoring the execution of self diagnostics and FIG. 53 shows a routine executed to determine if the mezzanine should be strobed or not via the use of the mezzanine strobe routine in FIG. 54. This generally concludes the description of detail related to techniques in the general categories of (1) start-up diagnostics executed by each control computer whenever Task D (or, conditionally, Task B) is initiated and (2) run-time diagnostics executed by each control computer while Task D, Task E, Task F (or, conditionally, Task B) is executing the Hz1 cycle in real-time after initiation is completed which are directed to confirming that (a) conditions validated by the start-up diagnostics continue in acceptable status and (b) the input and output signals are valid for use.

As previously noted, the techniques are organized in this specification into general categories of (1) start-up diagnostics executed by each control computer whenever Task D (or, conditionally, Task B) is initiated; (2) run-time diagnostics executed by each control computer while Task D, Task E, Task F (or, conditionally, Task B) is executing the Hz1 cycle in real-time after initiation is completed which are directed to confirming that (a) conditions validated by the start-up diagnostics continue in acceptable status and (b) the input and output signals are valid for use; (3) comparisons of Shadow Memory and regular memory values; (4) arbitration and alignment of Process Unit Steps between two control computers 10a,b functioning to execute actively redundant control; (5) run-time diagnostics executed by each control computer while Task D, Task E, Task F (or, conditionally, Task B) are executing the Hz1 cycle in real-time after initiation is completed which are directed to confirming that the Application Program Machine Operation Code which was intended for use by the programming engineer is the Application Program Machine Operation Code being used; and (6) enforcement of independence and "necessary domain separation" between (a) functions respective to the safety domain and aspect of the combined system and (b) functions respective to the general process control domain and aspect of the combined system.

In effecting technique and category 3, the use of comparisons between the Shadow Memory system and the normally used memory values (the third item above) is a critical component of enabling the predictability necessary for the safety shutdown system to be of use. In this regard, FIGS. 9A–12 and 3A and their affiliated discussion show details in implementing the comparator and error signal latch circuitry.

In effecting technique and category 4, arbitration and alignment of Process Unit Steps between two control computers 10a,b functioning to execute actively redundant control, Process Unit Steps are arbitrated and aligned between two control computers 10a,b as they execute actively redundant control. As previously noted in the definition of a SEQUENCE, Process Unit Steps (which are an attribute of a particular SEQUENCE) help the control program to define exactly what status the affiliated Process Unit is in at any particular moment of time. It is of value, therefore, that two control computers 10a,b executing actively redundant control on that particular Process Unit be aligned in terms of agreement respective to the status of the Process Unit for which the control is being executed. To enable this, an arbitration mechanism, much like the arbitration mechanism discussed for analog inputs, is utilized to maintain this alignment in the Process Unit Steps defined as active in the two control computers. The approach uses the same linkage described in U.S. Pat. No. 5,583,757 and essentially exchanges data respective to the step attribute of each particular SEQUENCE for which control is being executed in the same manner as the data for analog inputs or digital inputs are exchanged and a protocol which should be apparent is utilized to ensure that the two control computers 10a,b have the same perspective with respect to the appropriate step for the Process Unit. Note that a Process Unit Step is defined for each SEQUENCE defined, so (as is usually the case in implementation) a set of Process Unit Steps equal to the number of defined SEQUENCES (since a SEQUENCE always has only one active Process Unit Step at any moment of real-time) is arbitrated between the two control computers.

Another feature (technique and category 5) executes run-time diagnostics in each control computer as they execute the Hz1 cycle which are directed to confirming that the Application Program Machine Operation Code intended for use by the programming engineer (who originally was in a position of custody with respect to the logic which would be developed for control of apparatus 84) is indeed the Machine Operation Code which was loaded into the control computer. In this regard, it is possible for a control computer 10 to have its internal Machine Operation Code modified during the execution of its real-time cycle through means which are generally apparent to those of skill in the art of handling real-time computers by using, for example, a maintenance interface panel. A feature is provided for protecting against use of Machine Operation Code which has been modified in any manner not under the control of the Compiling Translator. This feature is implemented through the use of a check sum, such as a CRC (cyclic redundancy check), generated by the Compiling Translator at the time that the Machine Operation Code is first created. This checksum is subsequently loaded into the control computer at the time when the control computer program is first loaded in Task 4 as part of the Machine Operation Code loading process. As the control computer exits Task 4, it performs a comprehensive checksum of the non-variant Machine Operation Code; and, after entry into either Task D, Task E, Task F, or Task B, the control computer computes, in each Hz1 cycle increment, a certain portion of the checksum loaded into its memory. Over a period of time, not in excess of three hours, the entire non-variant Machine Operation Code base is processed to develop a dynamically re-determined checksum which should compare identically to the checksum stored in the control computer at the time of load. The comparison of the initially-loaded checksum with the dynamically re-determined checksum is then utilized to halt execution of the Hz1 cycle, Hz10 cycle, and Hz100 cycle in a computer having a deviation between the initially-loaded checksum (which was loaded based upon the Compiling Translators analysis of the Machine Operation Code) and the dynamically re-determined checksum (computed in real-time within the control computer).

The final key feature (technique and category 6) relates to the use of logical security domains to affect logical domain separation between functions which are respective to the safety domain of the system and functions which are respective to the general process control domain. In this regard, a portion of the control program Machine Operation Code has a variable set protected against modification by the operating technician at all times and all SIP variables are included in this set. This feature is overridden by the use of a software abort key in the custody of either the programming engineer or the ultimately accountable management of controlled apparatus 84, but such keys are for use only in very special situations with substantial monitoring by highly experienced personnel.

In addition to the previously discussed systems for guarding against modification of the Machine Operation Code as compiled, modification of the Machine Operation Code via the low level console is prevented by use of a firmware routine blocking all writes to memory except for a very limited set of specific locations. The Application program is divided into two domains: a general purpose control domain (having at least one file), and a SIP control domain (having at least one file). The SIP files have a checksum respective to their source content, as previously discussed, and are compiled with use of the SIP rule set.

The preferred embodiment uses a digital system to automate control and safeguarding of apparatus 84 in the dynamic execution of its function. The following steps outline an overview of the approach to control of apparatus 84.

TABLE 1

| operational step within the process control operating system | ACTION |
|---|---|
| 1 | Sample the measurements of apparatus 84. This is the "data snapshot": the process measurements are taken on a Hz1, Hz10, or Hz100 cycle time interval; and the measurements are then transformed to be "input data" in the database of the control computer (the Application Program defines the Hz10 and Hz100 inputs and outputs specifically). |
| 2 | Using the input data in the database of the control computer, compute new output conditions, and update the database with these new output conditions as "output data". |
| 3 | Transform "output data" to output signals which are forwarded to control elements in apparatus 84 (for modifying attributes of apparatus 84) based on the new "output data" in the database. The output signals thereby dictate the position of all actuators. |
| 4 | Wait to the beginning of the appropriate predefined time interval (that is, without limitation, 1 second for Hz1, .1 seconds for Hz10, and .01 seconds for Hz100) and "start over" at operational step 1. |

In modeling the above, the preferred embodiment is built around a database with time-scheduled computer tasks for input into and output from the control computer database. In this regard, there is a distinct moment in time where the database is updated with a new sample of the real-time status of controlled apparatus 84; this status is maintained throughout the sample interval and is not updated until the next cycle. The terms 'INPUT' and 'OUTPUT' for this model in the context of the preferred embodiment process control system are further explored in Tables 2 and 3.

TABLE 2

| INPUTS In from | Data |
|---|---|
| Field (sensors in apparatus 84) | AI, DI |
| Operator | MCU, SCU, Operator Station via process control system "data write" (in re U.S. Pat. Nos. 5,568,615; 5,519,603; 5,428,745; and 5,631,825) |
| control computer to control computer via network controller | AC, DC |
| outside computer value input (for example, an advanced control system) | TA, TD |

TABLE 3

| OUTPUTS Out-to | Data |
|---|---|
| Field (control elements in apparatus 84) | AO, DO, DA (abort signal) |
| Operator | Alarms, Graphics, Operator Station flowsheets, Event messages via (for example) a printer |
| Control program | AC, DC, delay time count (a "computer implemented 'egg timer'"), Process Unit Step (general process control domain), SSTEP (Current Process Unit Step in the SEQUENCE having the corresponding numeric identifier as the SSTEP index value), general statuses and conditions calculated in the Hz1 cycle (these values complement the input dataset for control decisions in the Next second). |

Figure 55:
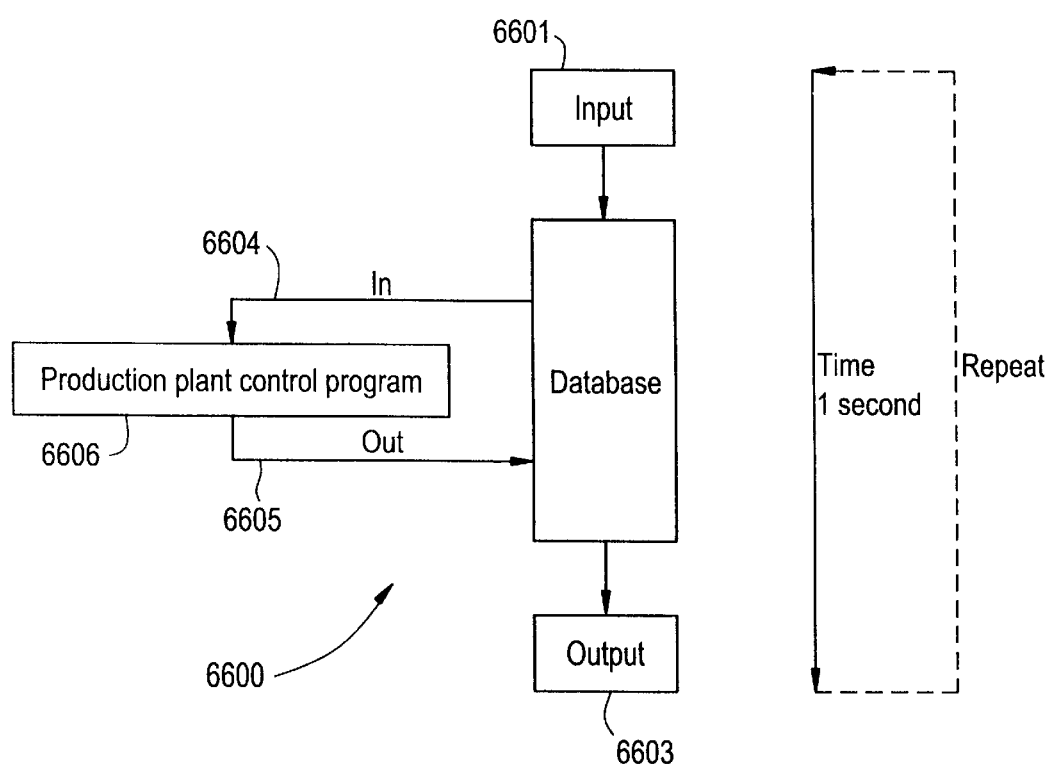
FIG. 55 presents a description of the overall Hz1 control cycle respective to the Application Program orientation.

Turning now to a consideration of FIG. 55, a description of the overall Hz1 control cycle respective to the Application Program orientation is depicted. In this regard, 'Input' 6601 represents the INPUT sampling of the process plant sensors in apparatus 84. 'Output' 6603 represents the update of hardware AO's, DO's and DA's for modifying the status of control elements in apparatus 84. 'In' 6604 to the control program is the data set worked upon, representing input data from "this second's" interval, constants, and calculated. results (output data) from the "previous second". 'Out' 6605 from the control program is output data from Table 3. The non-variant part of the Machine Operation Code executing in the control computer is indicated as the Production Plant Control Program 6606.

FIG. 55 depicts the general model; however, approaching the automation of a large apparatus (such as, without limitation, a chemical processing plant) as a whole needs to be usefully fragmented into virtual reference domains in order for the human mind to comprehend a comprehensive set of considerations in either operational decisions or in structuring software source code in developing an Application Program for further compilation into control-computer-implemented logic. In implementing this task, apparatus 84 is perceived in the context of smaller domains of process equipment, called "Process Units" (represented by the SEQUENCE in preferred embodiment Application Program terminology) for which an operational procedure is defined individually. The preferred embodiment Application Program term SEQUENCE is associated with the sequential procedures to operate such a "Process Unit". Examples for a "Process Unit" are "unit operations" (that is, "distillation tower" or "cracking furnace" "Process Units" for executing "unit operations" such as a "distillation" or "cracking"); another example of a "Process Unit" could be a "unit process" such as an "esterifier", which could include several "unit operations". In executing real-time operation of a Process Unit, (a) a number of time-correlated activities are needed to bring the equipment in apparatus 84 into a useful and dynamically stable production ("run") state, and (b) a number of time-correlated activities are needed to bring the equipment in apparatus 84 from the "run" state to a "full-stop" state. These operational procedures are executed in incremental status instances defined as attributes of the SEQUENCE in the form of Process Unit Steps. The Process Unit Step, therefore, identifies the activity done by a SEQUENCE at a particular moment in time. The operations of the individual Process Units must be coordinated in real-time. The SEQUENCE Process Unit Step is important in this context. The Process Unit's SEQUENCEs mutually communicate their current activities using their Process Unit Step status. Process Unit Steps change as their SEQUENCEs progress through the overall operational procedure used to operate apparatus 84 over an extended period of time. This means that the change of the Process Unit Step from a first Process Unit Step instance to a subsequent Process Unit Step instance must be carefully timed in the discrete world of the digital control computer executing the operational procedures for the entire apparatus under control.

Figure 56:
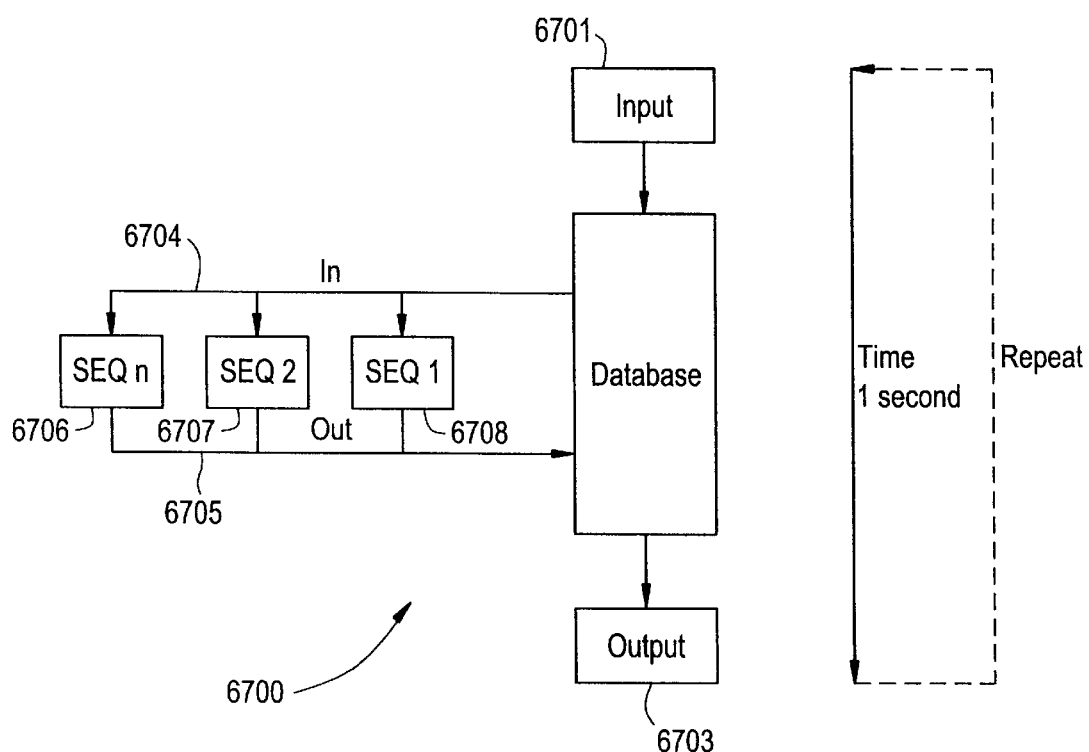
FIG. 56 presents a description of the overall Hz1 control cycle respective to the Application Program orientation modified with a "Process Unit" concept.

FIG. 56 modifies the model of FIG. 55 with the "Process Unit" concept. FIG. 56 depicts the overall Hz1 control cycle respective to the Application Program. In this regard, 'Input' 6701 represents the INPUT sampling of the process plant sensors in apparatus 84. 'Output' 6703 represents the update of hardware AO's, DO's and DA's for modifying the status of control elements in apparatus 84. 'In' 6704 to the control program is the data set "worked-upon". It represents input data from "this second's" interval, constants, and calculated results (output data) from the "previous second". 'Out' 6705 from the control program is output data from Table 3. SEQ as in SEQ n 6706, SEQ 2, 6707, and SEQ 1 6708 represent separate SEQUENCES in the Application Program to incorporate the "Process Unit" concept. In comparing the models of FIG. 55 and FIG. 56, only the division of the production plant control program (the Application Program as executionally expressed in control-computer-executed logic) into SEQUENCEs represents a modification. But the shift is profound in the sense that a particular datalogical object is defined for representing, into the control computer database, the traditionally recognized virtual concepts (that is, the traditional concepts of "unit operations" or "unit processes" are recognized as being achieved with Process Units which map to the SEQUENCE data objects used by the programming engineer in defining the Application Program for compilation to the Machine Operation Code for control computer 10).

Figure 57:
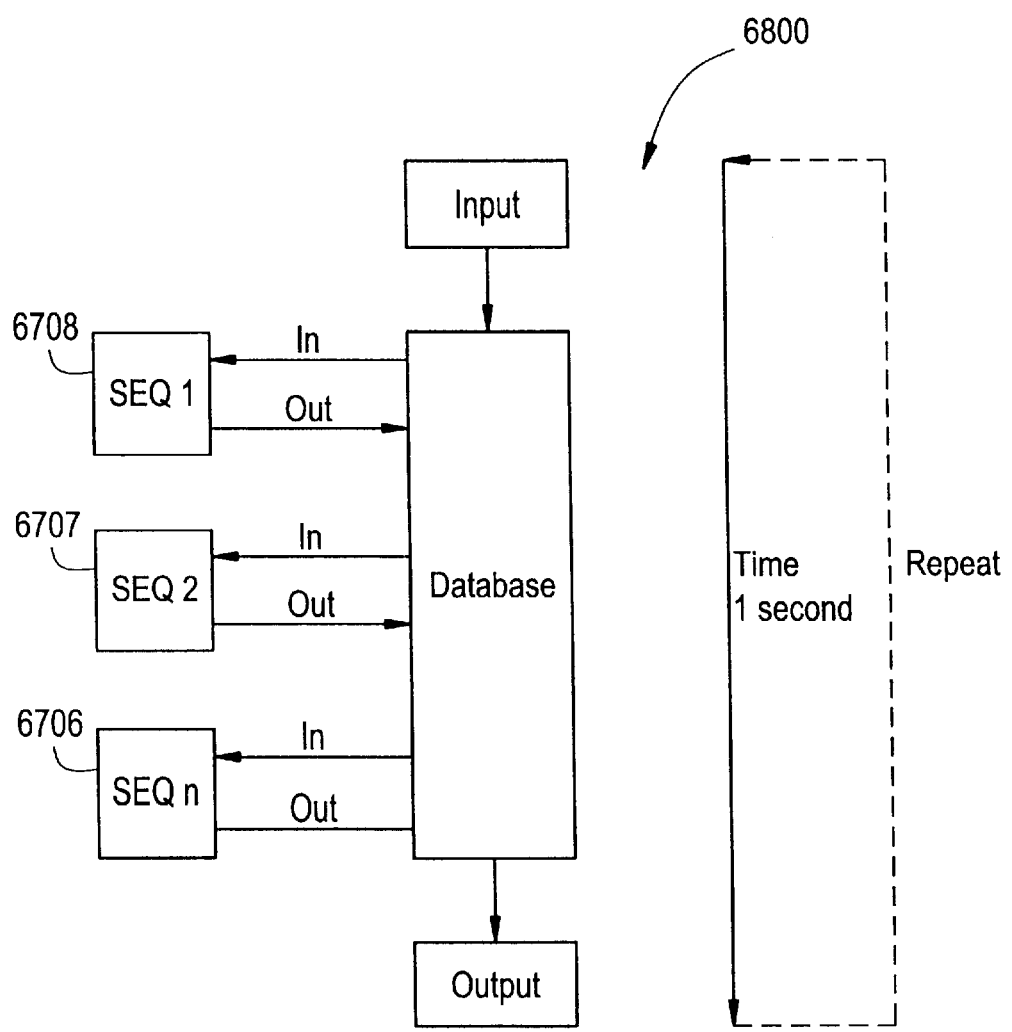
FIG. 57 presents a description of the overall Hz1 control cycle respective to the Application Program orientation modified with a "Process Unit" concept and further modified to show control-computer-executed logic specifically related to SEQUENCE considerations in Hz1 execution.

As shown in FIG. 57, the control-computer-executed logic specifically related to SEQUENCE considerations in Hz1 execution which was discussed in FIG. 56 is executed serially; the SEQUENCEs do not generally 'time-share' the computer resources on swapping basis but proceed through their individual logic sets in a serial manner to effect a procedural logic expert-system approach in a real-time control system. In this regard, however, Hz10 and Hz100 operations do interrupt Hz1 SEQUENCE operations—it is the Hz1 cycle that proceeds on a non-swapped basis respective to other Hz1 activities. In the Hz1 cycle, the computer resources are first assigned to execute the procedures for SEQ 1 (SEQUENCE) 6708 and, when concluded, the computer resources are assigned to SEQ 2 (SEQUENCE) 6707, and so on.

A study of FIG. 57 indicates that, if SEQ (SEQUENCE) 1 makes a Process Unit Step movement to a new Process Unit Step, SEQUENCES 2 and n could have a misaligned status indicator respective to the nature of apparatus 84 at the time of Hz1 data input. The new Process Unit Step value for SEQ (SEQUENCE) 2, identifying the activity done by that SEQUENCE, no longer fits the sample of data from apparatus 84 at the time of input for the "present" Hz1 cycle. Although this misalignment is resolved in the following Hz1 cycle, the misalignment in certain safety situations can lead to unnecessary shutdown directives from the control-computer system. To facilitate well-coordinated operation in a set of SEQUENCEs, a particular method of programming respective to Process Unit Step changes in the SEQUENCEs is provided.

Progression from one Process Unit Step to a subsequent Process Unit Step in the preferred embodiment is enabled in three ways: a TERM operation, a STEP operation, and a JSTEP function call operation.

The TERM operation proceeds by each SEQUENCE checking, in Hz1, the progress of the activity in the current Process Unit Step. If process measurements (taken from the database) signal that everything specified for the current Process Unit Step has been fulfilled, then the Process Unit Step is terminated and the SEQUENCE proceeds to the next Process Unit Step in numerical rank. The conditions for Process Unit Step termination are part of the operational procedures for that SEQUENCE; if the termination condition is satisfied, a proposed advance is entered in the current Hz1 cycle.

Process Unit Step change can also be invoked when serious process hazards arise to implement programmed procedures for an emergency plant shutdown. The JSTEP function call operation is discussed in another part of this specification as a priority Process Unit Step initiator (directed to stinted shutdown) whose progression cannot be impeded by a "Hold-In-Step". "Hold-In-Step" is a SEQUENCE attribute which activates upon the occurrence of certain Alarm attributes and functions to impede progression from one Process Unit Step to another Process Unit Step even if all other conditions have been fulfilled for such progression to occur. In this regard, Alarms are optionally Process Unit Step conditional in the preferred embodiment, and the use of the "Hold-In-Step" SEQUENCE attribute provides a basis for resolution of alarmed conditions before the control approach can shift in the context of a different Process Unit Step.

Another method for changing the Process Unit Step is via the STEP command, where the progression is to any defined Process Unit Step in the SEQUENCE; wherein the TERM command is useful for moving from Process Unit Step x to Process Unit Step x+1, the STEP command is used for going from any Process Unit Step x to any other Process Unit Step z—in this regard, the Application Program statement usually incorporates reference to the full transition (that is, the beginning Process Unit Step and the ending Process Unit Step as in "'Process Unit Step y' IF 'Process Unit Step x' AND 'conditions for transfer'") so that the transfer is effected only from the desired prior Process Unit Step.

Active redundant control computer operation adds further complexity to Process Unit Step progression because of the need for essential synchronization between the output signals defined by each control computer; a method for arbitrating differences between control computers 10a,b is needed to insure that such shifts in the Process Unit Step status are essentially implemented in the databases of both control computers 10a,b at essentially the same moment in real-time. The solution to this need is (a) to first enable a proposed Process Unit Step advance as the Process Unit Step control-computer-executed logic for each SEQUENCE is executed, (b) subsequently (within the Hz1 cycle time) arbitrate the proposed Process Unit Step advances within both control computers, and (c) effect the proposed Process Unit Step advances at the conclusion of the arbitration in each control computer for each SEQUENCE where a proposed Process Unit Step advance existed. In this regard, the control-computer-executed logic for each SEQUENCE determines a proposed Process Unit Step advance, but the proposed Process Unit Step advance is not executed into the control computer 10 database until the arbitration process has executed on the proposed Process Unit Step advances from the control computers. The appropriate arbitration rules include considerations to "use" the "safest" Process Unit Step. Process Unit Step change in the Hz1 cycle is done before the SEQUENCE logic is executed in the new second, just after the Fox and Dog data exchange across the major-link for input signal arbitration in Hz1 Step Link Remaining 2614. This provides arbitrated input data, together with arbitrated Process Unit Step data, for use by all SEQUENCEs at the start of SEQUENCE program execution at START SEQUENCE 2546.

Figure 58:
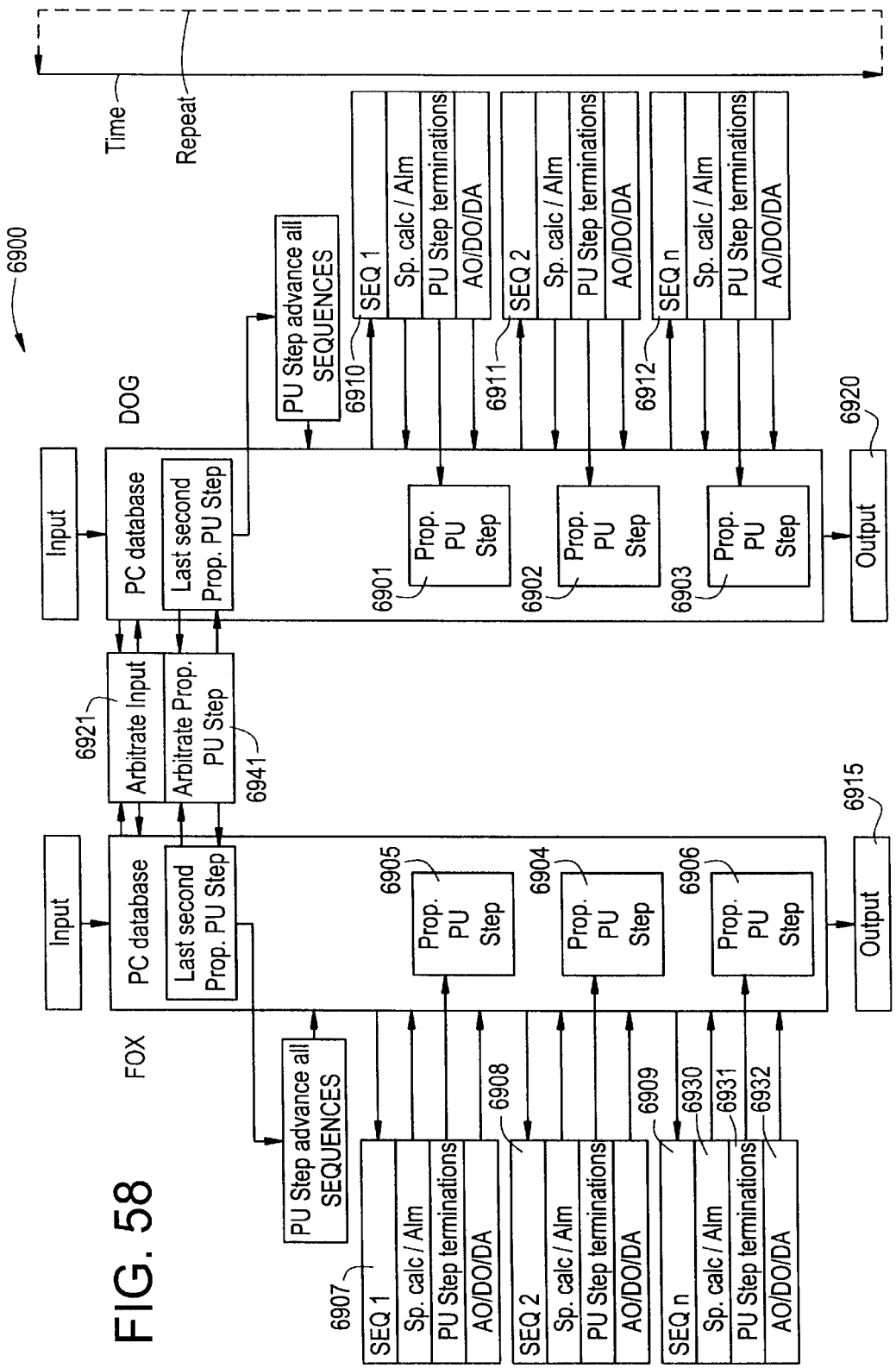
FIG. 58 depicts the Process Unit Step model for the overall Hz1 control cycle respective to the Application Program orientation modified with a "Process Unit" concept and further modified with SEQUENCE considerations in Hz1 execution.

FIG. 58 depicts the Process Unit Step advance method in Process Unit Step model 6900 for this process. The model 6900 enables the SEQUENCEs to have uniform information respecting the current Process Unit Step, for all SEQUENCEs programmed, during the Hz1 cycle in both control computers (this also effectively further coordinates all associated attributes for Process Unit Step advance and use—for example: SSTEP—the current Process Unit Step for the SEQUENCE; STIME—time in the current Process Unit Step; SHOLD—the existence of a hold in the Process Unit Step in the SEQUENCE which can only be overridden by an JSTEP; MAX—the maximum amount of time permitted in a Process Unit Step before an alarm is sounded and an affiliated bit is set, except via JSTEP; MIN—the minimum amount of time needed in a Process Unit Step before it is exited, except via JSTEP; and HOLD—the existence of a Hold in the Current Process Unit Step, which can only be overridden by a JSTEP). In further consideration of FIG. 58, "Prop. PU Step" 6901,6902,6903,6904,6905,6906 references the "proposed" Process Unit Step change in each of the three separately-depicted SEQUENCE logical sections, where SEQ 1 in drawing element 6907 references SEQUENCE 1 in the Fox, SEQ 1 in drawing element 6910 references SEQUENCE 1 in the Dog, SEQ 2 in drawing element 6908 references SEQUENCE 2 in the Fox, SEQ 2 in drawing element 6911 references SEQUENCE 2 in the Dog, SEQ n in drawing element 6909 references SEQUENCE n in the Fox, and SEQ n in drawing element 6912 references SEQUENCE n in the Dog. Output 6915 is the Fox output mapping to Output 6703, and Output 6920 is the Dog output mapping to Output 6703. "Arbitrate Prop. PU Step" 6941 maps to Step Arbitration 2609b in FIG. 20. In model 6900, "Sp. Calc/Alm" in drawing element 6930 shows the calculation of Special Calculations and Alarms for SEQUENCE n in the Fox, drawing element 6931 shows the determination of "Prop. PU Step" 6906 to calculate a Process Unit Step change in the Fox Hz1 cycle, and AO/DO/DA 6932 indicates the calculation of Analog Output, Digital Output, and Digital Abort signals for SEQUENCE n in the Fox.

TERM and STEP commands have no priority over (a) a manual step change command entered via MCU, SCU or Operator Station by the operating technician, or (b) the JSTEP. If any of these step advance commands become active in the same second, the JSTEP function call Process Unit Step has the highest priority. If multiple Process Unit Step advance commands become active in the same second without either an operating technician input or a JSTEP, priority is simply a matter of the last Process Unit Step change defined for a SEQUENCE predominating. Process Unit Step advance is only executed when data in "proposed step" points to a different value than contained in SSTEP.

The definition of an active JSTEP function call status overrides any Process Unit Step Hold status in the SEQUENCE to initiate the modification of the dynamic state of apparatus 84 to (or toward) a state considered to be of less risk than "normal" operation. In this regard, the dynamic and comprehensive status of apparatus 84 might be such that complete and immediate cessation of dynamic fluid operations is not the safest course of action in some emergency contexts, but that, rather, an interim reduced risk state of operations (for example, without limitation, controlled cooling and controlled deceleration of the rate of fluid flow within the system) optimally defines a preferable approach (as an alternative to complete de-energerization of all control elements) in achieving the best safety in operation of apparatus 84 given that normal operations cannot be sustained. This "stinted" (that is a "restrained", "limited", and "restricted") operational shutdown of apparatus 84 is effected by the control computer in response to the JSTEP function call when asserted as TRUE and when the Machine Operation Code in Hz1, Hz10, and Hz100 execution provides computer-executed logic which responds to the Process Unit Step defined by the JSTEP function call. The JSTEP function call is virtually, therefore, an attribute and datalogical object of the SEQUENCE and is utilized to affect a stinted-shutdown modification in the characterized operational manner in which apparatus 84 is controlled by control computer 10. As such, the JSTEP function call constitutes a stinted-shutdown status process control object. A number of different JSTEP function call scenarios are managed and accommodated in an Application Program. However, it is of further importance to have a clear priority established between different JSTEP function call possibilities so that a clearly determined priority of shutdown scenarios always exists. Therefore, to provide for determinate selection of the most critical JSTEP function call in managing the many levels of the shutdown imperative, the preferred embodiment also provides for a stinted-shutdown status process control object type having a priority attribute parameter where the priority attribute parameter supports a plurality of (for example, five) priority levels. The JSTEP function call in the general control domain is therefore an attribute of A SPECIFIC SEQUENCE and is determined in the control-computer-executed logic defined for that SEQUENCE.

The SIP domain is comprised of at least one SIP section (file) in the Application Program for compilation in view of the SIP rule set within the Compiling Translator. The SIP rule set provides SIL-conformant compilation respective to logic progression, data type, and data security. The general purpose control section (at least one file) in the Application Program is compiled without consideration of the SIP rule set within the Compiling Translator. In view of the above, a Process Unit Step needs to have an identifier in an attribute respective to SIP domain membership. The JSTEP function call prepares the SEQUENCE to terminate the current Process Unit Step and move into a shutdown Process Unit Step by entering the shutdown step number, specified in the command, in the proposed Process Unit Step table for arbitration in ARBLINK 2526. The actual Process Unit Step change is done at a later moment in time at STEP ADVANCE 2531. The JSTEP function call has priority over the manual Process Unit Step change command entered via MCU, SCU or Op. Station, which have further priority over Process Unit Step changes proposed via the commands TERM and STEP. In implementing arbitration respective to model 6900, priority is effected in the following manner:

1. JSTEP function call carries highest priority with the priority attribute determining the JSTEP function call which will be processed if more than one occurrence of the JSTEP function call is identified to the proposed Process Unit Step set for the SEQUENCE, with a specific Process Unit Step being identified for each JSTEP call. If the Process Unit Step identified for a JSTEP call is a SIP variable, then that JSTEP call can be made within the SIP domain.
2. Operating technician Process Unit Step change requests carry medium priority (Last Process Unit Step change proposed in the Hz1 cycle is processed).
3. Programmed auto Process Unit Step change via STEP or TERM commands carry lowest priority (Last Process Unit Step change proposed in the Hz1 cycle is processed).

During execution of the SEQUENCE control program, Process Unit Step change commands are prioritized according to the above rules in the preferred embodiment, to cope with multiple Process Unit Step change requests for a SEQUENCE in a single Hz1 cycle instance and to come up with a single Process Unit Step change request for the arbitration process.

The above priority rules enable:

1. If the control-computer-executed logic forces a SEQUENCE into a "shutdown" Process Unit Step by activating the JSTEP, nothing can interfere: neither another TERM or STEP defined Process Unit Step shift is active at the same time, nor an operating technician input via the MCU or SCU implementing a manual Process Unit Step change request.
2. For the case where multiple JSTEP function calls are active for the same SEQUENCE in the same Hz1 cycle instance, priority rules are that the JSTEP function call with the highest priority (for example, 1 through 5, in which 1 is highest and 5 is lowest) will execute.
3. If the operating technician enters a Process Unit Step change request (via the MCU, the SCU, or the Operator Station) and the control program has a programmed TERM or STEP Process Unit Step shift active, the operating technician entry wins.
4. For the case of multiple TERM or STEP Process Unit Step shift statements active for the same SEQUENCE, the statement programmed last wins.

In case of a single control computer being active in control of apparatus 84, Process Unit Step arbitration can not take place and the Process Unit Step advance proceeds according to the above rules in the preferred embodiment without the benefit of arbitration.

Figure 59:
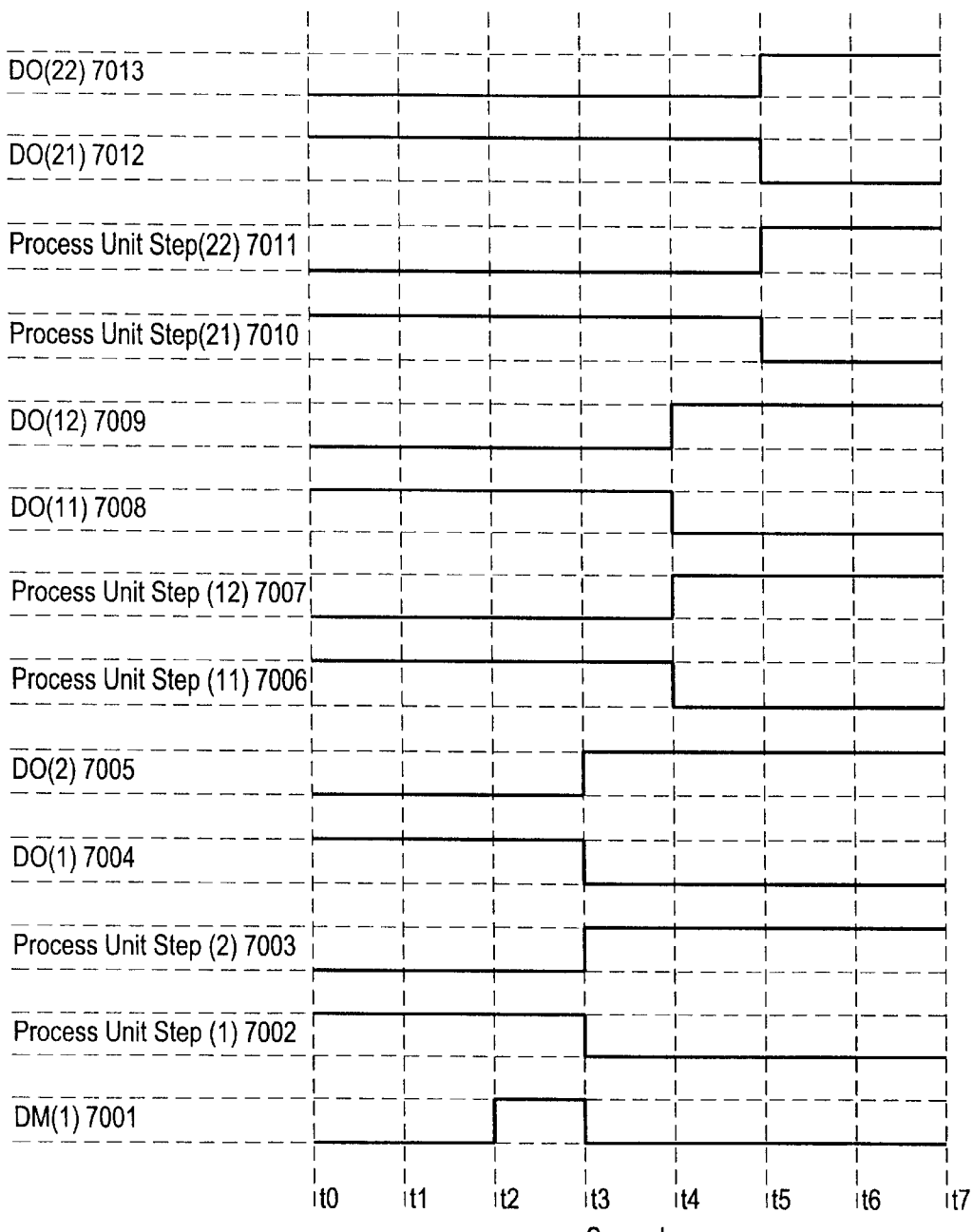
FIG. 59 illustrates the nature of the occurrence of changes in the database of the control-computer-executed logic in real-time respective to a pseudo code example in the context of the Process Unit Step model.

The following preferred embodiment Application Program example and FIG. 59 illustrate the nature of the occurrence of changes in the database of the control-computer-executed logic in real-time respective to the above discussion:

START SEQ(1)
Process Unit Step(1) IF RESTART
Process Unit Step(2) IF DM(1)
DO(1) IF Process Unit Step(1)
DO(2) IF Process Unit Step(2)
END SEQ(1)
START SEQ(11)
Process Unit Step(11) IF RESTART
Process Unit Step(12) IF Process Unit Step(2)
DO(11) IF Process Unit Step(11)
DO(12) IF Process Unit Step(12)
END SEQ(11)
START SEQ(21)
Process Unit Step(21) IF RESTART
Process Unit Step(22) IF Process Unit Step(12)
DO(21) IF Process Unit Step(21)
DO(22) IF Process Unit Step(22)
END SEQ(21)

With respect to FIG. 59, the above pseudo code is restated below with annotation and identifiers in the Figure—a change in the level of the locus respective to a particular data variable in FIG. 59 shows the shift from FALSE TO TRUE or from TRUE to FALSE; in this regard, the time of change is shown to be over a period of one second to depict the time of proposed change vs. the time of implementation—in implementation, the change is a step function.

START SEQ(1)
Process Unit Step(1) 7002 IF RESTART
  "RESTART" defines "second 1" (t0 to t1) in FIG. 59"
Process Unit Step(2) 7003 IF DM(1) 7001
  "DM" is a "digital manual value change"—a variable changed arbitrarily in time by an operating technician
DO(1) 7004 IF Process Unit Step(1) 7002
  "DO" is "digital output" which results in a Digital Output signal to apparatus 84
DO(2) 7005 IF Process Unit Step(2) 7003
END SEQ(1)
START SEQ(11)
Process Unit Step(11) 7006 IF RESTART
Process Unit Step(12) 7007 IF Process Unit Step(2) 7003
  "Note that SEQUENCE 11 can reference the status of Process Unit Step(2) 7003 in SEQUENCE 1"
DO(11) 7008 IF Process Unit Step(11) 7006
DO(12) 7009 IF Process Unit Step(12) 7007
END SEQ(11)
START SEQ(21)
Process Unit Step(21) 7010 IF RESTART
Process Unit Step(22) 7011 IF Process Unit Step(12) 7007
  "Again, note that SEQUENCE 11 can reference the status of Process Unit Step(12) 7007 in SEQUENCE 11"
DO(21) 7012 IF Process Unit Step(21) 7010
DO(22) 7013 IF Process Unit Step(22) 7011
END SEQ(21)

Figure 60:
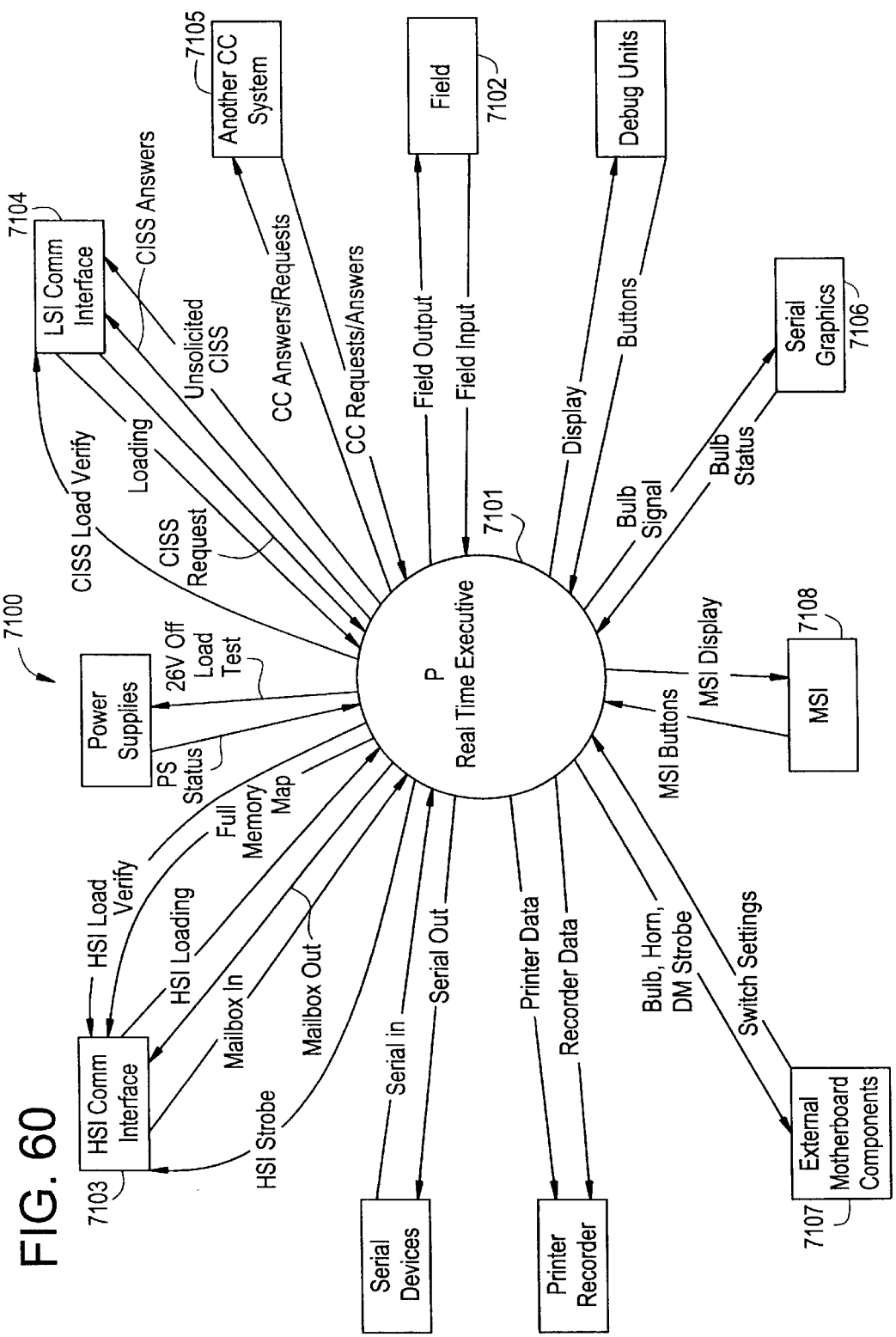
FIG. 60 illustrates a system context data flow diagram for the control computers.

The previous information relating to materials incorporated by reference, the discussion of hardware specifics, and a further discussion of software specifics (related both to the control computer operating system features and to the Application Program features as used by the programming engineer to develop a particular instance of control-computer-executed logic used to control an apparatus 84) all describe incremental pieces in assembling the overall system. The essential plurality of logical pieces conjoined together in implementing the described embodiment is usefully appreciated as a collective whole in a data flow context. FIGS. 60 through 67 present such a view by describing, at a data flow diagram level, the interactions of many of the logical components previously been described so that the overall system is appreciated for implementing an integrated process control system incorporating both general process control capability and safety shutdown capability in a form that satisfies (along with other organizational and quality control considerations as approved by the certifying agency) the present requirements for a certified system at the SIL1, SIL2, and SIL3 levels. Beginning with a discussion of FIG. 60, the real-time executive aspect of the control computer is shown in element 7101 with interaction to the field at 7102, representing apparatus 84, and to the high speed computer gateway (HSI) at element 7103 showing the primary and alternative units with which the real-time executive interfaces. A low speed communication interface (LSI) implemented in a standard-CPU-driven methodology is indicated at element 7104. Element 7105 indicates the interface with another control computer system as would be implemented through the use of the network controller boards. The serial graphic system at 7106 interfaces to the real-time executive 7101 through the methodology described with respect to FIGS. 34A1 to 34E. The interface to the external Motherboard components is indicated at drawing element 7107. Interface to the MCU and to the SCU, such as discussed respective to FIGS. 33A and 33B, is further referenced in drawing element 7108. FIG. 60 therefore describes the overall data flow diagram perspective with respect to the general control computer system context with the real-time executive or the control computer operating system at the central focal point. The interfaces between the real-time executive 7101 and the low speed communication section 7104 utilize a reference to CISS as the variable type. CISS stands for "Communication Interface SubSystem". It should further be noted that the use of the high speed communication interface, as depicted in drawing element 7103, or the low speed communication interface, at drawing element 7104, are implemented (in any particular instance) in the preferred embodiment alternatively and are not both active in any particular control system instance.

Figure 61:
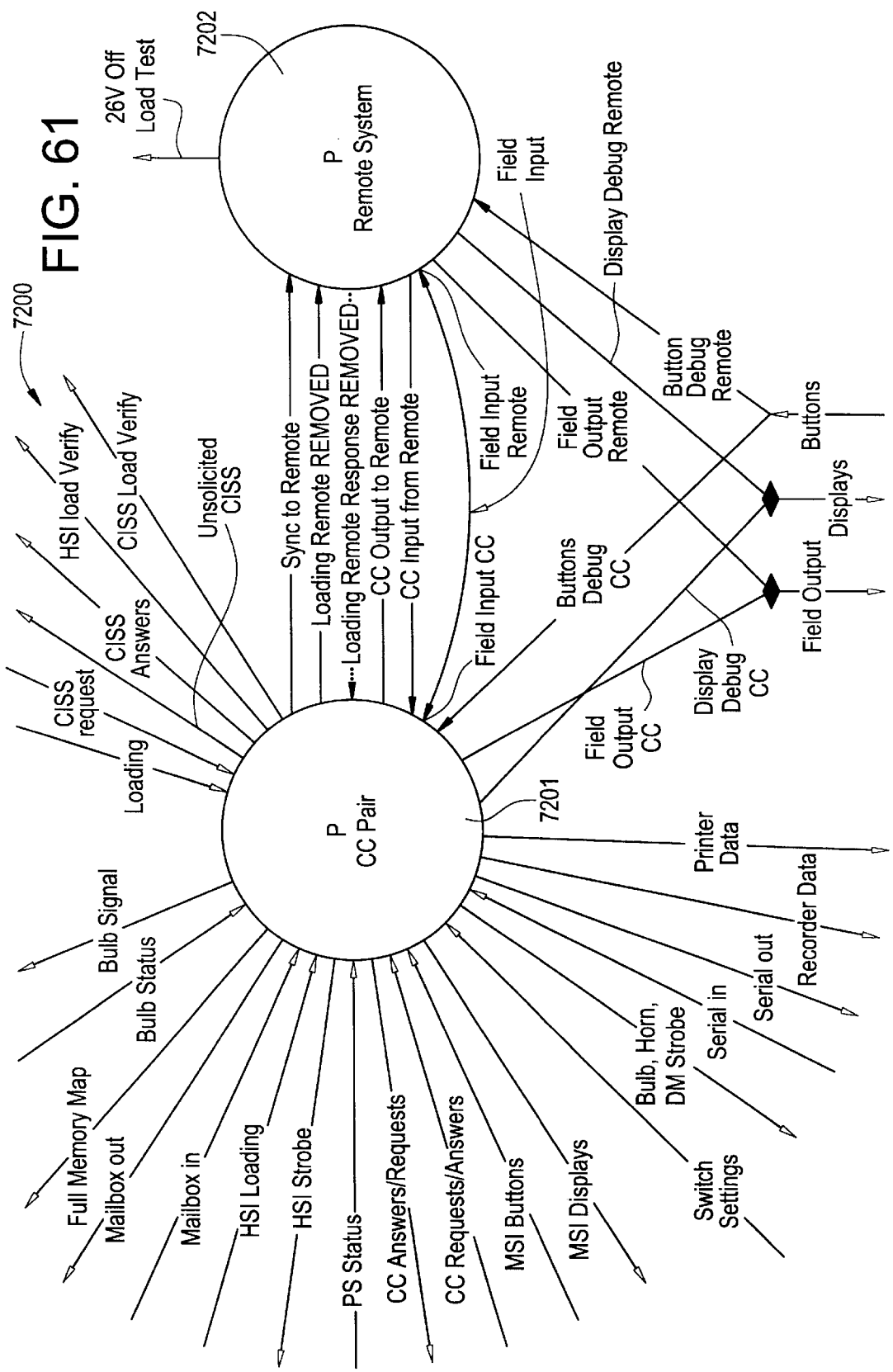
FIG. 61 illustrates the real-time executive data flow diagram for the control computers.
Figure 62A:
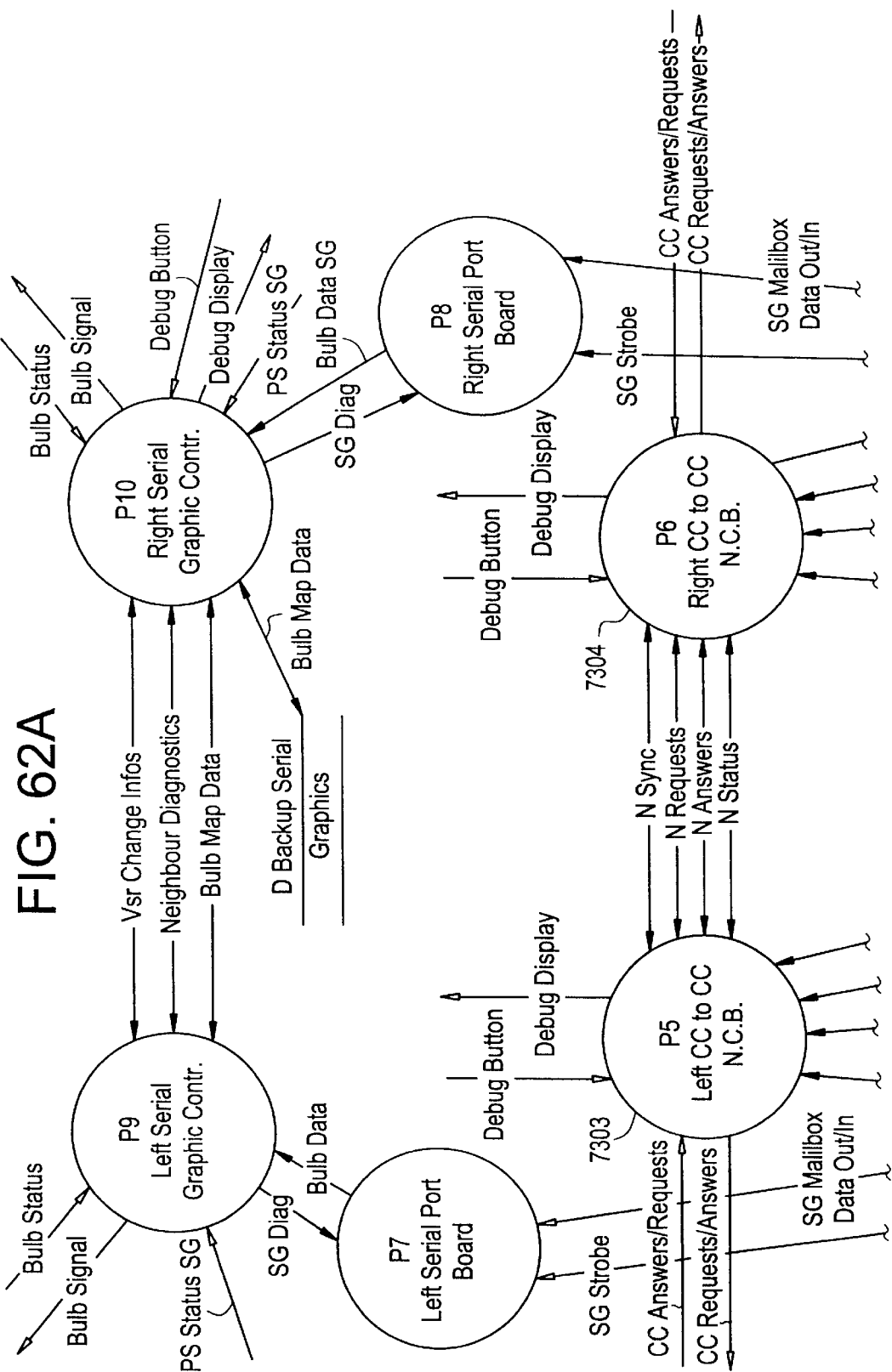
FIGS. 62A and 62B illustrate an actively redundant control computer data flow diagram for the control computers.
Figure 62B:
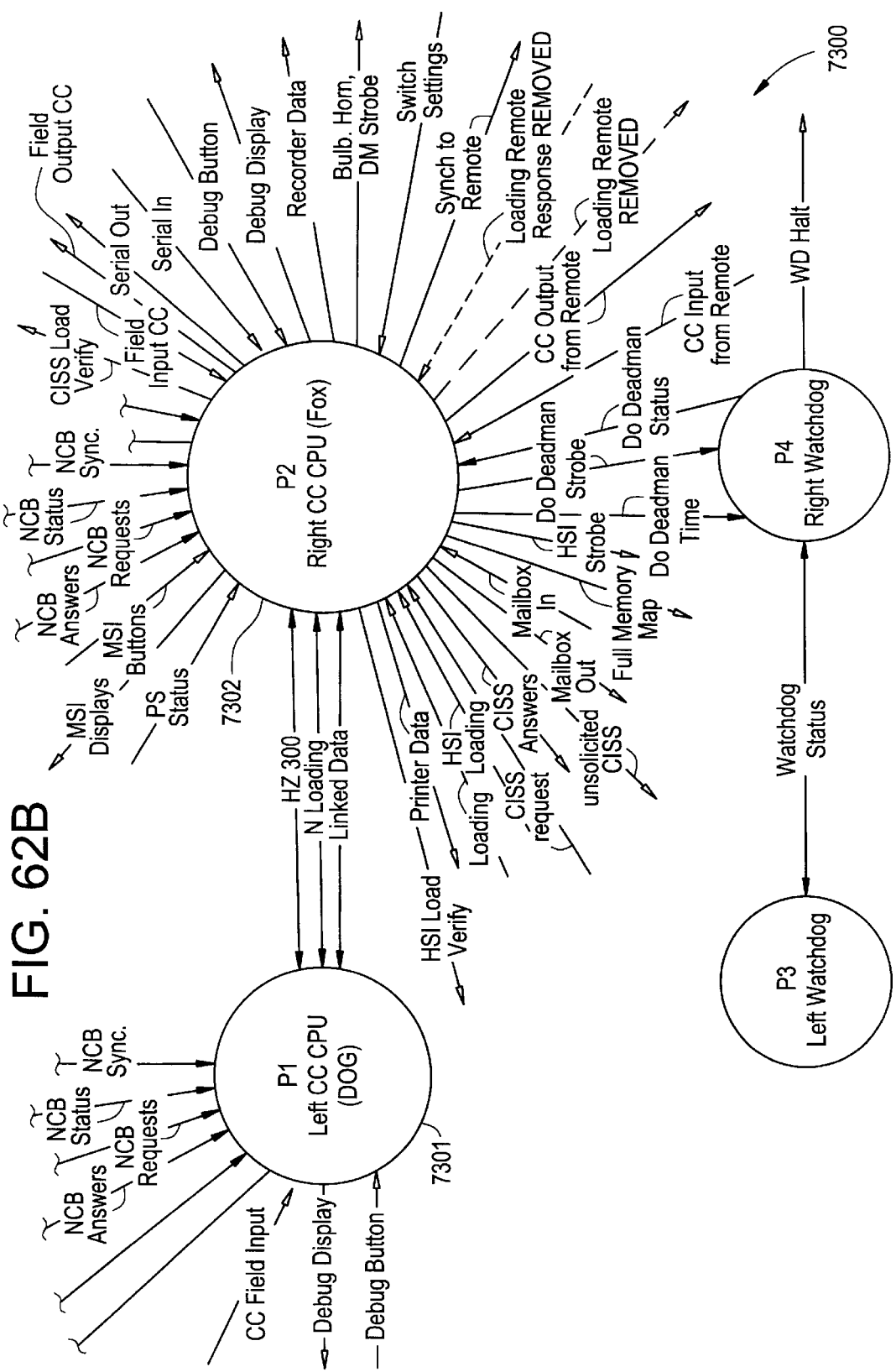
Figure 63A:
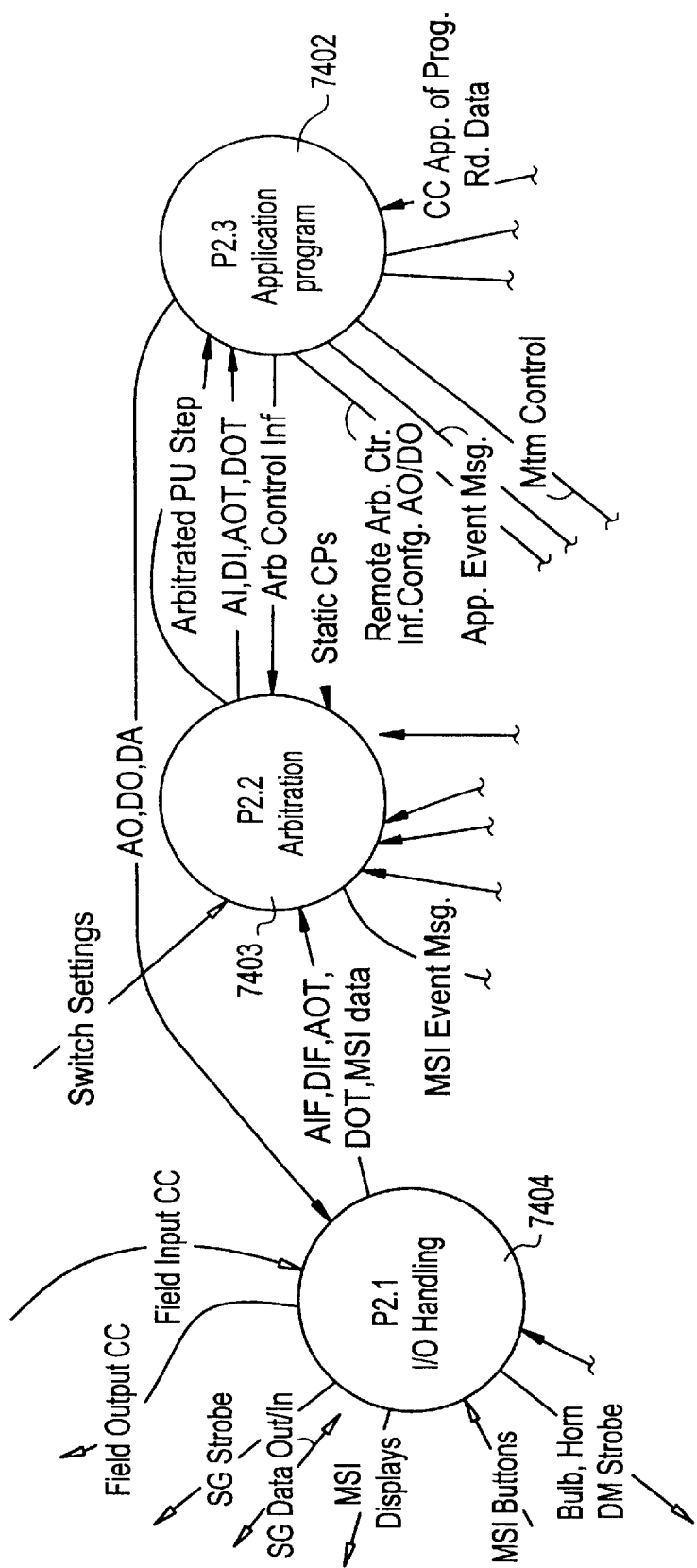
FIGS. 63A, 63B, and 63C illustrate the first nested level real-time executive data flow diagram for the control computers.
Figure 63B:
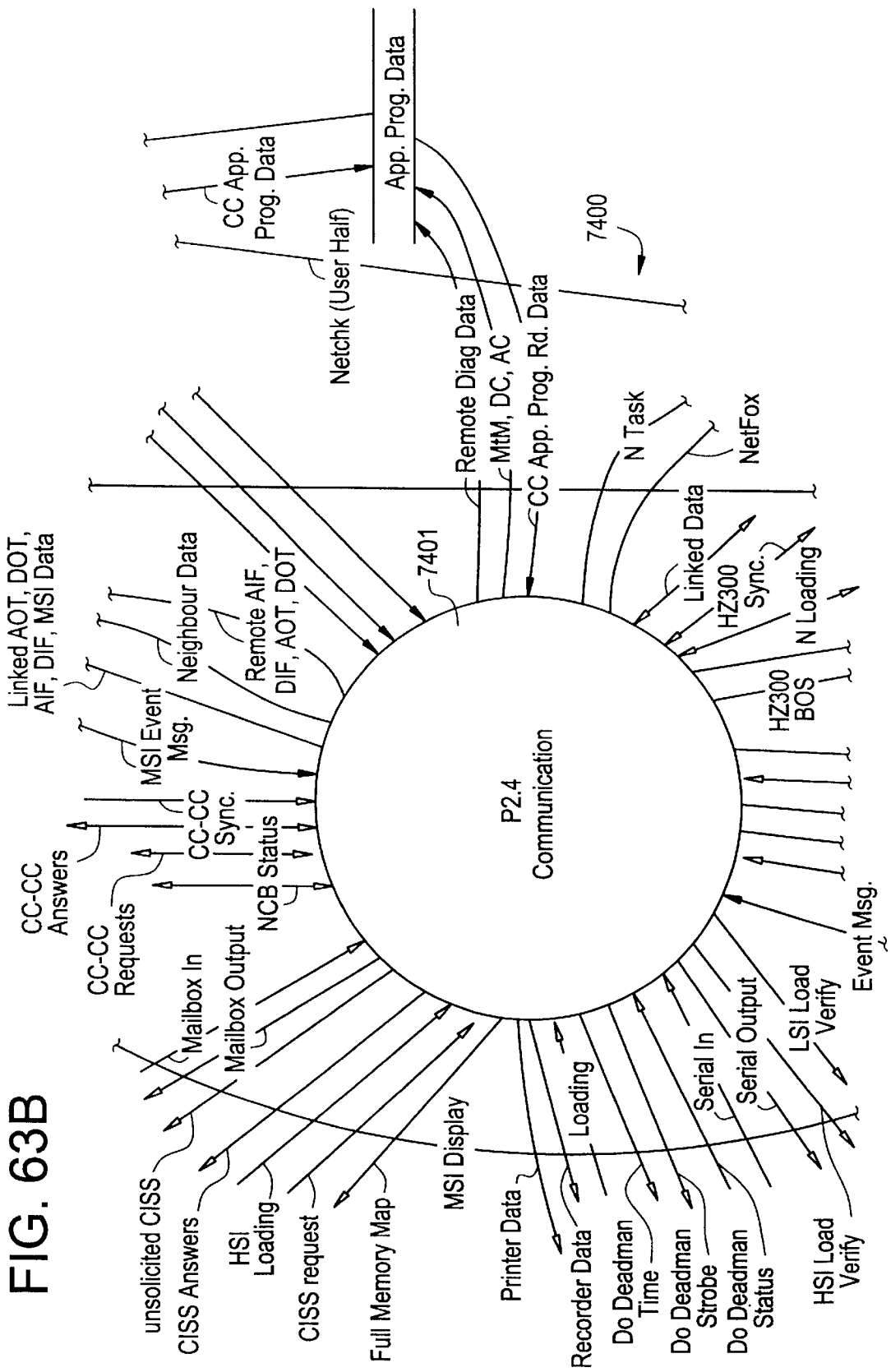
Figure 63C:
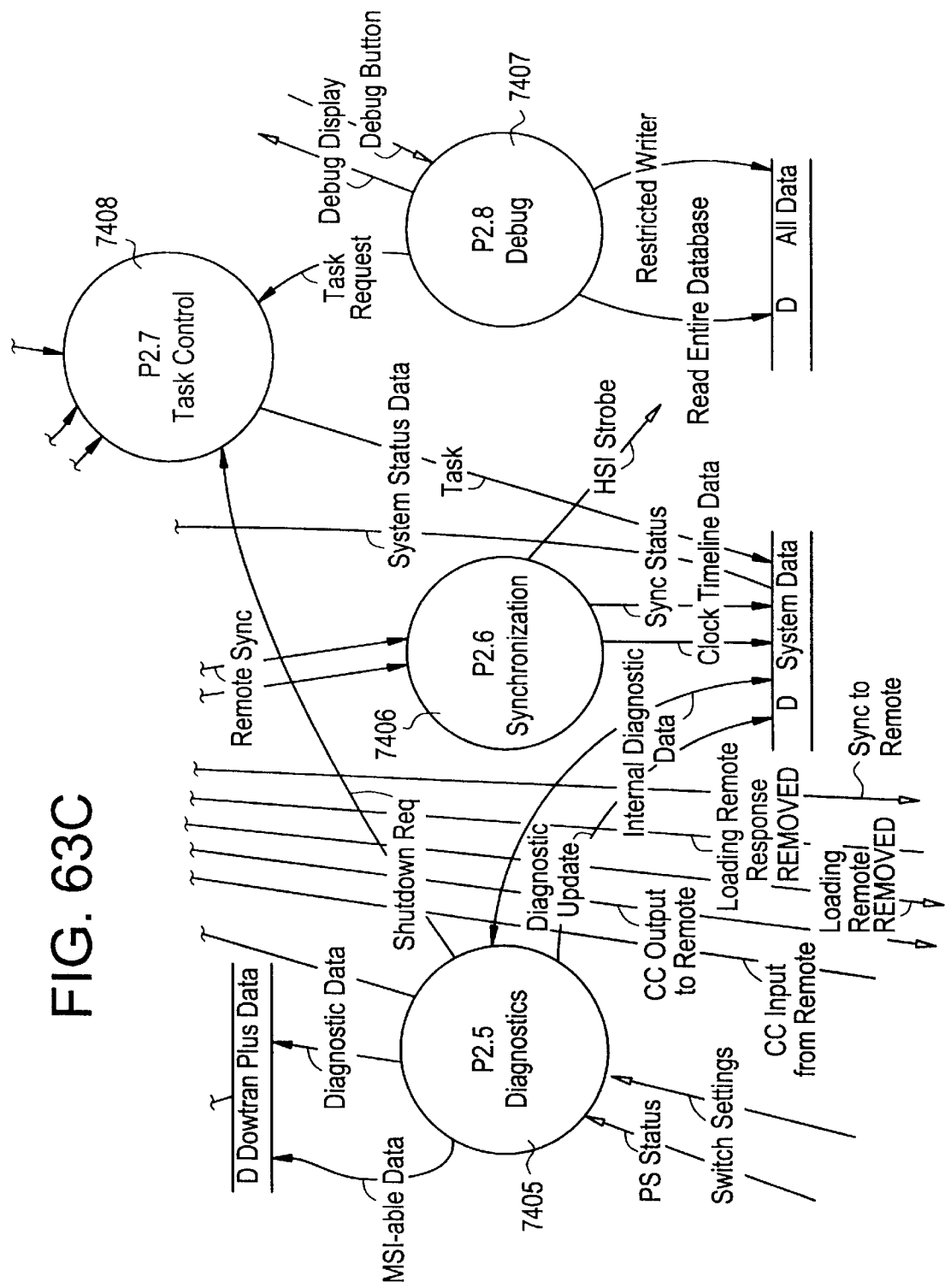
Figure 64:
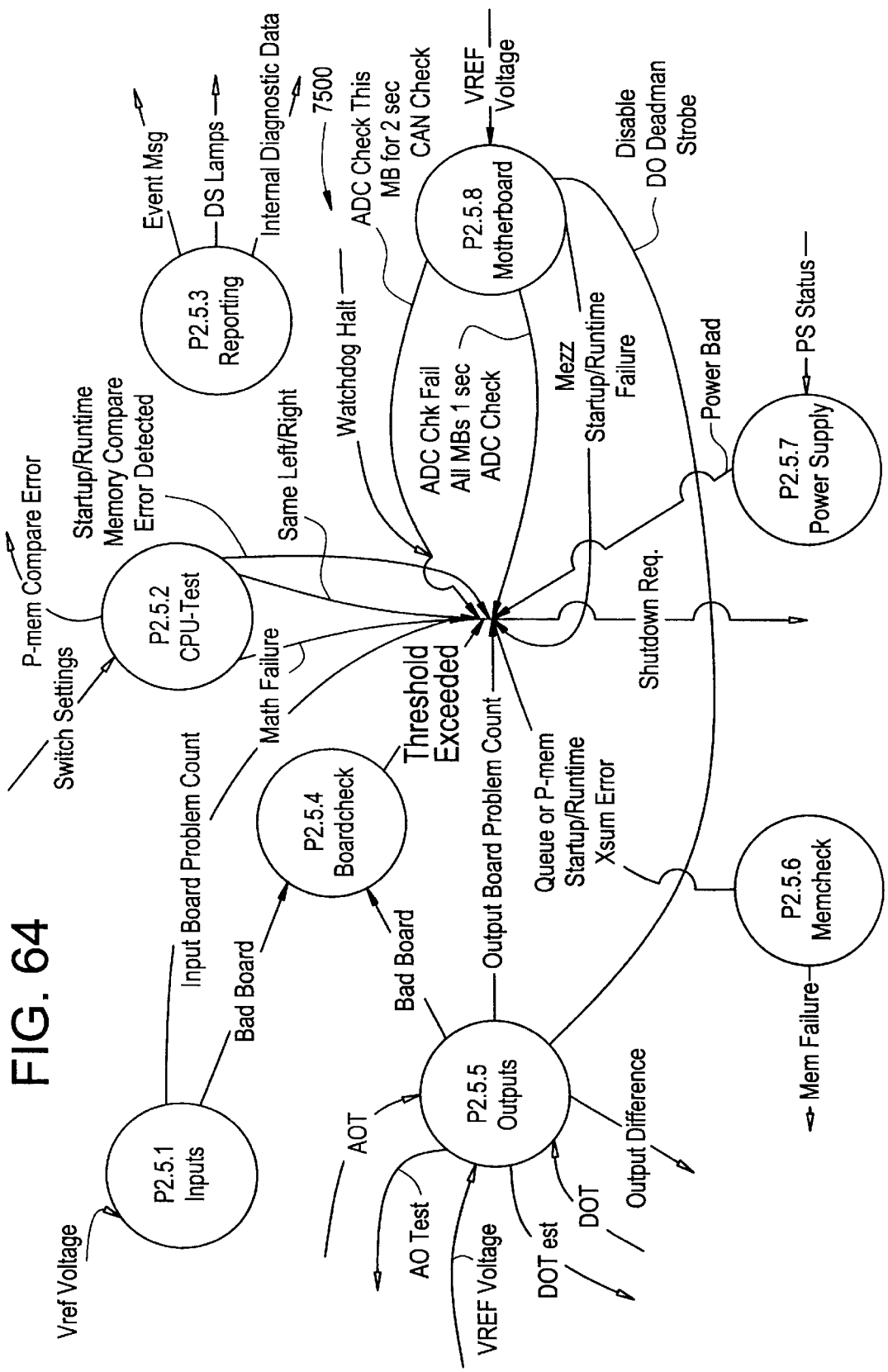
FIG. 64 illustrates the second-level-nested diagnostic real-time executive data flow diagram for the control computers.
Figure 65:
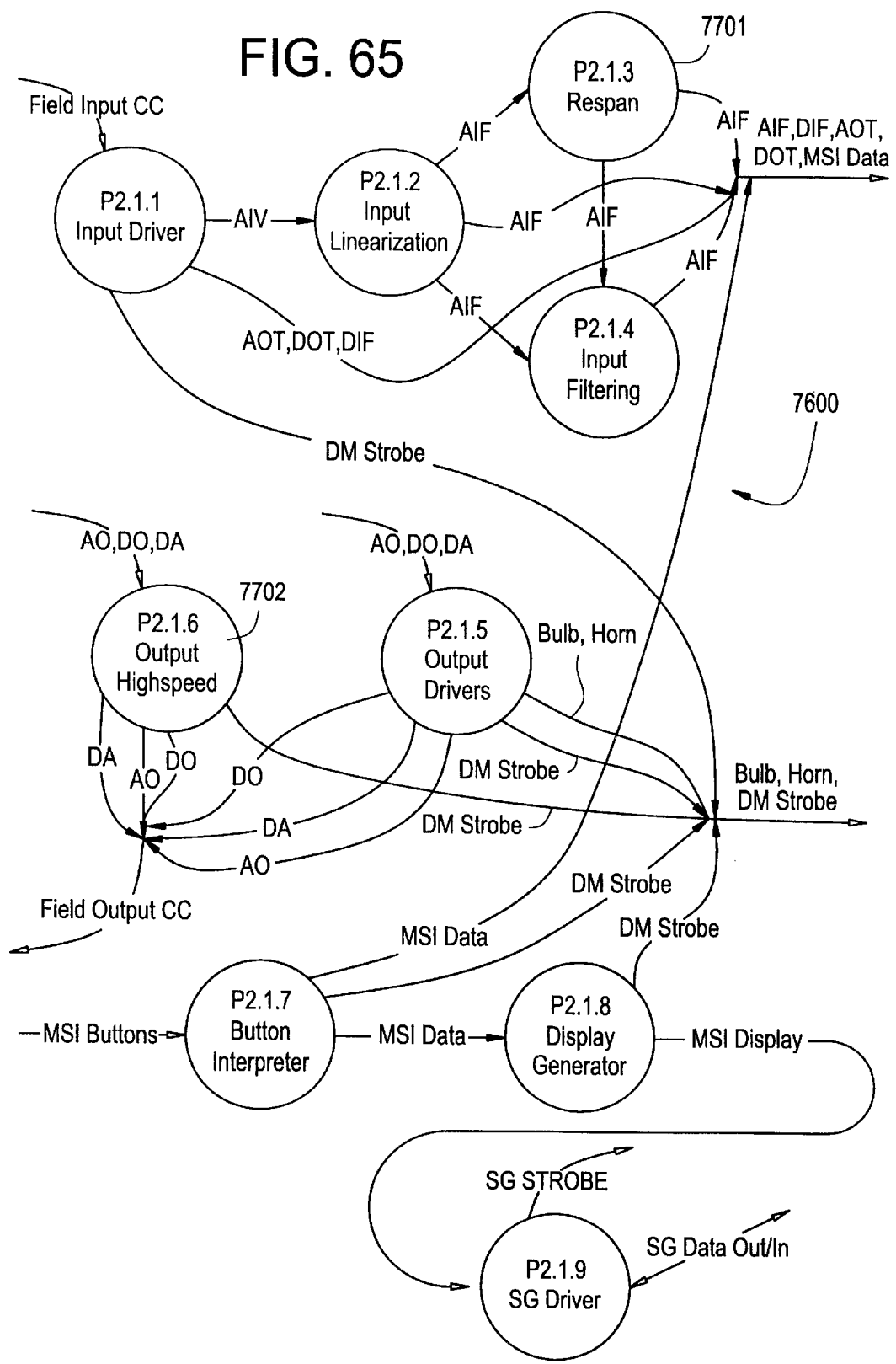
FIG. 65 illustrates the second-level-nested I/O handling real-time executive data flow diagram for the control computers.
Figure 66:
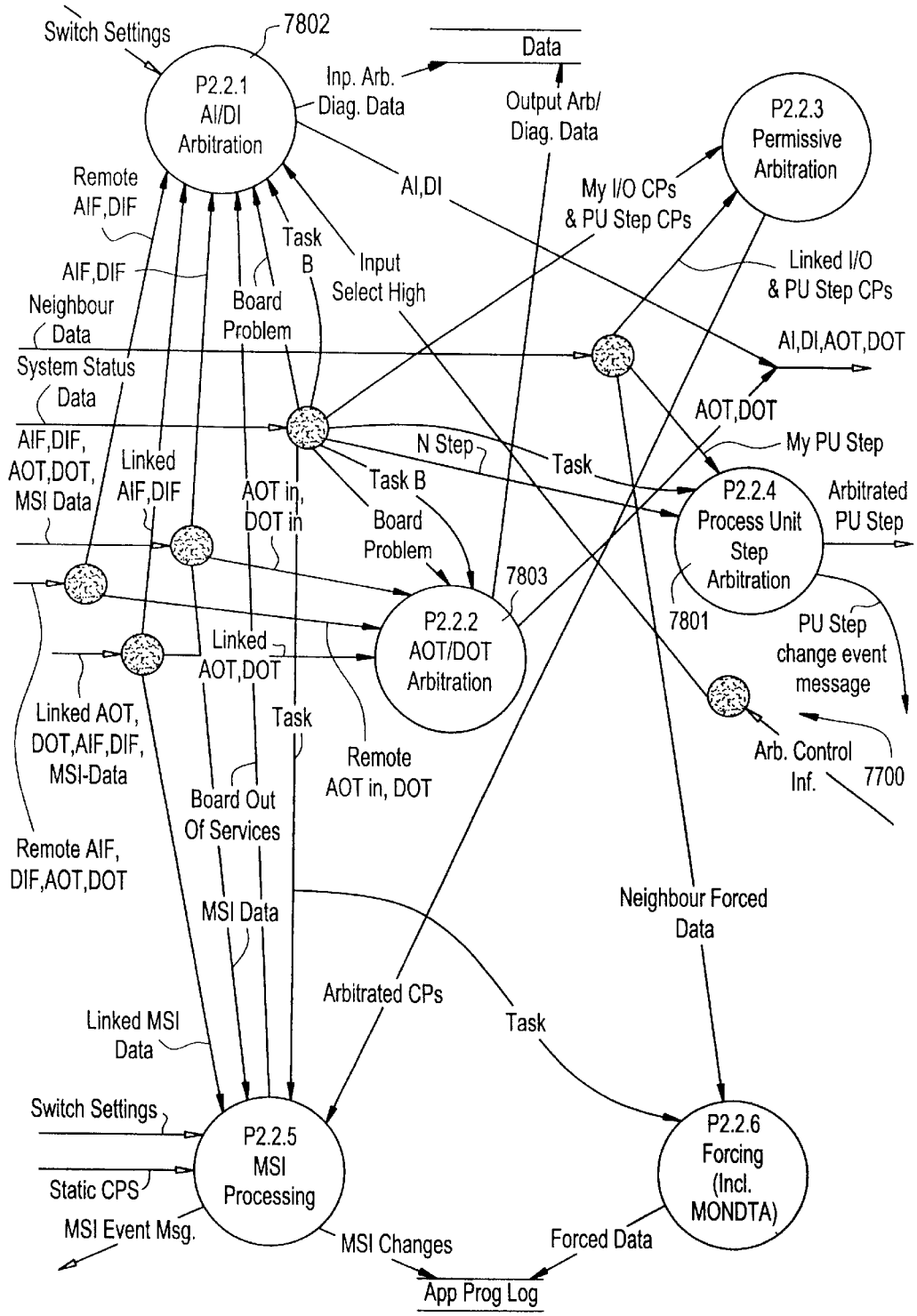
FIG. 66 illustrates the second-level-nested arbitration real-time executive data flow diagram for the control computers.
Figure 67:
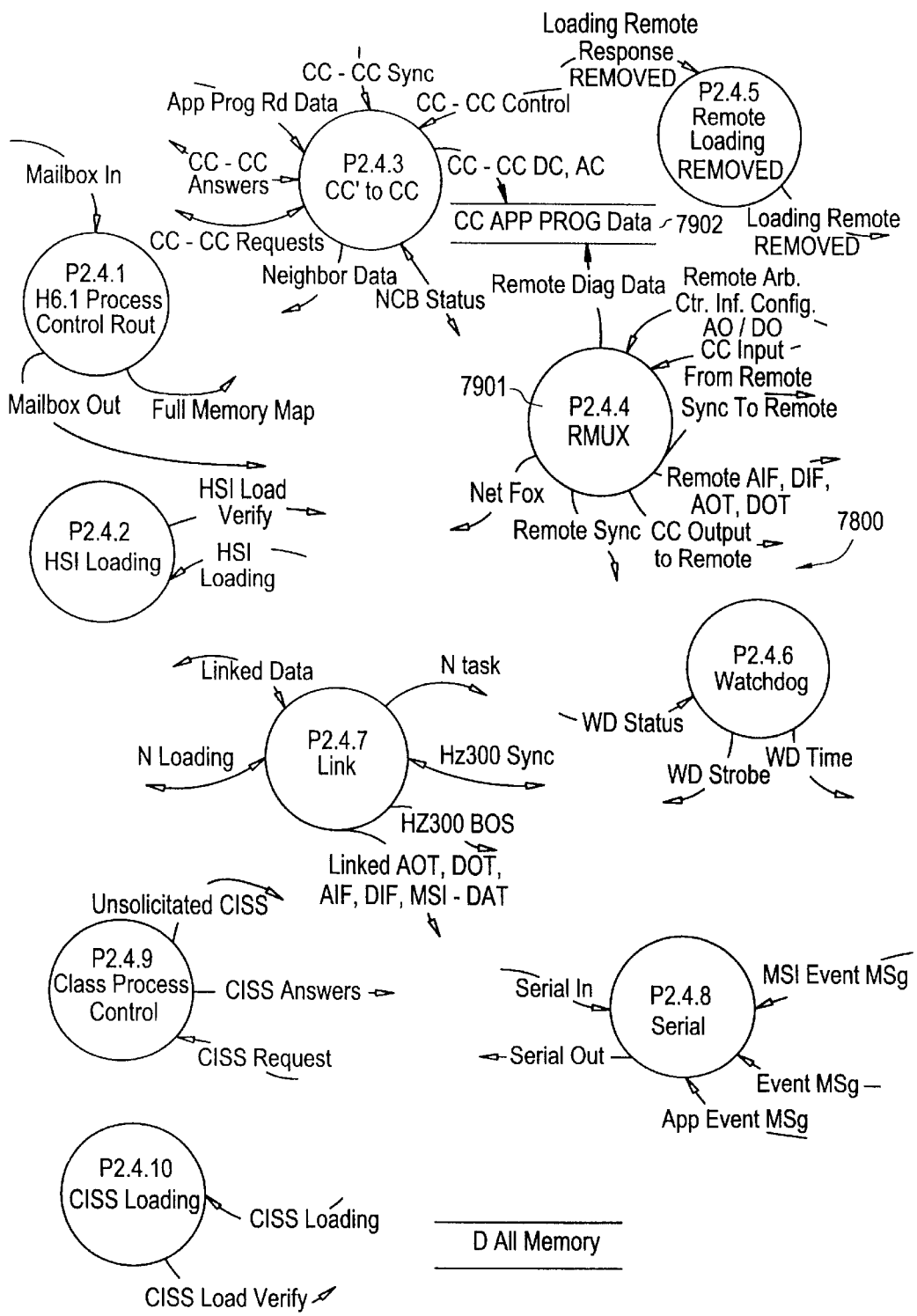
FIG. 67 illustrates the second-level-nested communication real-time executive data flow diagram for the control computers.

Continuing on to a consideration of FIG. 61, the real-time executive is further shown in the interaction between a control computer pair operating in an actively redundant mode, as depicted in drawing element 7201, with an interface to the Remote Field Unit system of drawing element 7202. In further consideration of FIG. 61, references to "CC" is a reference to the control computer, and a reference to HSI is for the high speed interface, as previously indicated in drawing element 7103. FIGS. 62A and 62B separate the control computer pair of FIG. 61, as indicated at drawing element 7201, into both the Left control computer and the Right control computer, as indicated at drawing elements 7301 and 7302. Drawing elements 7303 and 7304 reference the network controller boards which enable communication between the two control computers as has been previously discussed. It should also be noted that the communications of and respective to the Fox control computer, as denoted in 7302, and communications respective to the Dog control computer, at 7301, are essentially duplicated and that the provisions of space on FIGS. 62A and 62B precluded a detailed duplicating of all such similar communications that were occurring. In further consideration of FIGS. 62A and 62B, "NCB" refers to the network controller board. The initials "WD" reference Watchdog 603 and the letters "SG" refer to the Serial Graphics System. Continuing to FIGS. 63A, 63B, and 63C, a further expansion on the internals which exist in drawing element 7302, the Fox control computer's CPU, designated as the Right control computer CPU for this particular series of data flow diagrams, is further depicted (note that the data diagrams are also appropriate for the Dog). In this regard, communications are affected implicitly and explicitly via the database, as denoted in drawing element 7404, between the different particular blocks which are dedicated to specific tasks in the control computer: the Application Program coding including the SEQUENCE programming as indicated in drawing element 7402, the arbitration as indicated in 7403, the input/output signal handling as depicted in drawing element 7404, the diagnostics as discussed in drawing element 7405, synchronization between the two systems as denoted in drawing element 7406, debug operations as denoted in drawing element 7407, and task control as denoted in drawing element 7408. FIG. 64 shows an expansion of the diagnostic drawing element 7405 into its sub-components. Similarly, in FIG. 65, the I/O handling drawing element 7404 is expanded into an additional data flow diagram showing the exchanges between the various data flow diagram sub-objects. With respect to drawing element 7701, denoted as RESPAN, RESPAN is a routine in the preferred embodiment which modifies or changes the nature of an analog input to reflect a linearized signal when the normal response of the field measuring device (the device disposed in apparatus 84 to measure that particular data) does not generate data linear across the response span of the instrument. Drawing element 7702 shows high speed outputs respective to the Hz10 and Hz100 cycles. FIG. 66 depicts further data flow diagram detail respective to drawing element 7403 for arbitration in FIG. 63A. In this regard, Process Unit (PU) Step arbitration (discussed with respect to FIGS. 55 through 59) is expanded upon in data block flow item 7801 with classic input arbitration being handled in drawing element 7802 and output arbitration being handled in drawing element 7803. FIG. 67 presents the internal data flow diagram respective to the communication drawing element 7401 in data flow diagram of FIG. 63B. It should be noted in this regard that the RMUX object at drawing element 7901 relates to the interface between the control computers and the Remote Field Unit. The Application Program data store at drawing element 7902 resides in Data And Data Shadow Memory 14 of FIG. 3A.

The present invention has been described in an illustrative manner. In this regard, it is evident that those skilled in the art, once given the benefit of the foregoing disclosure, may now make modifications to the specific embodiments described herein without departing from the spirit of the present invention. Such modifications are to be considered within the scope of the present invention which is limited solely by the scope and spirit of the appended claims.

We claim:

1. A method for receiving input signals from manufacturing equipment and executing machine operation code determining at least one output signal adjusting at least one respective control device in said manufacturing equipment, comprising the steps of:

converting an application program instance into said machine operation code, said application program instance having at least two process unit step objects;

executing said machine operation code in a first control computer;

executing said machine operation code in a second control computer;

defining a first proposed process unit step in said first control computer to modify the active process unit step from a current process unit step to a new process unit step;

defining a second proposed process unit step in said second control computer to modify the active process unit step from the current process unit step to a new process unit step;

bilaterally transmitting said first and second proposed process unit steps between said first control computer and said second control computer so that each control computer contains both proposed process unit steps;

arbitrating said first and second proposed process unit steps in said first control computer to define a next process unit step;

arbitrating said first and second proposed process unit steps in said second control computer to define a next process unit step; and effecting in each control computer the next process unit step as the new current process unit step.

2. The method of claim 1 wherein said converting step uses a compiling translator having an embedded safety integrity programming rule set and wherein said safety integrity programming rule set provides adjoinder between said control computer, procedures and structures in said machine operation code, and safety integrity requirements, said method further comprising the steps of:

executing said machine operation code in a first control computer having a primary memory and a shadow memory wherein said first control computer reads said input signals and determines a first process control signal from first arbitrated input values;

executing said machine operation code in a second control computer having a primary memory and a shadow memory wherein said second control computer reads said input signals and determines a second process control signal from second arbitrated input values;

bilaterally transmitting said input signals between said first control computer and said second control computer;

determining said first arbitrated input values in said first control computer from the input signals transmitted from said second control computer and the input signals read by said first control computer;

determining said second arbitrated input values in said second control computer from the input signals transmitted from said first control computer and the input signals read by said second control computer; and coupling together to said control device the first process control signal and the second process control signal into one said output signal.

3. The method of claim 2 wherein said compiling translator compiles a Boolean operator type and a safety-domain Boolean operator type in said converting step.

4. A control computer receiving input signals from manufacturing equipment and executing machine operation code determining at least one output signal adjusting at least one respective control device in said manufacturing equipment, comprising:

means for evaluating real-time competence of said control computer to execute said machine operation code in essentially full accordance with said control computer as designed; and means for halting execution of said machine operation code when said real-time competence is unacceptable;

wherein said machine operation code is compiled from an application program instance by a compiling translator, wherein said application program instance has at least one safety integrity programming source code section and at least one general control source code section, wherein said control computer has a program memory section of memory for holding a portion of said machine operation code which is non-variant in real-time, and wherein said compiling translator further has
   a safety integrity programming rule set providing adjoinder between said control computer, procedures and structures in said machine operation code, and safety integrity requirements;
   means for interpreting a function type statement of said application program instance into a first list of input and output signals respective to said safety integrity programming section;
   means for defining a compiling translator signature data value characterizing said machine operation code for said program memory section;
   means for defining, independent of said function type statement, a second list of input and output signals in said application program instance respective to said safety integrity programming section;
   means for comparing the values in said first list and the values in said second list; and
   means for suppressing the generation of said machine operation code if said first list and said second list are different in the values that they contain;

and said control computer further comprises:
   means for defining a real-time signature data value characterizing said machine operation code in said program memory section;
   means for comparing said real-time signature data value to said compiling translator signature data value; and
   means for halting real-time execution of said machine operation code when said compiling translator signature data value and said real-time signature data value are different in value.

5. A control computer receiving input signals from manufacturing equipment and executing machine operation code determining at least one output signal adjusting at least one respective control device in said manufacturing equipment, comprising:

means for evaluating real-time competence of said control computer to execute said machine operation code in essentially full accordance with said control computer as designed; and means for halting execution of said machine operation code when said real-time competence is unacceptable;

wherein said machine-operation code is compiled from an application program instance by a compiling translator, said compiling translator having:
   a safety integrity programming rule set providing adjoinder between said control computer, procedures and structures in said machine operation code, and safety integrity requirements;
   means for compiling a first process unit step data object in dependence upon said safety integrity programming rule set; and
   means for compiling a second process unit step data object independently of said safety integrity programming rule set;

further comprising:
   a primary memory and a shadow memory;
   means for comparing data values in said primary memory and respective data values in said shadow memory; and
   means for halting said control computer when said data values in said primary memory and said respective data values in said shadow memory are different.

6. A method for receiving input signals from manufacturing equipment and executing machine operation code determining at least one output signal adjusting at least one respective control device in said manufacturing equipment, comprising the steps of:

evaluating real-time competence of said control computer for executing said machine operation code in essentially full accordance with the design of said control computer; and discontinuing said output signal when said real-time competence is unacceptable;

further comprising the steps of:
   providing a primary memory in said control computer;
   providing a shadow memory in said control computer;
   comparing data values in said primary memory and respective data values in said shadow memory when read-accessed in real-time; and
   halting said control computer when said data values in said primary memory and said respective data values in said shadow memory are determined by said comparing step to be different.

7. A method for receiving input signals from manufacturing equipment and executing machine operation code determining at least one output signal adjusting at least one respective control device in said manufacturing equipment, comprising the steps of:

generating said machine operation code with a compiling translator using a safety-domain rule set and a standard operations rule set; and loading said machine operation code into a control computer for execution in determining said output signals;

wherein said compiling translator compiles an application program instance into machine operation code in said machine operation code generating step, said application program instance has a safety integrity programming section, and said method further comprises the steps of:
   interpreting, in said compiling translator, a function type statement of said application program instance into a first list of input and output signals respective to a safety integrity programming rule set in said compiling translator for providing adjoinder between said control computer, procedures and structures in said machine operation code, and safety integrity requirements;
   defining, in said compiling translator, independent of said function type statement, a second list of input and output signals in said application program instance respective to said safety integrity programming section;
   comparing, in said compiling translator, the values in said first list and the values in said second list; and
   suppressing, in said compiling translator, the generation of said machine operation code if said first list and said second list are different in the values they contain.

8. A method for receiving input signals from manufacturing equipment and executing machine operation code determining at least one output signal adjusting at least one respective control device in said manufacturing equipment, comprising the steps of:

generating said machine operation code with a compiling translator using a safety-domain rule set and a standard operations rule set; and loading said machine operation code into a control computer for execution in determining said output signals;

wherein said compiling translator converts an application program instance into said machine operation code in said machine operation code generating step, wherein said application program instance has a safety integrity programming section, and wherein said safety-domain rule set provides adjoinder between said control computer, procedures and structures in said machine operation code, and safety integrity requirements, said method further comprising the steps of:

providing a data memory and a program memory in said control computer;

interpreting, in said compiling translator, a function type statement of said application program instance into a first list of input and output signals respective to said safety integrity programming compiling translator section;

defining, in said compiling translator, a compiling translator signature data value characterizing said machine operation code in said program memory;

defining, in said compiling translator and independent of said function type statement, a second list of input and output signals in said application program instance respective to said safety integrity programming compiling translator section;

comparing, in said compiling translator, the values in said first list and the values in said second list;

suppressing, in said compiling translator, the generation of said machine operation code if said first list and said second list are different in the values they contain;

defining, in said control computer, a real-time signature data value characterizing said machine operation code in said program memory and for comparing said real-time signature data value to said compiling translator signature data value; and halting, in said control computer, real-time execution of said machine operation code when said compiling translator signature data value and said real-time signature data value are different in value.

* * * * *